US008291074B2

(12) United States Patent
Kawamura et al.

(10) Patent No.: US 8,291,074 B2
(45) Date of Patent: Oct. 16, 2012

(54) NETWORK TYPE CONTENT REPRODUCING SYSTEM

(75) Inventors: Fumiaki Kawamura, Osaka (JP); Youichi Kudoh, Osaka (JP); Susumu Takemura, Osaka (JP); Yasushi Ikeda, Osaka (JP); Toshinobu Sano, Osaka (JP); Hiroko Yoshizaki, Osaka (JP); Takahiro Chiba, Osaka (JP)

(73) Assignee: Onkyo Corporation, Neyagawa-shi (JP)

( * ) Notice: Subject to any disclaimer, the term of this patent is extended or adjusted under 35 U.S.C. 154(b) by 0 days.

(21) Appl. No.: 13/226,621

(22) Filed: Sep. 7, 2011

(65) Prior Publication Data

US 2012/0041999 A1 Feb. 16, 2012

Related U.S. Application Data

(63) Continuation of application No. 13/107,101, filed on May 13, 2011, now Pat. No. 8,037,177, which is a continuation of application No. 13/019,631, filed on Feb. 2, 2011, now Pat. No. 8,005,928, which is a continuation of application No. 12/605,492, filed on Oct. 26, 2009, now Pat. No. 7,908,370, which is a continuation of application No. 10/498,181, filed as application No. PCT/JP03/06552 on May 26, 2003, now Pat. No. 7,634,532.

(30) Foreign Application Priority Data

| May 31, 2002 | (JP) | 2002-158753 |
| Aug. 9, 2002 | (JP) | 2002-232749 |
| Jan. 27, 2003 | (JP) | 2003-17931 |
| Feb. 24, 2003 | (JP) | 2003-45432 |

(51) Int. Cl.
*G06F 15/16* (2006.01)
*G06F 15/173* (2006.01)

(52) U.S. Cl. ........ 709/224; 709/203; 709/223; 709/228; 709/229

(58) Field of Classification Search ................ 709/219, 709/224, 328; 345/520
See application file for complete search history.

(56) References Cited

U.S. PATENT DOCUMENTS 5,732,217 A 3/1998 Emura
5,859,969 A 1/1999 Oki et al.
(Continued)

FOREIGN PATENT DOCUMENTS

EP 0 777 208 A 6/1997
(Continued)

OTHER PUBLICATIONS

Co-pending U.S. Appl. No. 13/107,101, filed May 13, 2011.
International Search Report, PCT/JP03/06552, mailed Sep. 16, 2003.
Network Working Group Request for Comments: 2616 Obsoletes: 2068 Category: Standards Track Hypertext Transfer Protocol—HTTP/1.1 14.35 Range 14.35.1 Byte Ranges.
(Continued)

*Primary Examiner* — Quang N. Nguyen
(74) *Attorney, Agent, or Firm* — Renner, Otto, Boisselle & Sklar, LLP

(57) ABSTRACT

A network AV system comprises a controller, a client connectable to the controller via a network, and an AV equipment connectable to the client. The controller includes a first transmitting unit transmitting a command for controlling a controlled element of the AV equipment to the client. The client includes a first receiving unit receiving the command from the controller, and a second transmitting unit transmitting the command to the AV equipment. The AV equipment includes the controlled element, a second receiving unit receiving the command from the client, and a controlling unit controlling the controlled element according to the received command.

14 Claims, 91 Drawing Sheets

U.S. PATENT DOCUMENTS

| | | | |
|---|---|---|---|
| 5,900,904 | A | 5/1999 | Okada et al. |
| 6,014,693 | A | 1/2000 | Ito et al. |
| 6,119,144 | A | 9/2000 | Fujita et al. |
| 6,173,328 | B1 | 1/2001 | Sato |
| 6,233,251 | B1 | 5/2001 | Kurobe et al. |
| 6,263,497 | B1 | 7/2001 | Maeda et al. |
| 6,397,258 | B1 | 5/2002 | Tsuji et al. |
| 6,452,943 | B1 | 9/2002 | Furuya |
| 6,647,496 | B1 | 11/2003 | Tagawa et al. |
| 6,721,490 | B1 | 4/2004 | Yao et al. |
| 6,725,155 | B1 | 4/2004 | Takahashi et al. |
| 6,804,820 | B1 | 10/2004 | Meric et al. |
| 6,865,431 | B1 | 3/2005 | Hirota et al. |
| 6,993,567 | B1 | 1/2006 | Yodo et al. |
| 7,000,002 | B2 | 2/2006 | Suzuki et al. |
| 7,051,110 | B2 | 5/2006 | Hagai et al. |
| 7,167,879 | B2 | 1/2007 | Sano et al. |
| 7,475,210 | B2 | 1/2009 | Yamada |
| 7,490,136 | B2 | 2/2009 | Suzuki |
| 7,620,713 | B2 * | 11/2009 | Tokuhashi et al. ............ 709/224 |
| 7,634,532 | B2 | 12/2009 | Kawamura et al. |
| 7,827,207 | B2 | 11/2010 | Takatsuka et al. |
| 7,908,370 | B2 | 3/2011 | Kawamura et al. |
| 8,005,928 | B2 | 8/2011 | Kawamura et al. |
| 8,140,648 | B2 * | 3/2012 | Sonoyama .................... 709/219 |
| 2001/0005363 | A1 | 6/2001 | Tajima |
| 2001/0009424 | A1 | 7/2001 | Sekiguchi |
| 2002/0056117 | A1 | 5/2002 | Hasegawa et al. |
| 2002/0058521 | A1 | 5/2002 | Yamada et al. |
| 2002/0194596 | A1 * | 12/2002 | Srivastava .................... 709/328 |
| 2003/0218613 | A1 * | 11/2003 | Yamamura et al. ........... 345/520 |
| 2004/0019685 | A1 | 1/2004 | Morita et al. |
| 2004/0153528 | A1 | 8/2004 | Suzuki |
| 2005/0010964 | A1 | 1/2005 | Sano et al. |
| 2005/0086284 | A1 | 4/2005 | Sano et al. |
| 2007/0031116 | A1 | 2/2007 | Takatsuka et al. |
| 2007/0112940 | A1 | 5/2007 | Morisawa et al. |
| 2008/0244067 | A1 | 10/2008 | Ushiyama |

FOREIGN PATENT DOCUMENTS

| | | |
|---|---|---|
| EP | 0 895 420 A2 | 2/1999 |
| EP | 0 898 278 A2 | 2/1999 |
| EP | 0 901 285 A1 | 3/1999 |
| EP | 0 964 578 A2 | 12/1999 |
| EP | 1 286 351 A2 | 2/2003 |
| JP | 04-167159 | 6/1992 |
| JP | 05-257839 | 10/1993 |
| JP | 06-326715 | 11/1994 |
| JP | 07-049704 | 2/1995 |
| JP | 07-327278 | 12/1995 |
| JP | 08-023583 | 1/1996 |
| JP | 08-202638 | 8/1996 |
| JP | 08-242426 | 9/1996 |
| JP | 08-289270 | 11/1996 |
| JP | 09-063176 | 3/1997 |
| JP | 09-070018 | 3/1997 |
| JP | 09-098362 | 4/1997 |
| JP | 09-244900 | 9/1997 |
| JP | 9-271002 | 10/1997 |
| JP | 09-284343 | 10/1997 |
| JP | 09-322123 | 12/1997 |
| JP | 09-331518 | 12/1997 |
| JP | 10-108157 | 4/1998 |
| JP | 10-304006 | 11/1998 |
| JP | 10-276408 | 12/1998 |
| JP | 10-320340 | 12/1998 |
| JP | 11-66824 | 3/1999 |
| JP | 11-096014 | 4/1999 |
| JP | 11-102287 | 4/1999 |
| JP | 11-103317 | 4/1999 |
| JP | 11-167550 | 6/1999 |
| JP | 11-168471 | 6/1999 |
| JP | 11-219207 | 8/1999 |
| JP | 11-234208 | 8/1999 |
| JP | 11-259404 | 9/1999 |
| JP | 2000-031998 | 1/2000 |
| JP | 2000-049831 | 2/2000 |
| JP | 2000-059755 | 2/2000 |
| JP | 2000-075867 | 3/2000 |
| JP | 2000-125260 | 4/2000 |
| JP | 2000-217167 | 8/2000 |
| JP | 2000-224207 | 8/2000 |
| JP | 2001-007856 | 1/2001 |
| JP | 2001-057571 | 2/2001 |
| JP | 2001-086163 | 3/2001 |
| JP | 2001-125773 | 5/2001 |
| JP | 2001-318949 | 5/2001 |
| JP | 2001-186162 | 7/2001 |
| JP | 2001-202317 | 7/2001 |
| JP | 2001-257707 | 9/2001 |
| JP | 2001-313741 | 9/2001 |
| JP | 2001-285284 | 10/2001 |
| JP | 2001-309457 | 11/2001 |
| JP | 2001-331176 | 11/2001 |
| JP | 2001-344271 | 12/2001 |
| JP | 2001-357312 | 12/2001 |
| JP | 2002-014912 | 1/2002 |
| JP | 2002-049556 | 2/2002 |
| JP | 2002-051387 | 2/2002 |
| JP | 2002-055687 | 2/2002 |
| JP | 2002-078047 | 3/2002 |
| JP | 2002-084202 | 3/2002 |
| JP | 2002-108814 | 4/2002 |
| JP | 2002-152319 | 5/2002 |
| JP | 2002-152682 | 5/2002 |
| JP | 2002-152859 | 5/2002 |
| JP | 2002-176610 | 6/2002 |
| JP | 2002-191038 | 7/2002 |
| JP | 2002-199344 | 7/2002 |
| JP | 2002-223443 | 8/2002 |
| JP | 2002-236490 | 8/2002 |
| JP | 2002-199344 | 12/2002 |
| JP | 2003-018668 | 1/2003 |
| JP | 2003-022225 | 1/2003 |
| JP | 2003-066973 | 3/2003 |
| JP | 2003-084761 | 3/2003 |
| JP | 2003-110561 | 4/2003 |
| JP | 2003-111048 | 4/2003 |
| JP | 2003-131975 | 5/2003 |
| JP | 2003-143222 | 5/2003 |
| JP | 2003-143583 | 5/2003 |
| JP | 2003-330827 | 11/2003 |
| WO | 98/38798 | 9/1998 |
| WO | 03/102919 | 12/2003 |

OTHER PUBLICATIONS

European Search Report for corresponding Application No. 04027337.7 dated Mar. 17, 2005.

European Search Report for corresponding Application No. 03733064.4 dated Jun. 30, 2005.

Mainichi Communications, Inc., Japan; "Essential Techniques for Comfortable Use of Personal Computer and Peripherals/Driver Software Complete Research;" Mar. 29, 2002; Windows Start vol. 7, No. 8; pp. 82-97.

Impress Corporation, Japan; "Apple Unveils iTunes 4 Supporting AAC, Co-owing of Audio Library on LAN Realized, AV Watch;" www.watch.impress.co.jp/av/docs/20030430/apple2.htm; Apr. 30, 2003.

Digital Arena, Nikkei BP Co. Ltd., Japan; Is iTunes 4 function of co-owning music illegal?; http://arena.nikkeibp.co.jp/col/20030521/104720/; May 21, 2003.

Satoshi Yoneda, Softbank Publishing Corporation, Japan; "140th, Gateway to UNIX, Home Server of Fast Internet Era, No. 5;" DOS/Vmagazine vol. 10, No. 19; Oct. 1, 2001; pp. 286-289.

Koji Konishi, Softbank Publishing Corporation, Japan; "For Playback of Movies/Sounds Obtained Through Internet, Multi Media Days: Happiest Playback Instructions;" DOS/VMagazine vol. 10, No. 9; May 1, 2001; pp. 160-167.

Takuya Tanaka, Softbank Publishing Corporation, Japan; "Home AV Server PK-AX10 NEC;" PC User vol. 9, No. 21; Dec. 8, 2002; p. 132.

* cited by examiner

F I G. 5
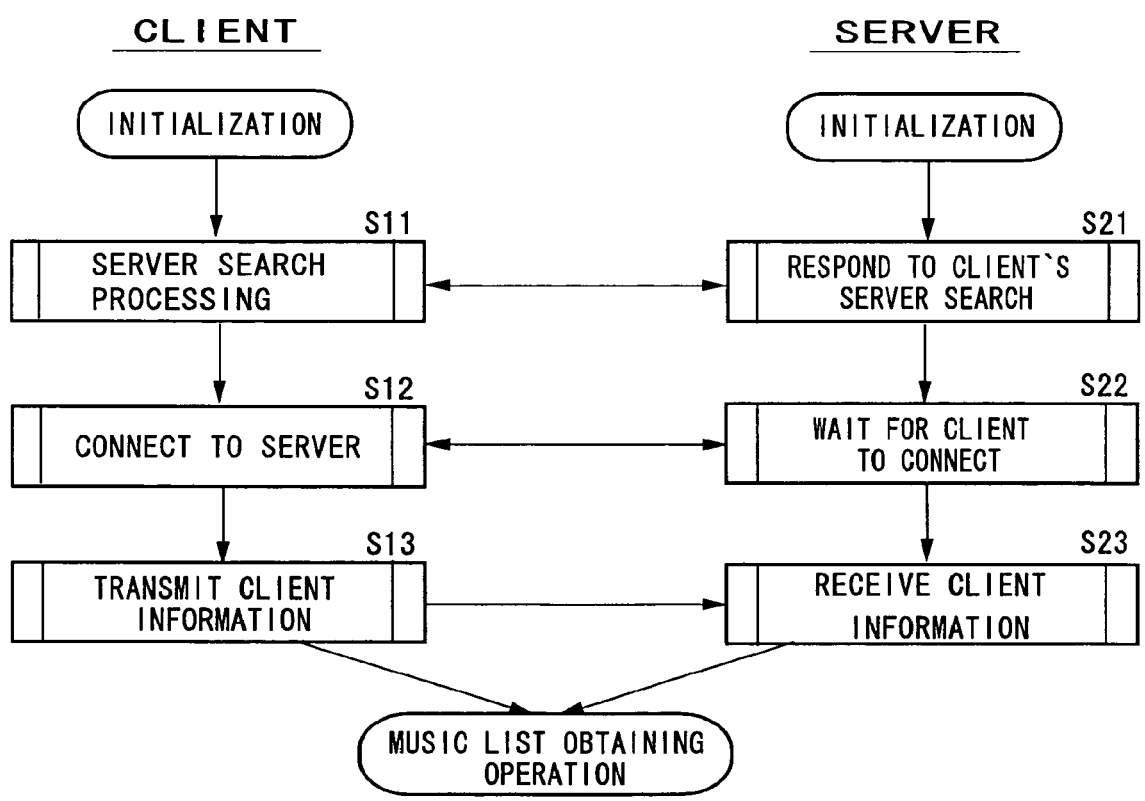

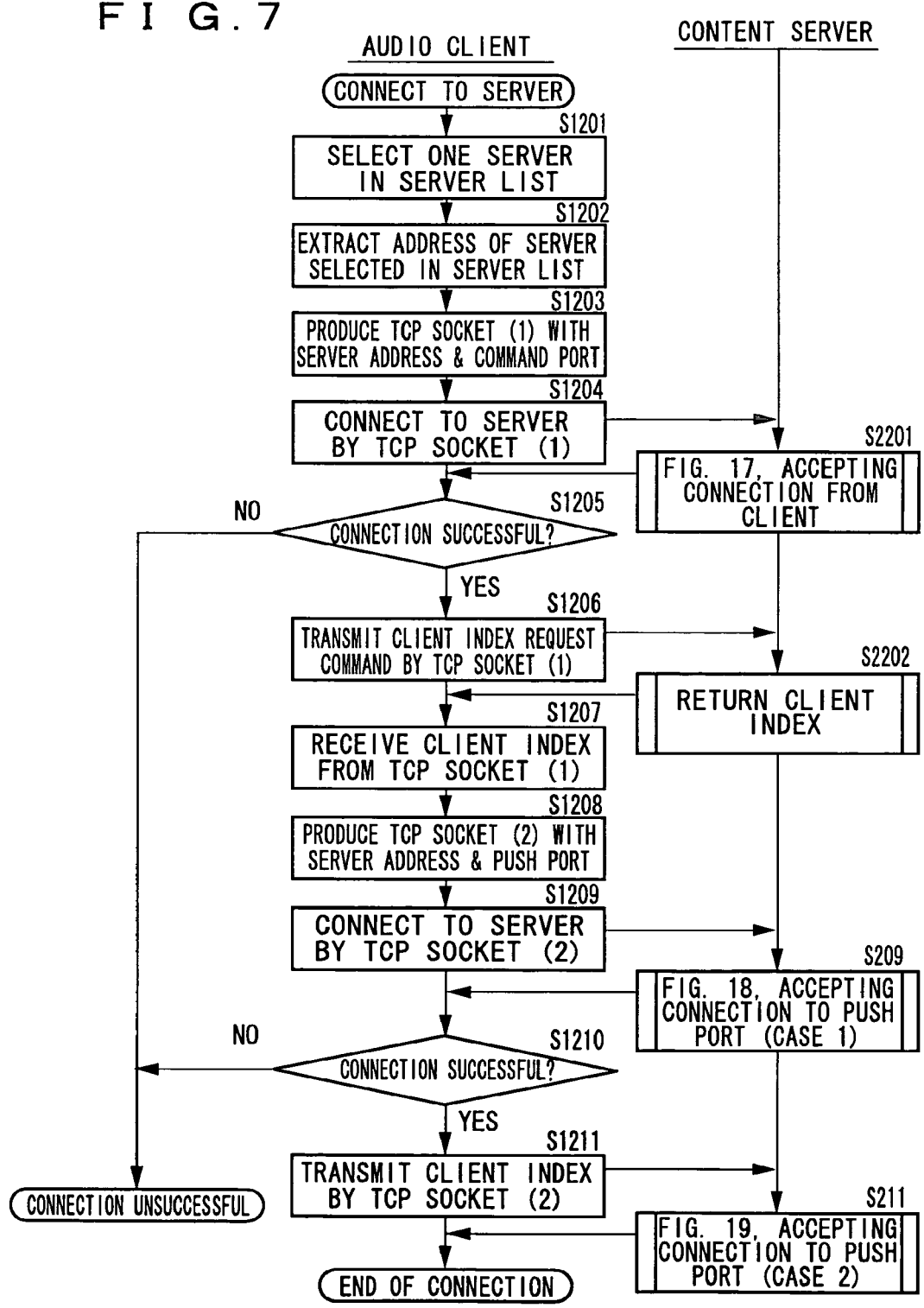

F I G. 1 0
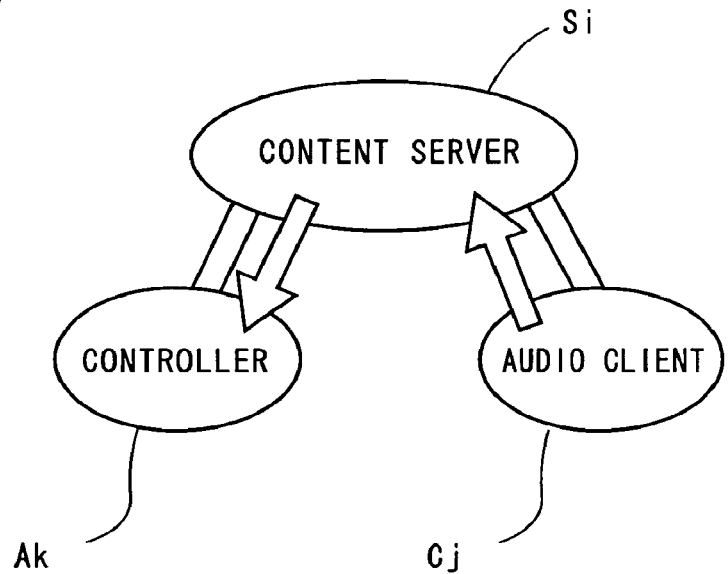
F I G. 1 1
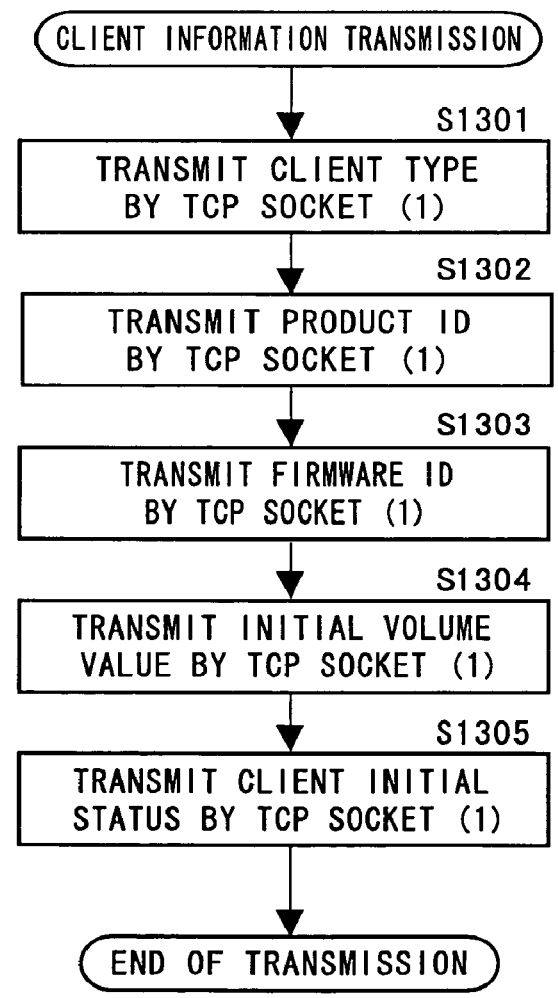

FIG. 13

CLIENT INFORMATION DATABASE

| FIELD NAME | CONTENT |
|---|---|
| flag | PRESENCE/ABSENCE OF CONNECTION |
| type | CLIENT TYPE |
| status | PRESENT STATUS |
| volume | PRESENT VOLUME VALUE |
| productid | PRODUCT ID |
| firmwareid | FIRMWARE ID (VERSION) |
| hostname | CLIENT NAME |
| filename | REPRODUCING FILE NAME |
| curkey | LIST CONSTRUCTION KEY |

(MULTIPLIED BY MAXIMUM CLIENT NUMBER)

FIG. 14

CONTENT INFORMATION DATABASE

| FIELD NAME | CONTENT |
|---|---|
| filename | FILE NAME |
| title | MUSIC PIECE TITLE |
| artist | ARTIST'S NAME |
| album | ALBUM TITLE |
| genre | GENRE |
| length | MUSIC PIECE LENGTH (TIME) |
| type | DATA FORMAT (MP3, WAV, etc.) |
| unmAccessed | NUMBER OF REPRODUCTION |
| latestAccessTime | WHEN ACCESSED LAST (DATE & TIME) |

(MULTIPLIED BY THE NUMBER OF MUSIC PIECES)

FIRMWARE INFORMATION DATABASE

| FIELD NAME | CONTENT |
|---|---|
| productid | PRODUCT ID |
| firmwareid | FIRMWARE ID (VERSION) |
| size | FILE SIZE |
| type | FILE FORMAT |
| filename | FILE NAME |

(MULTIPLIED BY THE NUMBER OF FIRMWARE PIECES)

F I G. 2 0
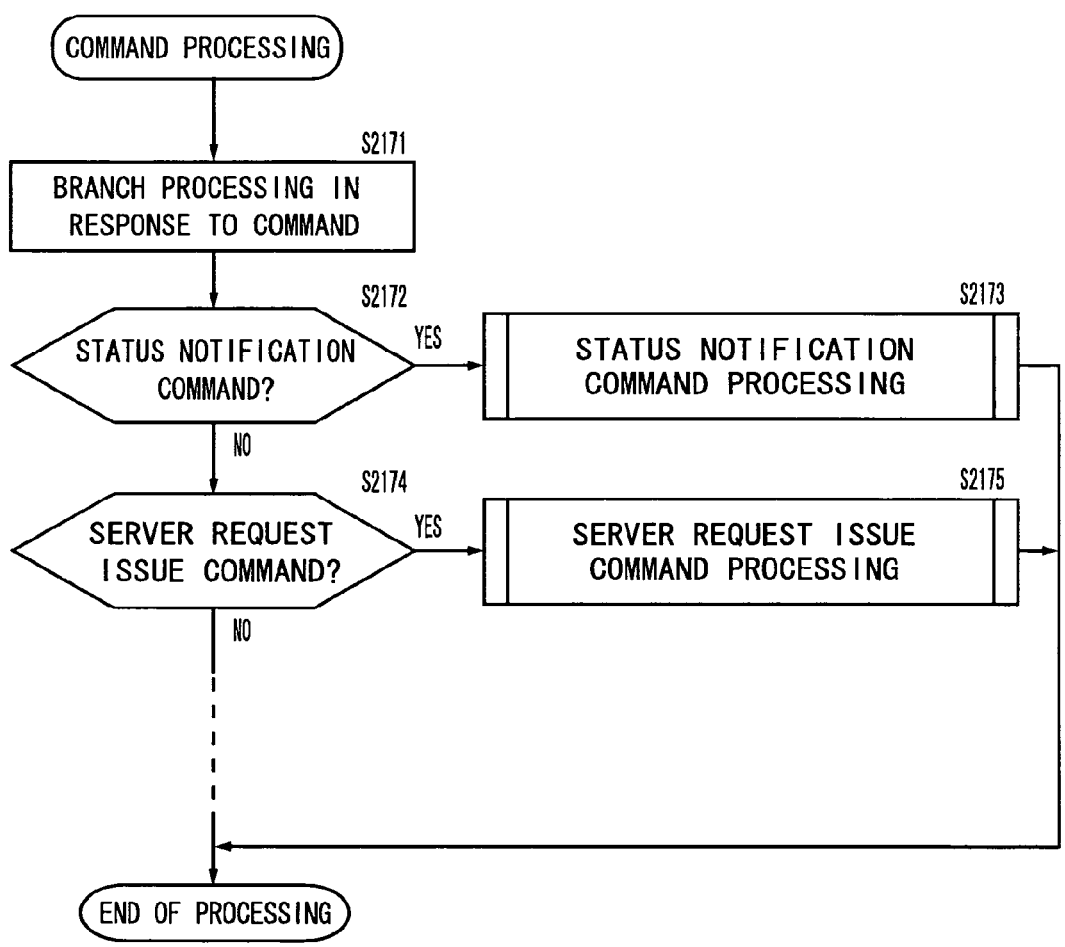

FIG. 26

GENRE LIST STORAGE REGION

| | |
|---|---|
| 1 | POPS |
| 2 | BLUES |
| 3 | CLASSIC |
| 4 | EASY LISTENING |
| | ... |
| n | WORLD MUSIC |

FIG. 27

| CONTENT INFORMATION DATABASE | |
|---|---|
| (NO.) | (ITEM) |
| RECORD 0 | TITLE |
| | GENRE |
| | ARTIST |
| | ALBUM TITLE |
| RECORD 1 | TITLE |
| | GENRE |
| | ARTIST |
| | ALBUM TITLE |
| | |
| RECORD n-1 | TITLE |
| | GENRE |
| | ARTIST |
| | ALBUM TITLE |

| LIST REQUEST COMMAND | |
|---|---|
| PARAMETER | OBTAINING START INDEX |
| | OBTAINING NUMBER |
| | LIST CONSTRUCTION KEY |

FIG. 32

| SEARCH DATA | |
|---|---|
| EFFECTIVE NUMBER | |
| REMAINING NUMBER | |
| FILE LIST INFORMATION 1 | FILE NAME |
| | TITLE |
| | ARTIST |
| | ALBUM TITLE |
| | HOURS |
| | MINUTES |
| | SECONDS |
| | GENRE |
| | AUDIO SOUND FORMAT |
| ... | ... |
| FILE LIST INFORMATION N | |

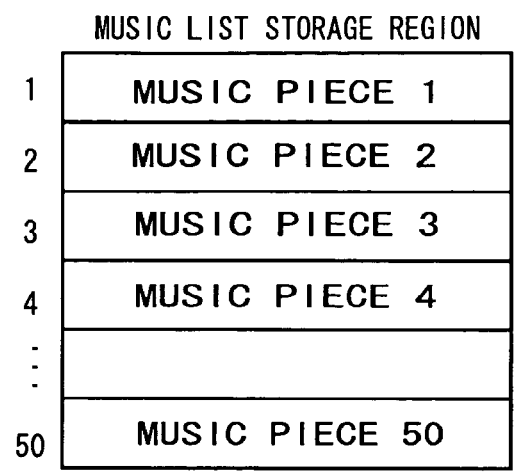
FIG. 33A
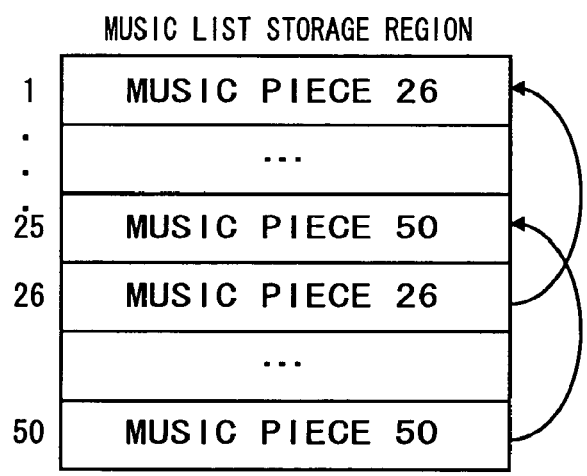
FIG. 33B
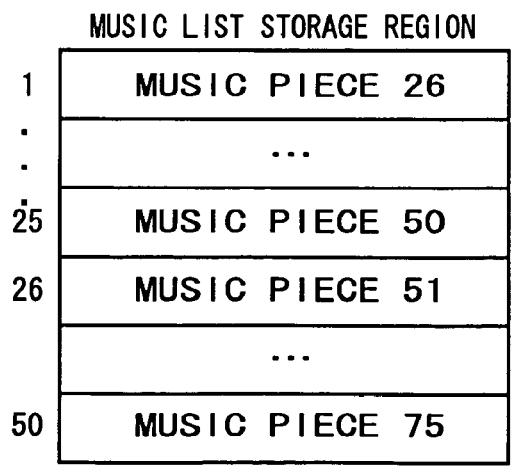
FIG. 33C

FIG. 37

| REQUEST CONTENT | |
|---|---|
| MUSIC PIECE INFORMATION REQUEST COMMAND INFORMATION | |
| PARAMETER | MUSIC PIECE FILE NAME |

FIG. 38

| RESPONSE CONTENT |
|---|
| MUSIC PIECE INFORMATION |
| DATA OFFSET |
| DATA SIZE |

FIG. 39

| REQUEST CONTENT | |
|---|---|
| MUSIC PIECE REPRODUCING PREPARATION COMMAND | |
| PARAMETER | MUSIC PIECE FILE NAME |
| | LIST CONSTRUCTION KEY |

FIG. 40

| RESPONSE CONTENT |
|---|
| ERROR CODE |

FIG. 41

| REQUEST CONTENT | |
|---|---|
| MUSIC PIECE DATA TRANSFER REQUEST COMMAND | |
| PARAMETER | OBTAINING START ADDRESS |
| | OBTAINING DATA LENGTH |

FIG. 42

| RESPONSE CONTENT |
|---|
| MUSIC PIECE DATA |

F I G. 5 2
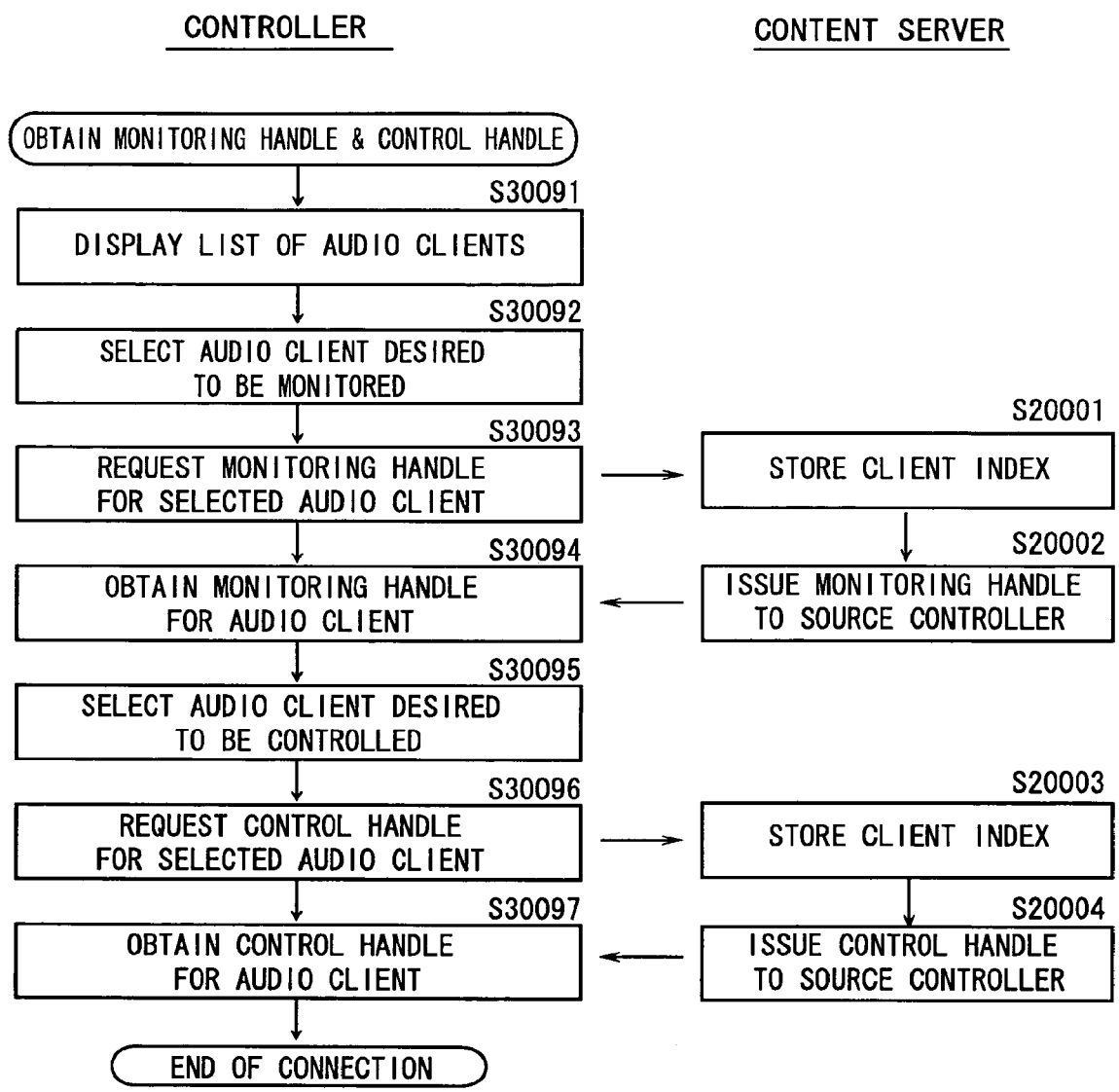

F I G. 5 3
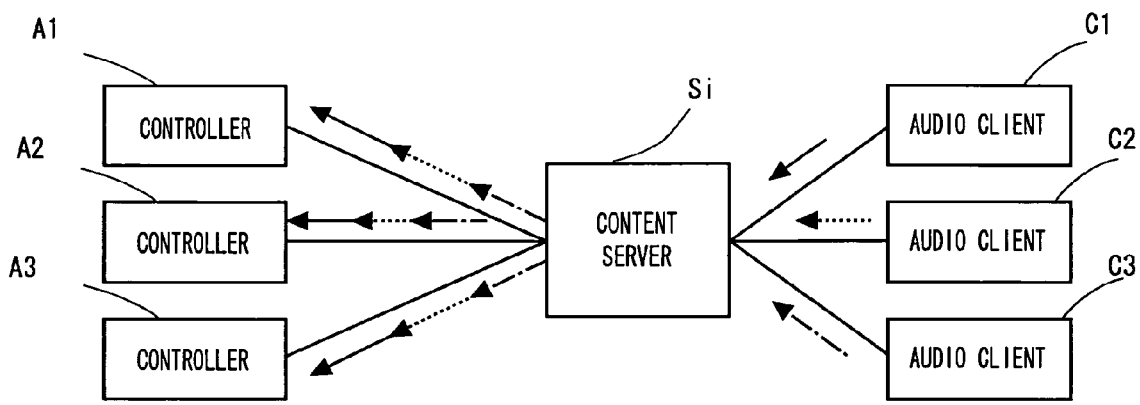
F I G. 5 4
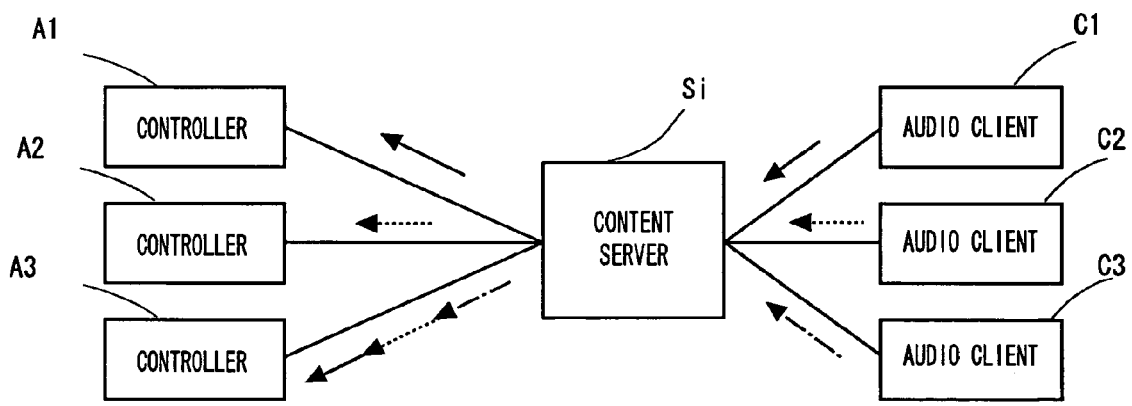

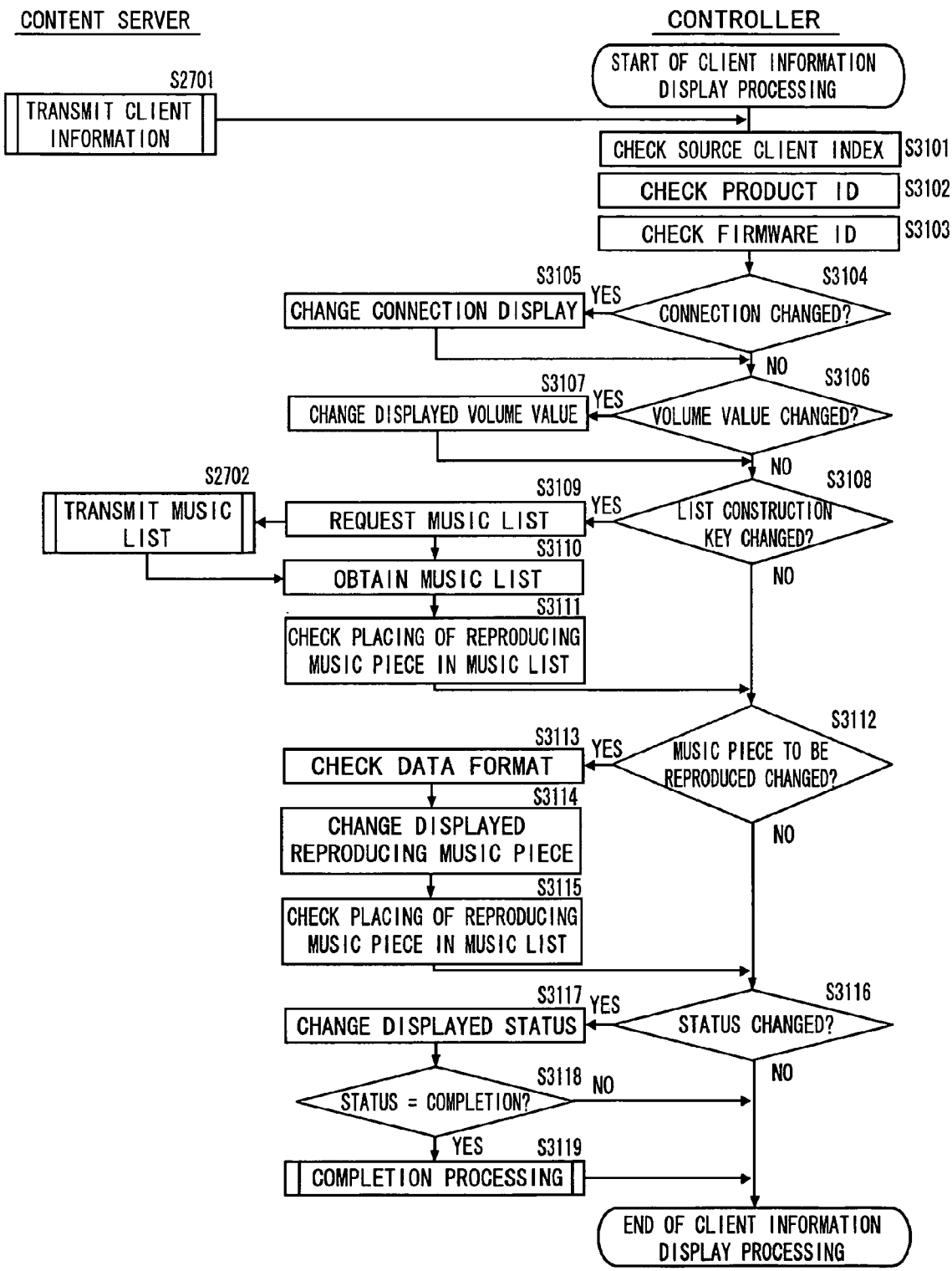

F I G. 6 0

| CLIENT TYPE | |
|---|---|
| HARDWARE STRUCTURE | Unknown |
| | AUDIO CLIENT (INTELLIGENT TYPE) |
| | AUDIO CLIENT (NON-INTELLIGENT TYPE) |
| | CONTROLLER |
| | AVR CLIENT |
| | AVR ADMINISTRATOR |
| REPRODUCIBLE FORMAT | MP3 |
| | WAV |
| | DTS |

FIG. 62

```
CLIENT C1

Playlist1

TITLE        ARTIST      FORMAT
aaaaaaaa     xxx         MP3
bbbbbbbb     yyy         WAV
bbbbbbbb     zzz         MP3 abcdef       yyy         MP3
```

FIG. 63

```
CLIENT C2

Playlist1

TITLE        ARTIST      FORMAT
aaaaaaaa     xxx         MP3
bbbbbbbb     yyy         WAV
bbbbbbbb     zzz         MP3 abcdef       yyy         MP3
```

FIG. 68

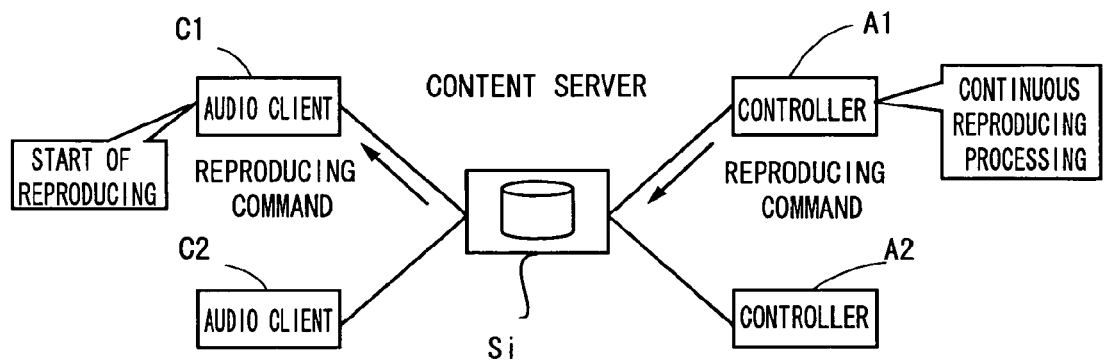

FIG. 69

| LIST CONSTRUCTION KEY ||
|---|---|
| PARAMETER | KIND OF FILTER |
| | KEYWORD |

FIG. 70

| KIND OF FILTER ||
|---|---|
| TITLE= | PRODUCE LIST OF PIECES HAVING THE TITLE MATCHING KEYWORD |
| GENRE= | PRODUCE LIST OF PIECES HAVING GENRE MATCHING KEYWORD |
| ARTIST= | PRODUCE LIST OF PIECES HAVING ARTIST NAME MATCHING KEYWORD |
| ALBUM= | PRODUCE LIST OF PIECES HAVING ALBUM TITLE MATCHING KEYWORD |
| PLAYLIST= | PRODUCE LIST OF PIECES REGISTERED IN A PLAY LIST MATCHING THE KEYWORD |
| FILENAME= | PRODUCE LIST OF PIECES HAVING THE TITLE MATCHING KEYWORD |

F I G. 7 1
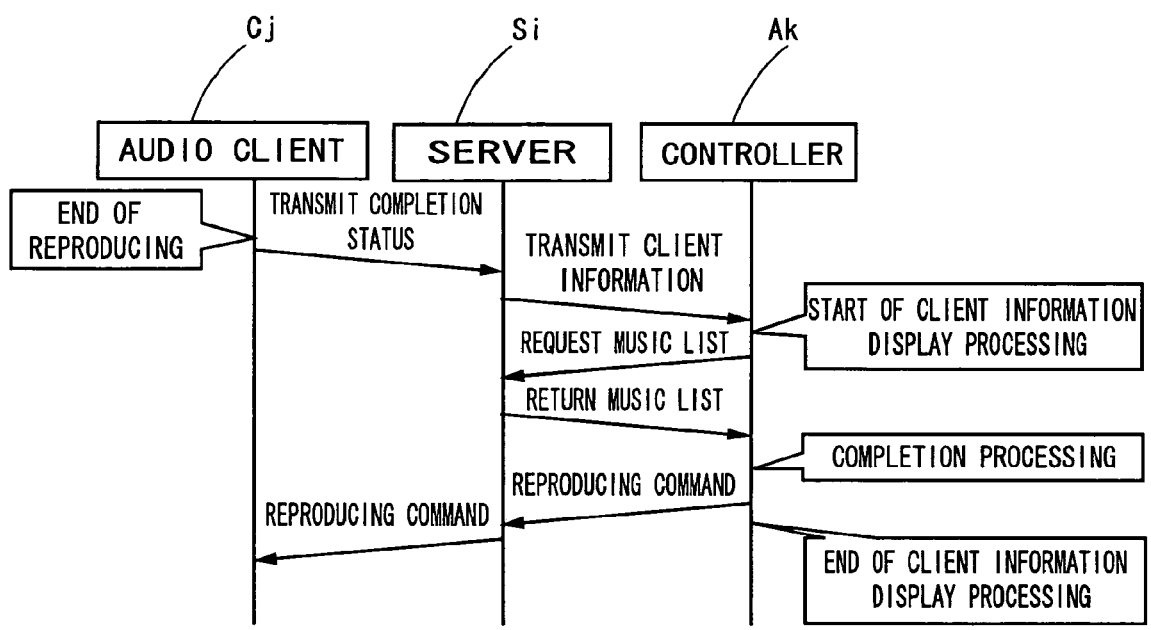

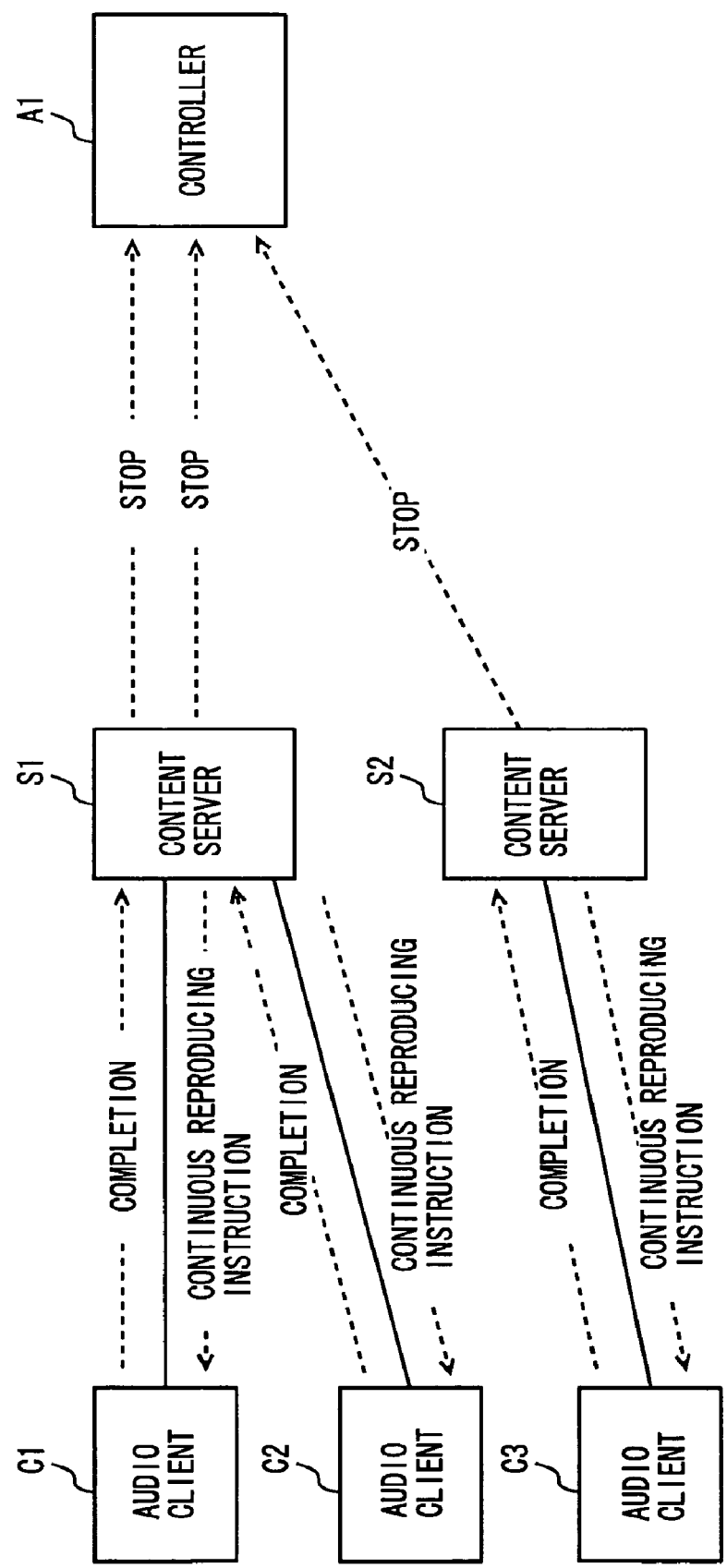

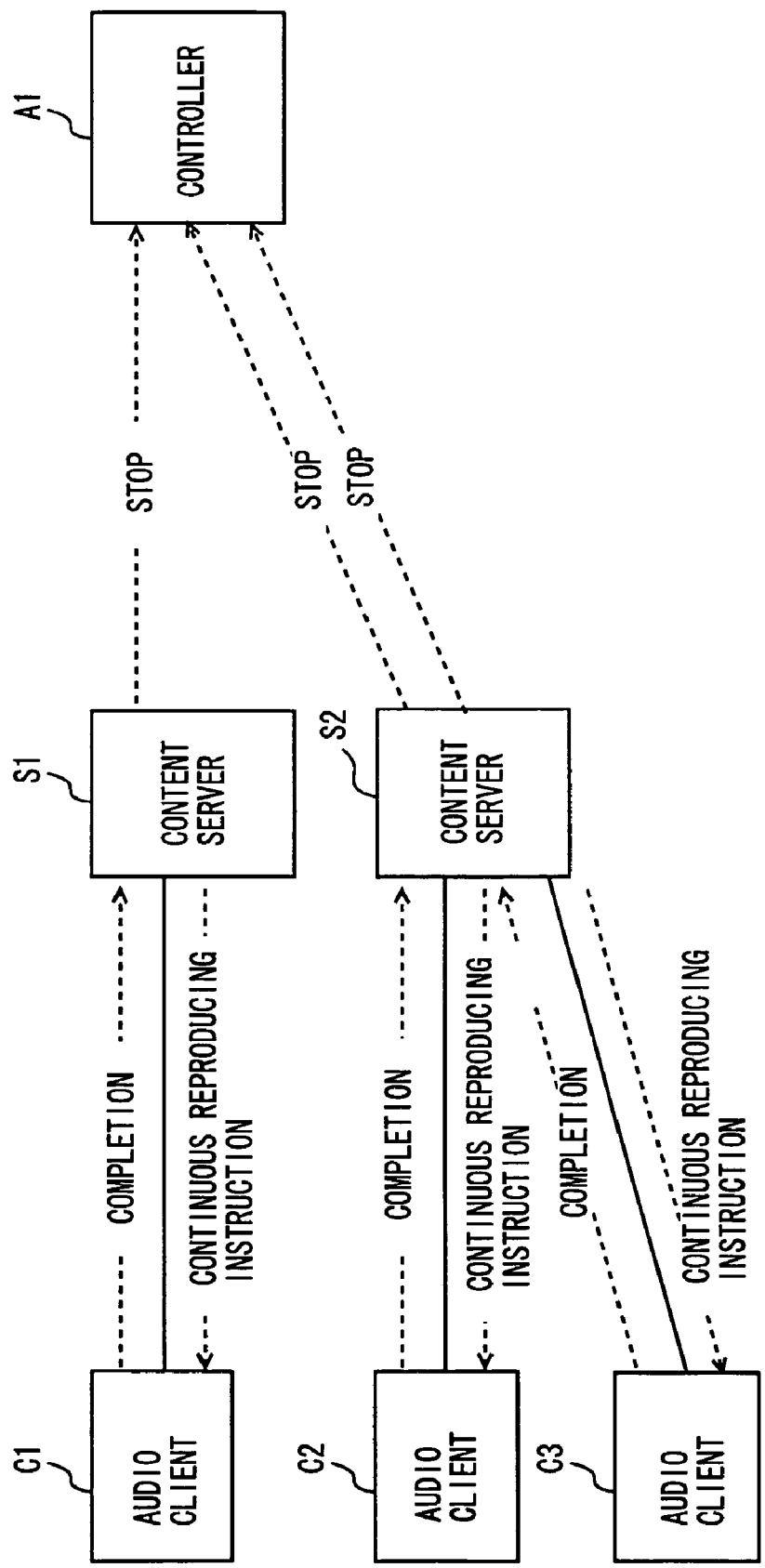
F I G. 8 2

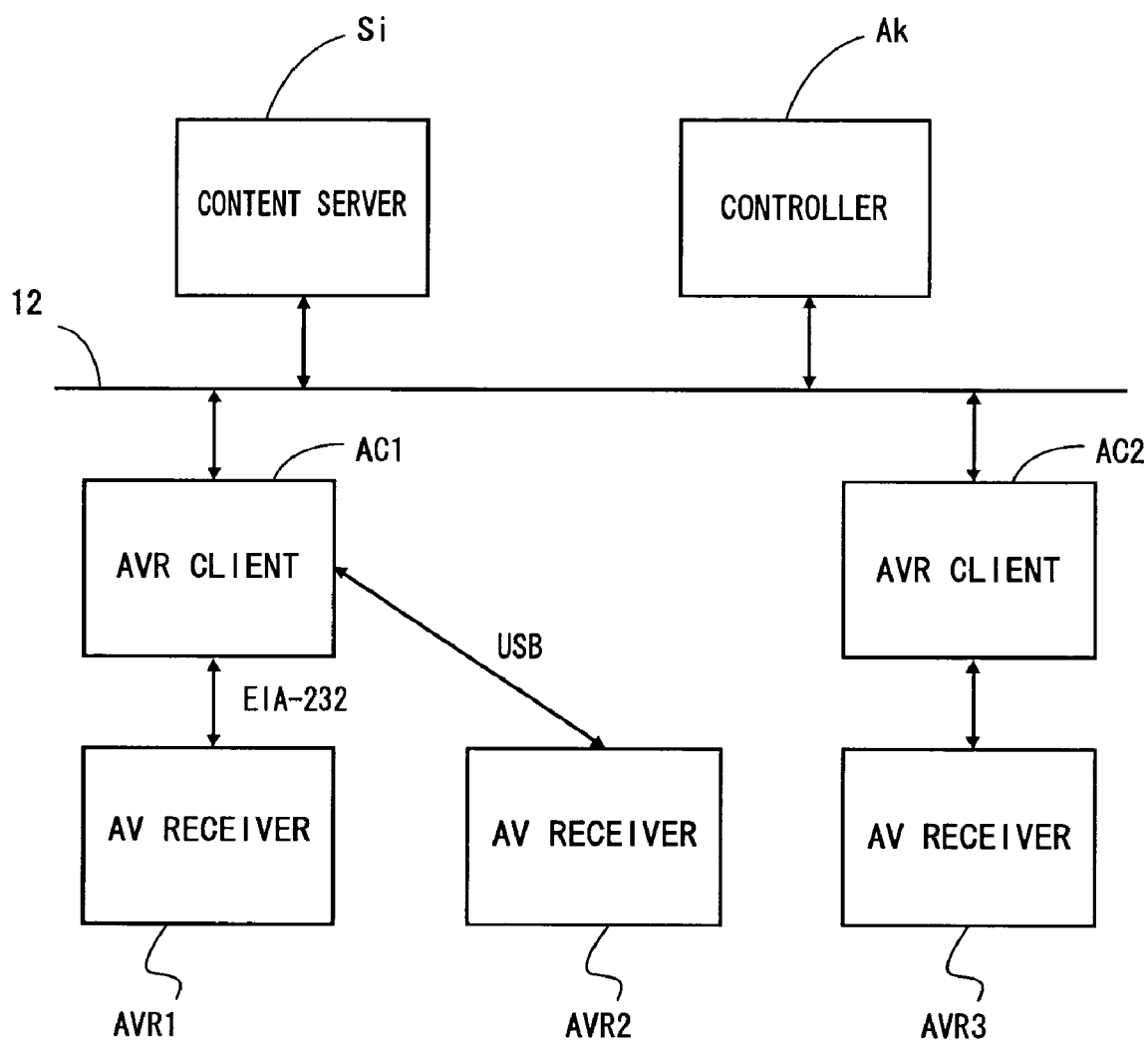
F I G. 9 0

F I G. 9 1
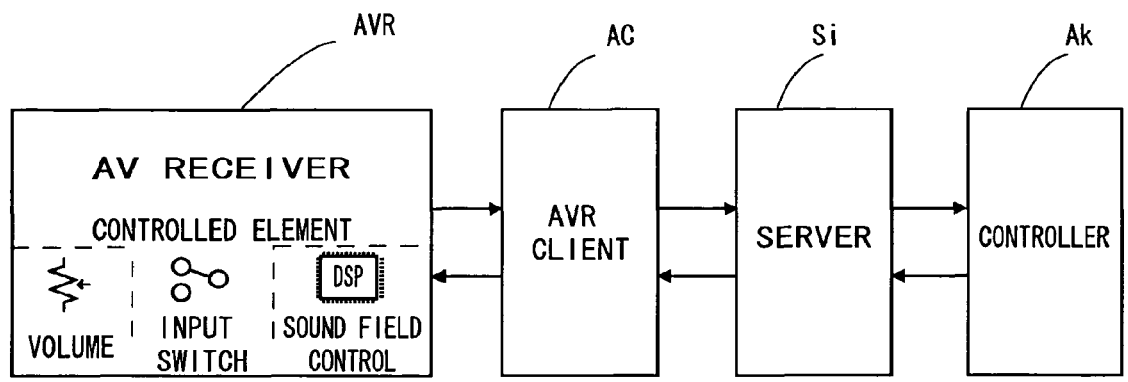
F I G. 9 2
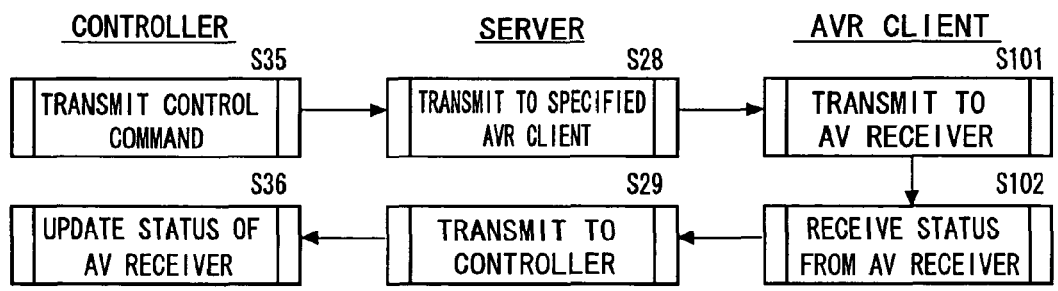

F I G. 9 3
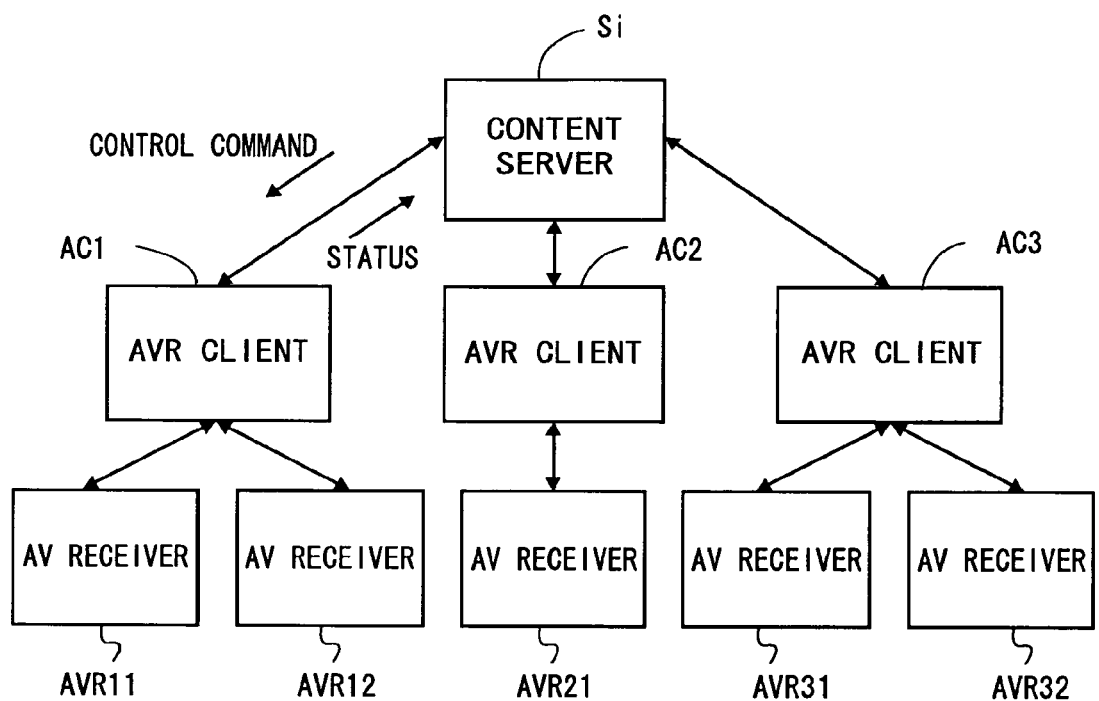

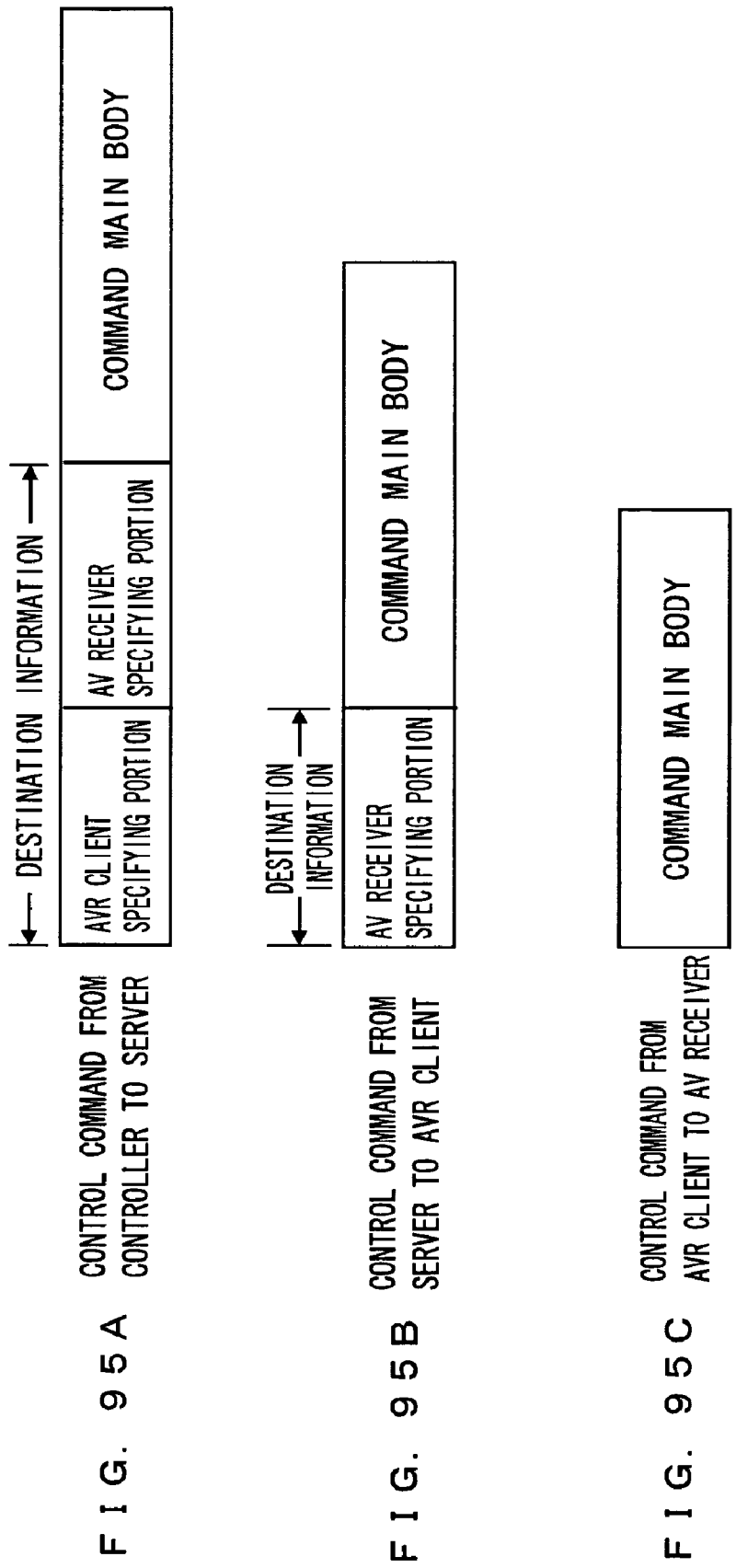

FIG. 96A (a) STATUS FROM AV RECEIVER TO AVR CLIENT
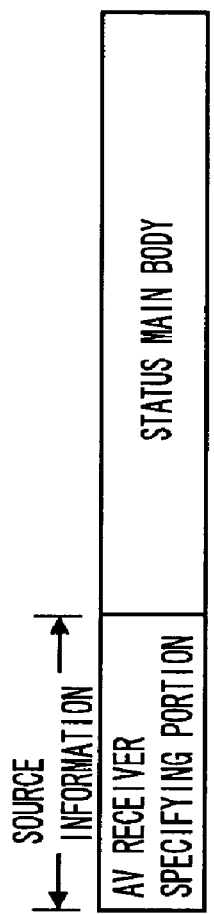
FIG. 96B (b) STATUS FROM AV CLIENT TO SERVER
FIG. 96C (c) STATUS FROM SERVER TO CONTROLLER F I G. 9 7
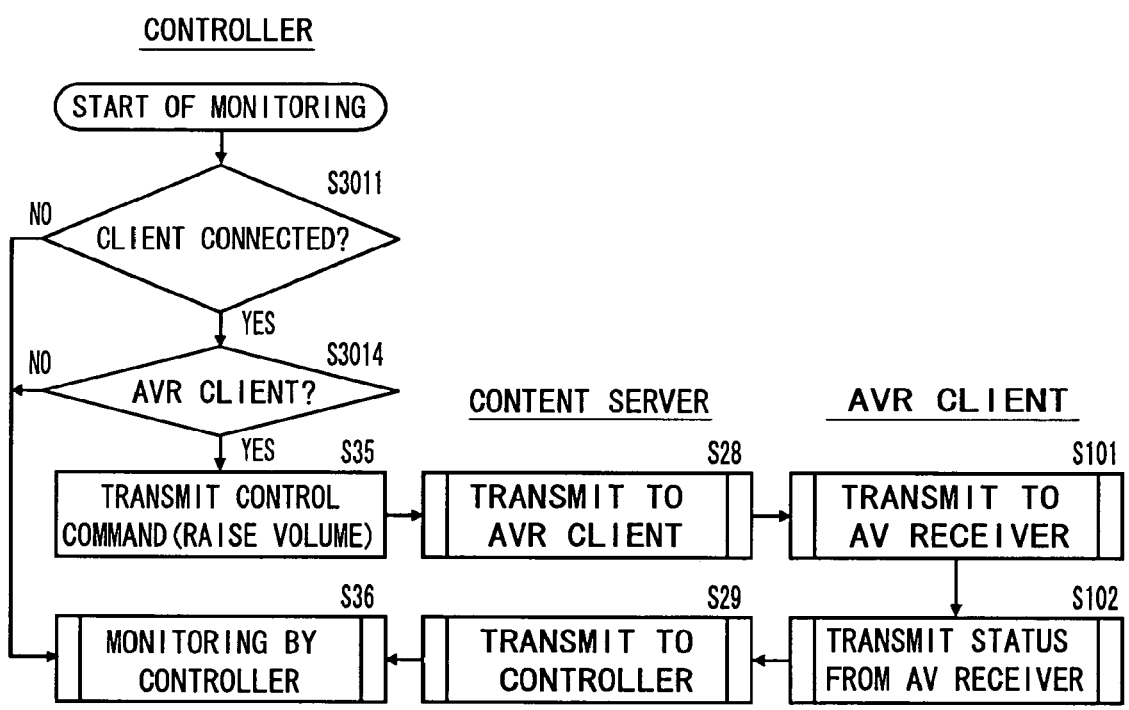

F I G. 9 9
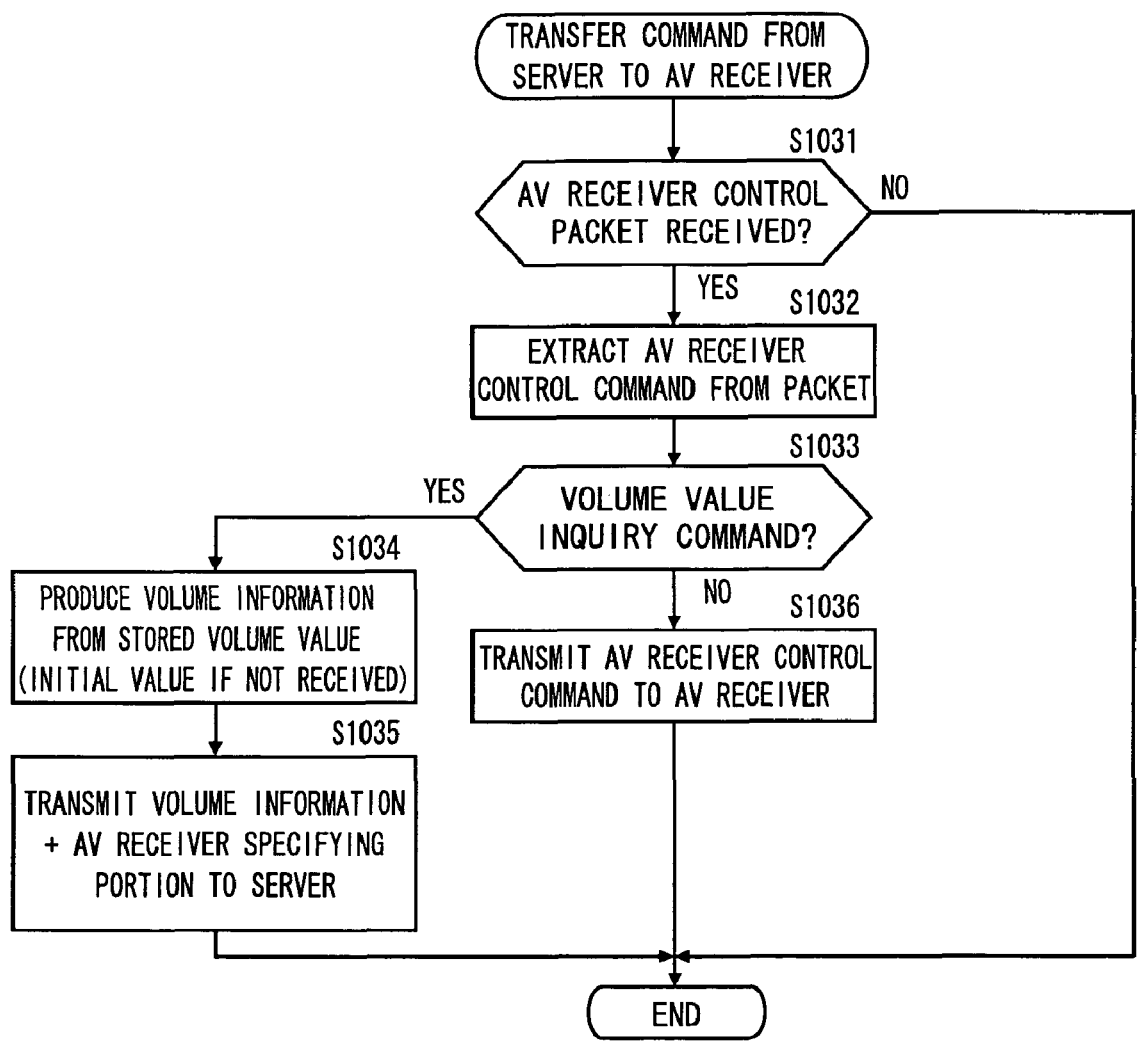

F I G. 1 0 1
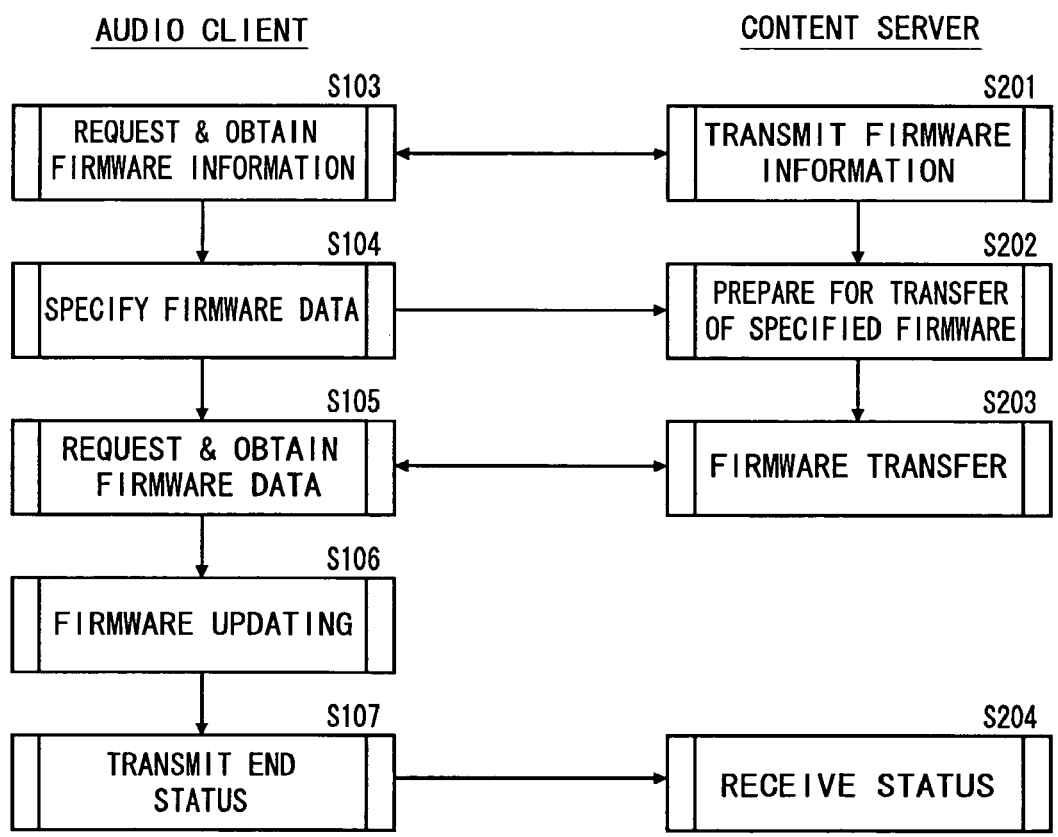

F I G. 1 0 3
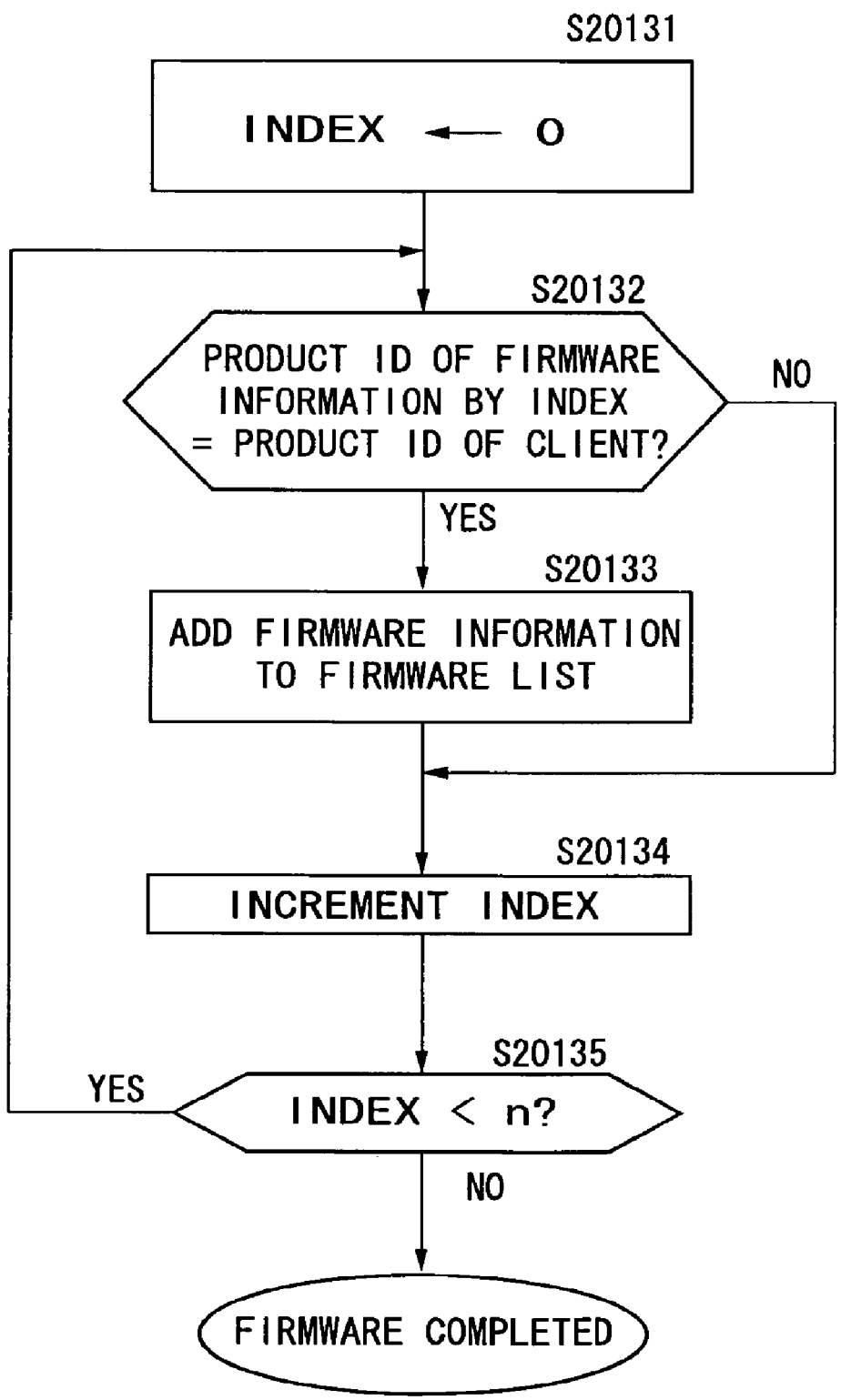

F I G. 1 0 4
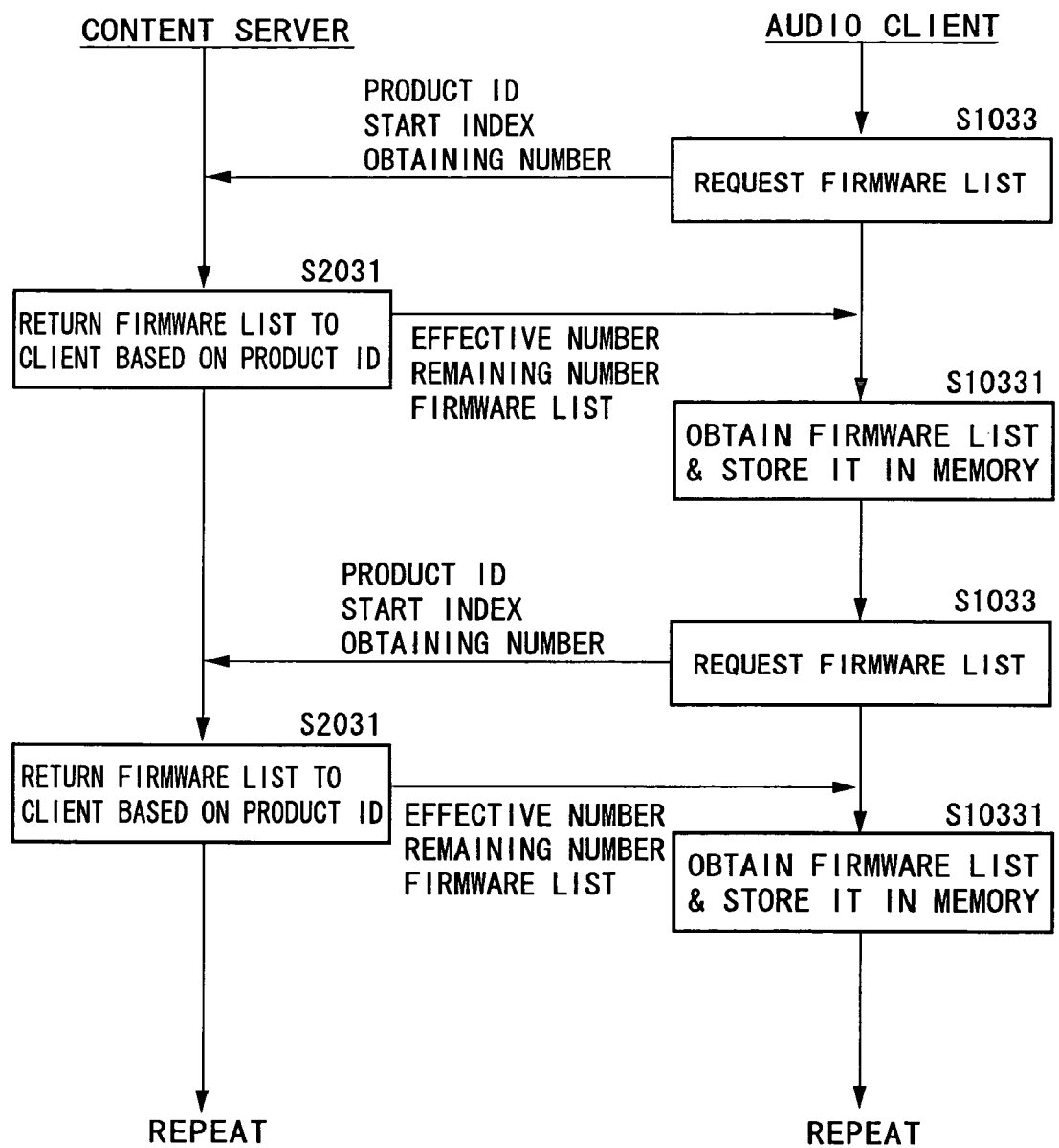

NETWORK TYPE CONTENT REPRODUCING SYSTEM

CROSS-REFERENCE TO RELATED APPLICATIONS

This application is a continuation of U.S. application Ser. No. 13/107,101 filed May 13, 2011, now U.S. Pat. No. 8,037,177 issued Oct. 11, 2011, which is a continuation of U.S. application Ser. No. 13/019,631 filed Feb. 2, 2011, now U.S. Pat. No. 8,005,928 issued Aug. 23, 2011, which is a continuation of U.S. application Ser. No. 12/605,492 filed on Oct. 26, 2009, now U.S. Pat. No. 7,908,370 issued Mar. 15, 2011, which is a continuation of U.S. application Ser. No. 10/498,181 filed Jun. 9, 2004, now U.S. Pat. No. 7,634,532 issued Dec. 15, 2009, which is a 371 of International Application No. PCT/JP03/06552 filed on May 26, 2003, which claims priority to Japanese Application Nos. 2002-158753 filed on May 31, 2002, 2002-232749 filed on Aug. 9, 2002, 2003-17931 filed on Jan. 27, 2003 and 2003-45432 filed on Feb. 24, 2003, the contents of which are hereby incorporated by reference.

TECHNICAL FIELD

The present invention relates to network type content reproducing systems, and more specifically, to a network type content reproducing system having a server, a client connected to the server, and a controller connected to the server.

BACKGROUND ART

A typical conventional audio system reads out music data from a medium and reproduces music based on the music data. Such an audio system must basically be provided on a room basis, and the overall cost is high. Meanwhile, there has been a concentrated audio system that can store all music data in one location and reproduce a selected music piece in each room.

In this concentrated audio system, however, a number of interconnections such as those for music signals and control signals must be provided in each room. One music piece can be reproduced at a time in all the rooms but a music piece cannot be reproduced from the beginning in a room while the same music piece is in the process of being reproduced in another room.

When an application program for music reproduction is installed in a general-purpose PC, music data can be obtained from a site on the Internet and music can be reproduced based on the data, but the data must be completely received before the music is reproduced midway or fast-forwarded or reversed just like a music CD. More specifically, the special reproducing manners cannot be achieved for data yet to be received.

DISCLOSURE OF THE INVENTION

It is an object of the invention to provide a network type content reproducing system that permits a client to freely select and reproduce an audio or video content stored in a server.

Another object of the invention is to provide a network type content reproducing system that permits the user to freely reproduce data not yet received by a client like reproducing the data from midway.

Yet another object of the invention is to provide a network type content reproducing system that permits a client to continuously reproduce contents in a client-server environment.

A still further object of the invention is to provide a network type content reproducing system that eliminates competition between continuous reproducing instructions to a client.

An additional object of the invention is to provide a client with an automatic connection recovery function that can quickly recover connection when the client is disconnected from a server.

A network type content reproducing system according to the invention includes a server and at least a first client connected to the server. The server includes storing means for storing a plurality of contents (such as music contents and visual contents). The first client includes content request means for requesting the server to provide a content selected among the plurality of contents. The server further includes content returning means for returning the content selected in response to the request from the first client to the first client. The first client further includes reproducing means for reproducing the returned content.

In the network type content reproducing system, a desired content is selected among the plurality of contents stored in the server in response to a request from the client. The selected content is transmitted from the server to the client and reproduced. Therefore, the client can freely select among the plurality of contents stored in the server and reproduce a selected content.

When the content is a music content, a desired music piece is selected among the large number of pieces stored in the server in response to a request from the first client. The data of the selected piece is transmitted to the first client, and the selected music piece is reproduced based on the data. Therefore, the first client can freely select among the plurality of music pieces stored in the server and reproduce a selected piece.

The first client is preferably attached in an outlet box provided in a wall.

In this way, the user can listen to music or watch video without the first client provided inside the room.

Preferably, the first client includes content list request means for requesting the sever to provide a content list of a plurality of contents. The server further includes content list returning means for returning the content list in response to the request from the first client. The first client further includes content list receiving means for receiving the content list returned from the server. The content request means selects a content to be requested in the content list.

In this way, the first client can obtain a content list from the server and reproduce a desired content selected in the list.

More preferably, the content list request means requests the server to provide a specified amount of a content list, preferably a part of the content list. The content list returning means responds to the request from the first client to return the specified amount of the content list, preferably a part of the content list.

In this way, only a part of the content list is transmitted to the first client from the server, and therefore the memory capacity necessary for storing the content list in the first client may be small.

More preferably, the content list request means transmits a list request command including an obtaining start index indicating the first content to be obtained from the server by the first client and an obtaining number indicating the number of contents to be obtained from the server by the first client. The content list returning means returns the content list including contents as many as the obtaining number from the first content indicated by the obtaining start index in response to the list request command.

More preferably, the content list returning means further returns the number of contents included in the content list to be returned and the number of the remaining contents left out of the content list to be returned.

In this way, the first client can be informed of the number of the contents remaining in the content list that are not yet obtained and can therefore request the server to provide the rest of the content list.

Preferably, the first client further includes category list request means for requesting the server to provide a category list of a plurality of categories. The server further includes means responsive to the request from the first client for returning the category list. The first client further includes means for receiving the category list returned from the server. The content list request means selects a category of the contents in the content list to be requested in the received category list.

In this way, the first client can obtain a category list from the server to begin with and then select a desired category in the list. The first client then obtains a content list and selects a desired content in the list. Therefore, in selecting, the large number of contents can gradually be narrowed down to a desired content.

Preferably, the content list request means transmits a list construction key necessary for producing the content list to the server. The content list returning means produces a content list based on the list construction key.

In this way, the first client can obtain a content list by sending the list construction key to the server when the client needs the content list, so that the client does not have to store the obtained content list.

Preferably, the content request means requests the server to provide a predetermined amount of a content. The content returning means returns the predetermined amount of the content in response to the request from the first client. The content request means repeats the request for the content until the content is obtained in its entirety.

In this way, only a part of the content is transmitted from the server to the first client, and therefore the memory capacity necessary for storing the content in the first client may be small.

The content request means further preferably calculates an obtaining start address indicating the first address of the predetermined amount of the content and transmits the address to the server. The content returning means returns the predetermined amount of the content from the obtaining start address transmitted from the first client.

More preferably, the content request means transmits a content transfer request command including the obtaining start address and an obtaining data length indicating the length of the content to be obtained from the server by the first client. The content returning means returns the content for the obtaining data length from the obtaining start address in response to the content transfer request command.

In this way, the obtaining start address is arbitrarily set, so that the client can carry out special reproducing to a content not yet received.

More preferably, the content request means adds the obtaining data length to the previous obtaining start address to calculate the next obtaining start address.

More preferably, the first client further includes means responsive to the user's operation for setting first and second addresses and means for setting the obtaining start address to the first address when the calculated obtaining start address exceeds the second address.

In this way, the first client can repeat obtaining the content from the first address to the second address and reproduce the obtained content.

Alternatively, the first client further includes means responsive to the user's operation for setting a desired address and means for setting the obtaining start address to the desired address.

In this way, the first client can obtain the content from the desired address and reproduce the content from midway.

Preferably, the first client further includes means responsive to the user's operation for setting a prescribed skip amount and means for shifting the obtaining start address by the set skip amount.

In this way, the first client can obtain the content discontinuously and can carry out fast forward reproducing or fast reverse reproducing.

Preferably, the first client further includes means for transmitting the identification information of the selected content to the server. The server includes means responsive to the identification information transmitted from the first client for returning the offset of the selected content to the first client. The first client further includes means for detecting the start of the selected content based on the offset returned from the server.

In this way, the first client detects the start of the content based on the offset of the content transmitted from the server and therefore can immediately reproduce the content.

Preferably, the first client further includes means for transmitting the identification information of the selected content to the server. The server further includes means responsive to the identification information transmitted from the first client for returning the size of the selected content to the first client. The first client further includes means for detecting the end of the selected content based on the size returned from the server.

In this way, the first client detects the end of the content based on the size of the content transmitted from the server and can therefore immediately end reproducing.

Preferably, the content request means requests the server to provide a specified amount of a content. The content returning means returns the specified amount of the content in response to the request from the first client. The content request means changes the specified amount of the content to be requested to the server.

In this way, the first client can reduce the specified amount of the content when the load on the server is large and increase the specified amount of the content when the load on the server is small, so that the content amount can appropriately be adjusted depending on the load on the server.

In addition, the server returns only a "part of music piece data" specified by the client, and therefore the client can carry out special reproducing (such as fast forward, fast reverse, and midway reproducing) to data not yet received by arbitrarily changing the "part of the music data" to be specified. The server transmits only the "part of music piece data" and therefore if the client cannot successfully receive the data, only the part the client cannot receive may be received again from the server, and the receiving failure can quickly be coped with.

When the format of a music piece requested by the client is a compressed data format (such as MP3), the amount of data to be specified may be reduced in order to alleviate the load on the server. This is because the compressed data has its data amount increased once it is decoded at the time of reproducing.

Preferably, the first client further includes means for transmitting client information related to the first client to the server every time the client information changes.

In this way, the client information is not constantly transmitted to the server from the first client, but transmitted only when there is a change. Therefore, the server can manage the up-to-date client information of the first client without increasing the network traffic.

Preferably, the network type content reproducing system further includes a second client connected to the server through a network for monitoring the first client.

In this way, the user can be informed of the operation state of the first client through the second client different from the first client.

More preferably, the first client further includes means for transmitting client information related to the first client to the server. The server includes means for receiving the client information transmitted from the first client and means for transmitting the received client information to the second client. The second client includes means for receiving the client information transmitted from the server.

In this way, the user can be informed of the information related to the first client such as the connection state with the server, the client type, the present operation state, and the present sound volume through the second client different from the first client.

Preferably, the server transmits the client information to the second client through a push port for forcibly transmitting a request to the second client.

In this way, the server can transmit the client information to the second client if there is no request from the second client.

Preferably, the second client further includes means for displaying the received client information and means for changing the display of the received client information when the client information is changed.

Preferably, the second client further includes content list request means for requesting the server to provide a content list of a plurality of contents. The server further includes content list returning means responsive to the request from the second client for returning the content list. The second client further includes content list receiving means for receiving the content list returned from the server.

Preferably, the client information includes a list construction key necessary for producing a content list. The content list request means transmits the list construction key to the server when the list construction key included in the received client information is changed. The content list returning means produces the content list based on the list construction key transmitted from the second client.

Preferably, the second client receives the client information transmitted from the server when the second client is connected to the server.

In this way, the second client is connected to the server once the power supply is turned on and can obtain the client information related to the first client from the server.

More preferably, the client information includes a list construction key necessary for producing a content list. The content list request means transmits the list construction key included in the received client information to the server. The content list returning means produces the content list based on the list construction key transmitted from the second client.

In this way, if the power supply is turned off after the second client instructs the first client to reproduce a content, and the content list being reproduced is lost, the second client can obtain the list construction key when the power supply is turned on again. Therefore, the second client needs only transmit the obtained list construction key to the server, so that the lost content list can be regained from the server.

Preferably, the client information includes the name of a data format of a content reproducible by the first client. The second client includes means for displaying the name of the data format name of the reproducible content based on the received client information.

In this way, the user can be informed of the data format reproducible by the first client through the second client different from the first client.

More preferably, the second client further includes means for obtaining a content list of a plurality of contents from the server and means for displaying a content reproducible by the first client among the contents included in the obtained content list and displaying a content that cannot be reproduced by the first client in a different manner from the reproducible content or not displaying the irreproducible contents.

In this way, contents that cannot be reproduced by the first client are not displayed, so that the user can be prevented from selecting any of the irreproducible contents.

Preferably, the second client includes means for determining whether a client to be monitored is the first client.

In this way, if the client to be monitored by the second client is not the first client, the second client does not monitor, and therefore erroneous operation can be prevented.

Preferably, the second client includes means for obtaining a monitoring handle necessary for monitoring the first client and means for monitoring the first client using the obtained monitoring handle.

In this way, a second client without the monitoring handle does not monitor the first client and therefore the network traffic can be reduced.

Preferably, the network type content reproducing system further includes a second client connected to the server through a network for controlling the first client.

More preferably, the second client includes server request means for requesting the server to control the first client. The server further includes means responsive to the request from the second client for controlling the first client.

In this way, the user can control the first client through the server from the second client different from the first client.

Preferably, the server request means transmits information for specifying the first client and information for specifying the selected content to the server.

In this way, the user can have a desired content reproduced by the first client.

Preferably, the second client includes means for determining whether a client to be controlled is the first client.

In this way, the second client does not control a client if the client is not the first client, and therefore erroneous operation can be prevented.

Preferably, the second client includes means for determining whether the data format of the selected content matches the data format of any of contents that can be reproduced by the first client and means for instructing the first client to reproduce the content based on the data of the selected content when the data formats match.

In this way, the second client instructs the first client to reproduce a content only if the content is reproducible by the first client and therefore erroneous operation can be prevented.

Preferably, the second client includes means for obtaining a control handle necessary for controlling the first client and means for controlling the first client using the obtained control handle.

In this way, the second client without the control handle will not control the first client, and therefore the network traffic can be reduced.

Preferably, the first client further includes means for transmitting a completion status to the server when the first client finishes reproducing a content as instructed by the second client and transmitting a stop status different from the completion status itself when the first client finishes reproducing a content selected by the first client or stops reproducing the content midway in response to the user's operation.

In this way, the server can distinguish the completion status from the stop status, and therefore the server can determine whether the first client has finished reproducing a content instructed by the second client or a content selected by the first client or stopped reproducing a content midway in response to the user's operation.

Preferably, the server includes means for receiving the completion status transmitted from the first client and transmitting the completion status to the second client. The second client includes means responsive to the completion status transmitted from the server for instructing the first client to reproduce the content next to the content that has been reproduced to the end.

In this way, the first client that has finished reproducing the content transmits a completion status to the second client that has instructed reproducing of the content, and therefore the second client can cause the first client to continuously reproduce contents based on the content list.

Preferably, a network type content reproducing system further includes a plurality of second clients connected to the server through a network to control the first client. The second clients each include reproducing instruction means for instructing the first client to reproduce a content. The content reproducing means of the first client reproduces a content in response to an instruction from the second client. The first client further includes means for transmitting a completion status to the server when the content has been reproduced to the end. The server further includes means for receiving a completion status transmitted from the first client and transmitting the completion status to the second client that has instructed the first client among the plurality of second clients, while transmitting a stop status to the other second clients. The reproducing instruction means of the second client responds to the completion status transmitted from the server to instruct the first client to reproduce the content the next to the content that has been reproduced to the end.

In this way, the first client that has finished reproducing the content transmits a completion status to the second client that has instructed the reproducing of the content through the server, so that the second client correctly instructs the first client to carry out continuous reproducing. Meanwhile, the server transmits a stop status to the other second clients, and therefore the second client is aware that the first client is in an operation stopped state and will not incorrectly instruct the first client to carry out continuous reproducing.

Preferably, the first client further includes broadcast means for broadcasting prescribed information. The server includes means responsive to the prescribed information broadcast from the first client for returning server specifying information to specify the server to the first client. The first client includes means for receiving the server specifying information returned from the server and registering the information in a server list.

In the network type content reproducing system, when the client broadcasts prescribed information to a network and there is a server connected to the network, the server transmits its server specifying information (such as the IP address and the port number) to the client. Therefore, the client can search and find the server existing on the network.

Preferably, the first client further includes means for determining whether the server specifying information is registered in the server list. When the server specifying information is not registered in the server list based on the result of the determination, the broadcast means broadcasts the prescribed information again.

In this case, the first client starts searching for a server if no server specifying information is registered in the server list and continues to search until at least one server is found.

Preferably, the first client further includes means for accessing a server on the Internet when the number of broadcasting operation by the broadcast means reaches a prescribed number of times or time for broadcasting by the broadcast means reaches a prescribed time period.

In this way, the first client does not continue to search for a server if there is no server existing on the local network and finds a server on the Internet instead.

Preferably, the first client further includes means for establishing connection at a command port for transmitting/receiving a command between the server and the first client and means for establishing connection at a push port for forcing a request to be transmitted to the first client from the server.

In the network type content reproducing system, commands or statuses are transmitted/received between the server and a client through the command port. A command from the server is forced to be transmitted to a client through the push port.

Preferably, the first client further includes means for transmitting a client index request command to the server through the command port. The client index request command is necessary for identifying the first client. The server further includes means responsive to the client index request command transmitted by the first client for returning the client index to the client. The first client further includes means for transmitting the client index returned from the server to the server through the push port.

Preferably, there are a plurality of the first clients. The server includes connection limiting means for limiting the number of connectable clients.

Preferably, the connection limiting means disconnects from the first client that has been already connected based on a prescribed priority order when another first client that has not yet been connected tries to be connected to the connection limiting means.

Preferably, another network type content reproducing system according to the invention includes a server, a first client connected to the server through a network, AV equipment connected to the first client, and a second client connected to the server through the network to control the AV equipment. The second client includes means for transmitting a control command for controlling the AV equipment to the server. The server includes means for transmitting the control command transmitted from the second client to the first client. The first client includes means for transmitting the control command transmitted from the server to the AV equipment. The AV equipment is controlled in response to the control command transmitted from the first client.

In this way, the control command is transmitted to the first client from the second client through the server. The AV equipment is controlled in response to the control command. Therefore, the second client can control the AV equipment.

Another network type content reproducing system according to the invention includes a server, a first client connected to the server, AV equipment connected to the first client, and a second client connected to the server through a network to monitor the AV equipment. The AV equipment includes means for transmitting information related to the AV equipment to the first client. The first client includes AV equipment information transmitting means for transmitting the information transmitted from the AV equipment to the server. The server includes means for transmitting the information transmitted from the first client to the second client.

In this way, the information related to the AV equipment is transmitted to the second client through the first client and the server. Therefore, the second client can monitor the AV equipment based on the information.

Preferably, the AV equipment information transmitting means of the first client transmits the frequently changing information at prescribed intervals.

In this way, the network traffic can be reduced.

Preferably, the server further includes firmware update means for updating firmware in the first client.

In this way, the firmware in the first client is automatically updated by the server.

Preferably, the server further includes means for registering information related to a plurality of firmware pieces suitable for the first client and firmware list transmitting means for transmitting a firmware list of the registered information related to the plurality of firmware pieces to the first client. The first client further includes means for receiving the firmware list transmitted from the server and firmware request means for requesting the server to transmit firmware selected in the received firmware list. The firmware update means returns the selected firmware to the first client in response to the request from the first client.

In this way, the firmware in the first client is not always updated to the up-to-date version, but updated to an appropriately selected version.

Preferably, the first client further includes means for transmitting client information related to the first client to the server. The server further includes means for producing a firmware list based on the client information transmitted from the first client.

In this way, a firmware list including firmware information corresponding to the first client can be produced.

Preferably, the first client requests the server to provide a specified amount of firmware, particularly a part of the firmware. The firmware update means returns the specified amount of the firmware, preferably a part of the firmware in response to the request from the first client.

In this way, the server transmits only the specified amount of the firmware, and therefore if the client cannot successfully receive the firmware, only the part the client cannot receive may be received again from the server, and the receiving failure can quickly be coped with. Since only a part of the firmware list is transmitted from the server to the first client, the memory capacity necessary for storing the firmware list in the first client may be small.

Another network type content reproducing system according to the invention includes a server, a first client connected to the server, and a plurality of second clients connected to the server. The server includes content storing means for storing a plurality of contents. The second clients each include means for specifying a content among the plurality of contents and instructing the first client to reproduce the specified content. The first client includes means responsive to the instruction from the second client for reproducing the specified content and means for transmitting a completion status to the server when the content has been reproduced to the end. The server further includes status transmitting means for selecting one of the plurality of second clients and transmitting the completion status to the selected second client in response to the completion status received from the first client. The second clients each further include means for specifying a content next to the content that has been reproduced to the end by the first client and instructing the first client to reproduce the specified content in response to the completion status received from the server.

Preferably, the server further includes means for managing the priorities of the second clients that can control the first client. The status transmitting means selects a second client with the highest priority as the second client to receive the transmitted completion status. Alternatively, the server further includes means for storing the identification information of the second client that has instructed reproduction. The status transmitting means selects the second client that has instructed reproduction as the second client to receive the completion status based on the stored identification information of the second client.

In this system, when the server receives a completion status from the first client that has finished reproducing a content, the server selects a second client and transmits the completion status to the second client. Therefore, only one second client instructs the first client to carry out continuous reproducing. As a result, the system eliminates competition between continuous reproducing instructions to a first client, and the first client can continuously reproduce contents.

Preferably, the status transmitting means transmits a stop status to the second client other than the second client with the highest priority.

In this way, the stop status instead of the completion status is transmitted to the second clients other than the second client with the highest priority, and therefore the other second clients can simply monitor the state of the first client without taking any positive action.

Another network type content reproducing system according to the invention includes a server, a first client connected to the server, and a plurality of second clients connected to the server. The server includes content storing means for storing a plurality of contents. The second clients each include control handle obtaining means for obtaining a control handle necessary for controlling the first client and means for specifying a content among the plurality of contents after obtaining the control handle and instructing the first client to reproduce the specified content. The first client includes means responsive to the instruction from the second client for reproducing the specified content and means for transmitting a completion status to the server when the content has been reproduced to the end. The server further includes means for transferring the completion status transmitted from the first client to each of the second clients. The second clients each further include means for specifying a content next to the content that has been reproduced to the end by the first client in response to the completion status received from the first client whose control handle is obtained by the second client and instructing the first client to reproduce the specified content.

In this system, the second client obtains a control handle necessary for controlling the client and then instructs the first client to reproduce the content. The first client transmits a completion status once a content has been reproduced to the end. In response to a completion status received from the first client whose control handle is obtained by the second client, the second client instructs the first client to carry out continuous reproducing. Consequently, the system eliminates competition between continuous reproducing instructions to the first client and the first client can continuously reproduce contents.

Preferably, the control handle obtaining means, upon obtaining a control handle, prohibits the other second clients from obtaining the control handle.

In this way, a plurality of second clients cannot obtain the control handle for the first client at a time, and therefore competition between reproducing instructions to the first client can completely be eliminated.

More preferably, the first client further includes means for transmitting a stop status to the server when the first client stops reproducing the content midway. The server further includes means for transferring the stop status transmitted from the first client to each of the second clients. The second clients each further include means for canceling the prohibition of obtaining the control handle in response to the stop status received from the first client whose control handle is obtained by the second client.

In this way, the first client that has stopped reproducing the content midway transmits a stop status to all the second clients and a second client that receives the stop status from the first client whose control handle is obtained by the second client releases the control handle. Therefore, any of the second clients can obtain the control handle for the first client.

Another network type content reproducing system according to the invention includes a server, a first client connected to the server, and a second client connected to the server. The server includes content storing means for storing a plurality of contents. The second client includes means for specifying a content among the plurality of contents and instructing the first client to reproduce the specified content. The first client includes means responsive to the instruction from the second client for reproducing the specified content, and means for transmitting a completion status to the server when the content has been reproduced to the end. The server further includes continuous reproducing instruction means responsive to the completion status received from the first client for specifying a content next to the content that has been reproduced to the end by the first client and instructing the first client to reproduce the specified content.

In this system, the first client that has reproduced a content to the end transmits a completion status to the server, and then the server itself instructs the first client to carry out continuous reproducing. Consequently, the system eliminates competition between continuous reproducing instructions to the first client, and the first client can continuously reproduce contents.

Preferably, the server further includes means for storing a list construction key necessary for producing a content list of contents to be reproduced by the first client and means for producing the content list based on the list construction key. The continuous reproducing instruction means instructs the first client to reproduce the content according to the content list.

In this way, the server stores the list construction key and produces the content list based on the list construction key, so that the content to be reproduced next can be specified.

Another network type content reproducing system includes a server, a first client connected to the server, and a second client connected to the server. The server includes content storing means for storing a plurality of contents. The second client includes means for specifying a content among the plurality of contents and instructing the first client to reproduce the specified content and means for transmitting a list construction key necessary for producing a content list of contents to be reproduced by the first client to the first client. The first client includes means responsive to the instruction from the second client for reproducing the specified content and means for transmitting the list construction key transmitted from the second client to the server. The server further includes means for producing the list of contents based on the list construction key transmitted from the first client and transmitting the produced content list to the first client. The first client further includes means for reproducing a content next to the content that has been reproduced to the end by the first client according to the content list transmitted from the server.

In this system, the server transmits the content list produced based on the list construction key to the first client. The first client carries out continuous reproducing on its own according to the content list. Consequently, the system eliminates competition between continuous reproducing instructions to the first client, and the first client can continuously reproduce contents.

A client in a network type content reproducing system according to the invention includes content request means for requesting the server to provide a digital content selected among a plurality of digital contents stored in the server and reproducing means for reproducing the digital content returned from the server in response to the request. There are a plurality of servers. The client further includes connection means and determination means. The connection means connects with any one of the plurality of servers. The determination means determines whether the connection with the server by the connection means is maintained at prescribed intervals. The connection means reconnects with the server when the determination means determines that the connection with the server is closed.

The client checks the connection state with the server at prescribed intervals. When the connection with the server is closed, the client carries out re-connection with the server. Therefore, if the client is disconnected from the server because of abnormality, the client can quickly recover the connection on its own.

Preferably, the connection means connects with another server when the connection with the server cannot be reestablished.

In this way, if the connection cannot be reestablished with the same server connected before the disconnection, the client quickly connects with another server. Consequently, the client is not left in the disconnected state from the server.

Preferably, the connection means transmits the client status to the reconnected server before the connection is closed.

In this way, the client transmits the client status before the disconnection to the reconnected server, and therefore the client can recover the connection state with the server as before. Consequently, the user can use the client without being aware of the re-connection of the client.

BRIEF DESCRIPTION OF THE DRAWINGS

FIG. 5 is a flowchart for use in illustration of the operation of the server and the audio client in FIGS. 1 to 3 in an initial connection phase;

FIG. 7 is a flowchart for use in illustration of connection operation by the client and the server in FIG. 5;

FIG. 10 is a diagram showing the operation of notifying the controller of a status from the audio client through the server as continued from FIG. 9;

FIG. 11 is a flowchart for use in illustration of client information transmitting operation by the audio client in FIG. 5;

FIG. 13 shows a client information database stored in the server in FIG. 2;

FIG. 14 shows a content information database stored in the server in FIG. 2;

FIG. 20 is a flowchart for use in illustration of a subroutine in command processing in FIG. 15;

FIG. 26 shows a region that stores the genre list obtained in FIG. 25;

FIG. 27 is a diagram of the record structure of the content information database in FIG. 14;

FIG. 32 shows the format of search data in FIG. 25;

FIGS. 33A to 33C show the transition state of a buffer memory in the operation of obtaining a music list in FIG. 25;

FIG. 37 shows a music piece information request command in FIG. 35;

FIG. 38 shows music piece information in FIG. 35;

FIG. 39 shows a music piece reproducing preparation command in FIG. 35;

FIG. 40 shows an error code in FIG. 35;

FIG. 41 shows a music piece data transfer request command in FIG. 35;

FIG. 42 shows music piece data in FIG. 35;

FIG. 52 is a flowchart for use in illustration of the operation of obtaining a monitoring handle and a control handle in FIG. 51;

FIG. 53 shows status notification to a plurality of controllers from a plurality of audio clients by the server;

FIG. 54 shows status notification when a controller obtains a monitoring handle in FIG. 54;

FIG. 56 is a flowchart for use in illustration of details of the monitoring operation in FIG. 55;

FIG. 60 shows details of a client type included in the client information database in FIG. 13;

FIG. 62 shows a screen showing the display of a music list related to an audio client capable of reproducing both MP3 and WAV in the music list display in FIG. 61;

FIG. 63 shows a screen showing the display of a music list related to an audio client that can reproduce MP3 but cannot reproduce WAV in the music list display in FIG. 61;

FIG. 68 shows how a reproducing command is transmitted as continued from FIG. 66;

FIG. 69 shows the structure of a list construction key used in the continuous reproducing control in FIGS. 65 to 68;

FIG. 70 shows the kinds of filters included in the list construction key in FIG. 69;

FIG. 71 is a sequence diagram for use in illustration of continuous reproducing control operation using the list construction key in FIG. 69;

FIG. 81 is a functional block diagram of the continuous reproducing processing when there are a plurality of content servers in the continuous reproducing processing in FIG. 80;

FIG. 82 is a functional block diagram of the continuous reproducing processing when the content server is switched in the continuous reproducing processing shown in FIG. 81;

FIG. 90 is a functional block diagram of the configuration of a network type audio system including a server, a controller, an AVR client, and an AV receiver;

FIG. 91 is a functional block diagram of the flow of a status and a command in the network type audio system in FIG. 90;

FIG. 92 is a flowchart for use in illustration of the control operation of an AV receiver by the controller in the network type audio system in FIGS. 90 and 91;

FIG. 93 is a functional block diagram of the transfer path of a control command and a status in the network type audio system in FIG. 90;

FIGS. 95A to 95C show a control command in the stages in FIG. 94;

FIGS. 96A to 96C show statuses in the stages in FIG. 94;

FIG. 97 is a flowchart for use in illustration of how the controller raises the volume of the AV receiver AVR through the AVR client in the network type audio system in FIGS. 90 to 96C;

FIG. 99 is a flowchart for use in illustration of the operation of the AVR client in the network type audio system in FIGS. 90 to 96C when a control command from the server is transferred to the AV receiver;

FIG. 101 is a flowchart for use in illustration of firmware updating operation by the client and server in FIG. 1;

FIG. 103 is a flowchart for use in illustration of the operation of producing a firmware list in FIG. 102;

FIG. 104 is a flowchart for use in illustration of the operation of transmitting the firmware list in FIG. 102;

BEST MODE FOR CARRYING OUT THE INVENTION

Figure 1:
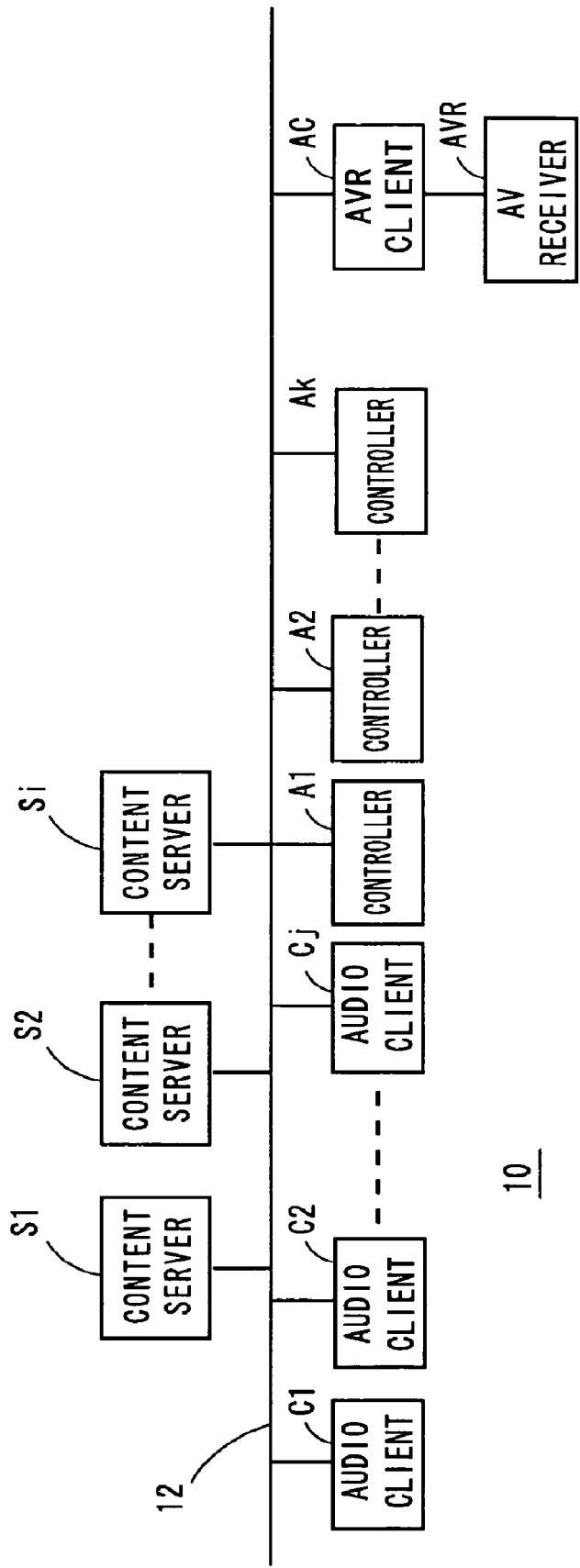
FIG. 1 is a functional block diagram of the general configuration of a network type audio system according to an embodiment of the invention.

Now, embodiments of the invention will be described in conjunction with the accompanying drawings, in which the same or corresponding portions are denoted by the same reference characters and the same description is equally applied.

TABLE OF CONTENTS

1. Preferred Embodiment
1. 1. Configuration
1. 1. 1. General Configuration
1. 1. 2. Content Server
1. 1. 3. Audio Client
1. 1. 4. Controller
1. 1. 5. AV Receiver 1. 2. Operation
1. 2. 1. Initialization of Content Server and Audio Client
1. 2. 1. 1. Initialization of Audio Client
1. 2. 1. 1. 1. Search for Content Server
1. 2. 1. 1. 2. Connection with Content Server
1. 2. 1. 1. 3. Transmission of Client Information
1. 2. 1. 2. Initialization of Content Server
1. 2. 1. 2. 1. Response to Content Server Search
1. 2. 1. 2. 2. Accepting Command Port Connection
1. 2. 1. 2. 3. Accepting Push Port Connection (Case 1)
1. 2. 1. 2. 4. Accepting Push Port Connection (Case 2)
1. 2. 2. Main Operation of Content Server and Audio Client
1. 2. 2. 1. Accepting Command
1. 2. 2. 1. 1. Command Allocation Processing
1. 2. 2. 1. 2. Status Notification Command Processing
1. 2. 2. 1. 3. Server Request Issuing Command Processing
1. 2. 2. 2. Normal Reproducing
1. 2. 2. 2. 1. Obtaining Music List
1. 2. 2. 2. 2. Specifying Music Piece
1. 2. 2. 2. 3. Reproducing Music Piece
1. 2. 2. 3. Special Reproducing
1. 2. 2. 3. 1. Fast Forward Reproducing
1. 2. 2. 3. 2. Fast Reverse Reproducing
1. 2. 2. 3. 3. Pause
1. 2. 2. 3. 4. Slow Reproduction
1. 2. 3 Operation of Controller
1. 2. 3. 1 Connection with Content Server
1. 2. 3. 1. 1 Obtaining Monitoring Handle and Control Handle
1. 2. 3. 2 Monitoring Function
1. 2. 3. 3 Control Function
1. 2. 3. 3. 1. Control Command Processing
1. 2. 3. 3. 2. Reproducing Control
1. 2. 3. 3. 3. Determine if in Reproducible Format and Reproduce
1. 2. 3. 3. 4. Continuous Reproducing Control
1. 2. 3. 3. 5. Continuous Reproducing Control Using List Construction Key
1. 2. 3. 3. 6. Continuous Reproducing Control with Priorities
1. 2. 3. 3. 7 Continuous Reproducing Control Using Control Handle
1. 2. 3. 3. 8. Continuous Reproducing Control by Content Server
1. 2. 3. 3. 9. Continuous Reproducing Control by Audio Client Itself
1. 2. 3. 3. 10. Continuous Reproducing Control Using Reproducing Instruction Management Table
1. 2. 4. AV Receiver Control
1. 2. 5. Firmware Updating
2. Other Embodiments
2. 1. Audio Client Stored in Outlet Box
2. 2. Obtaining Music Data on Internet
2. 3. Reproducing with Function of Changing Obtaining Data Length
2. 4. Skip Reproducing
2. 5. Repeating Reproducing
2. 6. Midway Reproducing
2. 7. Client with Automatic Connection Recovery Function 1. Preferred Embodiment 1. 1. Configuration
1. 1. 1. General Configuration Referring to FIG. 1, the network type audio system 10 according to an embodiment of the invention includes a plurality of content servers S1 to Si for storing music data for a large number of music pieces, a plurality of audio clients C1 to Cj for reproducing music based on music data from the content servers S1 to Si, a plurality of controllers A1 to Ak for controlling and monitoring the audio clients C1 to Cj, AV equipment AVR (such as an AV receiver including a switch and an amplifier), and an AVR client AC for controlling the AV receiver AVR. Hereinafter, as each representative one of them, the content server Si, the audio client Cj, and the controller Ak will be described.

Herein, music data is stored in the content server Si, but the music data and/or video data may be stored instead. Alternatively, various other kinds of digital contents (for example, still pictures such as photographs) may be stored. In the following, music data will be described by way of illustration. There are a plurality of content servers Si, audio clients Cj, and controllers Ak in the following, but at least one such content server or audio client is necessary. When there are a plurality of content servers S1 to Si, the audio client Cj may obtain music data from any of the content servers S1 to Si or may obtain music data only from one particular content server Si. The controller Ak does not have to be provided at all. A plurality of AV receivers AVR or AVR clients AC may be provided while they do not have to be provided at all.

They are connected with one another through a LAN (Local Area Network) 12, but USB, IEEE 1394 or anything suitable for building up a computer network may be employed. When a LAN is employed, the standard TCP/IP protocol for personal computers (PCs) is preferably selected, while the UDP protocol may be employed. In other words, the protocol is not particularly limited. In FIG. 1, the content servers or the audio clients are connected to branch from the main wiring of a LAN, but for 10BASE-T or 100BASE-TX, for example, they are connected in a star shape having a hub in the center.

1. 1. 2. Content Server

Figure 2:
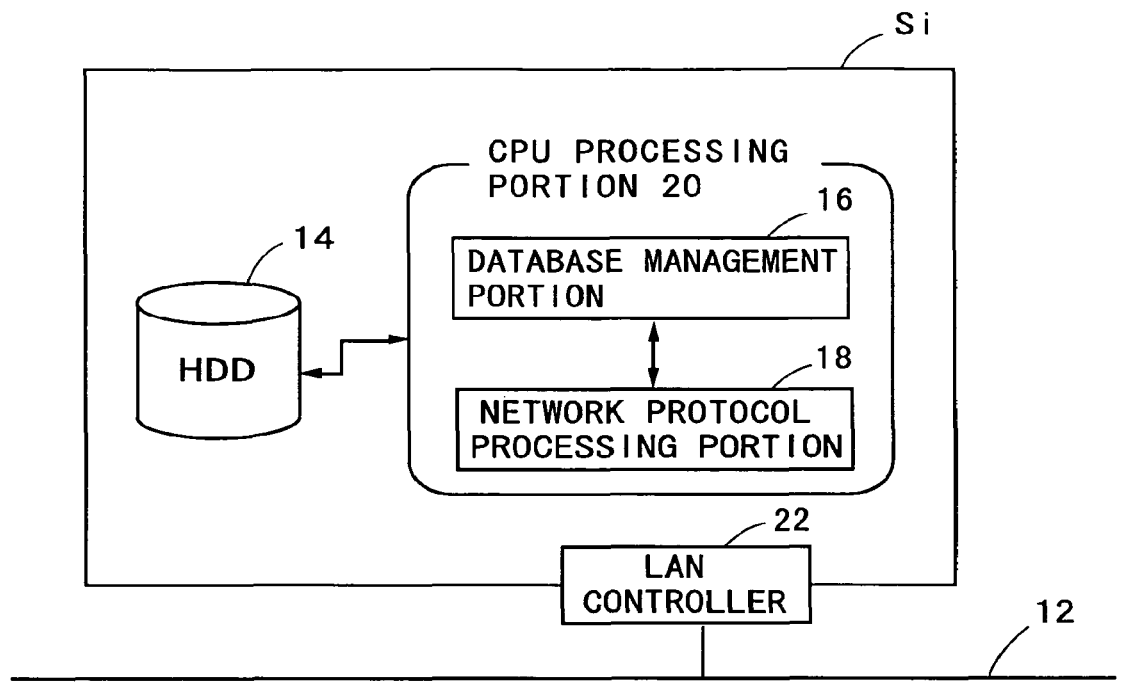
FIG. 2 is a functional block diagram of the configuration of each server in FIG. 1.

Referring to FIG. 2, each of the content servers Si includes an HDD (hard disc drive) 14 for storing compressed digital music data, a CPU processing portion 20 including a database management portion 16 and a network protocol processing portion 18, and a LAN controller 22 that transmits/receives signals between the content server Si and the LAN 12.

1. 1. 3. Audio Client

Figure 3:
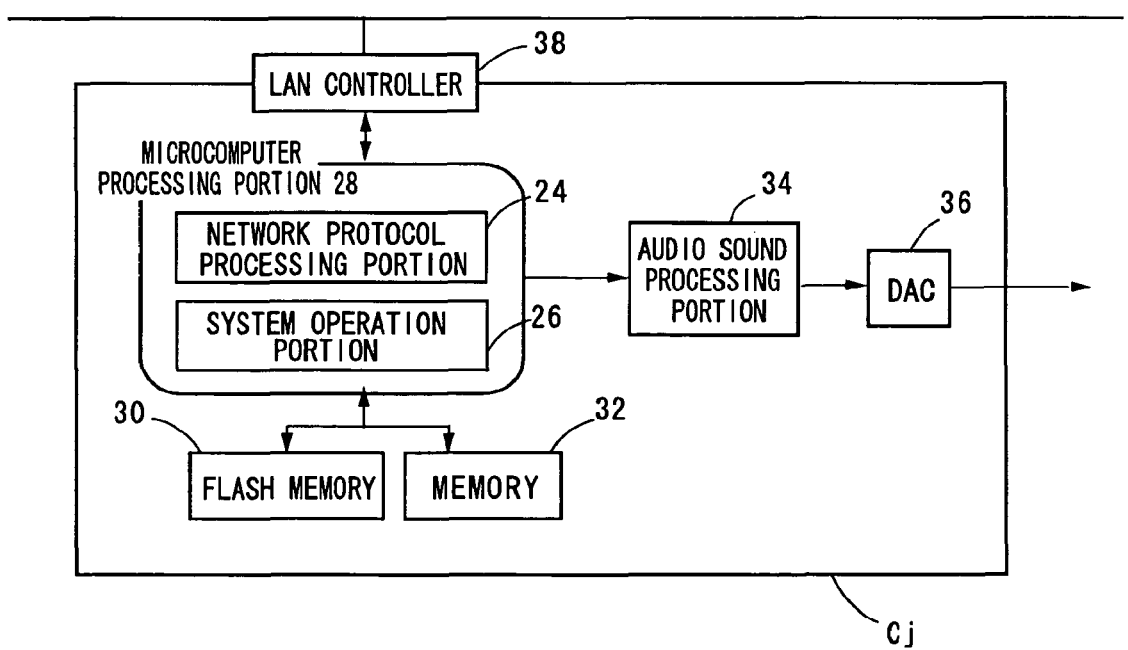
FIG. 3 is a functional block diagram of the configuration of each audio client in FIG. 1.

Referring to FIG. 3, each of the audio clients Cj includes a microcomputer processing portion 28 including a network protocol processing portion 24 and a system operation portion 26, a flash memory 30, a memory 32 that temporarily stores and sequentially outputs sequentially input, compressed digital music data or the like, an audio sound processing portion 34 that decodes compressed digital music data and generates non-compressed digital music data, a D/A converter (DAC) 36 that converts digital music data into analog music data, and a LAN controller 38 that transmits/receives signals between the audio client Cj and the LAN 12. Unlike the content server Si, the audio client Cj does not have to include an HDD for storing compressed digital music data.

1. 1. 4. Controller

Figure 4:
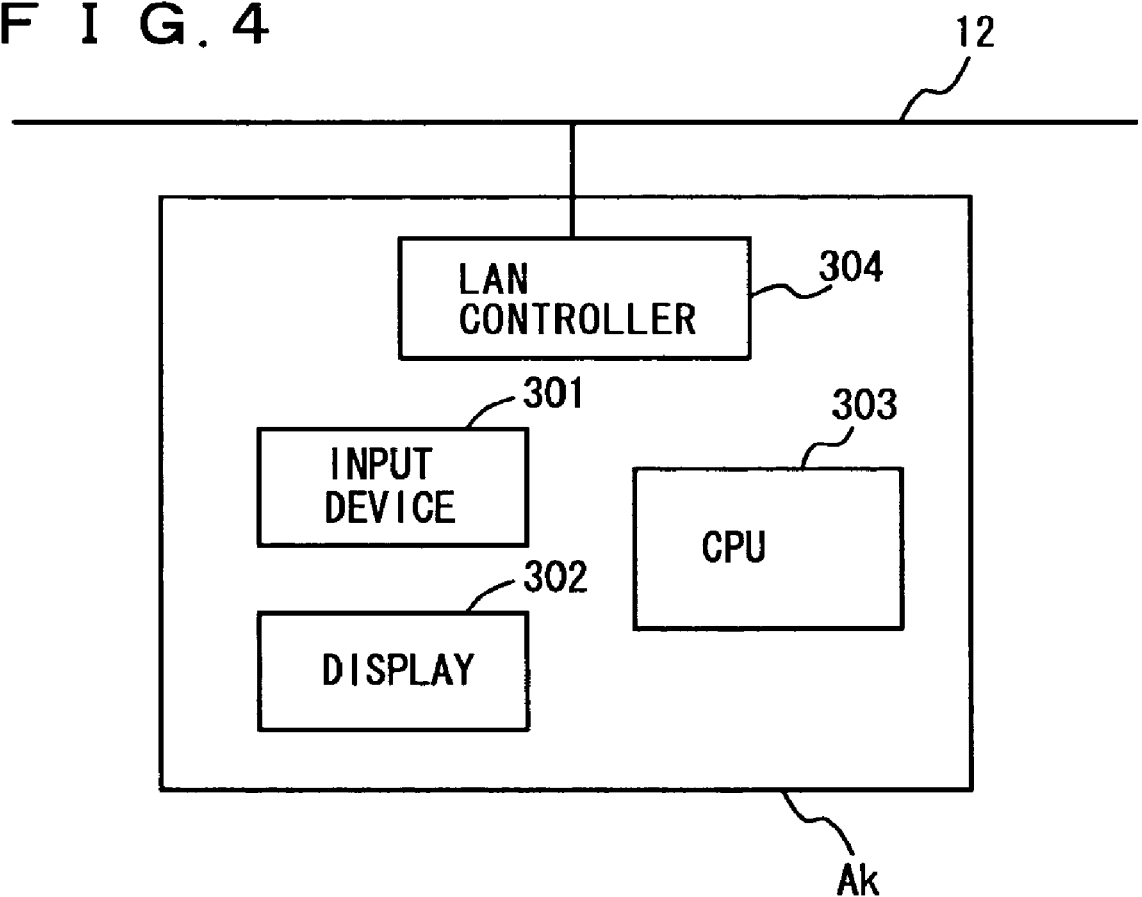
FIG. 4 is a functional block diagram of the configuration of each controller in FIG. 1.

Referring to FIG. 4, the controllers Ak each include an input device 301 such as a keyboard, a mouse, a tablet, and a touch panel, a display 302 such as a liquid crystal display and a CRT (Cathode Ray Tube), a CPU 303 that executes prescribed processing according to installed computer programs, and a LAN controller 304 that transmits/receives signals between the controller Ak and the LAN 12. The controllers A1 to Ak function as clients to the content servers S1 to Si similarly to the audio clients C1 to Cj. The controller Ak is different from the audio client Cj in that the audio client Cj has a reproducing function, while the controller Ak functions mainly for monitoring and controlling the audio client rather than reproducing.

The audio client mainly has a reproducing function but may have monitoring and controlling functions as well. In this case, the audio client also functions as a controller.

1. 1. 5 AV Receiver

The AV receiver AVR is connected to an AVR client AC for example by EIA-232 though not specifically limited. The AVR client AC mainly has a communicating function with the AV receiver AVR, but it may have a reproducing function as well similarly to the audio client Cj.

1. 2. Operation 1. 2. 1. Initialization of Content Server and Audio Client

Referring to FIG. 5, when an audio client is powered, the audio client searches for a content server (S11). A content server in operation among the plurality of content servers Si connected to the LAN 12 responds to the search (S21).

Then, the audio client issues a connection request to the content server in order to enable transmission/reception of data with the content server (S12). The content server establishes connection with the audio client in response to the connection request (S22).

Finally, the audio client transmits various client information related to the audio client to the content server (S13), and the content server receives the information (S23).

When the above initialization is completed, the process proceeds to the next operation of obtaining the music list. Before describing the operation, the initialization operation of the audio client will be described in detail.

Figure 6:
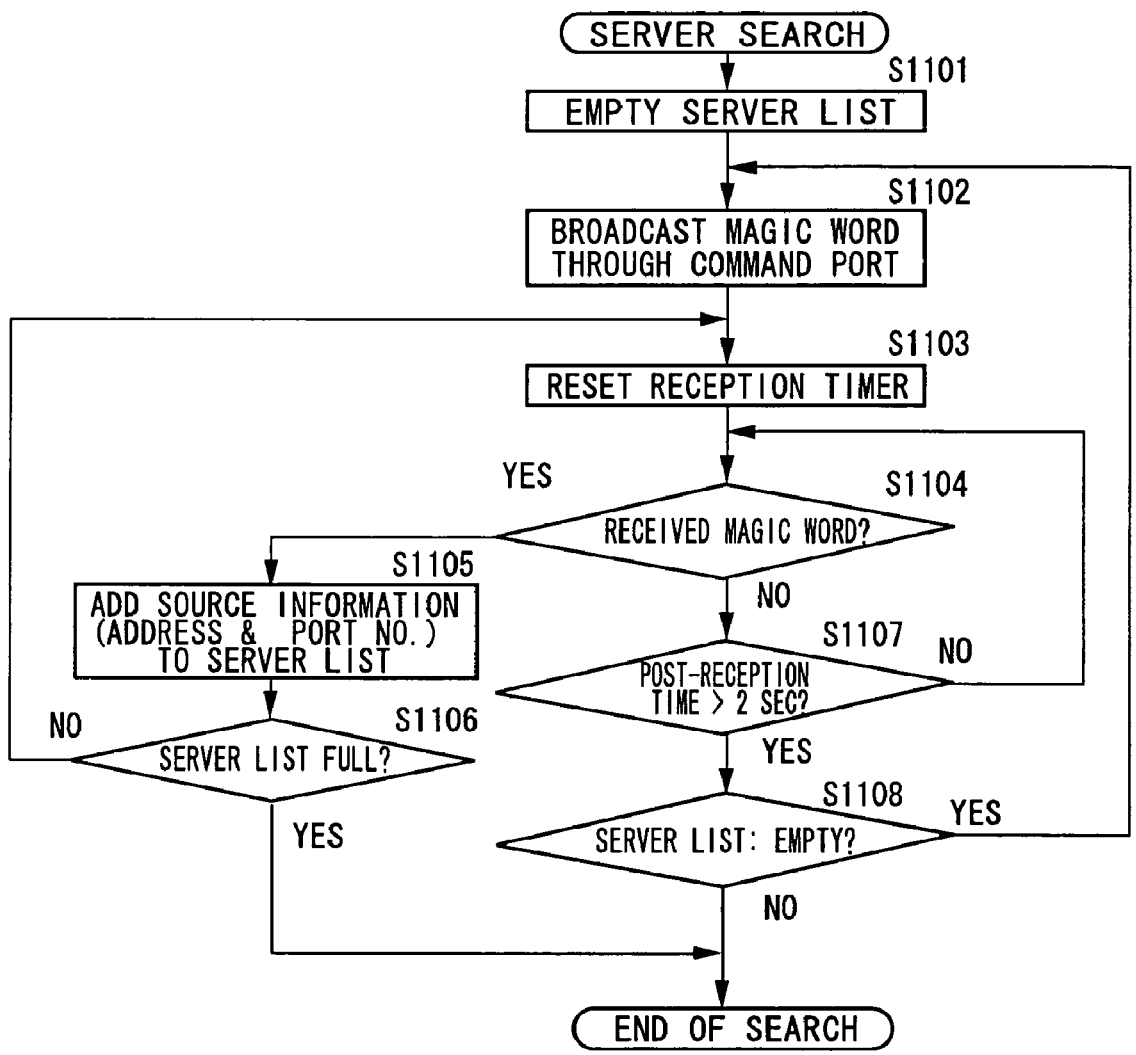
FIG. 6 is a flowchart for use in illustration of server search operation by the audio client in FIG. 5.

1. 2. 1. 1. Initialization of Audio Client 1. 2. 1. 1. 1. Search for Content Server Referring to FIG. 6, the audio client clears the server list for recording the IP address and port number of a found content server (S1101).

The audio client then broadcasts a predetermined magic word through a command port for example by the UDP protocol (though not specified) onto the LAN 12 (S1102). If there is a content server Si in operation among the content servers connected to the LAN 12, the content server receives the broadcast magic word at a search port and returns the same magic word to the audio client that has broadcast the magic word together with server specifying information (specifically its IP address and port number) to specify itself.

The audio client then resets the timer to count time for receiving the server specifying information (S1103) and then determines whether the server specifying information is received (S1104).

If the server specifying information is received (if a content server is found), the audio client records the server specifying information in the server list (S1105). The audio client then determines whether the server list is filled (S1106). If the list is filled, the searching operation is complete, and otherwise the process returns to step 1103.

Meanwhile, if the server specifying information is not received (if no content server is found), the audio client determines whether or not prescribed time such as two seconds has passed before the server specifying information should have been received (S1107). If the time has not elapsed, the process returns to step S1104. More specifically, the audio client waits for a response from any content server for two seconds.

If the two seconds have passed before the server specifying information should have been received, the audio client determines whether or not the server list is empty (S1108). If the server list is empty, in other words, if no server specifying information is recorded in the server list, the audio client returns to step S1102 and once again broadcasts the magic word. Meanwhile, if the server list is not empty, in other words, if server specifying information on at least one content server is recorded, the audio client ends the searching operation. More specifically, the audio client continues to search until it finds at least one content server.

As the result of searching for the content server, an IP address and a port number corresponding to one or more content servers are provided to the server list.

1. 2. 1. 1. 2. Connection with Content Server

Referring to FIG. 7, the audio client selects one content server in the server list in response to the user's operation (S1201) and obtains the IP address and port number of the selected content server (S1202).

The audio client generates a TCP (Transmission Control Protocol) socket (1) using the obtained IP address and the command port (S1203) and connects the content server with the TCP socket (1) (S1204). The command port is a port used to transmit/receive commands between the content server and the audio client. If the content server successfully accepts connection with the command port (S2201) and the connection is established, the process proceeds to step S1206, and otherwise the connection is not successful (S1205). In this way, the audio client establishes the connection to transmit/receive commands between the content server and itself.

The audio client then transmits a client index request command to the content server by the TCP socket (1) (S1206). The content server responds to the client index request command and returns a client index to the audio client from the TCP socket (1) (S2202), and the audio client receives the index (S1207). The client index is an ID number allocated to each audio client by the content server. The client index request command is a command by which the audio client requests the content server to transmit a client index.

The audio client then generates a TCP socket (2) using the IP address and push port of the content server (S1208) and establishes connection with the content server by the TCP socket (2) (S1209). The push port is a port in a stand-by state so that the port can always receive a voluntary request from the content server or a request from the content server in response to a request from a controller. Hereinafter, these requests from the content server are referred to as "server requests." If the content server successfully accepts the connection through the push port (S209), and the connection is successfully established, the process proceeds to step S1211, but otherwise the connection is not successful (S1210). In this way, the audio client establishes the connection to receive a server request.

At this point, the content server is not informed of which audio client is connected to the push port. Therefore, the audio client transmits the client index obtained in step S1207 to the content server by the TCP socket (2) (S1211). The content server specifies the audio client connected to the push port based on the client index. Thereafter, the content server uses the push port for transmitting a server request to the audio client.

In this way, the two kinds of connection are established through the command port and the push port. These two kinds of connection are established not only between the audio client Cj and the content server Si but also between the controller Ak (that will be described) and the content server Si, and between the AVR client AC and the content server Si.

In the server-client system in general, as with the HTTP protocol, a content server returns a response (such as an HTML document) to a request (such as a page request) from a client. This means that only the client has a trigger for action, and the content server cannot voluntarily act upon the client. Therefore, when the content server takes any voluntary action to a client such as notifying the client that the content server will be shut down, for example, such notification cannot be carried out unless there is a request from the client.

A command to check for a server request is issued to the content server at prescribed intervals so that the client can receive a server request if there is any. The content server responds to the command issued by the client to transmit a server request to the client and the client receives the request.

It is known that in the case of the HTTP protocol, any dynamically updated page must be reloaded for every prescribed time period. This can be called obtaining a server request by polling by a client, but the method suffers from the following disadvantages.

(1) Unless the polling intervals are short enough to frequently check for a server request, there could be time difference between when the content server issues a request and when the audio client actually receives the request.

(2) However, if the polling intervals are short as described above, the network traffic and the server-client load increase.

(3) The frequency of how often the content server has to transmit a server request to the client is lower than the normal frequency of transmitting/receiving a command, so that most of the polling occasions are wasted because the inquiry about the presence/absence of a server request usually ends up with the answer "absence."

In order to solve these disadvantages, a server request may be transmitted to the client by interrupt by the content server rather then the polling by the client. In this manner, the lack of real time-ness in the above (1) and the unnecessary load such as that in the above (2) and (3) can be eliminated.

To this end, the two kinds of connection are established. One is connection formed at a command port through which the audio client Cj issues a command and the content server Si responds to the command. The other is connection formed at the push port through which the content server Si sends a server request to the audio client Cj. In this manner, without having to carry out polling by the audio client Cj, the content server Si can notify the audio client Cj of a server request.

Now, the operation using these two kinds of connection will be described in detail.

Figure 8:
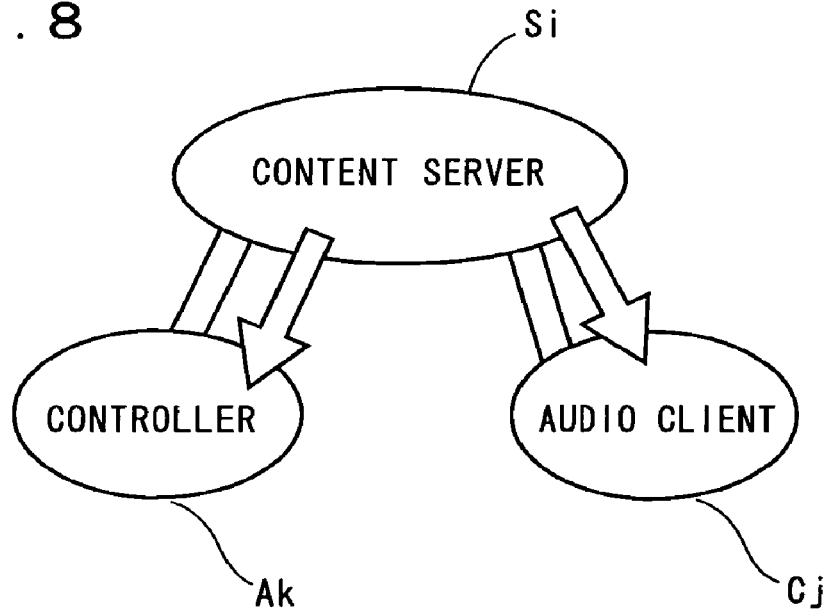
FIG. 8 is a diagram showing push operation by the server after the connection operation in FIG. 7.

As shown in FIG. 8, the content server Si notifies all the audio clients Cj of shutting down through the push port when it shuts down and causes the audio clients Cj to carry out some operation (such as turning off the power).

Figure 9:
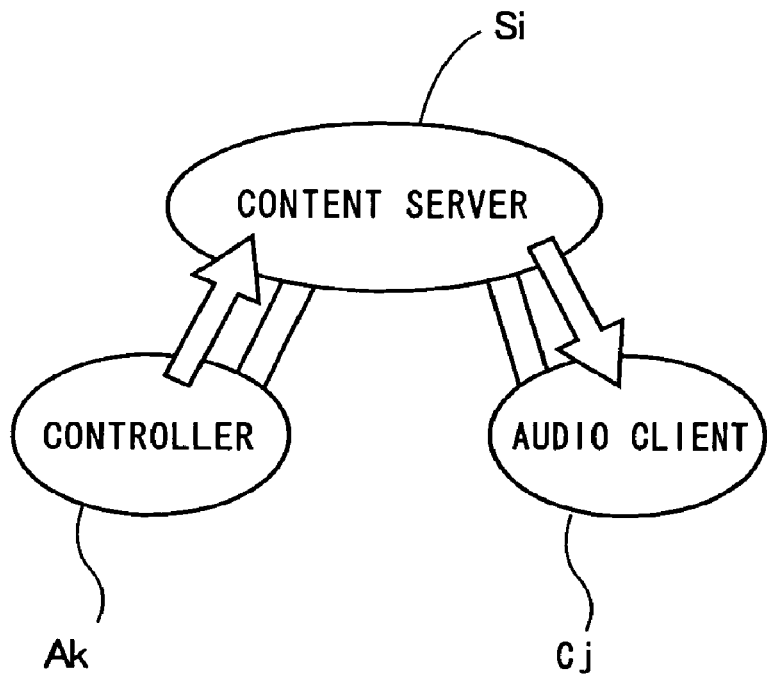
FIG. 9 is the continuation of FIG. 8 showing server request operation to the audio client from the controller to the server.

As shown in FIG. 9, when the controller Ak controls the audio client Cj (for example to reproduce or stop), the controller Ak transmits a request to the content server Si to issue a server request including the control content through the command port. The content server Si responds to the command to transmit a server request to the audio client Cj through the push port. Consequently, the controller Ak can control the audio client Cj.

As shown in FIG. 10, the audio client Cj transmits a change in its operation state to the content server Si through the command port. The content server Si transmits the change in the operation state through the push port to the controller Ak that monitors the operation state of the audio client Cj. Therefore, the audio client Cj can notify the controller Ak of a change in its operation state in real time.

As described above, the network traffic and the load on the content server and audio client in the network type audio system can be minimized, so that the performance of the entire system can be increased.

1. 2. 1. 1. 3 Transmission of Client Information

Referring to FIG. 11, the audio client transmits its attribute information to the content server (S1301 to S1303) and transmits its initial status (S1304 and S1305).

More specifically, the audio client transmits the audio client type by the TCP socket (1) (S1301). The audio client type includes the kind of a reproducible music format, whether it can be operated by a remote controller (remote), the presence/absence of an EIA-232 port and the like.

The audio client then transmits its product ID by the TCP socket (1) (S1302). The product ID is machine information provided for each of audio client types. Therefore, the audio clients of the same type are provided with the same product ID.

The audio client then transmits the firmware ID by the TCP socket (1) (S1303). The firmware ID is the version information of firmware installed in the audio client.

The audio client then transmits the initial volume value by the TCP socket (1) (S1304). The initial volume value is an initial value for the volume of sound reproduced by the audio client.

Finally, the audio client transmits the initial status of the audio client by the TCP socket (1) (S1305). The initial status of the audio client includes a stop status or the like.

The content server receives client information transmitted from a client and stores the received information in client information database (FIG. 13). The client information is transmitted not only from the audio client Cj but also from the controller Ak and the AVR client AC to the content server Si. The content server Si controls all the clients based on the client information.

1. 2. 1. 2. Initialization of Content Server

Now, the initialization of a content server corresponding to the initialization of the audio client will be described.

Figure 12:
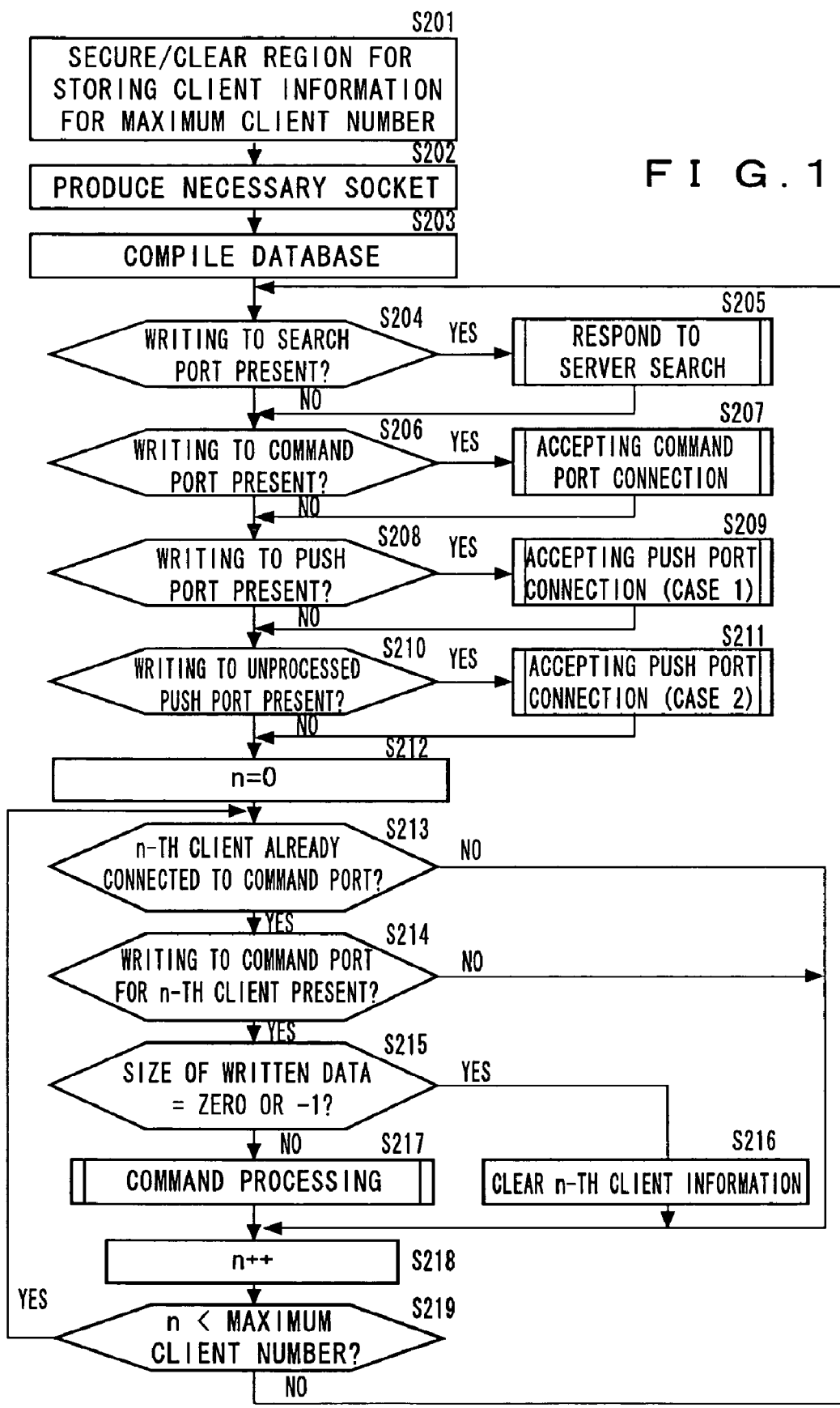
FIG. 12 is a flowchart for use in illustration of initialization and main operation by the server in FIGS. 1 and 2.

Referring to FIG. 12, the content server secures storage regions for the client information database as shown in FIG. 13 as many as the maximum number of clients and clears them (S201). The client information each includes a flag indicating the presence/absence of connection, the type of the client, the present status, the present volume value, a product ID, a firmware ID, the name of the client, a reproducing file name, and a list construction key.

As the client type, the type such as an audio client, a controller, and an AVR client, and a reproducible data format (such as MP3 and WAV) are recorded. For the client type, whether or not it can be controlled with a remote is also recorded. If the audio client can be remote-controlled, information as being "remote-controllable" is recorded. The status to be recorded includes "reproducing," "stop," "pause," "complete," and "firmware in the process of updating." As the reproducing file name, the full path name of the HDD 14 that stores the data of the music piece being reproduced at present is recorded. The reproducing file name does not have to be the file name itself such as a full pathname but may be any information that can be used to specify the file. For example, a table having prescribed ID numbers and file names in association with each other may be stored in the content server, and the content server may refer to the table to convert an ID number into a corresponding file name. In this way, long file names do not have to be transmitted/received. Since the file storing the data of a music piece cannot be specified directly based on the file name, it is also advantageous in terms of security. In addition, the list construction key is used by the content server to produce a list, which will be detailed later.

The content server then produces sockets to accept connection requests to the command port and the push port and a server search request to the search port (S202). The search port is a port used when a content server is searched for, and the content server monitors to check whether or not a magic word is input to the search port.

Figures 15, 16:
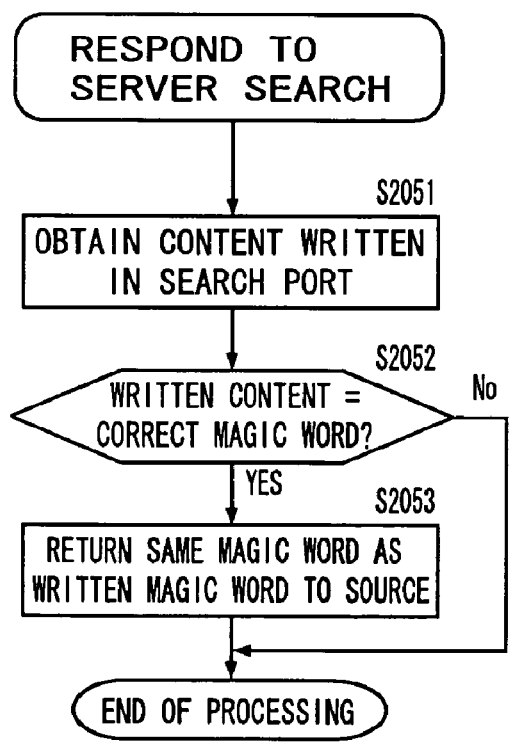
FIG. 15 shows a firmware information database stored in the server in FIG. 2.
FIG. 16 is a flowchart for use in illustration of a subroutine to respond to server search in FIG. 12.

Then, the content server builds up a content information database as shown in FIG. 14 and a firmware information database as shown in FIG. 15 (S203). The content information database includes content information pieces as many as the number of music pieces. The content information of each music piece includes a file name, the title of the piece, an artist name, an album title, a genre, the length (time) of the piece, a data format, the number of how many times it has been reproduced, and the last accessed time. The file name includes the full path of the HDD 14 that stores the data of the music piece of interest. The firmware information database includes firmware information pieces as many as the number of firmware files. The firmware information includes a product ID, a firmware ID, a file size, a data format, and a file name. As the file name, the full path name indicating the site on the Internet where the firmware is stored is recorded.

If something is written in the search port (S204), the content server carries out response processing to the content server search that will be described (S205). The content server also carries out command port connection accepting processing that will be described (S207), if something is written in the command port (S206). The content server carries out push port connection accepting processing (case 1) that will be described (S209), if the push port is written (S208). The content server carries out the push port connection accepting processing (case 2) that will be described (S211), if a push port yet to be processed is written (S210).

1. 2. 1. 2. 1. Response to Content Server Search

Referring to FIG. 16, when something is written in the search port, the content server obtains the written content (S2051) and determines whether or not the content is a correct magic word (S2052). If the content is a correct magic word, the content server returns the same magic word to the source client (S2053) together with the IP address and port number of the content server.

1. 2. 1. 2. 2. Accepting Command Port Connection

Figure 17:
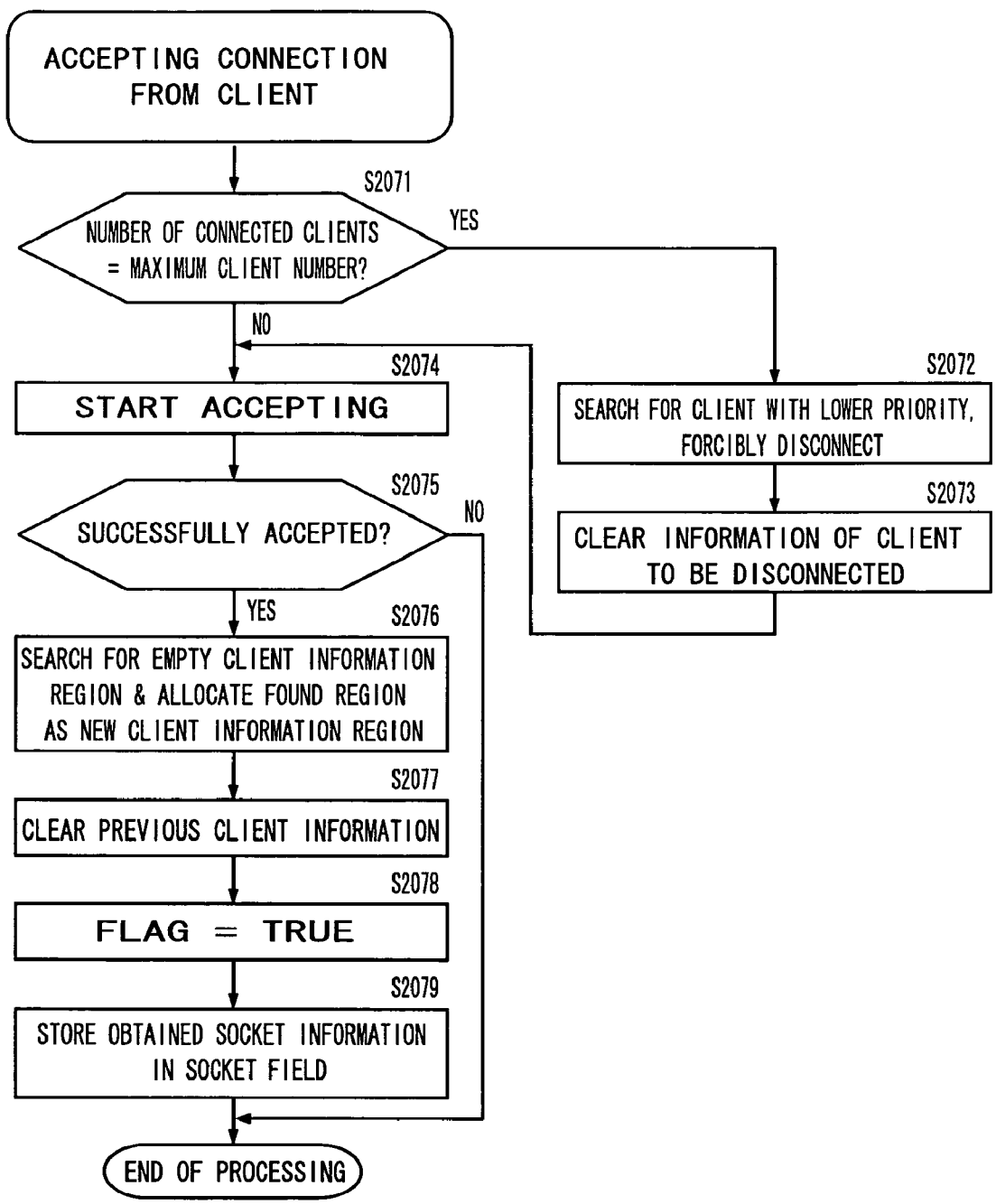
FIG. 17 is a flowchart for use in illustration of a subroutine in command port connection accepting processing in FIG. 12.

Referring to FIG. 17, when a connection request is issued from a client to the command port, the content server determines whether or not the number of presently connected clients has reached the maximum client number (S2071). If the number of presently connected clients has reached the maximum client number, the content server searches for a client with a low priority and forcibly disconnects the found client (S2072). The priorities of the clients are lower for audio clients not in the process of reproducing at present and audio clients that have not communicated for prescribed time. The content server clears the client information of the forcibly disconnected client (S2073).

Alternatively, the content server may be adapted not to connect with further clients if the number of clients connected at present has reached the maximum client number.

If there are more sockets to be connected with clients, or if more connectable sockets are secured by disconnecting clients with low priorities, the content server starts to accept connection requests from clients (S2074).

When a request is successfully accepted (S2075), the content server searches for an empty region in the client information database (S2076). More specifically, the content server searches for client information whose flag indicates FALSE. The content server allocates the found region as a new client information storage region (S2077) and clears the previous client information (S2078).

The content server then sets the flag to TRUE (S2078), and socket information obtained as the result of accepting the request is stored in the socket field of the client information storage region (S2079).

1. 2. 1. 2. 3. Accepting Push Port Connection (Case 1)

Figure 18:
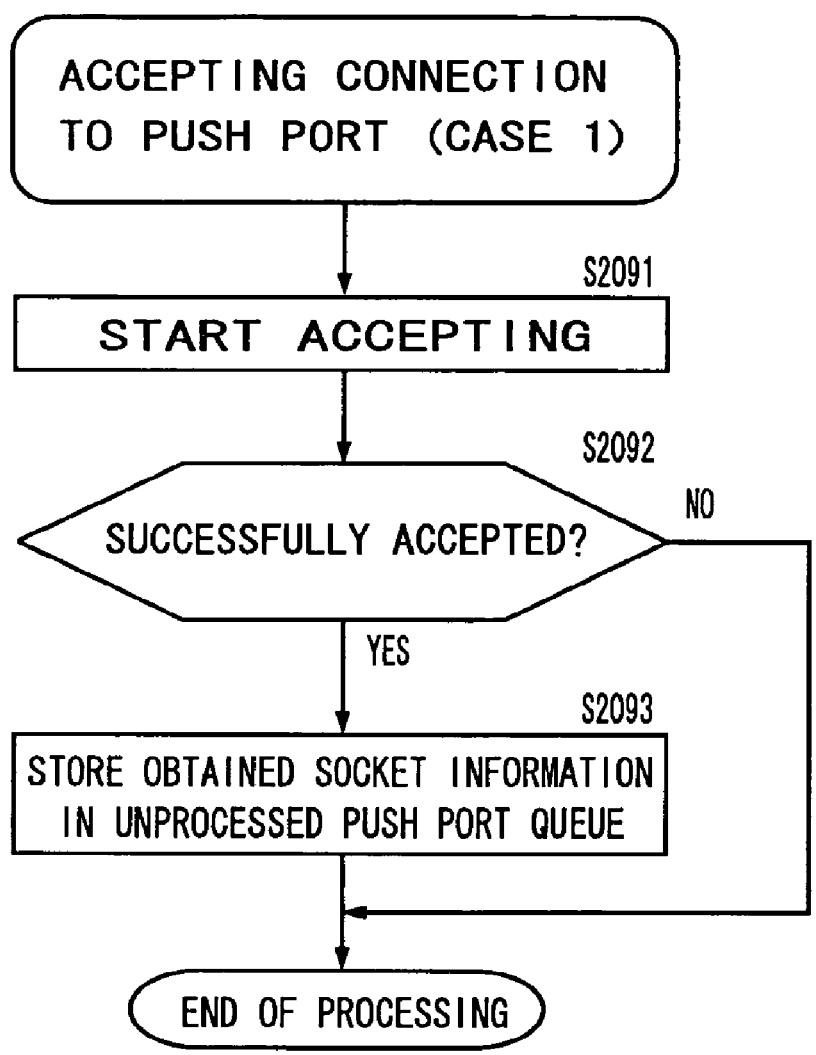
FIG. 18 is a flowchart for use in illustration of a subroutine in push port connection accepting processing (case 1) in FIG. 12.

Referring to FIG. 18, if a client requests connection to the push port, the content server starts to accept the request (S2091). If the request is successfully accepted (S2092), socket information obtained as the result of accepting the request is stored in a queue for a push port yet to be processed (S2093). At the point, the content server still cannot specify the client connected to the push port. Such a push port is referred to as "unprocessed push port."

1. 2. 1. 2. 4. Accepting Push Port Connection (Case 2)

Figure 19:
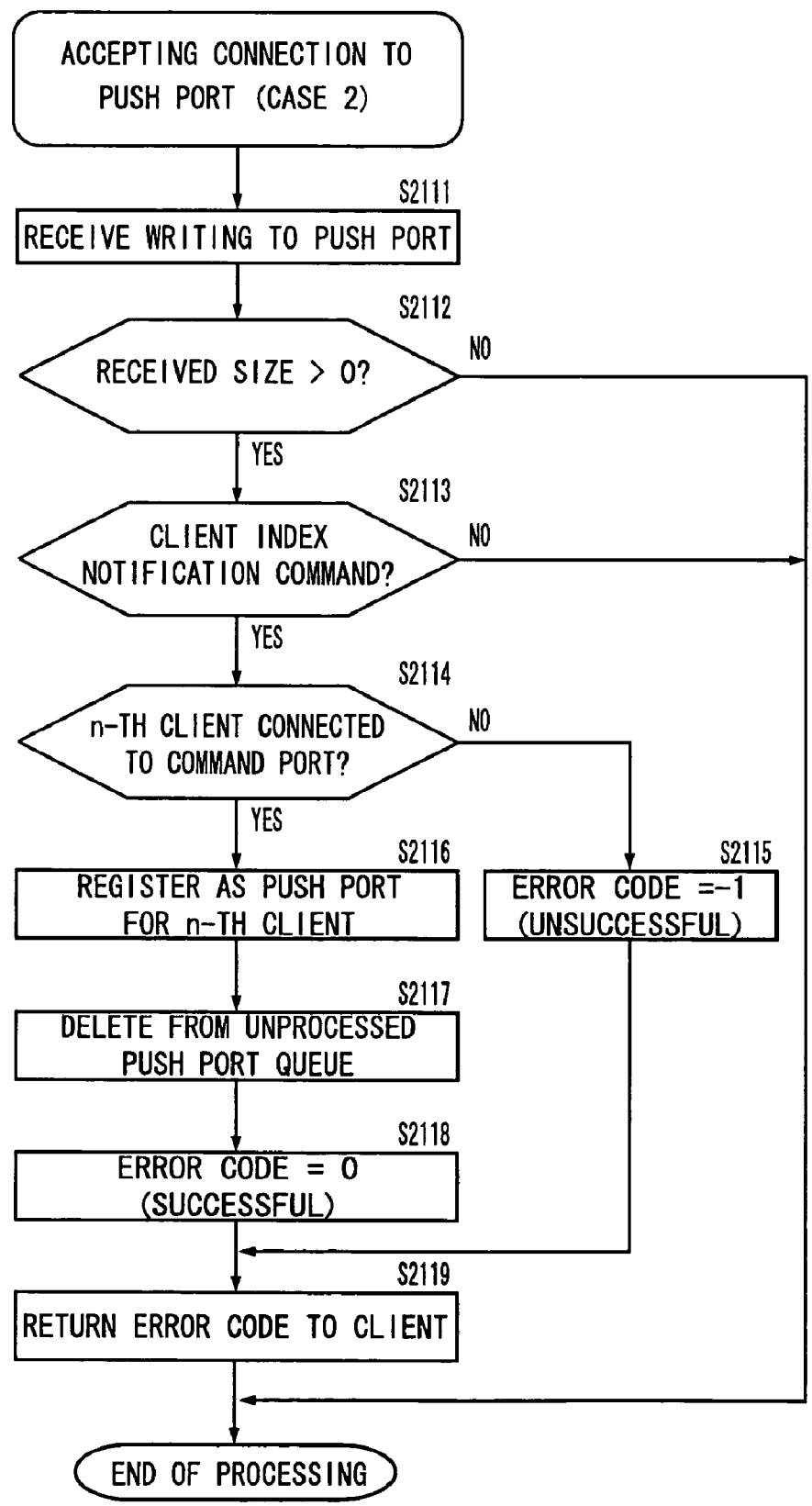
FIG. 19 is a flowchart for use in illustration of a subroutine in the push port connection accepting processing (case 2) in FIG. 12.

Referring to FIG. 19, if the client issues a connection request to an unprocessed push port, the content server obtains a command written in the push port (S2111). If the command has a size larger than zero (S2112) and is a client index notification command (S2113), the content server determines whether or not the client indicated by the client index has already been connected to the command port (S2114).

If connection is not complete, the content server sets the error code to −1 (failure) (S2115) and proceeds to step S2119. Meanwhile, if connection is complete, the content server registers the push port as the push port for the client (S2116). The content server further eliminates the push port from the queue for unprocessed push ports (S2117) and sets the error code to zero (success) (S2118). The content server then returns the set error code to the client (S2119).

1. 2. 2. Main Operation of Content Server and Audio Client 1. 2. 2. 1. Accepting Command Referring back to FIG. 12, the content server accepts a command from a client after completing the initialization. More specifically, the content server repeats steps S213 to S217 as many times as the maximum client number (S212, S218, S219). The character n is a client index from zero to the maximum client−1 allocated to a client.

More specifically, the content server refers to the flags in the client information database and determines whether or not the n-th client has already been connected to the command port (S213). If it has already been connected, the content server determines whether or not data has been written to the command port for the n-th client (S214). If data has been written, the content server determines whether or not the size of the written data is 0 or −1 (S215). If the data is 0 or −1, which means that a client is disconnected or there is a socket error, the content server clears the client information of the n-th client (S216). Meanwhile, if otherwise, the content server carries out the following command processing (S217).

1. 2. 2. 1. 1. Command Allocation Processing

Referring to FIG. 20, if data has been written to the command port by a client, the content server branches processing in response to a command stored in the head four bytes (S2171). More specifically, if the command is a status notification command to notify a change in the status to the content server from the audio client (S2172), the controller is notified of the status transmitted from the audio client (S2173), details of which will be described later. If the command is a content server request issuing command from the controller to the audio client (S2174), the audio client is notified of the request from the controller (S2175), details of which will be described later. In addition, the content server carries out prescribed processing in response to the command.

1. 2. 2. 1. 2. Status Notification Command Processing

Figure 21:
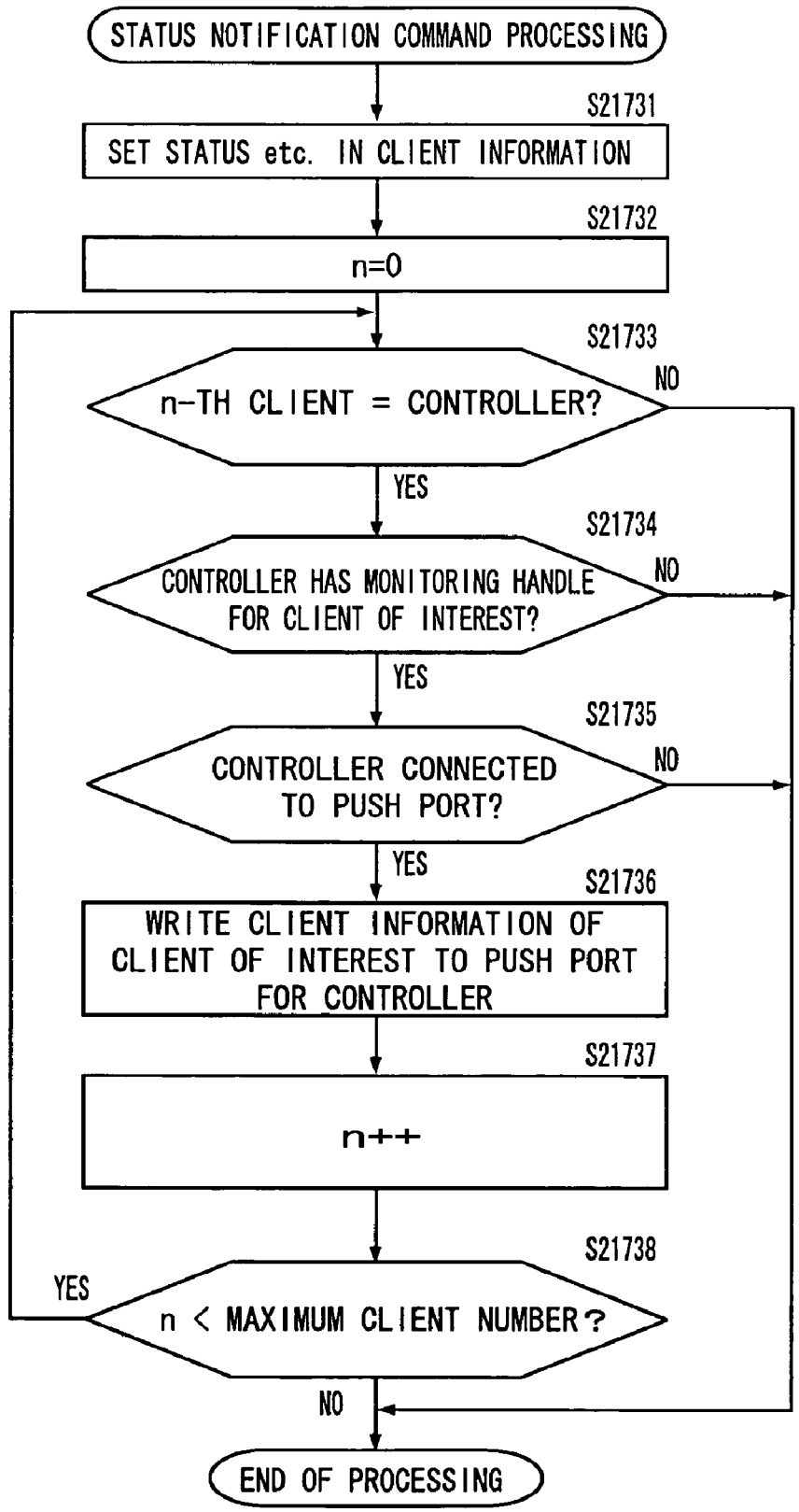
FIG. 21 is a flowchart for use in illustration of a subroutine in status notification command processing in FIG. 20.

Referring to FIG. 21, when a command from an audio client (hereinafter referred to the "audio client of interest") is a status notification command, the content server stores client information such as a status and volume stored in parameters in the command in the client information database (S21731). Therefore, the content server always holds the most updated version of client information.

The content server then searches for a controller among all the clients and notifies the found controller of the status of the audio client of interest. Therefore, the content server repeats the following steps S21733 to S21736 as many times as the maximum client number (S21732, S21737, S21738).

More specifically, the content server refers to the client type of the client information and determines whether or not the n-th client is a controller (S21733). Therefore, the status of the audio client of interest can be prevented from being notified to any other audio client that is not a controller. If the client is a controller, the content server determines whether or not the controller has a monitoring handle for the audio client of interest (S21734). If the controller has the monitoring handle, the content server determines whether or not the connection between the controller and the push port is established (S21735).

If the connection to the push port is established, the content server writes the client information of the audio client of interest in the push port of the controller and thus notifies the controller of the status of the audio client of interest (S21376).

1. 2. 2. 1. 3. Server Request Issuing Command Processing

Figure 22:
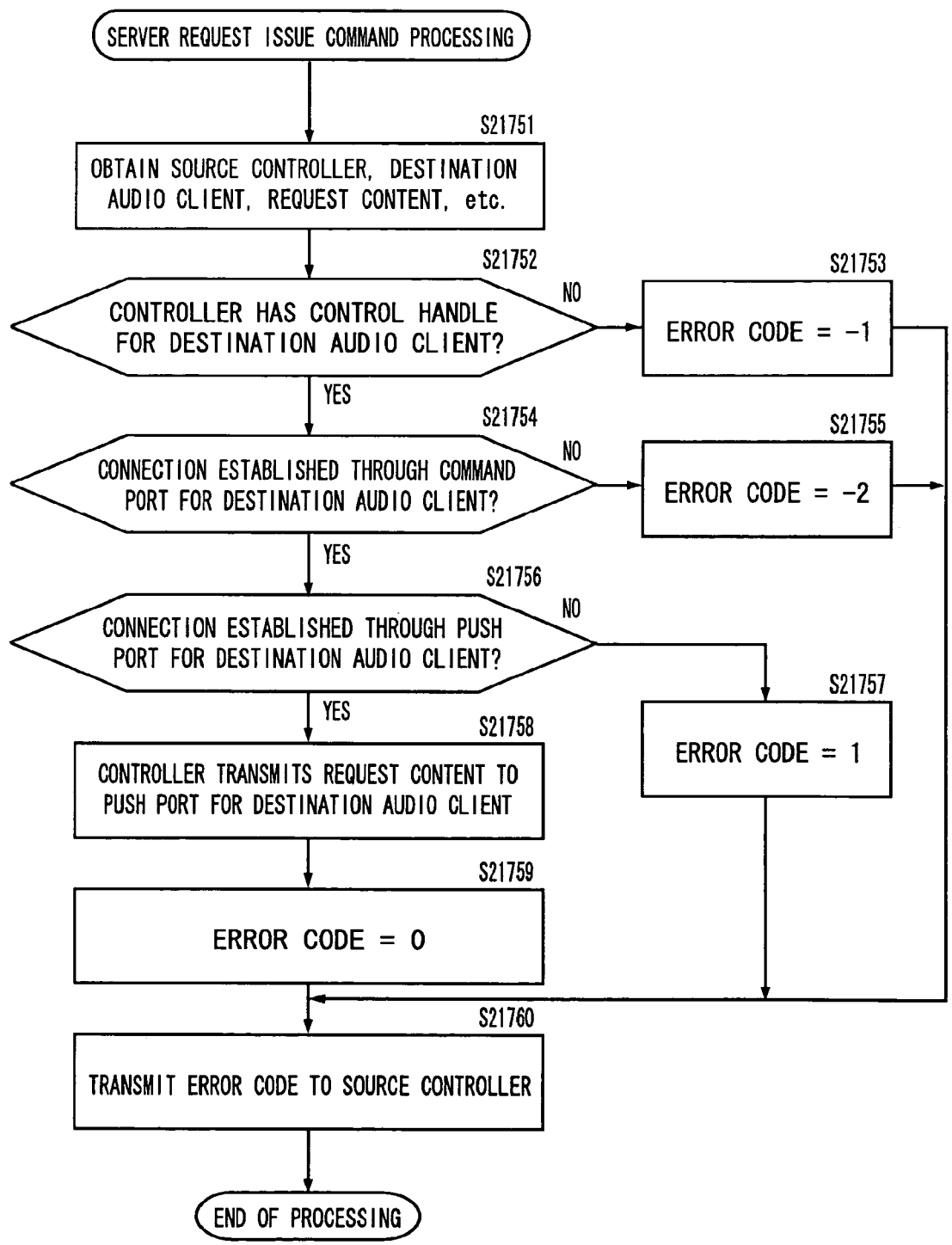
FIG. 22 is a flowchart for use in illustration of a subroutine in server request issue command processing in FIG. 20.

If a command from a controller is a server request issuing command, as shown in FIG. 22, the content server obtains information such as the source controller, the destination audio client, the request content and the like included in the command (S21751).

The content server determines whether or not the source controller has the control handle (that will be described) for the destination audio client (S21752). If the source controller does not have the control handle, the error code is set to −1 (S21753). Therefore, a controller without the control handle can be prevented from controlling the audio client.

If the controller has the control handle, the content server refers to the flag in the client information and determines whether or not connection is established at the command port of the destination audio client (S21754). If the connection is not established, the error code is set to −2 (S21755). Therefore, the command can be prevented from being transmitted to an uncontrollable audio client.

If the connection is established at the command port of the destination audio client, the content server determines whether connection is established at the push port of the destination audio client (S21756), and if the connection is not established, the error code is set to 1 (S21757). Meanwhile, if the connection is established, the content server transmits the content of the request from the controller to the push port of the destination audio client (S21758) and sets the error code to 0 (no error) (S21759).

Finally, the content server returns the error code to the source controller (S21760).

Note that if the destination audio client is not connected to the push port, the content of the request from the controller may be transmitted to the destination audio client in response to an inquiry by polling from the destination audio client.

1. 2. 2. 2 Normal Reproducing

Now, the operation of how the user has a desired music piece reproduced by the audio client Cj will be described. Here, the user does not directly specify the desired piece but specifies a list of desired music pieces and selects a desired music piece in the list.

Figure 23:
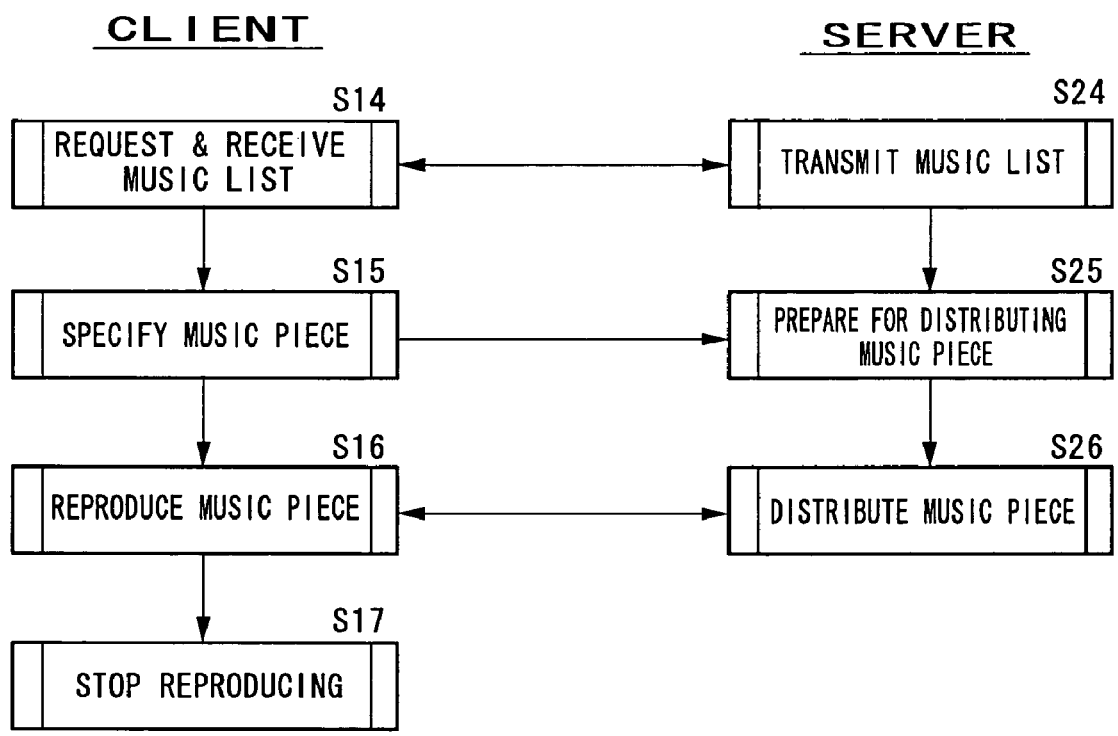
FIG. 23 is a flowchart for use in illustration of the operation of obtaining a music list and reproducing by the server and the audio client in FIGS. 1 to 3.

Referring to FIG. 23, an audio client transmits a music list request command in response to the user's operation (S14). The music list request command is a command from the audio client to request the content server to provide a list of desired music pieces. The music list includes the titles of music pieces, the artists' names, and the like. The content server transmits a music list to the requesting audio client in response to the music list request command (S24), and the audio client receives the list (S14).

The audio client responds to the user's operation to specify a music piece included in the music list (S15), and the content server prepares for distribution of the specified music piece accordingly (S25).

The content server distributes the specified music piece to the audio client (S26), and the audio client reproduces the distributed music piece (S16). The audio client then stops reproducing the music piece at the end of reproduction or in response to the user's operation (S17).

Now, each of steps S14 to S16 will be described in detail.

1. 2. 2. 2. 1. Obtaining Music List

Figure 24:
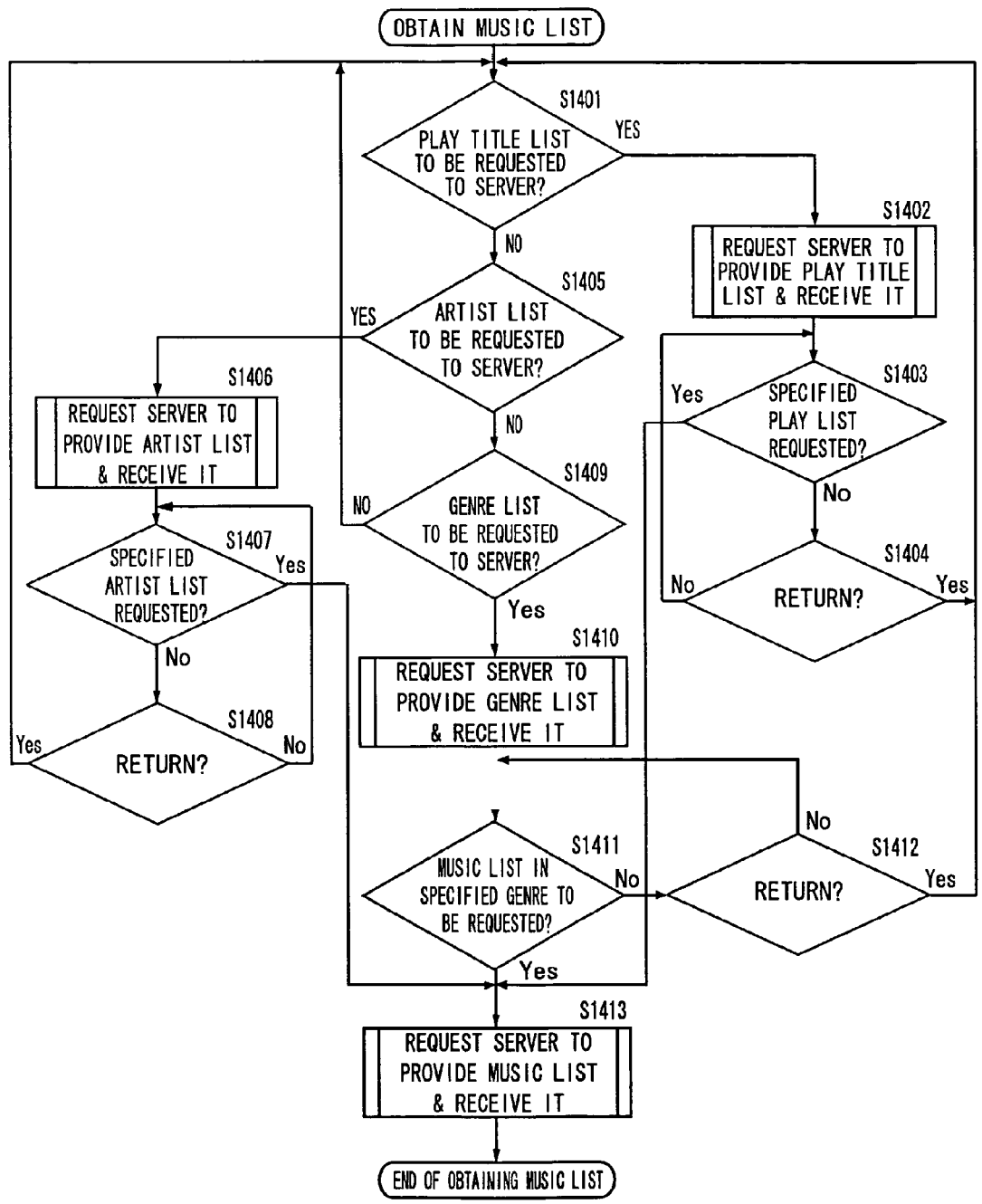
FIG. 24 is a flowchart for use in illustration of the operation of obtaining a music list by the audio client in FIG. 23.

Referring to FIG. 24, the audio client determines whether or not to request the content server to provide a play title list (S1401). The play title list includes the titles of playlists. The playlist is a list of music pieces selected by the user. The content server stores a plurality of playlists produced by the user.

When the user tries to select one of the plurality of playlists stored in the content server, the user requests the content server to provide a play title list in order to check what kind of playlists are registered. The audio client requests the content server to provide a play title list in response to the user's operation and receives the play title list from the content server (S1402).

Then, the audio client determines whether or not to request for a specified playlist (S1403). If the user specifies a desired playlist in the play title list, and the audio client requests for the specified playlist in response to the operation, the process proceeds to S1413, and otherwise the process returns to step S1401 or S1403 (S1404).

If the play title list is not requested, the audio client determines whether or not to request the content server to provide an artist list (S1405). The artist list includes a plurality of artists' names. The artist list is not prepared in the content server, but such a list is produced from the content information database shown in FIG. 14 every time there is a request from the audio client.

If the user requests for an artist list, the audio client requests the content server to provide a desired artist list in response to the user's operation and receives the artist list from the content server (S1406).

The audio client then determines whether or not to request for a music list by the specified artist (S1407). If the user specifies a desired artist in the artists' list, and the audio client requests for a music list by the specified artist in response to the operation, the process proceeds to step S1413, and otherwise the process returns to step S1401 or S1407 (S1408). The music list includes the titles of music pieces by the specified artist and the like, and the music list is not prepared in the content server as with the artist list as described above and it is produced from the content information database shown in FIG. 14 every time there is a request from the audio client.

If no artist list is requested, the audio client determines whether or not to request the content server to provide a genre list (S1409). The genre list includes a plurality of genres. The genre list is not prepared in the content server as with the artist list either and it is produced from the content information database shown in FIG. 14 every time there is a request from the audio client.

If the user requests for a genre list, the audio client requests the content server to provide a desired genre list in response to the user's operation and receives the genre list from the content server (S1410).

The audio client then determines whether or not to request a music list in a specified genre (S1411). If the user specifies a desired genre in the genre list, and the audio client requests a music list in the specified genre in response, the process proceeds to step S1413, and otherwise the process returns to step S1401 or S1411 (S1412). The music list including the titles of music pieces in the specified genre is not prepared in the content server as with the artist's music list and it is produced from the content information database shown in FIG. 14 every time there is a request from the audio client.

Consequently, when a music list is requested, the audio client requests the content server to provide the music list and receives the music list from the content server (S1413). In this way, the music list is successfully obtained.

Now, referring to FIG. 25, the operation of obtaining a genre list, selecting pop music as a desired genre, and obtaining a pop music list will be described.

In this case, the audio client transmits a list request command to request the content server to provide a genre list (S1421) and the content server returns the genre list accordingly (S2401). The audio client receives the genre list from the content server and stores the list in the memory 32 as shown in FIG. 26 (S1422).

The genre list may be prepared and stored in the content server, but here the list is produced from the content information database shown in FIG. 14 every time there is a request from the audio client. Now, how such a genre list is produced will be described.

As shown in FIG. 27, in the case that the content server stores n music pieces, the content information database has n records. Each record includes the title of a music piece, the genre, the artist's name, and the album title.

Figure 28:
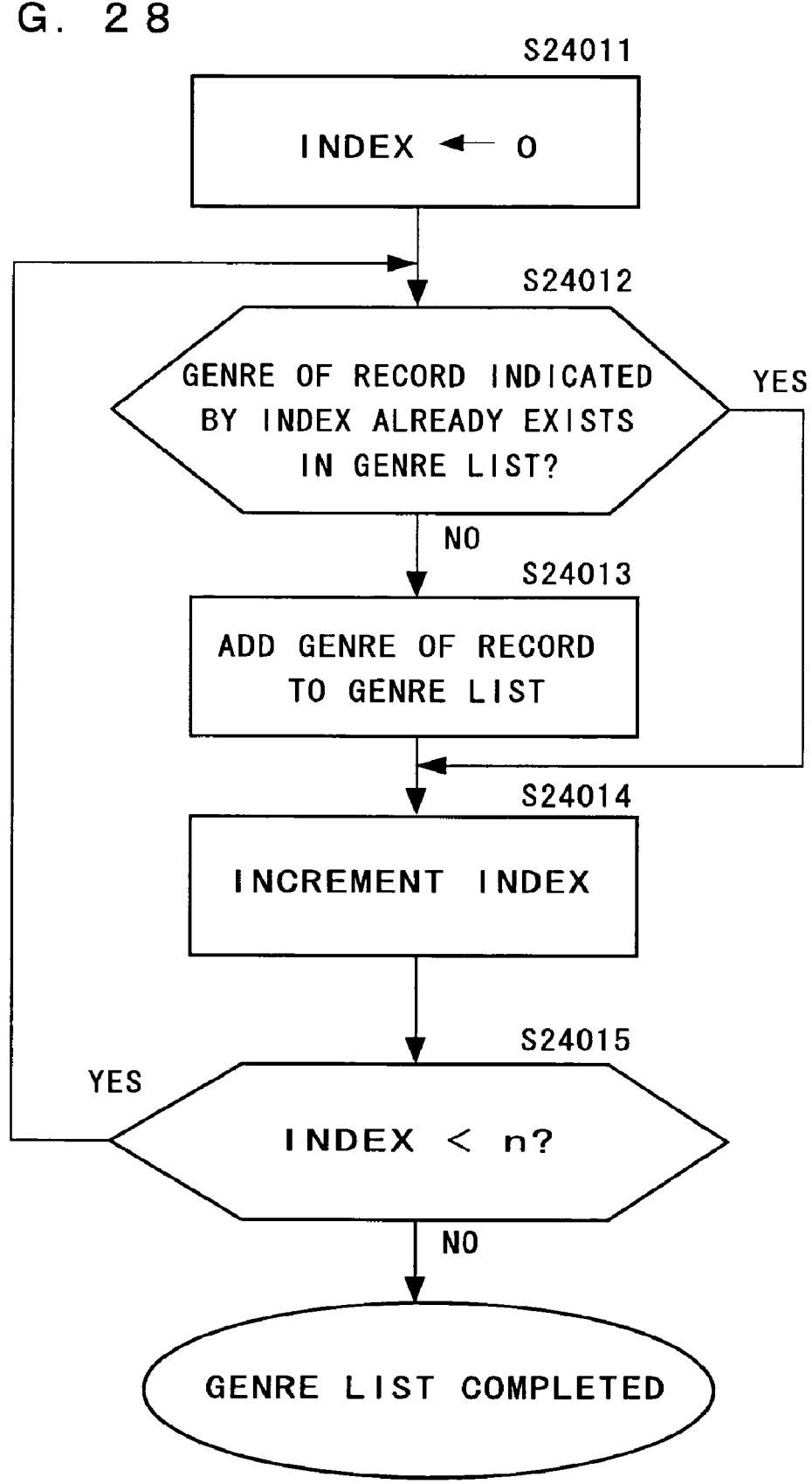
FIG. 28 is a flowchart for use in illustration of the operation of producing a genre list by the server in FIG. 25.

If a genre list is produced using the content information database, as shown in FIG. 28, the content server initializes the index representing the record number to zero (S24011).

Then, the content server determines whether or not the genre of the record indicated by the index already exists in the genre list (S24012). If there is no such genre, the content server adds the genre of the record to the genre list (S24013) and then increases the index (S24014). Meanwhile, if there is the genre in the list, the content server skips step S24013 and directly increases the index (S24014).

The content server then determines whether or not the record number indicated by the index is smaller than the number n of all the records (S24015). If the number is smaller, the process returns to step S24012, and otherwise the genre list is complete.

By the above processing, the content server picks up the genres of all the music pieces stored in the content information database without duplication and produces a genre list. In this way, the genre list is not formed into a database in advance and temporarily produced every time the audio client requests for one, so that a memory region to constantly store the genre lists is not necessary.

Referring back to FIG. 25, the genre list thus produced is transmitted from the content server to the audio client (S2401, S1422). The user selects a desired genre (pops in this example) in the genre list. The audio client requests the content server to provide a music list in the genre selected in response to the user's operation (S1423). The content server returns the music list in the genre selected in response to the request from the audio client to the audio client (S2402). The audio client receives the music list from the content server and stores the list in the memory 32 in FIG. 29 (S1424).

Figure 30:
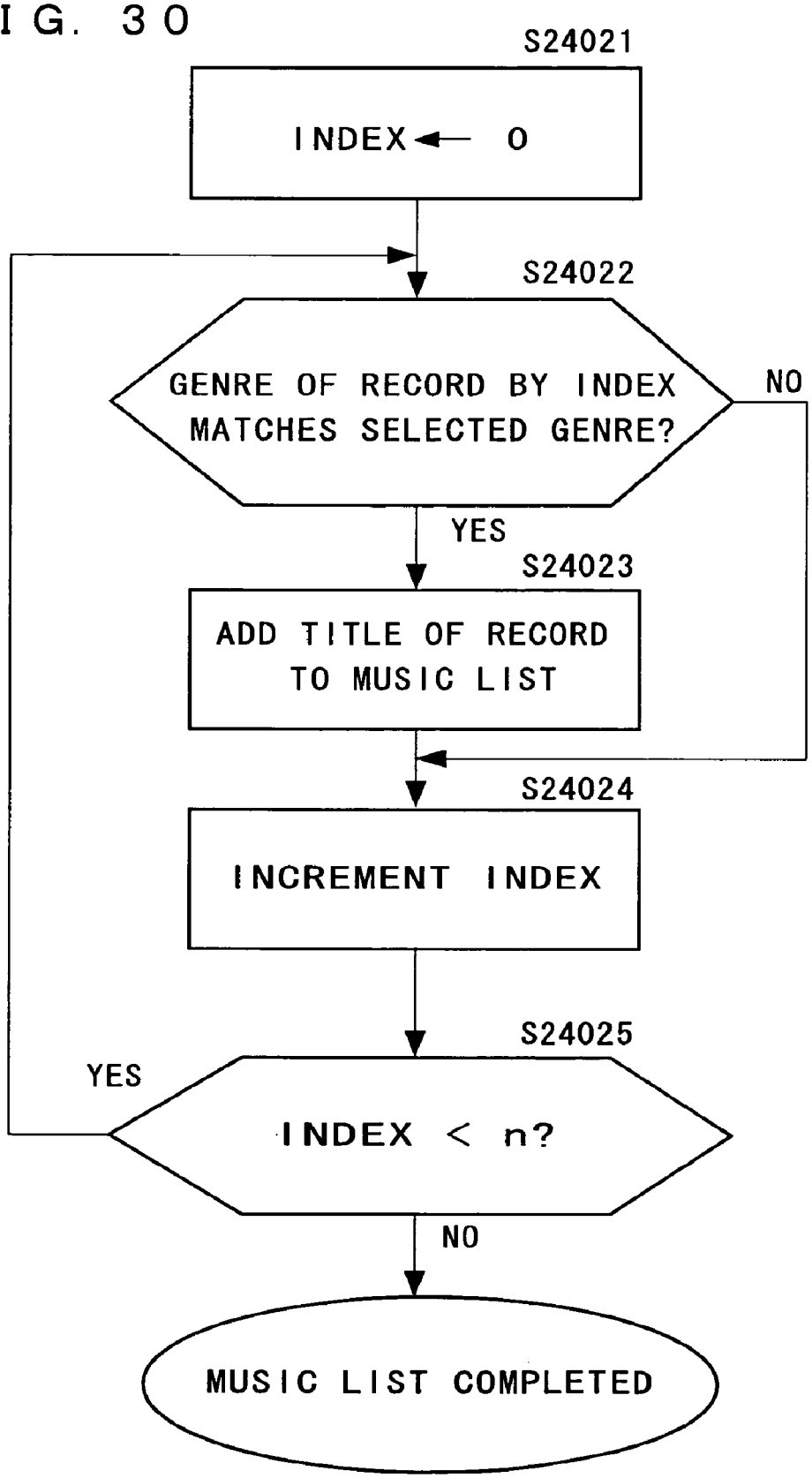
FIG. 30 is a flowchart for use in illustration of the operation of producing a music list by the server in FIG. 25.

Similarly to the genre list described above, the music list is not prepared in advance in the content server but is produced based on the content information database shown in FIG. 27. More specifically, the content server produces a music list every time the audio client requests for one. Now, the method of producing the music list will be described in conjunction with FIG. 30.

The content server initializes the index indicating the record number in the content information database shown in FIG. 27 to zero (S24021).

The content server then compares the genre of the record indicated by the index to the selected genre (pops in this example) and determines whether or not they match (S24022). If they match, the content server adds the title, the artist's name, the album title and the like in the record to the music list (S24023) and then increases the index (S24024). Meanwhile, if they do not match, the content server skips step S24023 and directly increases the index (S24024).

The content server then determines whether or not the record number indicated by the index is smaller than the number n of all the records (S24025). If the number is smaller than n, the process returns to step S24022, and otherwise the music list is complete.

By the above processing, the content server picks up music pieces only in the selected genre from the content information database and produces a music list. In this way, the music list is not included in a database in advance but is temporarily produced every time the audio client requests for one, so that a memory region to constantly store the music lists is not necessary.

Note that when a music list is produced, music pieces in irreproducible data formats may be omitted rather than picking up all the corresponding music pieces. Alternatively, rather than producing a music list in response to every request from the audio client, music lists may be cached once they are produced. In this case, a memory region to store the music lists is necessary, but a music list can immediately be returned in response to a request from the audio client.

Similarly to the genre list described above, the entire music list is not sent at a time but is transmitted gradually piece by piece. More specifically, the steps of requesting a music list (S1423, S1425), returning the music list (S2402, S2403), and receiving the music list (S1424, S1426) are repeated. Now, the operation will be described in detail.

Figures 29, 31:
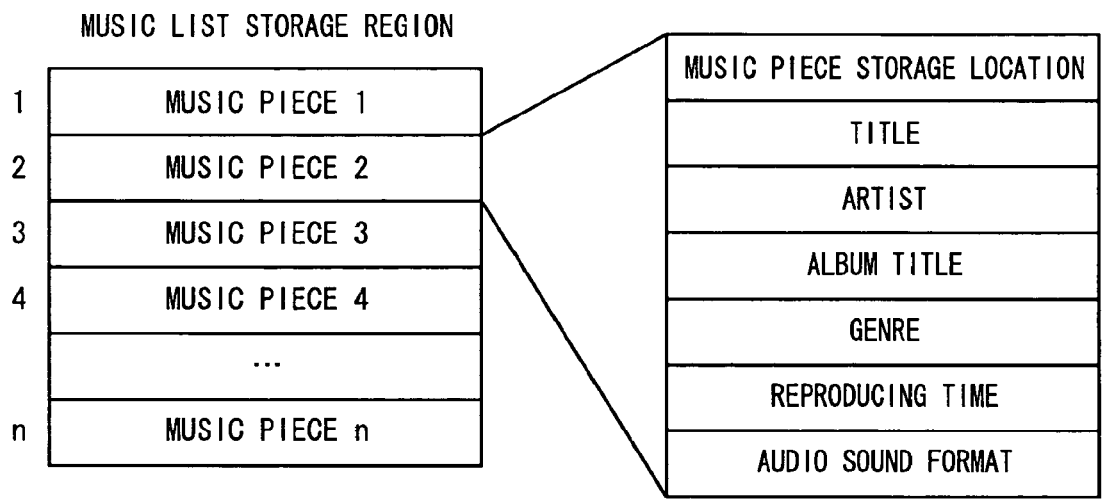
FIG. 29 shows a region that stores the music list obtained in FIG. 25.
FIG. 31 shows the format of a list request command in FIG. 25.

The audio client transmits a list request command as shown in FIG. 31 to the content server (S1423). The list request command is a command to request the content server to provide a list and includes an obtaining start index, an obtaining number, and a list construction key. The obtaining start index is an index to indicate the first music piece to be obtained by the audio client among the music pieces included in the selected genre list. The obtaining number is the number of music pieces to be obtained by the audio client. The list construction key that will be described includes the kind of a filter indicating a category of interest when music pieces are extracted from the content information database, and a specific keyword classified into the category. Although not specified, in this example, the obtaining start index=0, the obtaining number=50, and the list construction key is set as "genre (kind of filter)=pops (keyword)."

The content server responds to the list request command and returns search result data as shown in FIG. 32 to the audio client (S2402). The search result data includes part of the music list, an effective number, and the remaining number. The effective number is the number of music pieces actually returned by the content server to the audio client. The remaining number is the number of music pieces remaining after the music list is returned to the audio client. In this example, in response to the list request command in which the obtaining start index=0, and the obtaining number=50, the content server returns the first to the 50-th music pieces in the produced music list to the audio client (S2402). Assuming that the number of all the music pieces in the music list is 110, then the effective number=50, and the remaining number=60 (=110−50).

Since there are the music list for still 60 music pieces remaining in the content server, the audio client again transmits a list request command to the content server (S1425). This time, the obtaining start index=51, and the obtaining number=50.

The content server responds to the list request command and again returns search result data to the audio client (S2403). Here, the effective number=50, and the remaining number=10 (=110−(50+50)). More specifically, the content server again returns a music list for 50 music pieces to the audio client (S2403). The audio client receives the music list and stores the list in the memory 32 (S1426).

Note that in the above example, since the number of all the music pieces in the music list=110, and the obtaining number=50, the 50 music pieces forming part of the music list are returned. Meanwhile, when the number of all the music pieces in the music list is smaller than the obtaining number, for example when the number of all the music pieces in the music list=40, and the obtaining number=50, all the music pieces in the music list, i.e., 40 pieces are returned.

In the above example, the obtaining start index=0, and therefore the music pieces are returned starting from the first piece in the list, while if for example the obtaining start index=10, the music pieces are returned from the 11th piece in the music list. In this case, the number of all the music pieces in the music list=110, and in the first list request command, the obtaining starting index=10, and the obtaining number=50. The content server returns search result data in which the effective number=50 and the remaining number=50 (=110−10−50).

If the number of music pieces that can be stored in the memory 32 is larger than the number of all the music pieces in the list, the audio client can store the entire music list. However, the capacity of the memory 32 is considerably smaller than that of the content server, and therefore the audio client can usually store only a part of the music list in the memory 32.

According to the above embodiment, the audio client downloads the music list in divided forms from the content server. Therefore, when a region for storing at least 50 music pieces is secured in the memory 32 in the audio client, the music list for all the 110 pieces can be downloaded. Therefore, the capacity of the memory 32 may be small.

For example as shown in FIG. 33A, if the audio client stores the music list for 50 pieces in the memory 32, and then the user desires to obtain the 51st music piece and on, the audio client moves the last half of the music list to the first half of the memory 32 as shown in FIG. 33B. Then, as shown in FIG. 33C, the audio client stores a music list for 25 music pieces from the 51st in the last half of the memory 32.

The audio client repeats the above operation and receives the entire music list or receives only the music pieces as many as the number that can be stored in the memory 32.

Figure 25:
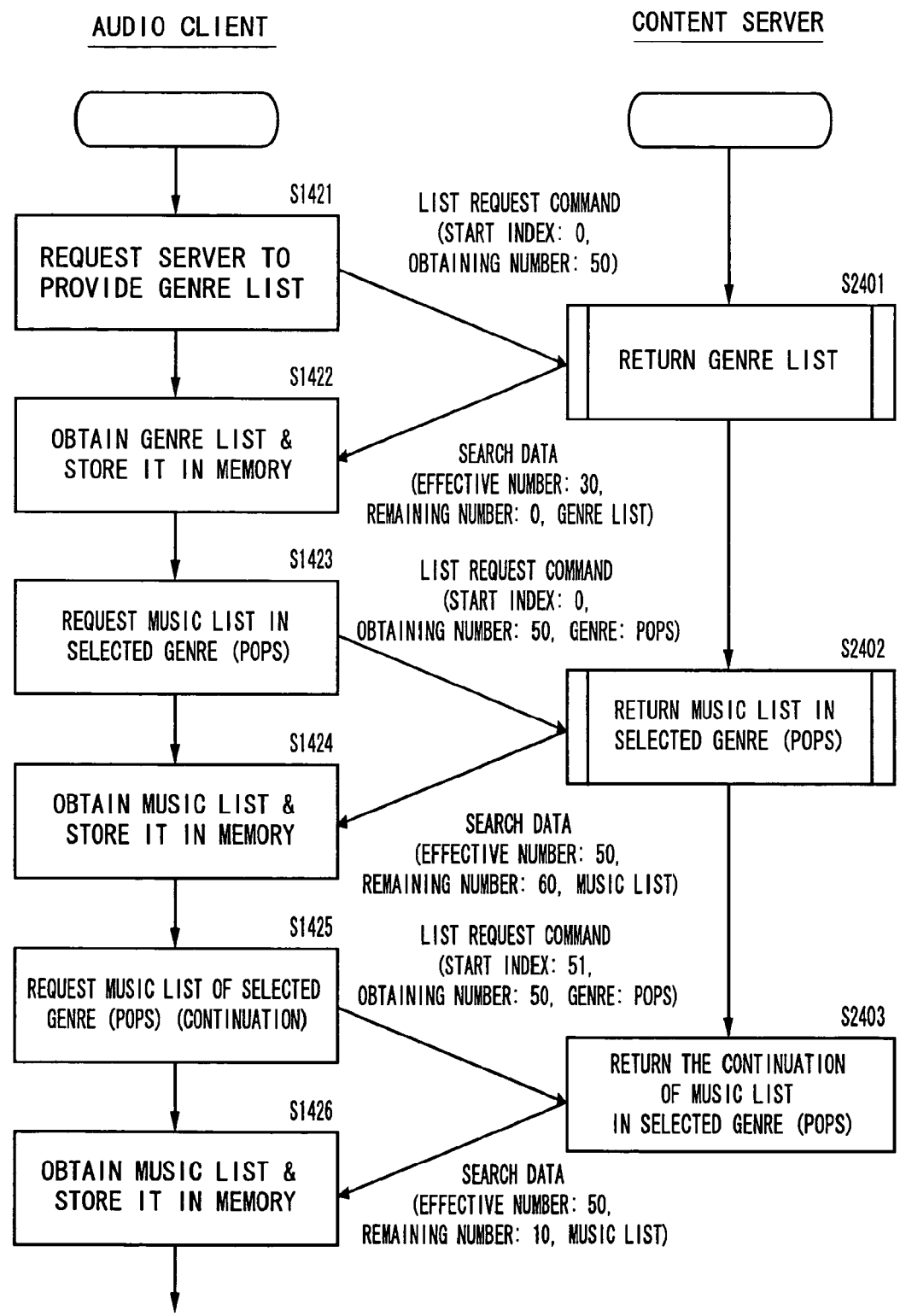
FIG. 25 is a flowchart for use in illustration of the operation of obtaining a genre list and a music list in FIG. 24.
Figure 34:
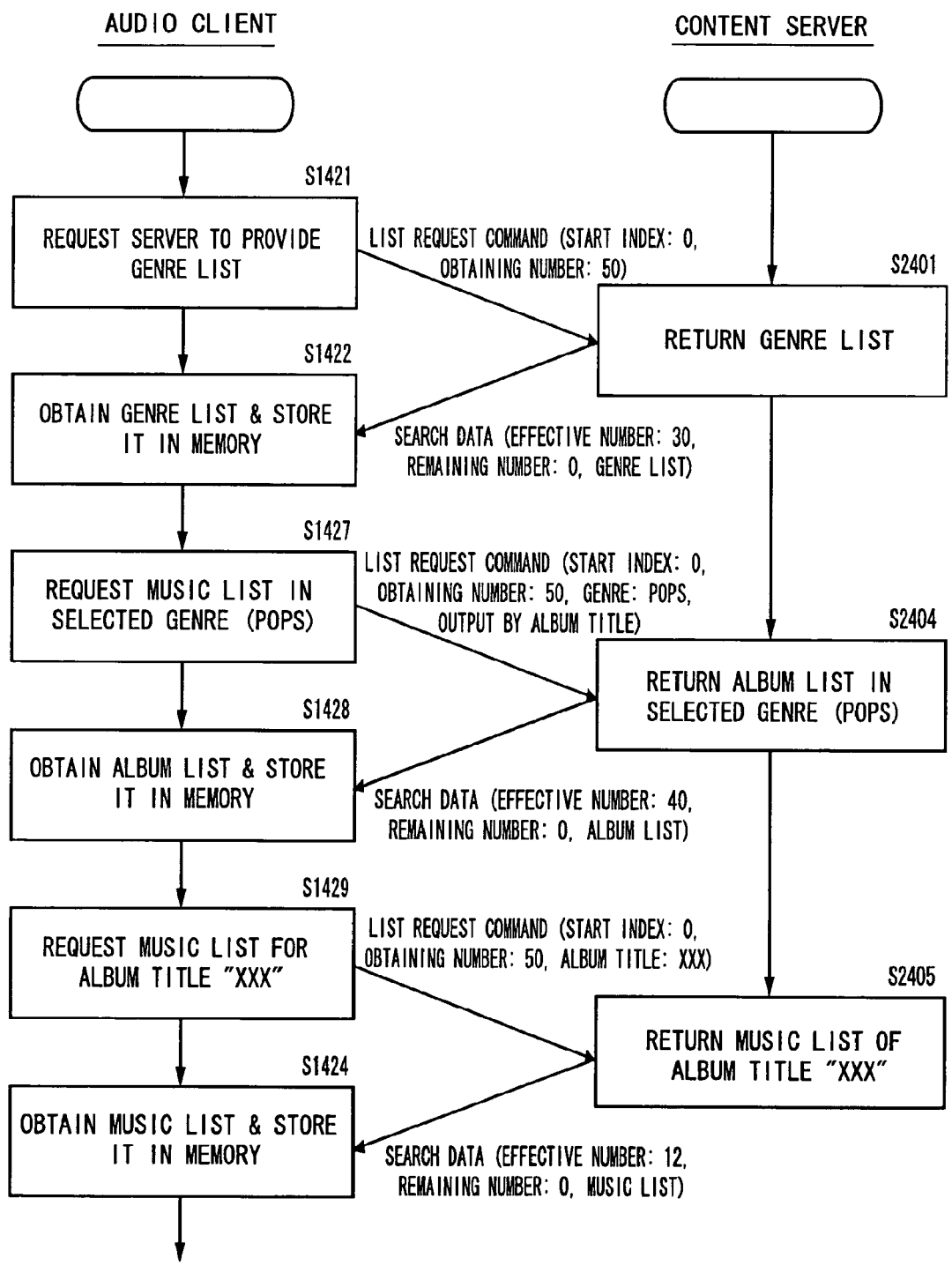
FIG. 34 is a flowchart for use in illustration of the operation of obtaining a genre list and a music list as well as the operation of obtaining an album list in FIG. 25.

In the example shown in FIG. 25, a genre is selected, and then a music piece in the genre is immediately selected. Meanwhile, as shown in FIG. 34, a genre may be selected, then an album in the genre may be selected, and then a music piece may be selected from the album.

In this case, the audio client requests the content server to provide an album list in the genre selected in response to the user's operation (S1427). The content server returns the album list in the genre selected in response to the request from the audio client to the audio client (S2404). The audio client receives the album list from the content server and stores the list in the memory 32 (S1428).

The audio client then requests the content server to provide a music list for an album selected in response to the user's operation (S1429). The content server returns the music list for the album selected in response to the request from the audio client to the audio client (S2405).

1. 2. 2. 2. 2 Specifying Music Piece

Figure 35:
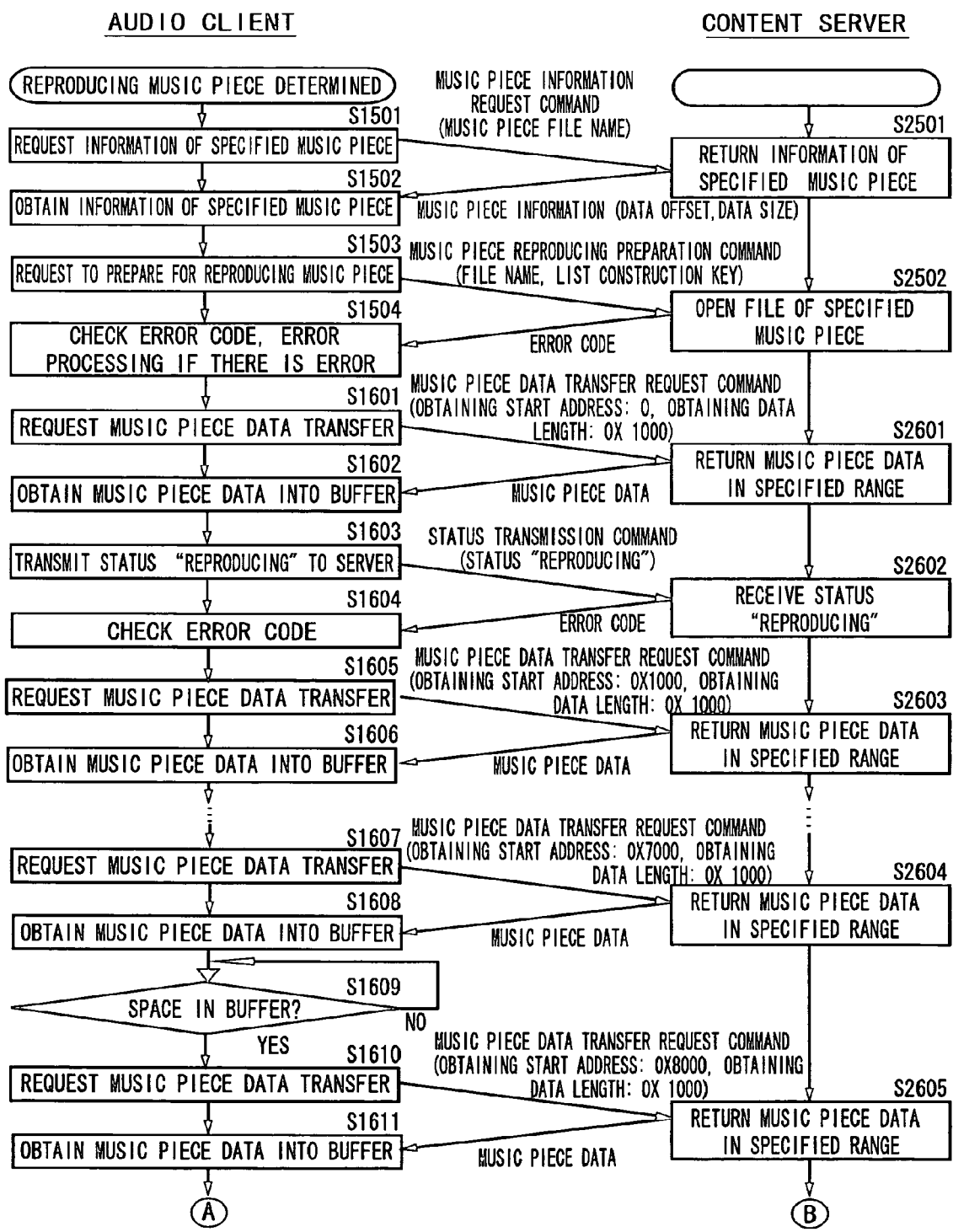
FIG. 35 is a flowchart for use in illustration of the operation of specifying a music piece, reproducing, and stopping by an audio client as well as the operation of preparing for music piece distribution and distributing by a server in FIG. 23.
Figure 36:
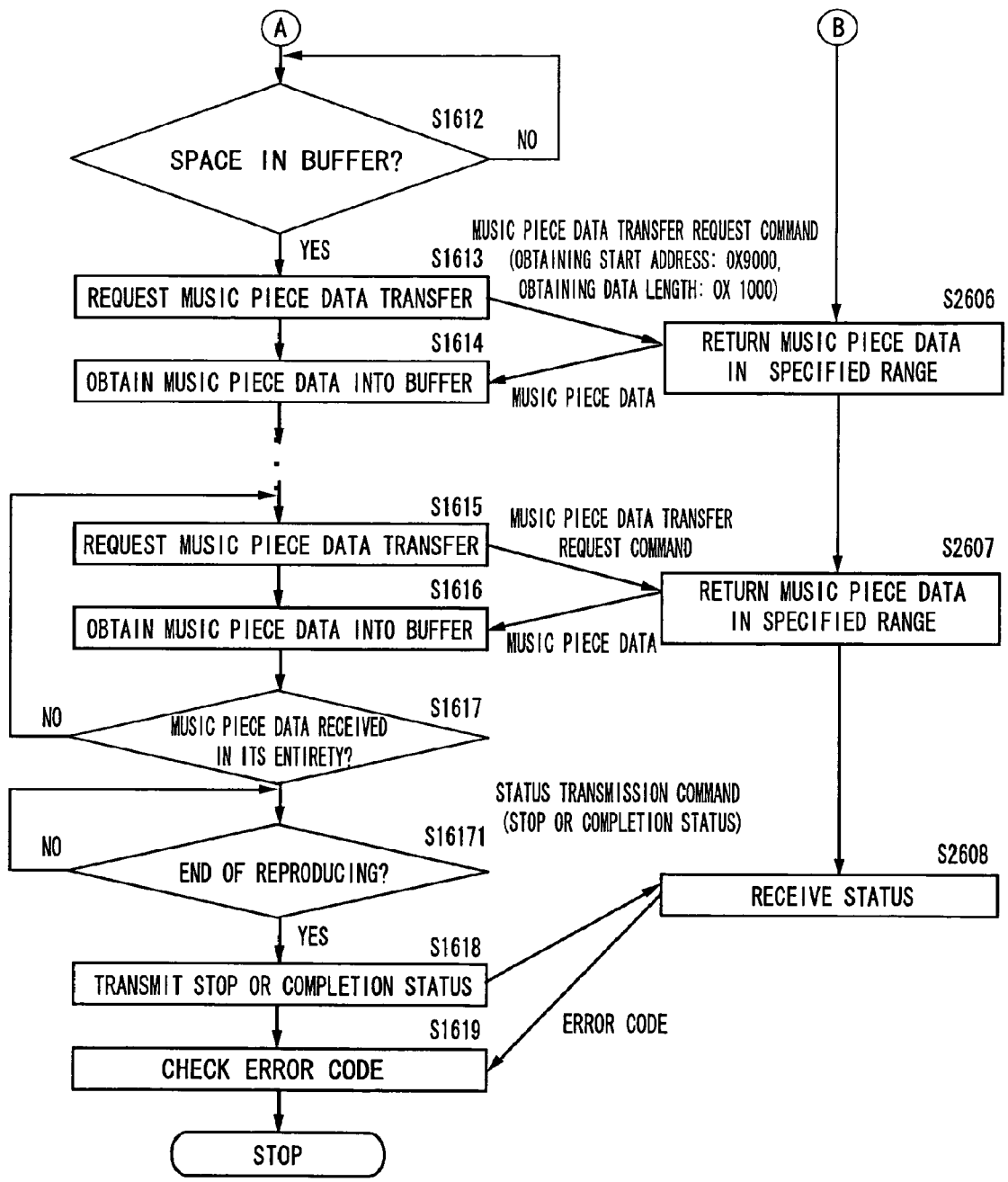
FIG. 36 is a flowchart continued from FIG. 35.

Referring to FIGS. 35 and 36, the audio client requests the content server to provide information on a specified music piece (S1501), the content server returns information on the specified music piece in response to the request to the audio client (S2501), and the audio client receives the information (S1502).

More specifically, the audio client transmits a music piece information request command as shown in FIG. 37 (S1501). The music piece information request command includes the file name of the specified music piece. The content server responds to the music piece information request command and returns music piece information as shown in FIG. 38 (S2501). The music piece information includes the data offset and data size of the specified music piece. Music data for example in the form of MP3 generally has header information preceding the content information. The data offset is used to skip the header information and specifies the start address of the music piece. The content server analyzes the offset, so that the audio client does not have to analyze the offset. The content server generally has greater processing capability than the audio client does, and therefore the system as a whole can be increased in the processing speed. The data size is used to check the ending time of the music piece.

The audio client then requests the content server to prepare for reproducing the specified music piece (S1503). The content server responds to the request to open the file of the specified music piece and returns the result to the audio client (S2502), and the audio client receives the result (S1504).

More specifically, the audio client transmits a music piece reproducing preparation command as shown in FIG. 39 (S1503). The music piece reproducing preparation command includes the file name of the specified music piece and the list construction key that will be described. The content server responds to the music piece reproducing preparation command to open the file and returns an error code as shown in FIG. 40 (S2502). As for the error code, an error is present if for example a corresponding file does not exist and file transfer cannot be prepared, while an error is not present if such preparation can be carried out. If there is an error, prescribed error processing is carried out (S1504).

1. 2. 2. 2. 3. Reproducing Music Piece

Then, the audio client requests the content server to transfer music data in a specified range in the music data of the specified music piece (S1601), and the content server responds to the request to return the music data in the specified range to the audio client (S2601). The audio client receives and stores the music data in the memory 32 (S1602).

More specifically, the audio client transmits a music piece data transfer request command as shown in FIG. 41 (S1601). The music piece data transfer request command includes the obtaining start address and the obtaining data length of the music data to be transferred. As shown in FIG. 42, the content server returns the music data for the obtaining data length from the start address specified by the obtaining start address (S2601). The size of data to be transmitted at a time is preferably in the range from 1 Kbytes to 32 Kbytes though not specified, more preferably 4 Kbytes to 16 Kbytes. The content server can reduce the load more as the data volume is smaller. The audio client can process the data more quickly as the data volume to receive at a time is larger. Meanwhile, the range of 1 Kbytes to 32 Kbytes (especially from 4 Kbytes to 16 Kbytes) is the optimum range for both the content server and the audio client. The data size is previously set on the audio client side.

The obtaining start address is sequentially increased by the obtained data length that has been transferred and the operation is repeated (S1605, S2603, S1606, S1607, S2604, S1608), so that the music data can sequentially be transferred by each specified range.

In this way, the audio client can obtain music data in a specified range from the content server, so that a music piece can be reproduced from midway, or the music piece can be reproduced in a flexible manner including fast forward reproducing, fast reverse reproducing, and slow reproducing in response to the user's operation.

Figure 43:
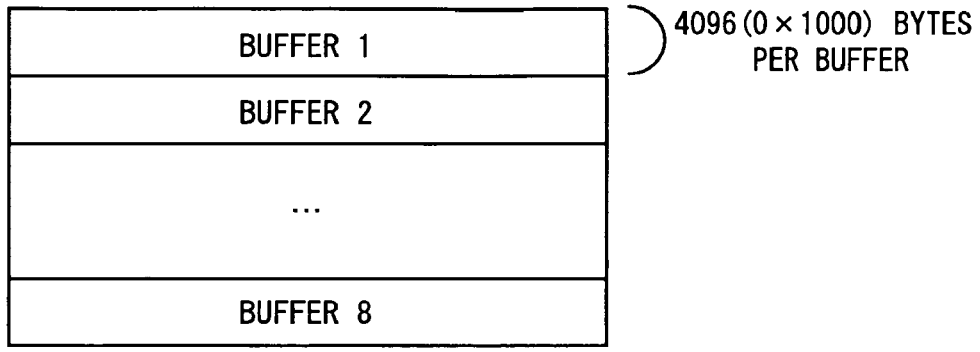
FIG. 43 shows the structure of a buffer memory for storing the music piece data in FIG. 42.
Figure 44:
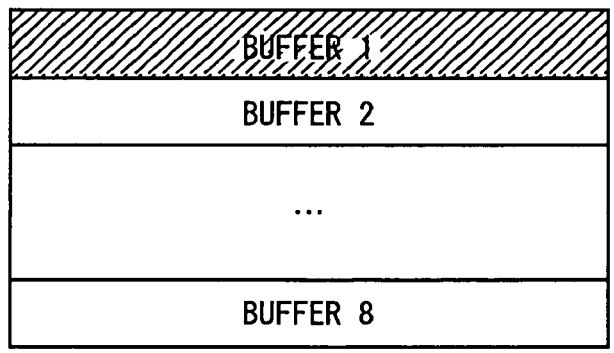
FIG. 44 shows the state of how music piece data for one buffer is stored from the start of the music piece in the buffer memory in FIG. 43.
Figure 45:
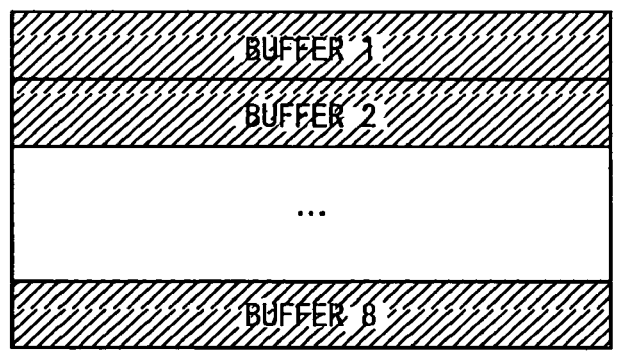
FIG. 45 shows the state of how music data for all the buffers are stored as continued from FIG. 44.

The memory 32 includes a plurality of buffers (eight buffers in the example shown in FIG. 43). As shown in FIG. 44, the audio client obtains music data for one buffer from the start of a music piece using a music piece data transfer request command and stores the data. As shown in FIG. 45, the audio client continues to obtain and store music data in the same manner until all the buffers are filled with data.

Figure 46:
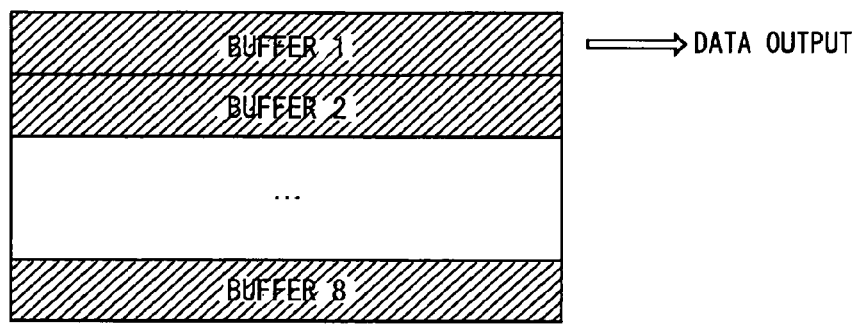
FIG. 46 shows the state of how the first buffer outputs music piece data as continued from FIG. 45.

Once all the buffers are filled with data as described above during the process from steps S1601 to S1608, the audio client starts to output music data to a sound processing portion 34 from the first buffer as shown in FIG. 46.

When the audio client starts to output music data as described above and reproduces the music, the audio client transmits a reproducing status to the content server (S1603). The content server receives the status and returns an error code to the audio client (S2602). The audio client checks the error code and carries out prescribed error processing if there is an error (S1604).

Figure 47:
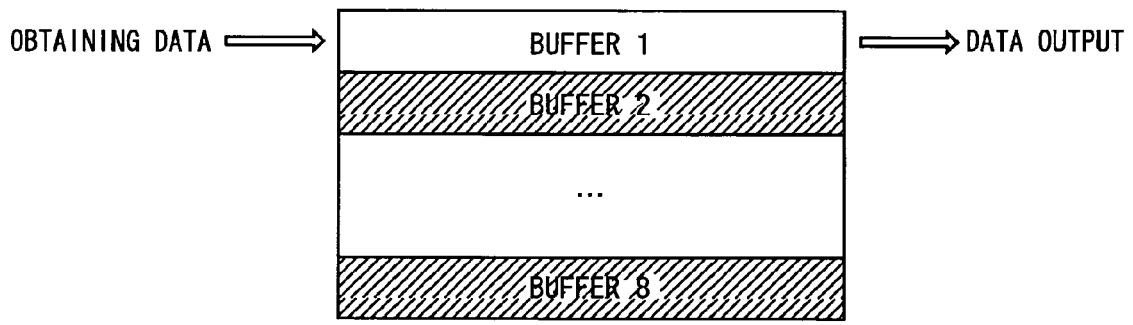
FIG. 47 shows the state of how a space for one buffer is generated as continued from FIG. 46.
Figure 48:
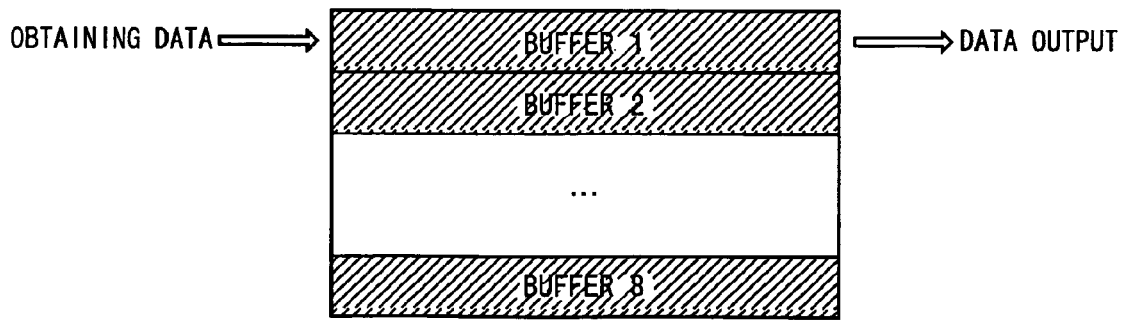
FIG. 48 shows the state of how the space in the buffer is filled as continued from FIG. 47.

As described above, when music is reproduced while the music data thereof is being transferred, an empty space is created for one buffer with time as shown in FIG. 47. The presence of the empty buffer (S1609) causes the audio client and the content server to again carry out the above described transfer operation (S1610, S2605, S1611). As a result, as shown in FIG. 48, the empty buffer is filled. The audio client and content server repeat the transfer operation every time there is an empty buffer (S1612 to S1616, S2606, S2607).

Note that in the above example, music data starts to be output after all the buffers are filed with music data, but the data may start to be output before all the buffers are filled.

The audio client then determines whether or not the entire music data of the specified music piece has been received based on the size of the data obtained in step S1502 (S1617). If the entire data has been received, the audio client determines whether or not the specified music piece has been reproduced to the end based on the received music data (S1671). If the music piece has been reproduced to the end, the audio client transmits a stop or completion status to the content server (S1618). When the user operates the audio client to reproduce a specified music piece and the audio client finishes reproducing the piece or when the user operates the audio client to stop reproducing the music piece midway, the audio client transmits a stop status. Meanwhile, when the user operates the controller, and the audio client reproduces a music piece specified by the controller to the end in response, the audio client transmits a completion status. The reason why there are the stop status and completion status will be described later.

The content server receives any of these statuses and returns an error code to the audio client (S2608). The audio client checks the error code and carries out prescribed error processing if there is an error (S1619).

As described above, music data is divided and intermittently transferred from the content server to the audio client, music can correctly be reproduced with a smaller buffer capacity.

In the above example, music data is transferred on a byte basis, but MP3 music data is preferably transferred on a frame basis. This is because the frame-based transfer is advantageous in terms of time display and special reproducing such as fast forward or fast reverse reproducing (that will be described). Therefore, the audio client requests music data in the MP3 form on a frame-basis. In response to the request, the content server searches for the frame header of MP3 in the specified file and transfers the frame from its start. Since the header includes a parameter for calculating the data length, it is not difficult to find the starts of the following frames once the header is found.

1. 2. 2. 3. Special Reproducing

The audio client carries out the following processing before a series of processing steps including transfer request for music data and returning and obtaining the data so that the special reproducing such as fast forward reproducing, fast reverse reproducing, pause, and slow reproducing can be carried out.

1. 2. 2. 3. 1. Fast Forward Reproducing

Figure 49:
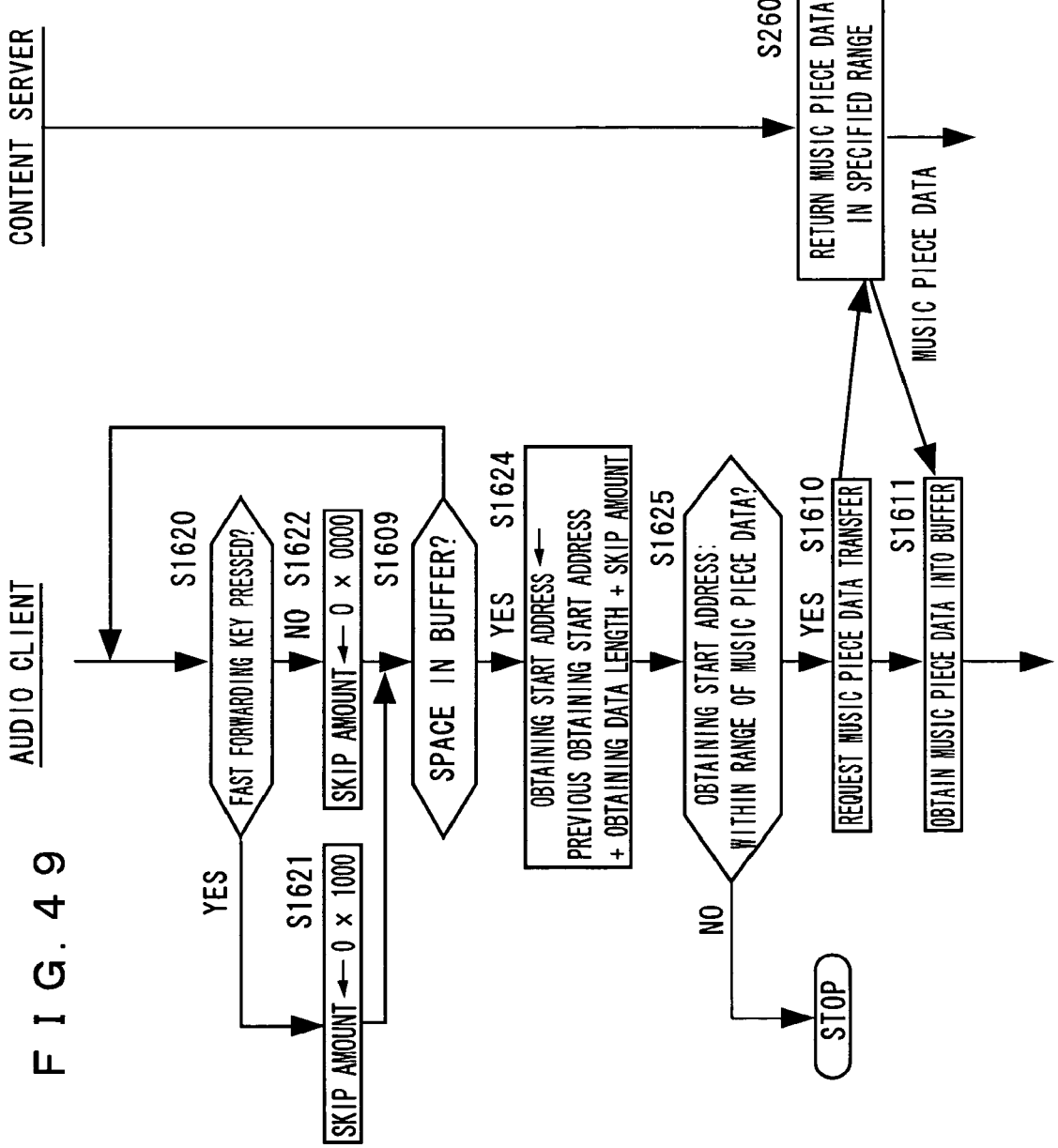
FIG. 49 is a flowchart for use in illustration of fast forward reproducing by the client and server in FIGS. 1 to 3.

Referring to FIG. 49, in fast forward reproducing, the audio client monitors for a key input (S1620) and sets a skip amount to a value greater than zero in response to the pressing of the fast forward reproducing key (S1621) and otherwise sets the skip amount to zero (S1622).

When there is an empty buffer (S1609), the audio client calculates the obtaining start address of music data according to the following expression (S1624).

Obtaining start address=previous obtaining start address+obtaining data length+skip amount If the fast forward reproducing key is not pressed in step S1620, the skip amount is set to zero in step S1622, and therefore the obtaining start address increases by the obtaining data length. In this case, the audio client continuously obtains music data, normal reproducing is carried out. Meanwhile, the fast forward reproducing key is pressed in step S1620, the skip amount is set to a value greater than zero in step S1621, and therefore the audio client skips music data for the skip amount and obtains the data. In this way, the audio client carries out fast forward reproducing. In this example, when the skip amount is set to the value equal to the obtaining data length, double-speed fast forward reproducing is carried out. If the skip amount is twice as large as the obtaining data length, triple-speed fast forward reproducing is carried out.

1. 2. 2. 3. 2 Fast Reverse Reproducing

In fast reverse reproducing, the audio client determines whether or not the fast reverse reproducing key has been pressed in place of step S1620 described above and sets the skip amount to a value which is smaller than zero and whose absolute value is greater than the previous obtaining data length in place of step S1621 described above. This is because if the absolute value of the skip amount is smaller than the previous obtaining data length, the obtaining range of music data overlaps. If the obtaining data length is the same each time, and the absolute value is set to be twice as large as the obtaining data length, reverse reproducing can be carried out at normal reproducing speed.

The audio client determines whether or not the obtaining start address calculated in step S1624 is within the range of the music data (S1625). If the address is within the range, the audio client proceeds to the next step S1610, while otherwise the audio client stops reproducing. For normal reproducing, the end of the music data is detected, and therefore such ending condition is not necessary. However, for the fast reverse reproducing in particular, the start of the music data must be detected, and the ending condition must be satisfied. Note however that rather than providing the ending condition, the file of the next music piece may be opened for fast forward reproducing or the file of the previous music piece may be opened for fast reverse reproducing.

Note that for MP3 music data, once the frame header is read, the header of the next frame can be located virtually without fail as described above. Therefore, a certain number of frames may be skipped, then data for the following several frames may be reproduced, and then several frames may be skipped again. The process may be repeated, so that fast forward reproducing can be carried out.

1. 2. 2. 3. 3. Pause

Figure 50:
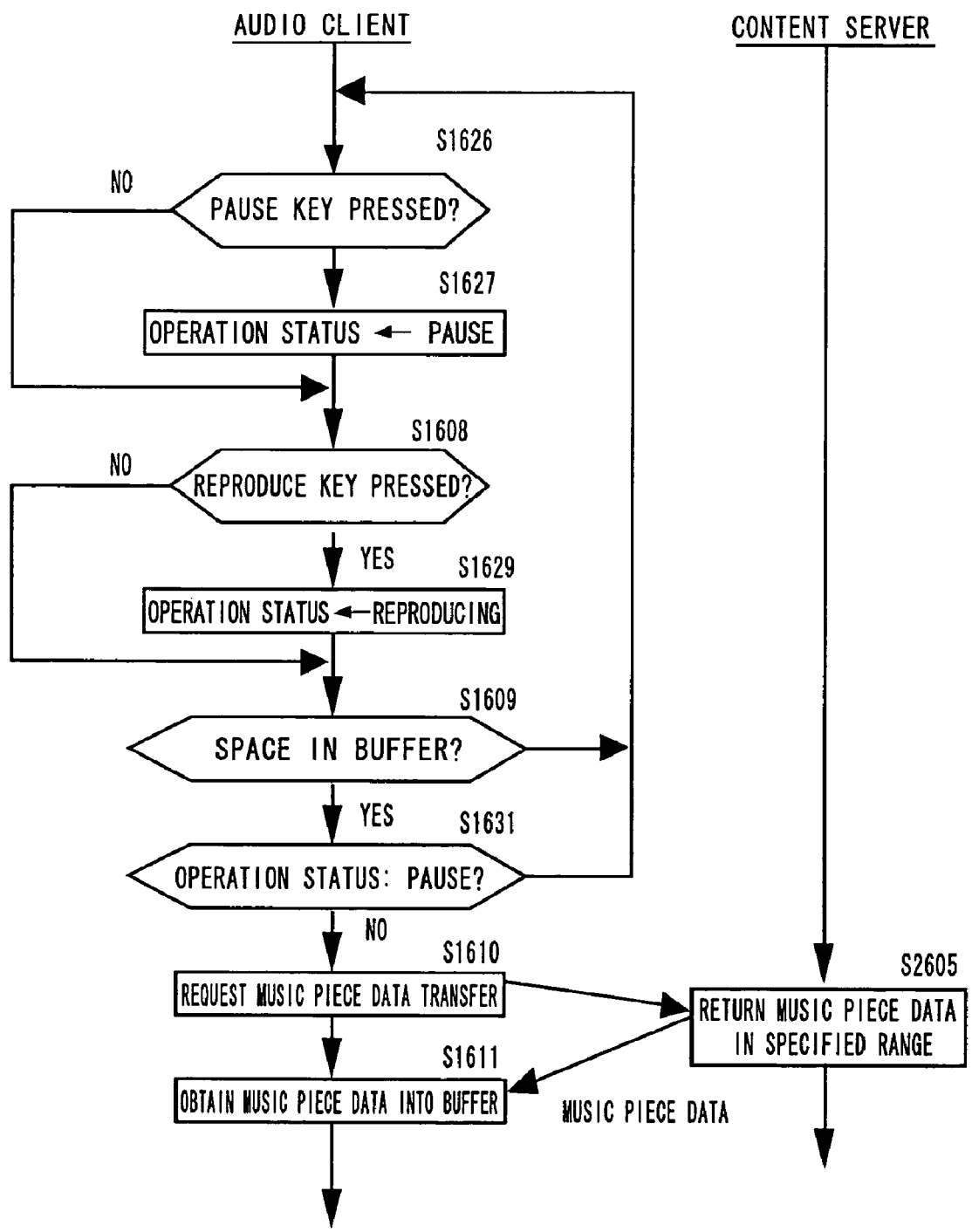
FIG. 50 is a flowchart for use in illustration of pause operation by the client and server in FIGS. 1 to 3.

Referring to FIG. 50, as for pause, the audio client monitors for a key input (S1626, S1628) and sets to the operation status to pause in response to the pressing of the pause key (S1627), while the audio client sets the operation status to reproducing in response to the pressing of the reproducing key (S1629).

When there is an empty buffer (S1609), the audio client determines whether or not the operation status is set to pause (S1631). If the status is set to the pause, the audio client returns to step S1626 and does not start to transfer the next music data. Meanwhile, if the status is not set to the pause, in other words, if the reproducing key has been pressed so that the pause is off, and the operation status has changed to reproducing, the audio client proceeds to step for request and the next music data starts to be transferred.

If the operation status is set to the pause, the audio client stops reading from the buffer. This is because the previously transferred music data still remains in the buffer.

1. 2. 2. 3. 4. Slow Reproducing

For motion pictures instead of music, slow reproducing may be necessary. Motion picture files are normally in a compressed form such as MPEG-2, and therefore the audio client includes a decoder to reproduce such data. For the slow reproducing, in response to a command to cause the decoder to carry out slow reproducing, video data stored in the buffers reduces at lower speed. For slow reproducing at 30% of the normal reproducing speed, the amount of video data read out from the buffer by the decoder per unit time is 30% as well. Therefore, the audio client waits for an empty buffer to be generated for a longer period in step S1609, so that slow reproducing can be carried out.

1. 2. 3. Operation of Controller
1. 2. 3. 1. Connection with Content Server

The controller Ak establishes connection with the content server Si substantially in the same manner as the audio client Cj.

Figure 51:
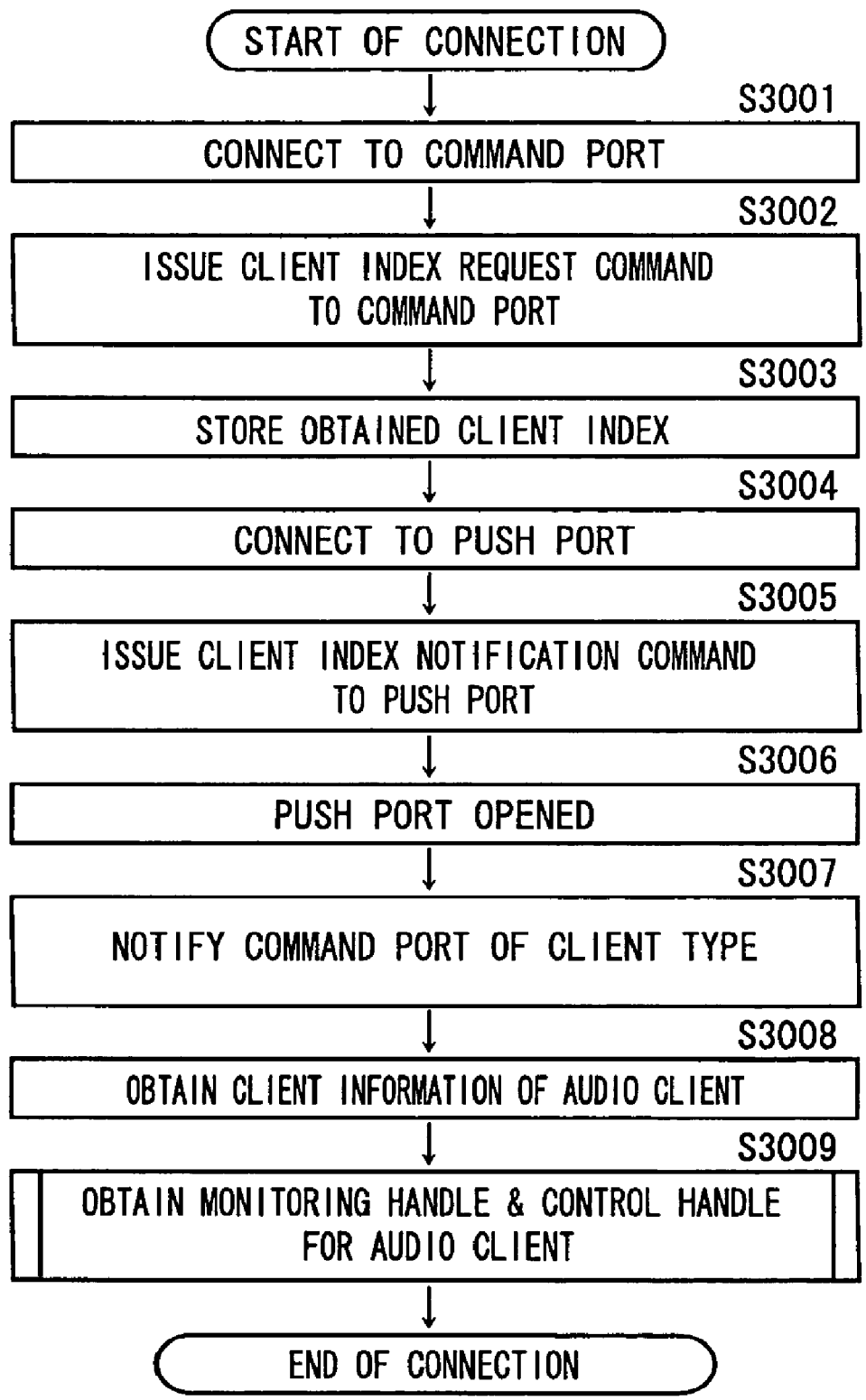
FIG. 51 is a flowchart for use in illustration of connection operation by the controller and server in FIG. 1.

Referring to FIG. 51, once the controller Ak is turned on, the controller Ak connects to the command port of the content server Si (S3001). The controller Ak issues a client index request command through the command port (S3002). The content server Si responds to the command to return a client index to the controller Ak, and the controller Ak stores the obtained client index (S3003).

Then, the controller Ak connects to the push port of the content server Si (S3004). The controller Ak issues a client index notification command through the push port and transmits the client index stored in step S3003 to the content server (S3005). In this way, the push port is made open (S3006).

The controller Ak then notifies the content server Si about the client type through the command port (S3007). Here, unlike the audio client Cj described above, the controller Ak notifies about the client type of itself, i.e., its being a controller. The content server Si can distinguish the audio client Cj from the controller Ak based on the client type.

The controller Ak then obtains the client information of the audio client Cj from the content server Si (S3008) and displays the status and the like included in the information on the monitor.

The controller Ak requests for the monitoring handle and control handle of the audio client Cj connected to the content server Si based on the client type and the obtained client index and obtains the handles (S3009).

The above connection process is different from that of the audio client Cj in that the controller Ak notifies the content server Si of its own client type, in other words, its being a controller. Another difference is that the controller Ak obtains the monitoring handle and/or the control handle, which will be detailed.

1. 2. 3. 1. 1. Obtaining Monitoring Handle and Control Handle

Referring to FIG. 52, the controller Ak displays the list of all the audio clients Cj connected to the content server Si (S30091). The controller Ak selects an audio client Cj to be monitored in the list in response to the user's operation (S30092). The audio client Cj to be monitored in response to the user's operation is selected only when the network type audio system is activated for the first time. For the second time and on, it is preferable that the audio client Cj selected first that is registered is automatically selected.

The controller Ak then transmits the client index of the selected audio client Cj to the content server Si and requests for its monitoring handle (S30093). The content server Si stores the client index of the source controller Ak and the received client index of the audio client Cj in association with each other (S20001) and issues a monitoring handle to the source controller Ak (S20002). In this way, the controller Ak obtains the monitoring handle of the selected audio client Cj (S30094).

The controller Ak then responds to the user's operation to select the audio client Cj to be controlled in the list (S30095). The controller Ak then transmits the client index of the selected audio client Cj to the content server Si and requests for its control handle (S30096). The content server Si stores the client index of the source controller Ak and the received client index of the audio client Cj in association with each other (S20003) and issues the control handle to the source controller Ak (S20004). In this way, the controller Ak obtains the control handle for the selected audio client Cj (S30097).

The monitoring handle represents the authority provided from the content server Si to the controller Ak to monitor the audio client Cj. In this way, when the status of the audio client Cj changes, the new status after the change is notified to the content server Si. The content server Si transmits the client information of the audio client Cj to the controller Ak from time to time through the push port, and the controller Ak responds to the information to update the client information of the audio client Cj.

In this network type audio system, the larger the number of audio clients Cj is, the greater the load is upon the LAN 12.

The transmission of commands from the controller Ak, the status of the audio client Cj and the like affects the traffic on the LAN 12.

As shown in FIG. 53, when there are a number of controllers A1 to A3 on the same LAN 12, the content server Si can transmit all the client information on the audio clients C1 to C3 to all the controllers A1 to A3, but this could increase the network traffic and the load imposed upon the content server.

Therefore, as shown in FIG. 54, the controller A1 obtains the monitoring handle only for the audio client C1, and the controller A2 obtains the monitoring handle only for the audio client C2, so that the content server Si transmits the client information of the audio client C1 only to the controller A1 and the client information of the audio client C2 only to the controller A2.

The content server Si transmits the client information only to the controller Ak that has the monitoring handle for the audio client Cj, and therefore the network traffic and the load upon the content server can be reduced. Meanwhile, the controller A3 may obtain the monitoring handles for all the clients C1 to C3, so that the content server Si may transmit the client information to all the controllers A1 to A3.

Meanwhile, the control handle represents the authority provided by the content server Si to the controller Ak to control the audio client Cj.

In the network type audio system, if there are a number of controllers Ak, and any of the controllers Ak can control an audio client Cj, in the process of reproducing a music piece by an audio client Cj in response to a command from a controller Ak, another controller Ak may instruct the same audio client Cj to stop reproducing or reproduce another music piece.

Therefore, in this system, only the controller Ak that has the control handle for an audio client Cj can control the audio client Cj. Any controller Ak without the control handle for an audio client Cj cannot control the audio client Cj.

If the content server limits the number of controllers that can obtain control handles, combinations of the audio client and controllers that can control audio clients can be arranged. When a controller issues a control handle release command to the content server, the controller can give up control handle.

1. 2. 3. 2. Monitoring Function

As described above, the controller Ak can monitor the audio client Cj by obtaining the monitoring handle.

Figure 55:
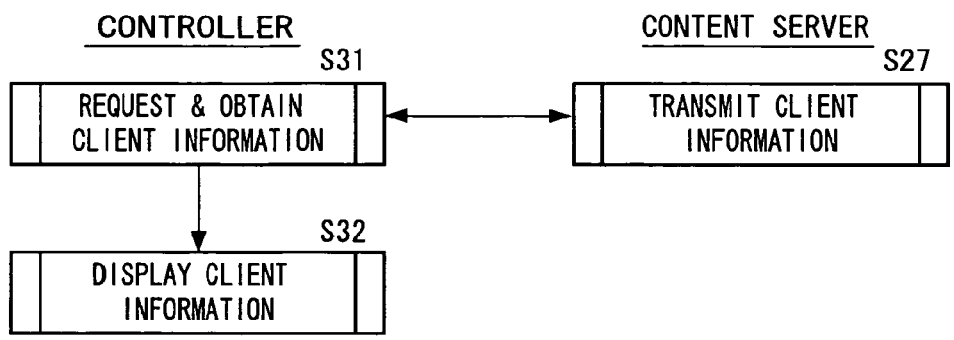
FIG. 55 is a flowchart for use in illustration of the operation of monitoring an audio client by a controller in FIG. 1.

Referring to FIG. 55, the controller Ak requests the content server Si to provide client information (S31), the content server Si responds to the request to return the client information (S27), and the controller Ak obtains and stores the information (S31). Alternatively, if the content server Si receives client information from an audio client Cj, the content server Si transmits the client information to the controller Ak through the push port, and the controller Ak obtains and stores the information. The controller Ak then displays the obtained client information (S32). Now, the monitoring function by the controller will be detailed.

Referring to FIG. 56, the content server Si responds to a request from the controller Ak or client information received from an audio client and transmits the client information to the controller Ak (S2701). The controller Ak searches into the received client information for changes in the information. More specifically, the controller checks the client index (S3101) and stores to which audio client Cj the client information belongs. The stored product ID and firmware ID of the audio clients are checked (S3102, S3103).

More specifically, the kind of the audio client is determined based on the product ID, and the version of the firmware is determined based on the firmware ID. If the version of the firmware applied to the audio client is out of date, the controller Ak accesses the customer service on the Internet and has the firmware distributed to the audio client Cj for automatic updating. How to update the firmware will be detailed later.

Note that the controller Ak analyzes the received client information to check the client type, branches to processing for the audio client Cj if the client type suggests the audio client Cj, and otherwise ignores the information.

The controller Ak then checks for a change in the connection information (S3104) and changes the display of the connection state with the audio client Cj if there is a change (S3105).

Therefore, the controller Ak can constantly monitor if the plurality of audio clients Cj are turned on and connected to the content server Si.

If an audio client Cj is connected, the controller Ak checks for a change in the volume value (S3106) and changes the display of the volume value if there is a change (S3107).

The controller Ak then checks for a change in the list construction key (that will be detailed) (S3108) and requests the content server Si to provide a music list using the list construction key if there is a change (S3109). The content server Si responds to the request to return the music list (S2702), and the controller Ak receives the music list (S3110).

The controller Ak stores the received music list as the list of music pieces in the process of being reproduced by the audio client Cj, checks for the order of the presently reproduced music piece in the sequence of the music list and stores the ordinal number (S3111).

The controller Ak then checks for a change in the music piece in the process of being reproduced (S3112). If there is a change, the controller Ak checks the data format of the music piece (S3113), changes the display of the title of the music piece being reproduced or the displayed name of the artist (S3114), checks the order of the presently reproduced music piece in the sequence of the music list and stores the ordinal number (S3115).

Finally, the controller Ak checks for a change in the status (S3116) and changes the displayed status if there is a change (S3117). If the audio client Cj is remote-controlled, the controller Ak monitors and displays the status. When the status of the audio client Cj is a completion status (S3118), the controller Ak instructs the audio client Cj to continue to reproduce the next music piece (S3119). The continuous reproducing will be detailed later.

The above processing is repeated every time there is a change in the client information of any of the audio clients whose monitoring handles are obtained by the controller.

Although not shown, the controller Ak monitors for the client type of each of the audio clients Cj. The controller Ak also monitors for the data format that can be reproduced by the audio client and displays only the titles of music pieces that can be reproduced.

As in the foregoing, when the content server receives client information from a client, the client information is forcibly transmitted to a controller Ak through a push port, so that the controller can constantly monitor the audio clients Cj, and only the minimum necessary information is transmitted from the content server Si to the controller Ak. Therefore, the load of processing imposed upon the controller Ak can be reduced. When there are a plurality of audio clients Cj, the controller Ak can distinguish the audio clients Cj based on the client indexes and can update the client information in real time.

1. 2. 3. 3. Control Function

The controller Ak obtains the control handle as described above in order to control the audio client Cj.

Figure 57:
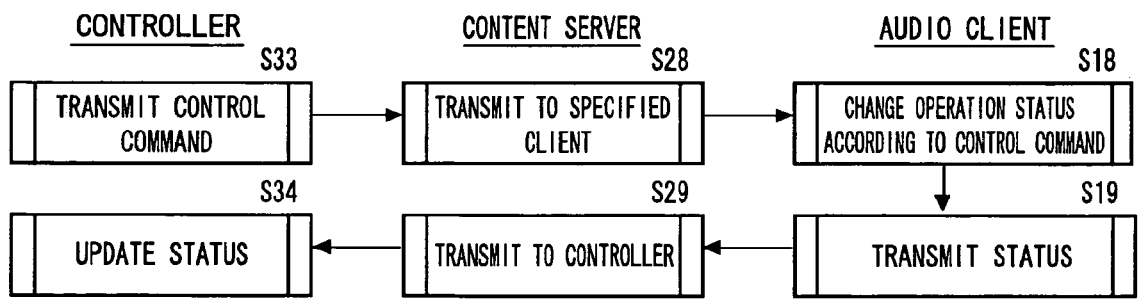
FIG. 57 is a flowchart for use in illustration of the operation of controlling the audio client by the controller in FIG. 1.

Referring to FIG. 57, the controller Ak transmits a control command to the content server Si (S33), and the content server Si transmits the command to a specified audio client Cj (S28). The audio client Cj operates in response to the control command, changes its status (S18), and transmits the new status to the content server Si (S19). The content server Si transmits the status to the controller Ak (S29), and the controller Ak changes the status of the stored client information in response (S34).

1. 2. 3. 3. 1. Control Command Processing

Figure 58:
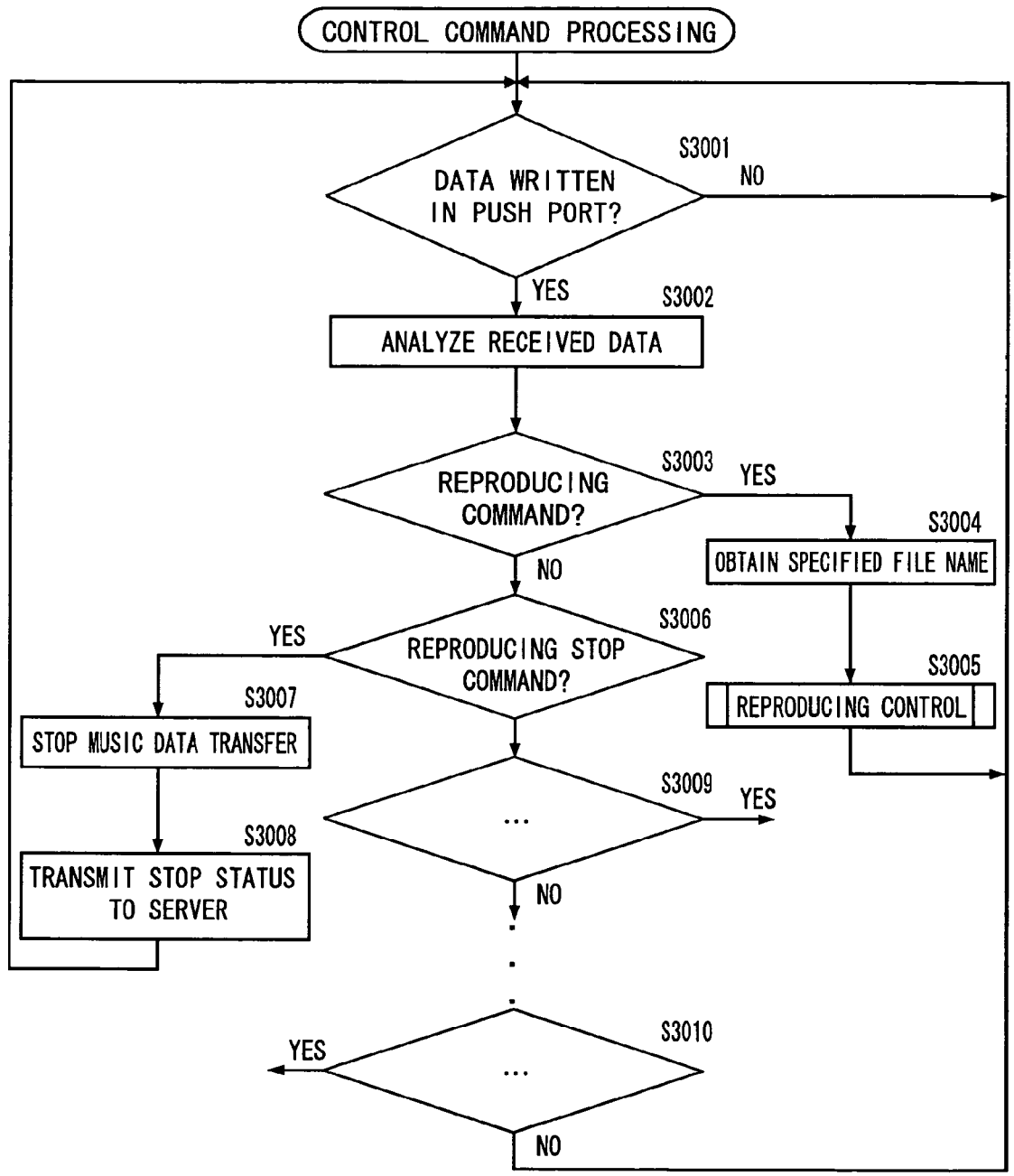
FIG. 58 is a flowchart for use in illustration of a subroutine in control command processing by the audio client in FIG. 57.

Now, referring to FIG. 58, the processing carried out by the audio client Cj in response to a control command received from the controller Ak through the content server Si will be described.

When some data is written in the push port (S3001), the audio client Cj receives and analyzes the data (S3002).

When the received data is a reproducing command (S3003), the audio client Cj obtains the specified file name from the content server Si (S3004). The audio client Cj specifies the title of the music piece, the album, the genre and the like based on the obtained file name. The audio client Cj then specifies the music piece and instructs the content server Si to transfer the music data of the piece (S3005). The audio client Cj reproduces the music piece based on the transferred music data.

If the received data is a reproducing stop command (S3006), the audio client Cj stops issuing the music piece data transfer request command, which stops transfer of the music data (S3007), and transmits a stop status to the content server Si (S3008). The audio client Cj also responds to a volume value set command, a pause command, an AV receiver control command, a firmware update command and the like to carry out prescribed processing (S3009 to S3010).

1. 2. 3. 3. 2. Reproducing Control

Now, the operation of the controller Ak to have a desired piece by a desired artist reproduced by the audio client Cj using a reproducing command will be described.

Figure 59:
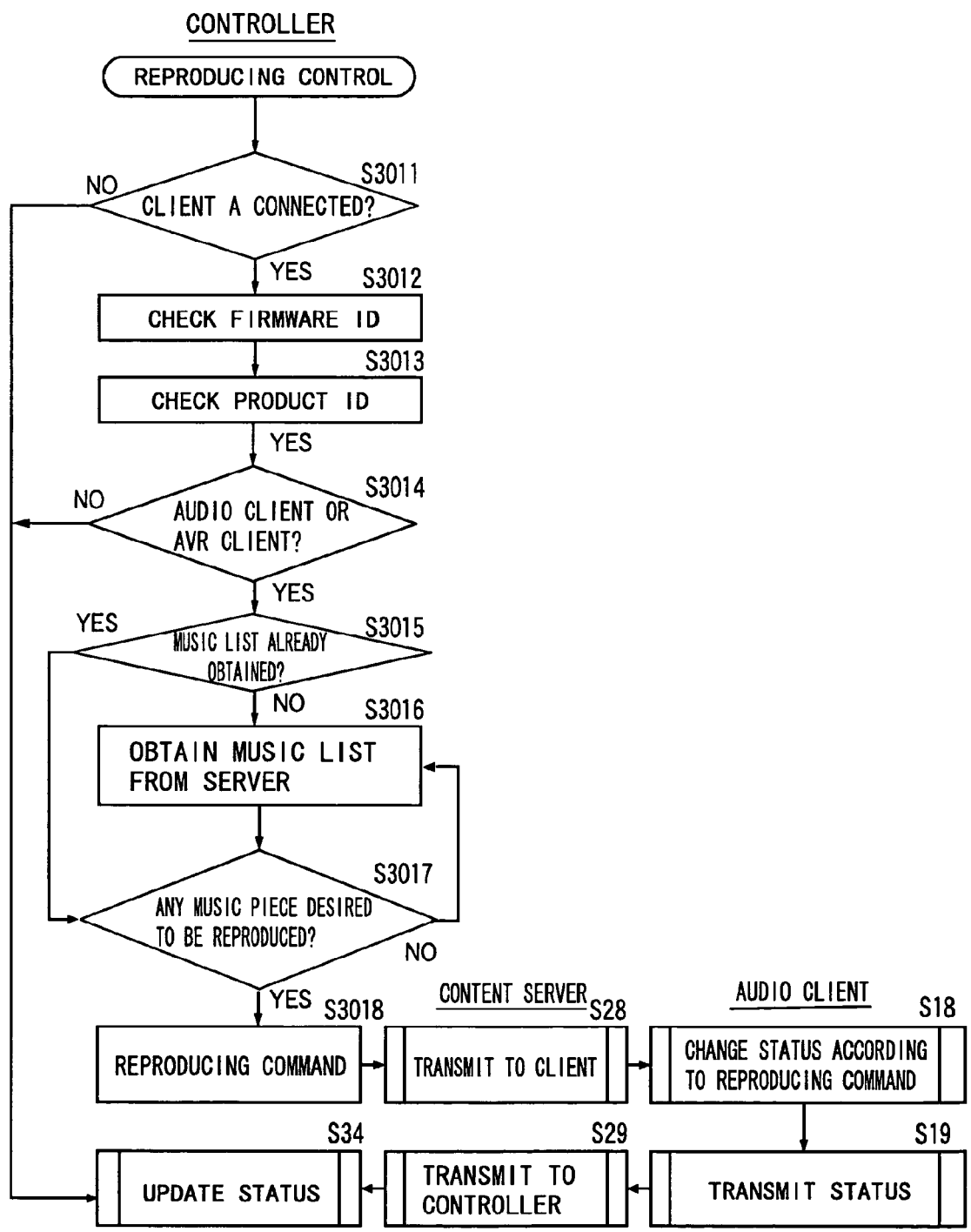
FIG. 59 shows a subroutine in reproducing control operation in FIG. 58.

Referring to FIG. 59, the controller Ak checks for connection with an audio client Cj (S3011) and checks the firmware ID and product ID of the audio client Cj if there is the connection (S3012, S3013).

The controller Ak then determines whether or not the audio client Cj is an audio client or an AVR client based on the client type (S3014). Since it is the audio client Cj in this example, the controller Ak determines whether or not the music list by the desired artist has been obtained (S3015). If the list has not been obtained yet, the controller Ak obtains the music list by the desired artist from the content server Si (S3016). The controller Ak displays the music list at the display.

When there is a music piece the user desires to reproduce in the obtained music list (S3017), the controller Ak selects the music piece in response to the input operation of the user and transmits a reproducing command to the content server Si (S3018). The reproducing command includes the name of the file that stores the data of the selected music piece and the audio client index of the audio client that is to reproduce the music piece. Meanwhile, if there is no desired music piece, the controller Ak obtains the next music list by the desired artist (S3016).

The content server Si specifies the audio client Cj based on the client index transmitted from the controller Ak and transmits the file name of the selected music piece to the audio client Cj (S28).

The audio client Cj responds to the reproducing command transmitted through the content server Si from the controller Ak to reproduce a desired music piece and changes the status to the reproducing status (S18). The audio client Cj transmits the reproducing status to the content server Si (S19), and the content server Si transmits the reproducing status to the controller Ak (S29). The controller Ak changes the status of the audio client Cj to the reproducing status in response (S34).

1. 2. 3. 3. 3. Determine if in Reproducible Format and Reproduce

A music list includes music pieces in all the formats regardless of whether or not music in the formats can be reproduced by the audio client Cj. Therefore, if the controller Ak directly displays a music list obtained from the content server Si in response to the user's selection of desired music pieces, the following problem can arise.

When the user selects a music piece in a format that cannot be reproduced by the audio client Cj, and the controller Ak instructs the audio client Cj to reproduce the music piece selected by the user, no sound is reproduced while the reproducing state is displayed at the audio client Cj.

Therefore, as shown in FIG. 60, information related to the reproducible formats is added to the client type in the client information. In this way, the client type includes information related to the hardware structure of the client and the formats that can be reproduced by the audio client.

The information related to the hardware structure includes the following items. The "audio client (intelligent type)" can reproduce music and receive a remote signal. The "audio client (non-intelligent type)" can reproduce music but cannot receive a remote signal. The "controller" is a client that can monitor and control an audio client through the content server. The "AVR client" has an EIA-232 port and can communicate with an AV receiver. The "AVR controller" is a client that can control and monitor an AVR client through the content server. Information related to the reproducible formats include MP3, WAV, and WMA and so on.

The client type of one client may include information related to a plurality of hardware structures in some cases and information related to a plurality of reproducible formats in other cases.

Figure 61:
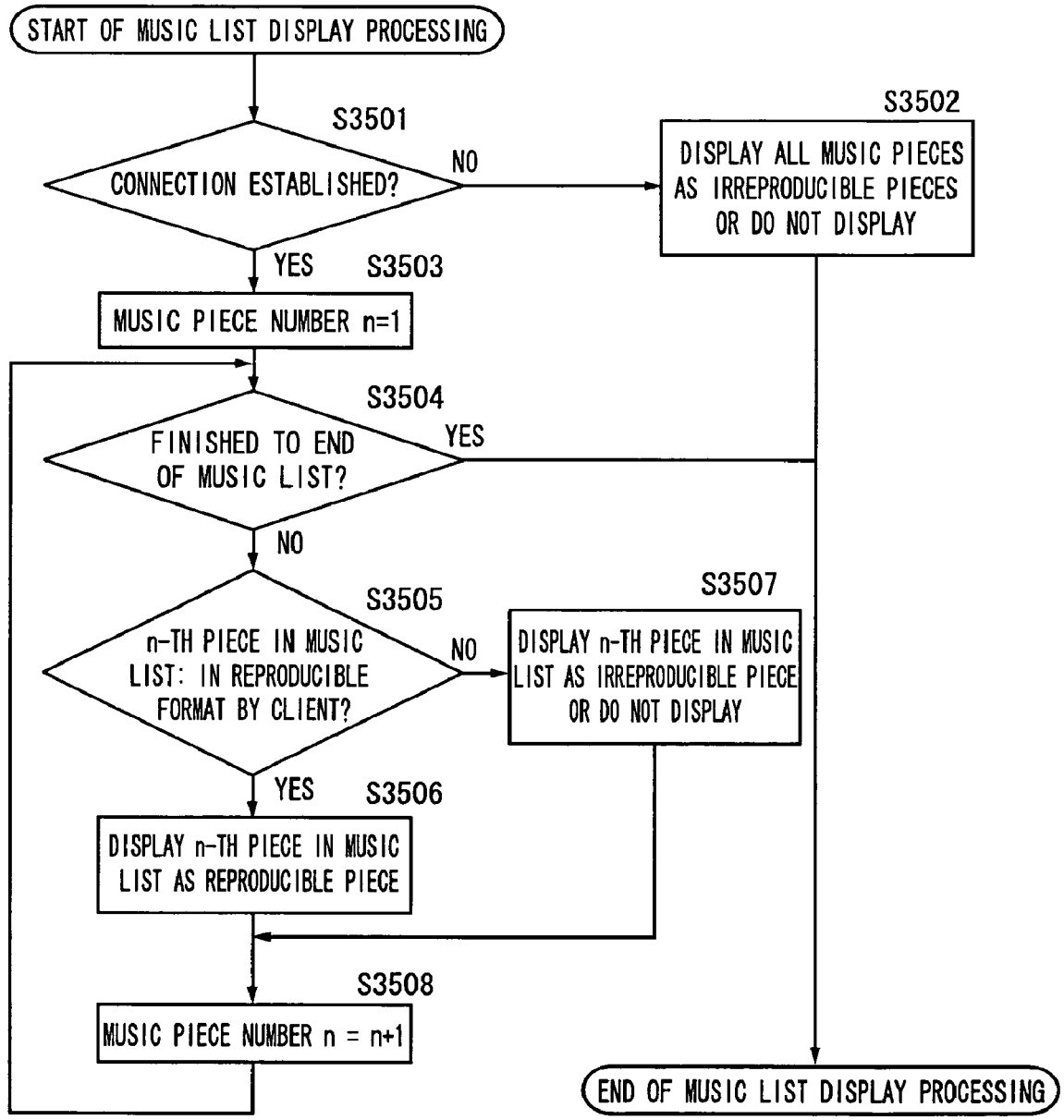
FIG. 61 is a flowchart for use in illustration of the operation of displaying a music list in the reproducing control in FIG. 59.

Now, the process of how the controller Ak displays a music list to the user will be described in conjunction with FIG. 61.

The controller Ak determines whether or not the audio client Cj to reproduce a music piece is connected to the content server Si (S3501). If not connected, the audio client Cj cannot reproduce the music piece, and therefore all the music pieces in the music list are displayed as irreproducible music pieces or the music pieces are not displayed at all (S3502). In this way, the user can be prevented from selecting any piece that cannot be reproduced by the audio client Cj.

Meanwhile, if the connection is established, the following steps S3505 to S3507 are repeated as many times as the number of music pieces in the music list (S3503, S3504, S3508).

More specifically, the controller Ak determines whether or not the format of the n-th piece in the music list is reproducible by the audio client Cj (S3505). If the format is reproducible, the controller Ak displays the piece as a reproducible piece (S3506). Meanwhile, the controller Ak displays the piece as an irreproducible piece or does not display it at all if the format is not reproducible (S3507).

If for example the audio client C1 can reproduce both MP3 and WAV, the controller Ak displays all the music pieces in the music list (playlist in the example) as shown in FIG. 62. If however the audio client C2 can reproduce MP3 but not WAV, music pieces in the MP3 format are all displayed normally but those in the WAV format are displayed pale in color as shown in FIG. 63. Alternatively, they do not have to be displayed at all rather than being displayed pale in color. In this way, the user can be prevented from selecting a music piece in the WAV format that cannot be reproduced by the audio client C2.

Note that when the connection state or the client type of the audio client Cj is changed, the controller Ak displays the music list all over again and the present client information of the audio client can be displayed in real time.

Now, the operation of the controller Ak when the user operates the controller Ak to have a music piece reproduced by the audio client Cj will be described.

Figure 64:
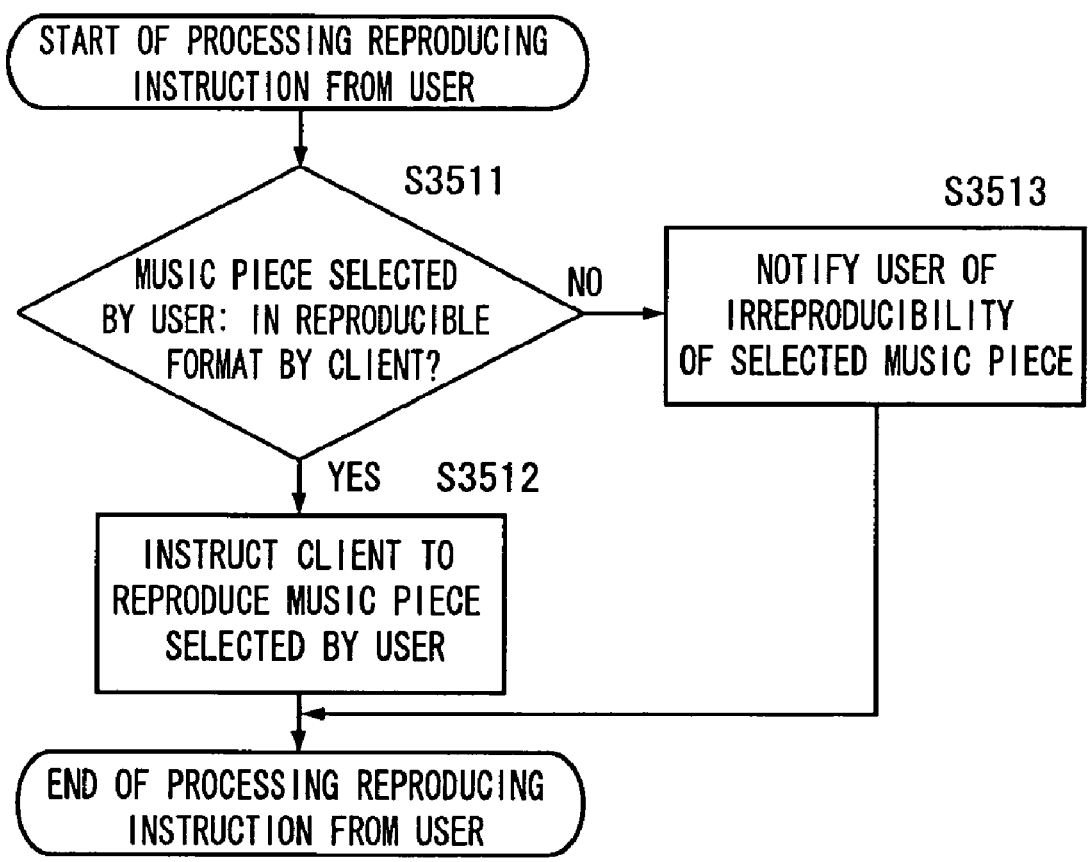
FIG. 64 is a flowchart for use in illustration of the operation of reproducing instruction processing by the user in the reproducing control in FIG. 59.

Referring to FIG. 64, if the user selects a music piece desired to be reproduced, the controller Ak determines whether or not the format of the selected music piece is reproducible by the audio client Cj (S3511). More specifically, the controller Ak compares the format of the selected piece to the reproducible formats in the client type.

If the format is reproducible, the controller Ak instructs the audio client Cj to reproduce the selected music piece (S3512). Meanwhile, if the format is not reproducible, the user is notified that the audio client Cj cannot reproduce the selected music piece (S3513).

As in the foregoing, music pieces that can be reproduced by the audio client Cj are displayed distinctly to the user, so that the user can be prevented from selecting a music piece that cannot be reproduced by the audio client Cj.

1. 2. 3. 3. 4. Continuous Reproducing Control

When the user operates the audio client Cj to reproduce a music piece, the audio client Cj can continuously reproduce music pieces in the already obtained music list. If however the audio client Cj reproduces a music piece based on the instruction from the controller Ak, the audio client Cj does not have the music list and therefore the controller Ak must instruct the audio client Cj to reproduce the next music piece so that the audio client Cj continues to reproduce the music pieces in the music list.

If there is only one controller on the network, there is no problem, but if there are a number of controllers, the audio client may not normally reproduce music pieces in a continuous manner. If for example the content server that has been notified of the completion of reproducing by the audio client notifies the completion to all the controllers, the audio client receives instructions for continuous reproducing from the plurality of controllers. This problem is even more complicated when there are a plurality of content servers on the network. Therefore, in order to carry out continuous reproducing by the controller in the network type audio system, which controller to instruct continuous reproducing to a client must be managed.

According to the embodiment, the audio client Cj reproduces a music piece in response to a instruction from a controller Ak and transmits a completion status upon finishing reproducing, while otherwise for example when the audio client Cj independently reproduces a music piece in response to the user's operation and finishes reproducing it, or stops reproducing the music piece midway in response to the user's operation, a stop status different from the completion status is transmitted. When the completion status is received, the controller determines that continuous reproducing processing should be carried out, selects the music piece following the previously selected music piece in the music list, and instructs the audio client to reproduce the next music piece. When the stop status is received, the controller does not instruct the audio client to reproduce the next music piece.

As described above, the audio client transmits the completion status and the stop status in the different manners depending upon situations, so that the controller can determine whether or not to instruct the audio client to reproduce the next music piece based on the received status.

Consequently, when the audio client Cj stops reproducing a music piece midway in response to the user's operation, or the audio client Cj selects a music piece on its own and finishes reproducing it, a stop status is transmitted to the controller through the content server. Therefore, the controller can be prevented from erroneously instructing the audio client to reproduce the next music piece.

Figure 65:
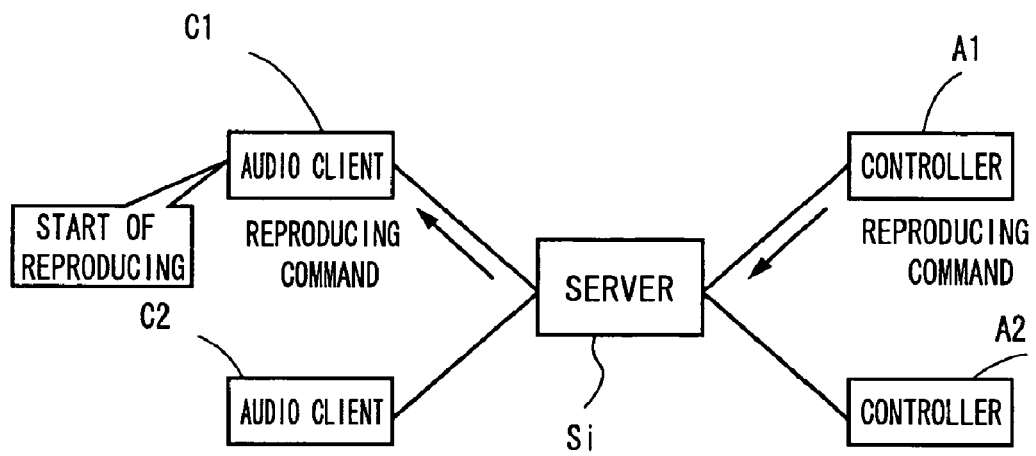
FIG. 65 shows how a reproducing command is transmitted in continuous reproducing control by the controller in FIG. 1.

When there are a plurality of controllers, the content server that has received a completion status from the audio client transmits the completion status and the stop status to each of the controllers in different manners. More specifically, referring to FIG. 65, when the controller A1 instructs the audio client C1 to reproduce a music piece, the controller A1 first transmits a reproducing command directed to the audio client C1 to the content server Si. The content server Si receives the reproducing command from the controller A1 and transmits the received command to the audio client C1. The audio client C1 receives the reproducing command from the content server Si and starts to reproduce the music piece.

Figure 66:
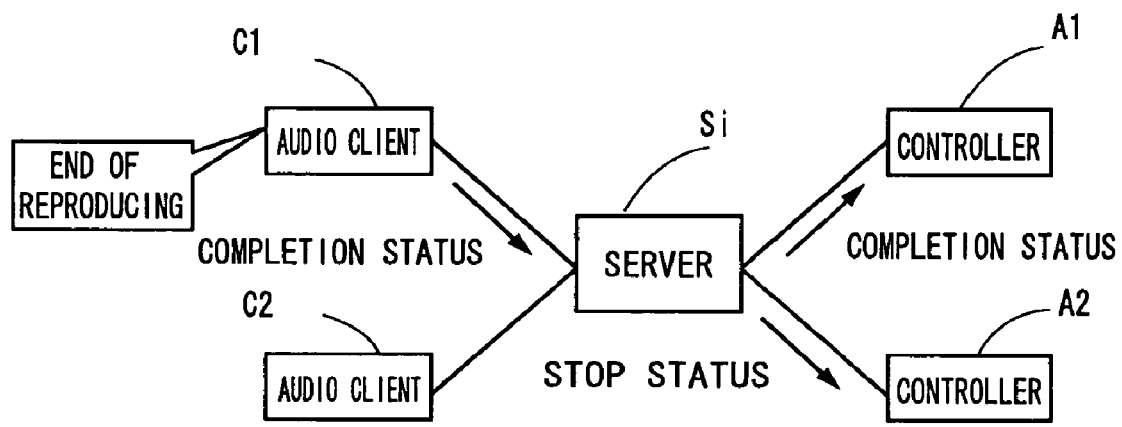
FIG. 66 shows how completion and stop statuses are transmitted as continued from FIG. 65.
Figure 67:
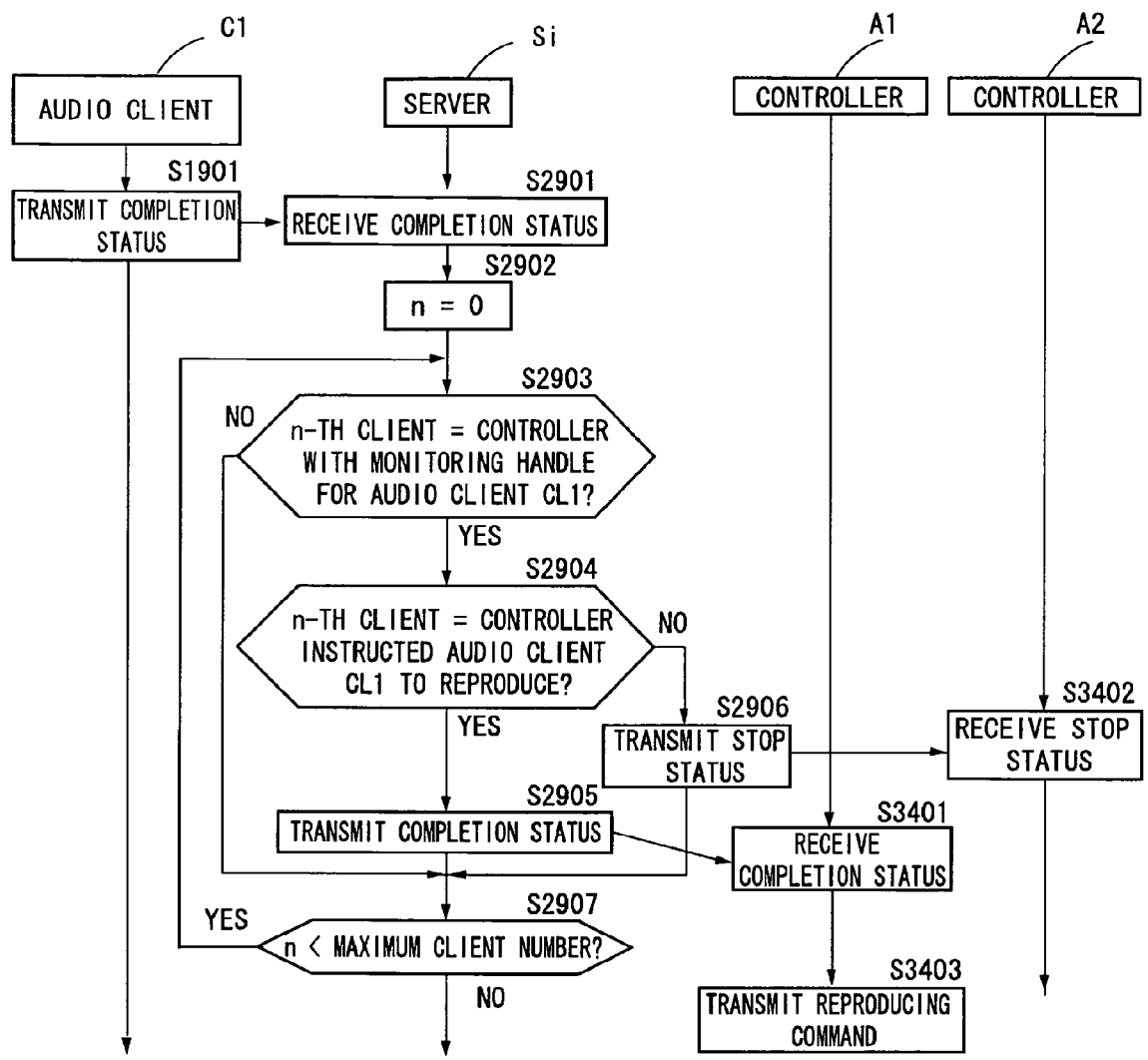
FIG. 67 is a flowchart for use in illustration of the operation of transmitting the completion and stop statuses in FIG. 66.

Referring to FIGS. 66 and 67, the audio client C1 finishes reproducing the music piece, and then transmits a completion status to the content server (S1901). The content server Si then receives it (S2901). Then, the content server Si repeats the following steps S2903 to S2906 as many times as the number of clients (S2902, S2907).

The content server Si determines whether or not the n-th client is a controller that has a monitoring handle for the audio client C1 based on the client index n (S2903).

If the client is the controller that has a monitoring handle, the content server Si determines whether the n-th client (controller) is the controller A1 that has instructed the audio client C1 to reproduce the music piece (S2094).

If the client is the controller A1 that has instructed the audio client C1 to reproduce the music piece, the content server Si transmits the completion status received from the audio client C1 to the controller A1 (S2905), and the controller A1 receives it (S3401). Meanwhile, if the client is a controller A2 instead of the controller A1 that has instructed the audio client C1 to reproduce the music piece, the content server Si transmits a stop status instead of the completion status received from the audio client C1 to the controller A2 (S2906) and the controller A2 receives it (S3402).

Referring to FIG. 68, the controller A1 selects the music piece the next to the previously selected piece in the music list in response to the received completion status and transmits a reproducing command to cause the audio client C1 to reproduce the music piece to the content server Si (S3403). The content server receives the command and transmits the command to the audio client C1. The audio client C1 reproduces the next music piece in response to the reproducing command transmitted from the content server Si.

Meanwhile, the controller A2 receives the stop status, determines that the audio client C1 is in a stop state, and does not carry out continuous reproducing processing as opposed to the controller A1.

The audio client Cj transmits to the content server Si a reproducing status when the status changes to reproducing, a pause status when the status changes to pause, and a stop status when a music piece specified by the audio client Cj has been reproduced to the end. Meanwhile, when a music piece specified by the controller Ak has been reproduced to the end, the audio client Cj transmits a completion status to the content server Si.

As in the foregoing, the statuses transmitted to the controller Ak when the audio client Cj finishes reproducing a music piece are separated into the stop status and the completion status. Therefore, the controller Ak can determine whether the audio client Cj instructed by the controller to reproduce has finished reproducing a music piece. Consequently, the controller Ak can determine whether to instruct the audio client Cj to continue reproducing or simply to display the stop status from the audio client Cj.

Note that when the audio client Cj finishes reproducing a music piece, the status to be notified to the content server Si may be different between when the music piece has been reproduced in response to an instruction from a dedicated remote and when the music piece has been reproduced in response to an instruction from the controller Ak that has both the monitoring and control handles. This is because the dedicated remote that has only the control handle cannot receive a status from the content server Si and therefore cannot carry out continuous reproducing processing.

1. 2. 3. 3. 5. Continuous Reproducing Control Using List Construction Key

The controller Ak obtains various music lists from the content server Si, selects a music piece in the lists, and has the music piece reproduced by the audio client Cj. The controller Ak monitors for the status of the audio client Cj, selects the next music piece in the obtained music list once the audio client Cj finishes reproducing the selected music piece, and has the music piece reproduced by the audio client Cj. In this way, the controller Ak controls the audio client Cj to continuously reproduce music pieces. In order to instruct reproducing of succeeding music pieces, the music list must be stored in advance. Therefore, the power supply for the controller Ak that instructs reproducing of music pieces cannot be turned off during reproducing a music piece.

Therefore, the following method is employed so that the controller Ak can instruct the audio client Cj to carry out continuous reproducing even when the power supply for the controller Ak that has instructed the audio client Cj to reproduce is turned off during reproducing.

When the user desires to select a music piece to be reproduced from the content information database, the user uses various music lists in selecting a piece such as the music list of a certain artist or in a certain genre. A list construction key is defined so that an arbitrary music list can be produced based on the content information database. The list construction key is added to the client information as information used by the audio client Cj to specify the music list whose music piece is presently reproduced.

Referring to FIG. 69, the list construction key includes a filter kind and a key word. The filter kind is used to specify which category in the content information database is based in producing a music list, an example of which is shown in FIG. 70. If the filter kind is "TITLE=," "GENRE=," "ARTIST=," "ALBUM=," or "FILENAME=," music pieces whose title, genre, artist name, album title, or file name matches a keyword are searched in the content information database and the found pieces are formed into a music list. If the filter kind is "PLAYLIST=," music pieces registered in a playlist whose file name matches the keyword are searched in the content information database and the found pieces are formed into a music list.

For a music list for the artist name "xxxx" for example, the filter kind is "ARTIST=," the keyword is "xxxx" and therefore the list construction key is "ARTIST=xxxx." When "*" (asterisk) is specified as the keyword, a list by a keyword that can be used for the filter kind is produced. A list produced by the list construction key "ARTIST=*" is a list by the name of an artist whose music pieces are registered in the content information database.

Now, the process of continuous reproducing processing by a controller to an audio client that has finished reproducing a piece specified by the controller will be described.

Referring to FIG. 71, the audio client Cj instructed by the controller Ak to reproduce a music piece transmits a completion status to the content server Si upon finishing reproducing the music piece. The content server Si transmits client information including the completion status, the file name of the reproduced music piece, and the list construction key to the controller Ak in response to the change in the status of the audio client Cj.

The controller Ak starts to carry out client information display processing as shown in FIG. 56 in response to the received client information. The processing has already been described above, and therefore hereinafter the continuous reproducing control using the list construction key will mainly be described.

The controller Ak checks for a change in the list construction key (S3108) and obtains a music list whose piece is reproduced at present by the audio client Cj using the list construction key if there is a change in the key (S3110). More specifically, the controller transmits the received list construction key to the content server, and the content server produces a list based on the list construction key and transmits the produced list to the controller. Once the power supply is turned off, and the controller Ak no longer stores the music list whose piece is being reproduced by the audio client Cj, the music list being reproduced is obtained from the content server Si using the list construction key obtained after connection with the content server Si.

In this example, since the status changes to the completion status, the controller Ak carries out completion processing (S3119). More specifically, the controller Ak selects the music piece the next to the piece the audio client Cj has finished reproducing in the music list and instructs the audio client Cj to reproduce the selected music piece.

Figure 72:
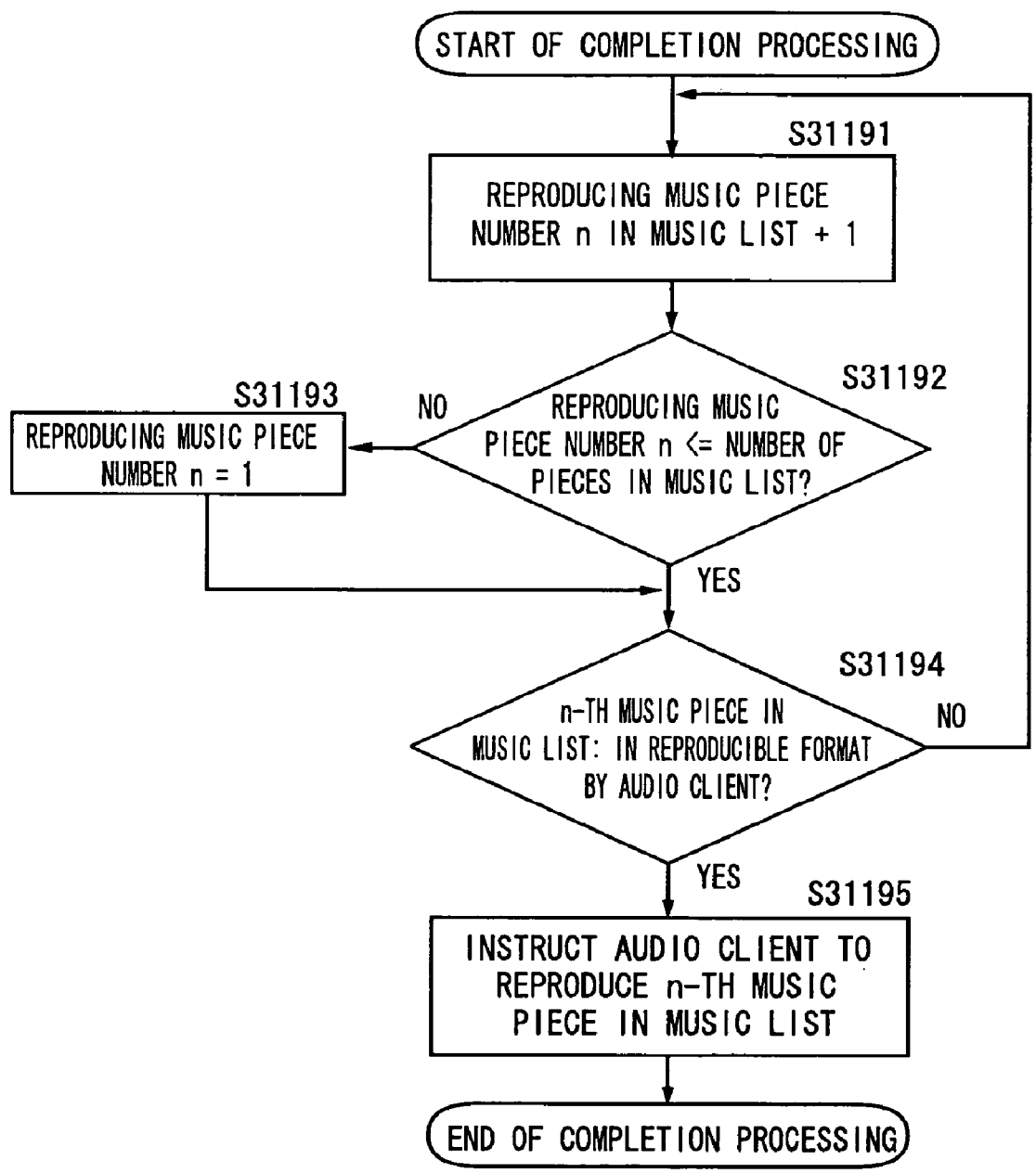
FIG. 72 is a flowchart for use in illustration of completion processing operation by the controller in FIGS. 56 and 71.

Referring to FIG. 72, the completion processing will be detailed. The controller Ak increases the reproducing music number n stored in step S3111 in FIG. 56 (S31191) and thus specifies the music piece to reproduce next. Then, the controller Ak determines whether or not the reproducing music number n is equal to or smaller than the number of music pieces in the music list (S31192). If the reproducing music number n is more than the number of music pieces in the music list, the controller Ak determines that the audio client Cj has reproduced the music list the end and sets the reproducing music number n to 1 (S31193), and the music piece to reproduce next returns to the first music piece in the list.

If the reproducing music number n is not more than the number of music pieces in the music list, the controller Ak checks whether or not the n-th music piece is in the format that can be reproduced by the audio client Cj (S31194), and if the format is reproducible, the controller instructs the audio client Cj to reproduce the n-th music piece in the music list (S31195). If the format is not reproducible, the completion processing is recursively carried out in order to reproduce the music piece the next to the next music piece. The controller Ak instructs the audio client Cj to skip the irreproducible music piece and reproduce the next music piece.

As in the foregoing, when the power supply for the controller Ak is turned off after the audio client Cj is instructed to reproduce a music piece, the controller Ak loses the music list at the time of instructing the audio client Cj. However, when the power supply is turned on again, and connection with the content server is established, as described in connection with step S3008 in FIG. 51, the controller Ak obtains the client information of the audio client Cj from the content server Si.

The client information includes the list construction key, and therefore the controller Ak can obtain the music list presently reproduced by the client Cj again based on the list construction key. Therefore, if the power supply for the controller Ak is turned off after the audio client Cj is instructed to reproduce a music piece, the audio client Cj finishes reproducing the music piece and transmits a completion status. When the controller Ak receives the completion status, the controller can instruct the audio client Cj to reproduce the next music piece according to the regained music list.

Note that in order to stop the reproducing operation of the audio client Cj, the controller Ak needs only transmit a stop command to the audio client Cj through the content server Si. In this case, the stop status is returned from the audio client Cj to the controller Ak through the content server Si. In order to temporarily stop the reproducing operation of the audio client Cj, the controller Ak needs only transmit a pause command to the audio client Cj through the content server Si. In this case, the pause status is returned from the audio client Cj to the controller Ak through the content server Si.

1. 2. 3. 3. 6. Continuous Reproducing Control with Priorities

The embodiment will be described particularly in connection with the content server 51 and the audio client C1. According to the embodiment, a controller management table is stored in the HDD 14 of the content server S1. An example of the controller management table is shown as the following Table 1. In the controller management table, priorities in controlling the audio client C1 are registered in association with the controller indexes provided to the controllers A1 to Ak.

TABLE 1

| controller management table | |
|---|---|
| priority | controller |
| 1 | A1 |
| 2 | A2 |
| 3 | |
| 4 | |
| ... | ... |
| k | |

Figure 73:
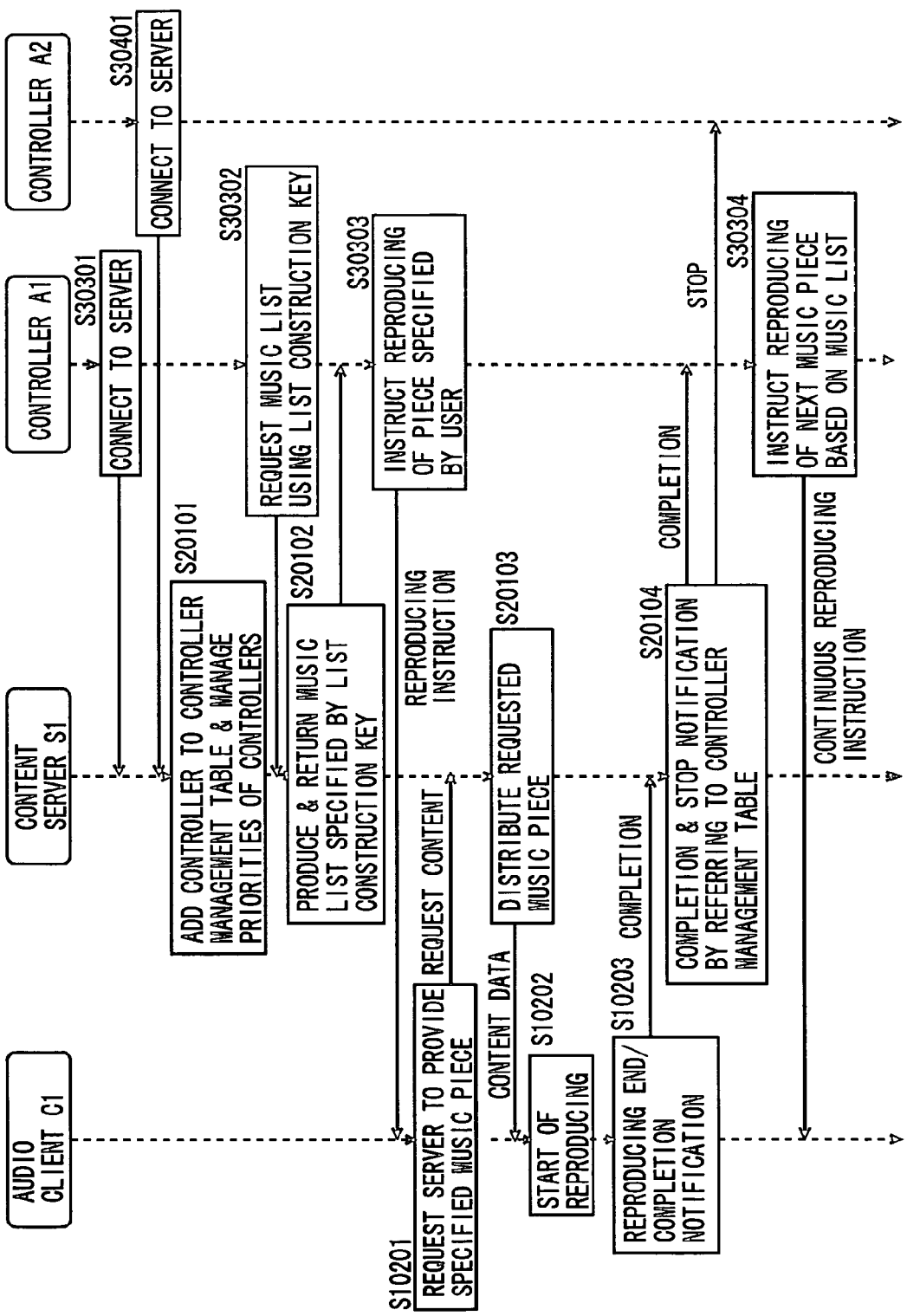
FIG. 73 is a flowchart for use in illustration of continuous reproducing processing with priorities.

According to the embodiment, computer programs to carry out the steps shown in FIG. 73 are installed in the content servers S1 to Si, the audio clients C1 to Cj, and the controllers A1 to Ak. The operation of the network type audio system 10 according to the embodiment will be described with reference to the flowchart in FIG. 73.

To start with, the controller A1 requests connection to the content server S1, and the connection between the controller A1 and the content server S1 is established when the request is accepted by the content server S1 (S30301).

Subsequently to the controller A1, the controller A2 requests connection to the content server S1, and the connection between the controller A2 and the content server S1 is established when the request is accepted by the content server S1 (S30401).

Meanwhile, the content server Si records the controller index of the controller A1 in association with the "first" priority and the controller index of the controller A2 in association with the "second" priority in the controller management table (S20101). Consequently, the controller management table as shown in Table 1 is obtained. According to the controller management table, the controller A1 has the authority with the highest priority about continuous reproducing processing, and then the controller A2 has the authority with the second highest priority about the continuous reproducing processing.

Now, the operation of how the controller A1 instructs the audio client C1 to continuously reproduce a plurality of music pieces through the content server S1 will be described.

The controller A1 requests the content server S1 to provide a music list to be continuously reproduced (S30302). More specifically, the controller transmits a list construction key necessary for producing the music list to the content server S1.

When the user selects a music piece desired to be reproduced from the content server S1, she/he selects various music lists in selecting a music piece such as a music list of a certain artist and a music list in a certain genre. As shown in FIG. 69, the list construction key is a search key to extract music pieces from the content server S1 and arbitrarily produce such a music list. The list construction key is made of two parameters, a filter kind and a keyword.

The filter kind is used to specify the category of a music piece to be entered to the music list, and a specific example is shown in FIG. 70.

The content server S1 produces a music list based on the list construction key transmitted from the controller A1 and transmits the list to the controller A1 (S20102).

More specifically, when the filter kind is "TITLE=," "GENRE=," "ARTIST=," "ALBUM=," or "FILENAME=," one or more music pieces whose title, genre name, artist name, album title, or file name matches a keyword are searched, and the matching one or more pieces are formed into a music list. If the filter kind is "PLAYLIST=," music pieces registered in a playlist whose file name matches the keyword are searched and the matching pieces are formed into a music list (playlist). The content server S1 registers the list construction key in association with the client index (the ID information of the audio client C1) as one kind of client information related to the audio client C1.

The controller A1 instructs the audio client C1 to reproduce a music piece specified in response to the user's operation in the obtained music list through the content server S1 (S30303). The audio client C1 responds to the reproducing instruction from the controller A1 to request the content server S1 to provide the music content of the specified music piece (S10201). The content server S1 distributes the music content requested by the audio client C1 to the audio client C1 (S20103). The audio client C1 starts to reproduce the music piece based on the music content transmitted from the content server S1 (S10202).

When the audio client C1 finishes reproducing a specified music piece, the audio client C1 transmits a completion status indicating the completion of reproducing to the content server S1 (S10203). The content server S1 refers to the controller management table 104 as shown in FIG. 74 upon receiving the completion status from the audio client C1, transmits the completion status as it is to the controller A1 with the highest priority and transmits a stop status different from the completion status to the controller A2 with a lower priority (S20104).

Figure 74:
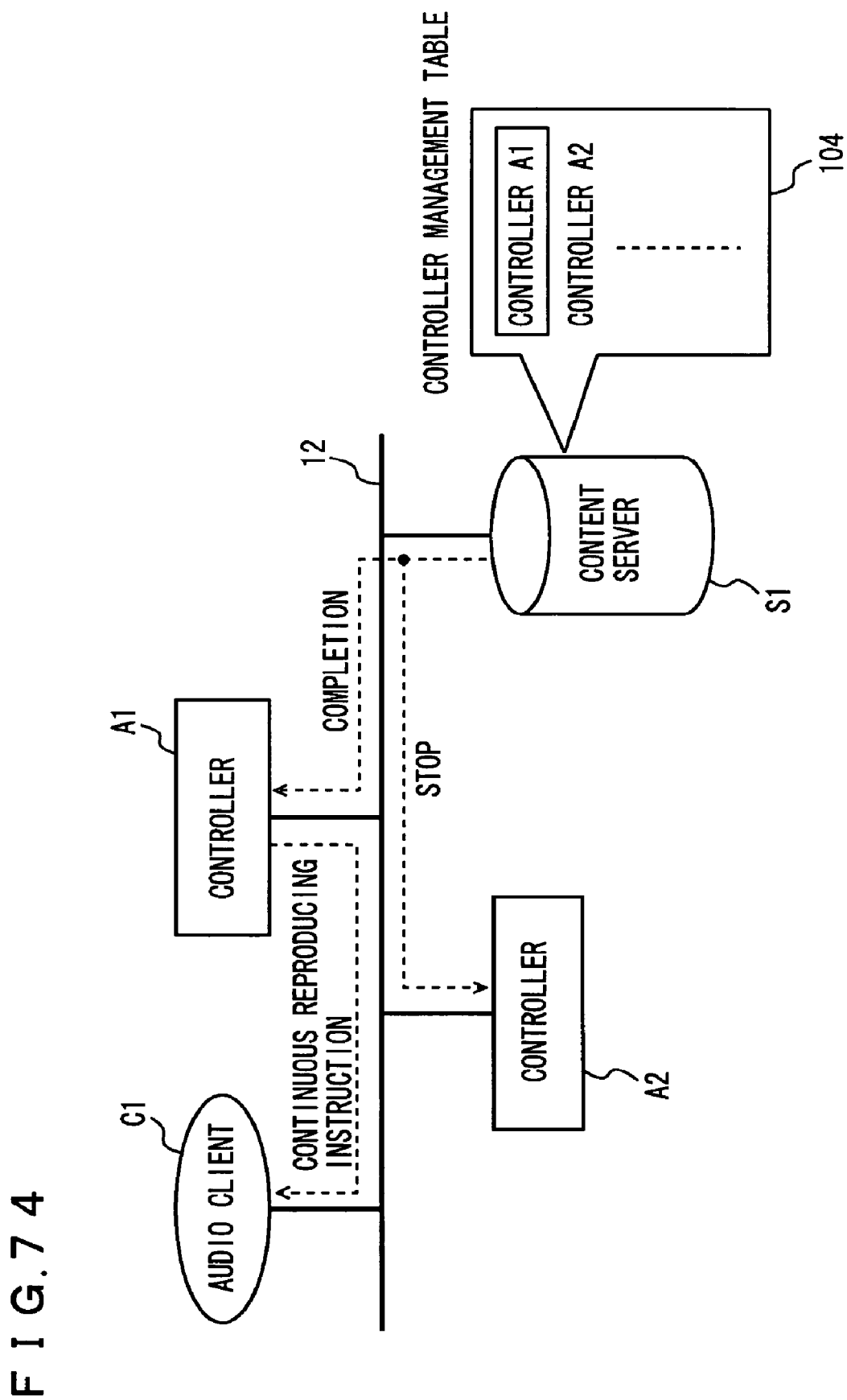
FIG. 74 is a functional block diagram of the continuous reproducing processing in FIG. 73.

As shown in FIG. 74, the controller A1 instructs the audio client C1 to continuously reproduce the next music piece in the music list through the content server S1 (S30304). The audio client C1 reproduces the next music piece in response to the continuous reproducing instruction from the controller A1. Then, the audio client C1 repeats step S201 and the operation thereafter. Meanwhile, the controller A2 does not take a positive action in response to the stop status received from the content server S1 and simply monitors the state of the audio client C1.

Figure 75:
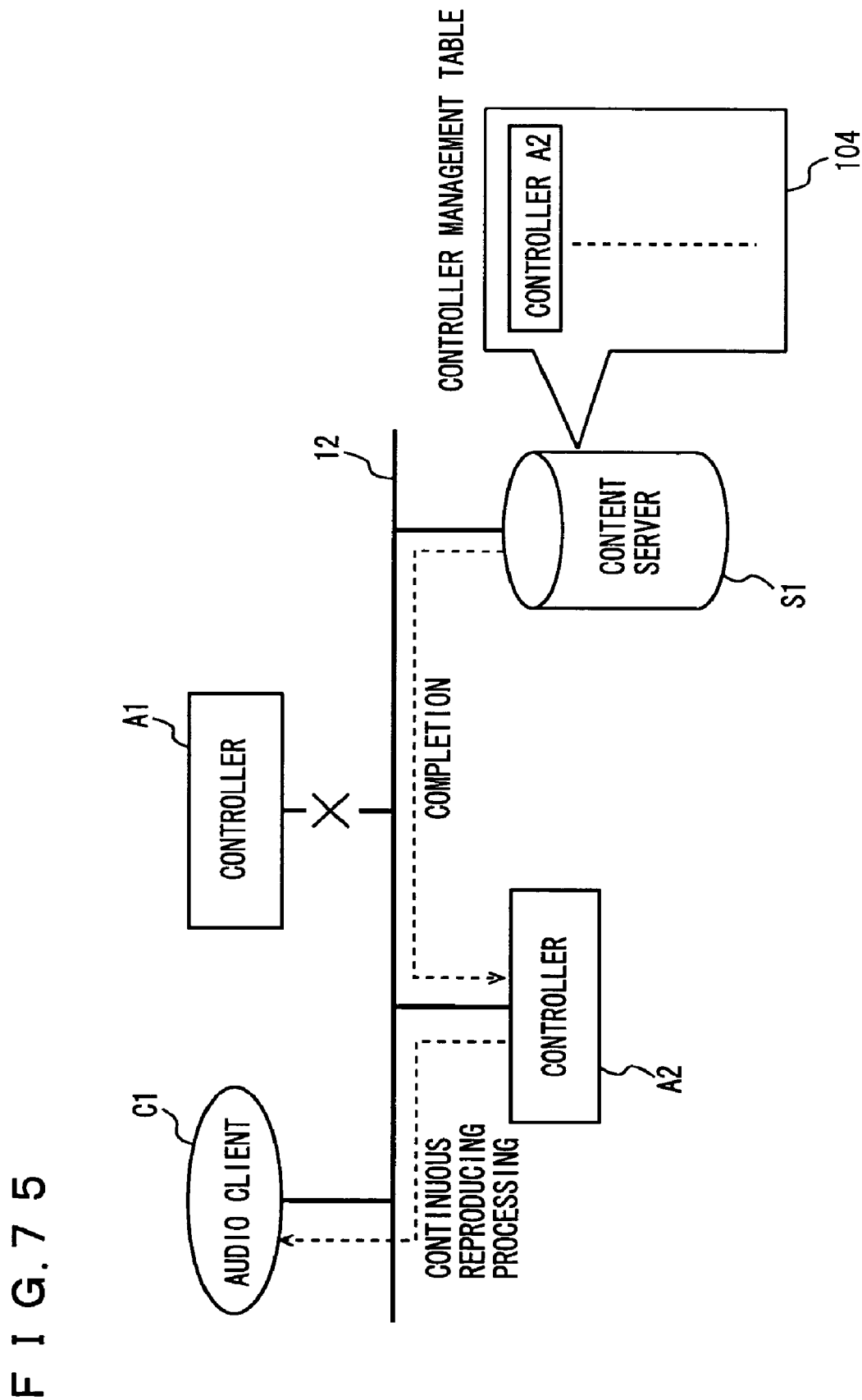
FIG. 75 is a functional block diagram of the continuous reproducing processing when the controller with the highest priority is disconnected in the continuous reproducing processing in FIG. 73.

Note that when the controllers A1 to Ak are disconnected from the content server S1, the content server S1 updates the controller management table 104. More specifically, the controller index of the controller disconnected from the content server S1 is deleted, and the priorities of the controller indexes of the controllers with lower priorities than the deleted index are sequentially advanced. For example as shown in FIG. 75, when the controller A1 with the highest priority is disconnected from the content server S1, the controller A2 with the second highest priority is advanced to replace the controller A1 and obtains the authority about the continuous reproducing processing.

In the above described example, the controller A1 instructs reproducing first, and then the same controller A1 instructs continuous reproducing. Meanwhile, if the controller A2 instructs reproducing first, the controller A1 instructs continuous reproducing as long as the controller A1 has the highest priority. In this case, the controller A1 does not have a music list if it receives the completion status from the content server S1. Therefore, the controller A1 obtains the music list from the content server S1 using the list construction key of the audio client C1 registered in the content server S1 and specifies the next music piece accordingly.

All the music pieces included in the music list are not always stored in the single content server S1 and may be stored in a plurality of content servers such as the content servers S1 and Si in some cases. In this case, the audio client C1 reproduces music pieces in the content server S1 and then must reproduce music pieces in the separate content server Si. Therefore, after reproducing the music pieces in the content server S1, the audio client C1 must disconnect from the content server S1 and has to connect to the content server Si, in other words, server switching processing is carried out.

The audio client C1 connected to the content server Si responds to a reproducing instruction from the controller A1 to request the content server Si to provide the music content of the specified music piece, and the content server Si distributes the requested music content to the audio client C1.

The audio client C1 finishes reproducing the music piece and then transmits a completion status to the content server Si. The content server Si, upon receiving the completion status, refers to the controller management table inside and transfers the completion status to the controller with the highest priority and a stop status to the controllers with lower priorities.

Here, the control management table in the content server Si may be the same as or different from the controller management table in the content server S1. In order that a plurality of content servers use the same controller management table, for example a certain content server may determine the priorities in the controller management table, and transfer the controller management table to the other content servers. Meanwhile, in order that a plurality of content servers use different controller management tables, the content servers each independently determine the priorities in a controller management table.

As described above, according to the embodiment, the content server S1, upon receiving the completion status from the audio client C1, refers to the controller management table, transmits the completion status only to the controller A1 with the highest priority, and the stop status to the other controller A2. Therefore, only the controller A1 with the highest priority instructs continuous reproducing and the other controller A2 does not. Consequently, the possibility of competition between continuous reproducing instructions can be eliminated, and continuous reproducing processing can normally be carried out.

The priorities are determined based on the order of connection with the content server S1 in the above embodiment, but they may be determined in other manners such as based on the order of issuing an instruction to the audio client C1. The plurality of content servers do not have to be provided, and at least one content server is necessary. The plurality of audio clients do not have to be provided either, and at least one audio client is necessary.

1. 2. 3. 3. 7. Continuous Reproducing Control Using Control Handle

Figure 76:
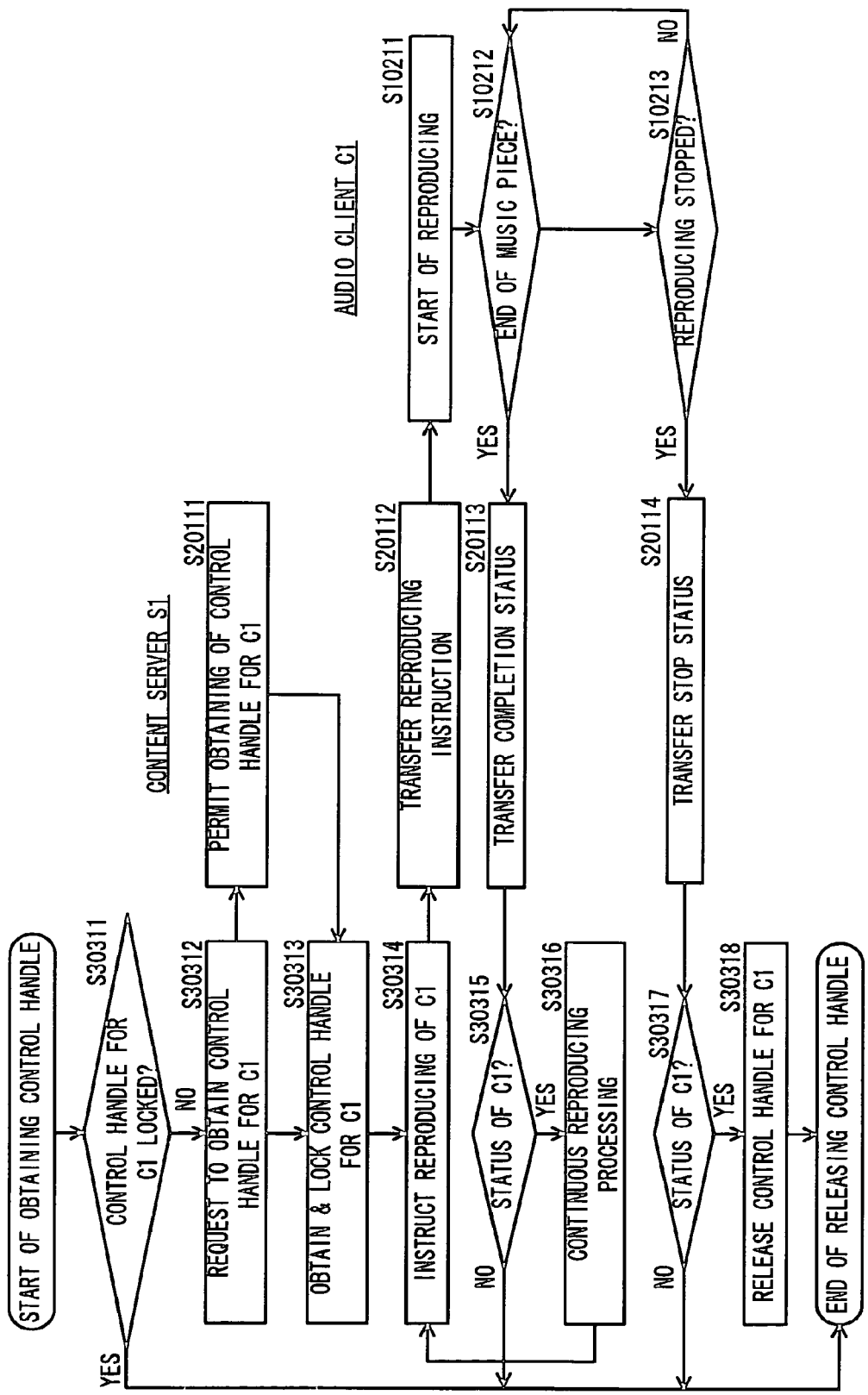
FIG. 76 is a flowchart for use in illustration of the operation of continuous reproducing processing using a control handle.

According to the embodiment, computer programs to carry out the steps shown in FIG. 76 are installed in the content servers S1 to Si, the audio clients C1 to Cj, and the controllers A1 to Ak. Similarly to the above described embodiment, this embodiment may be applied to a network type audio system including the plurality of controllers A1 to Ak, and at least one content server or audio client is necessary.

Unlike the above-described embodiment, according to this embodiment, control handle management tables are stored in the controllers A1 to Ak. An example of the control handle management table is given in the following Table 2. The control handle management table stores the client indexes of the audio clients C1 to Cj and the controller indexes of the controllers A1 to Ak that have the controller handles for the audio clients C1 to Cj in association with each other. A control handle represents the authority to control an audio client. In the example shown in Table 2, the control handle for the audio client C1 is obtained by the controller A1, but the control handles for the audio clients C2 and Cj are not obtained by any of the controllers.

TABLE 2

| control handle management table | |
|---|---|
| audio client | controller having control handle |
| C1 | A1 |
| C2 | — |
| ... | ... |
| Cj | — |

Now, the operation of the embodiment will be described with reference to the flowchart in FIG. 76 particularly in connection with the content server S1, the audio client C1, and the controller A1. Note that in FIG. 76, the steps of obtaining a music list (S30302 and S20102 in FIG. 73) that have been detailed in conjunction with the first embodiment are not shown.

The controller A1 obtains a control handle necessary for controlling the audio client C1 instructing the audio client C1 to reproduce a music piece. More specifically, the controller A1 refers to a control handle management table and determines whether or not the control handle for the audio client C1 is locked (S30311).

If the control handle for the audio client C1 has already been obtained by any of the other controllers A2 to Ak, the controller index of the controller is recorded in connection with the client index of the audio client C1 in the control handle management table shown in Table 2. The state in which the control handle has already been obtained is referred to as "the control handle is locked." Meanwhile, if the control handle for the audio client C1 is not obtained by any of the other controllers A2 to Ak, no controller index is entered in association with the client index of the audio client C1. The state in which the control handle has not been obtained is referred to as "the control handle is not locked (is unlocked)."

In the control handle management table in Table 2, for example, the control handle for the audio client C2 is not locked.

When the control handle for the audio client C1 is locked, the controller A1 cannot successfully obtain the control handle. Meanwhile, if the control handle is unlocked, the controller A1 requests the content server S1 to permit the controller A1 to obtain the control handle (S30312). In response to the request, the content server S1 permits the controller A1 to obtain the control handle (S20111). In this way, the controller A1 obtains the control handle and locks the control handle so that the other controllers A2 to Ak do not obtain the handle (S30313). More specifically, the controller A1 updates the control handle management table and stores the controller index of the controller A1 in association with the client index of the audio client C1. The content server S1 updates the control handle management tables in the other controllers A2 to Ak in synchronization with the above operation.

The controller A1 that has obtained the control handle instructs the audio client C1 to reproduce a music piece in a music list specified in response to the user's operation through the content server S1 (S30314). The content server S1 transfers the reproducing instruction to the audio client C1 (S20112). The audio client C1 starts to reproduce the music piece specified in response to the reproducing instruction (S10211).

Figure 77:
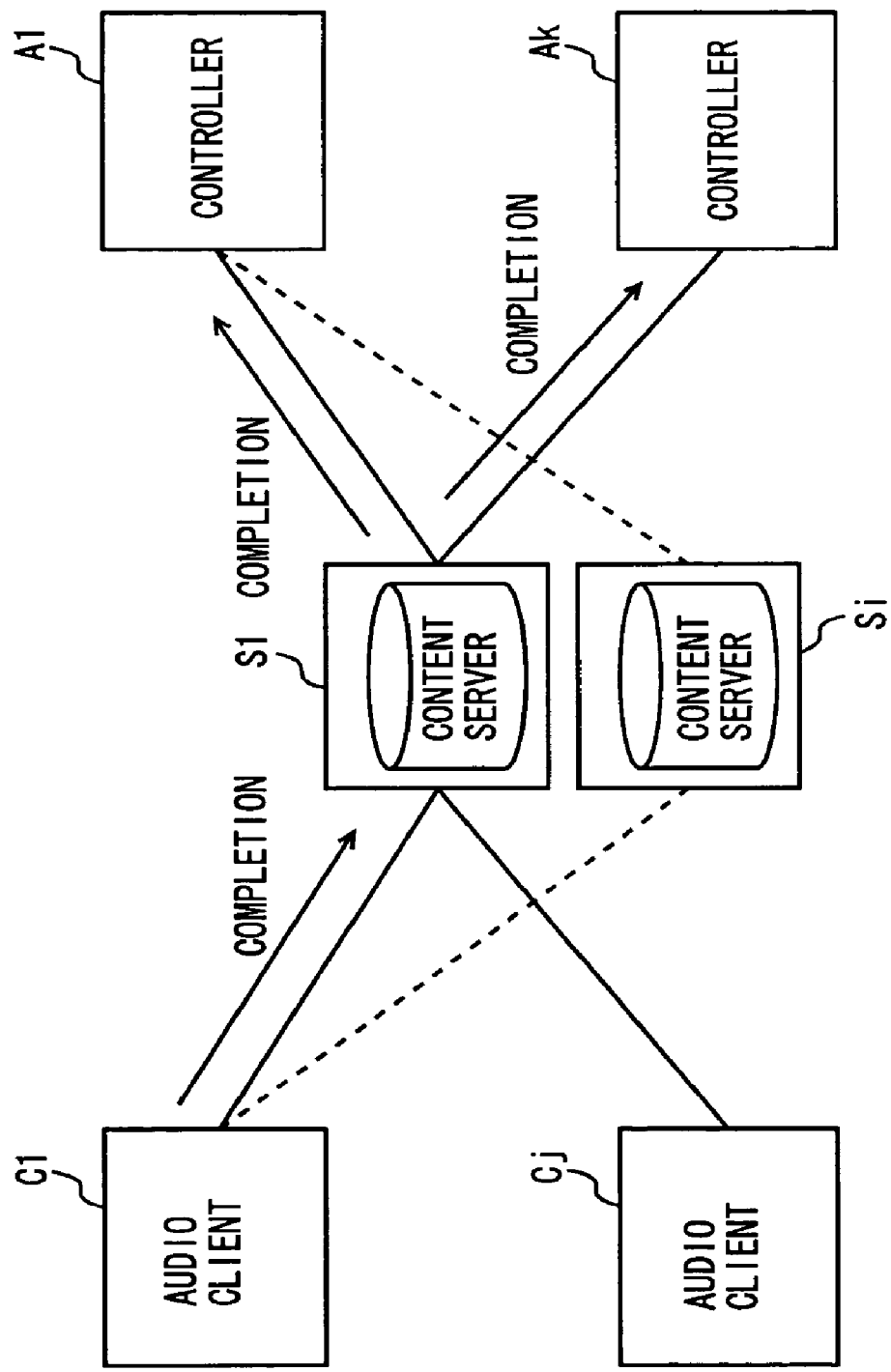
FIG. 77 is a functional block diagram of the continuous reproducing processing in FIG. 76.

The audio client C1 finishes reproducing the music piece to the end and transmits a completion status to the content server S1 as shown in FIG. 77 (S10212). The content server S1 transfers the completion status to all the controllers A1 to Ak (S20113).

The controller A1 determines whether or not the completion status is from the audio client C1 whose control handle is obtained by the controller A1 (S30315). If it is the audio client whose control handle is obtained by the controller A1, the controller carries out continuous reproducing processing (S30316). If otherwise, the controller ignores the completion status and simply monitors the state of the audio client C1. In this example, the controller A1 has the control handle for the audio client C1, therefore carries out continuous reproducing processing (S30316) and instructs to reproduce the next music piece based on the music list (S30314).

Meanwhile, if the audio client C1 does not reproduce the music piece to the end, and stops reproducing midway, the audio client transmits a stop status to the content server S1 (S10213). The content server S1 transmits the stop status to all the controllers A1 to Ak (S20114).

The controller A1 determines whether or not the stop status is from the audio client C1 whose control handle is obtained by the controller A1 (S30317). If the status is from the audio client whose control handle is obtained by the controller A1, the controller unlocks the control handle for the audio client C1 (S30318). If otherwise, the controller ignores the stop status.

In addition to the above case in which the stop status is received from the audio client C1 whose control handle is obtained by the controller A1, the controller A1 also unlocks the obtained control handle when it is disconnected from the content server S1. Once the control handle for the audio client C1 is unlocked, the control handle can be obtained by any of the controllers A1 to Ak.

Note that when music pieces included in a music list are stored in a plurality of content servers S1 and Si, the audio client C1 switches the connection between the content server S1 to the other content server Si as shown in FIG. 77 similarly to the above described first embodiment. If the content server Si receives the completion status from the audio client C1, it is unknown which controller among the controllers A1 to Ak has instructed the audio client C1 to reproduce the music piece that the audio client C1 has finished reproducing. Therefore, also in this case, the content server Si transfers the completion status to all the controllers A1 to Ak. Since the controllers A1 to Ak have the control handle management tables, they carry out continuous reproducing processing only when the completion status is from the audio client whose control handle is obtained by each of the controllers. In this example, the controller A1 has obtained the control handle for the audio client C1, and therefore only the controller A1 carries out continuous reproducing processing.

As in the foregoing, the controllers A1 to Ak each have a control handle management table, and therefore if the content server transmits the completion status transmitted from the audio client C1 to all the controllers A1 to Ak, the controllers A1 to Ak each carry out continuous reproducing processing only when the completion status is received from a corresponding audio client whose control handle is obtained by each controller. Consequently, the possibility of competition between continuous reproducing instructions can be eliminated, and continuous reproducing processing can normally be carried out.

Note that the control handle management tables are stored in the controllers A1 to Ak according to the embodiment, but they may be stored in the content servers S1 to Si.

Rather than locking the control handle, the control handle may be obtained by the controller that instructs last. More specifically, when a controller A1 obtains the control handle for an audio client C1, and a different controller A2 instructs the audio client C1 to reproduce, the controller A2 may obtain the control handle while the controller A1 may lose the control handle.

1. 2. 3. 3. 8. Continuous Reproducing Control by Content Server

Figure 78:
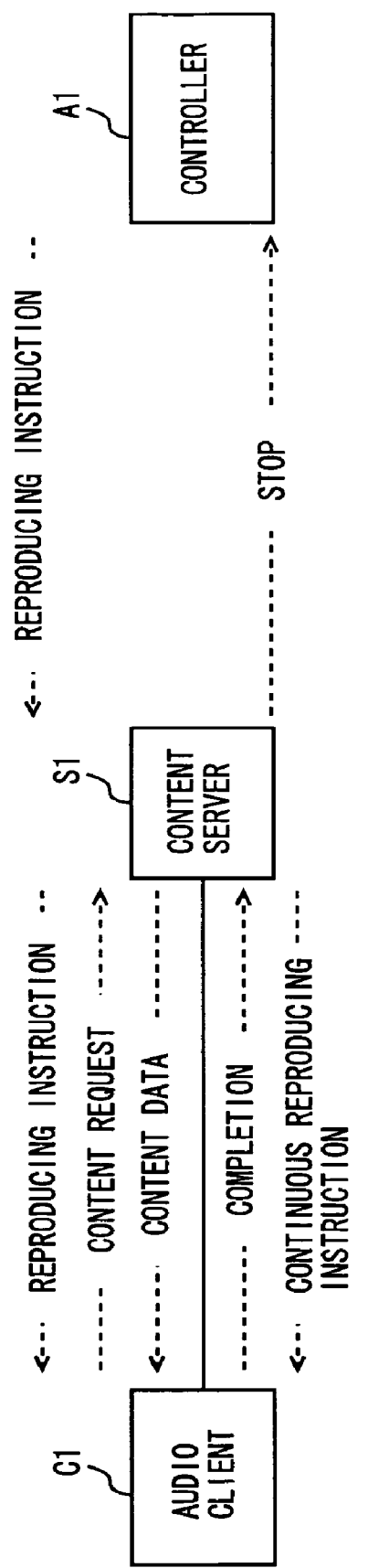
FIG. 78 is a functional block diagram of the continuous reproducing processing by a content server.

To begin with, a simple example including a single content server, a single audio client, and a single controller will be described in conjunction with FIG. 78.

Similarly to the above-described embodiment, the controller A1 instructs the audio client C1 to reproduce a music piece through the content server S1. The audio client C1 responds to the instruction to request the content server S1 to provide the music content of the music piece. The content server S1 responds to the request to distribute the music content to the audio client C1. The audio client C1 starts to reproduce the music piece based on the music content and transmits a completion status to the content server S1 once the audio client finishes reproducing the music piece to the end. The content server S1 responds to the received completion status to instruct the audio client C1 to continuously reproduce the next music piece as opposed to the embodiment described above and transmits a stop status to the controller A1.

Figure 79:
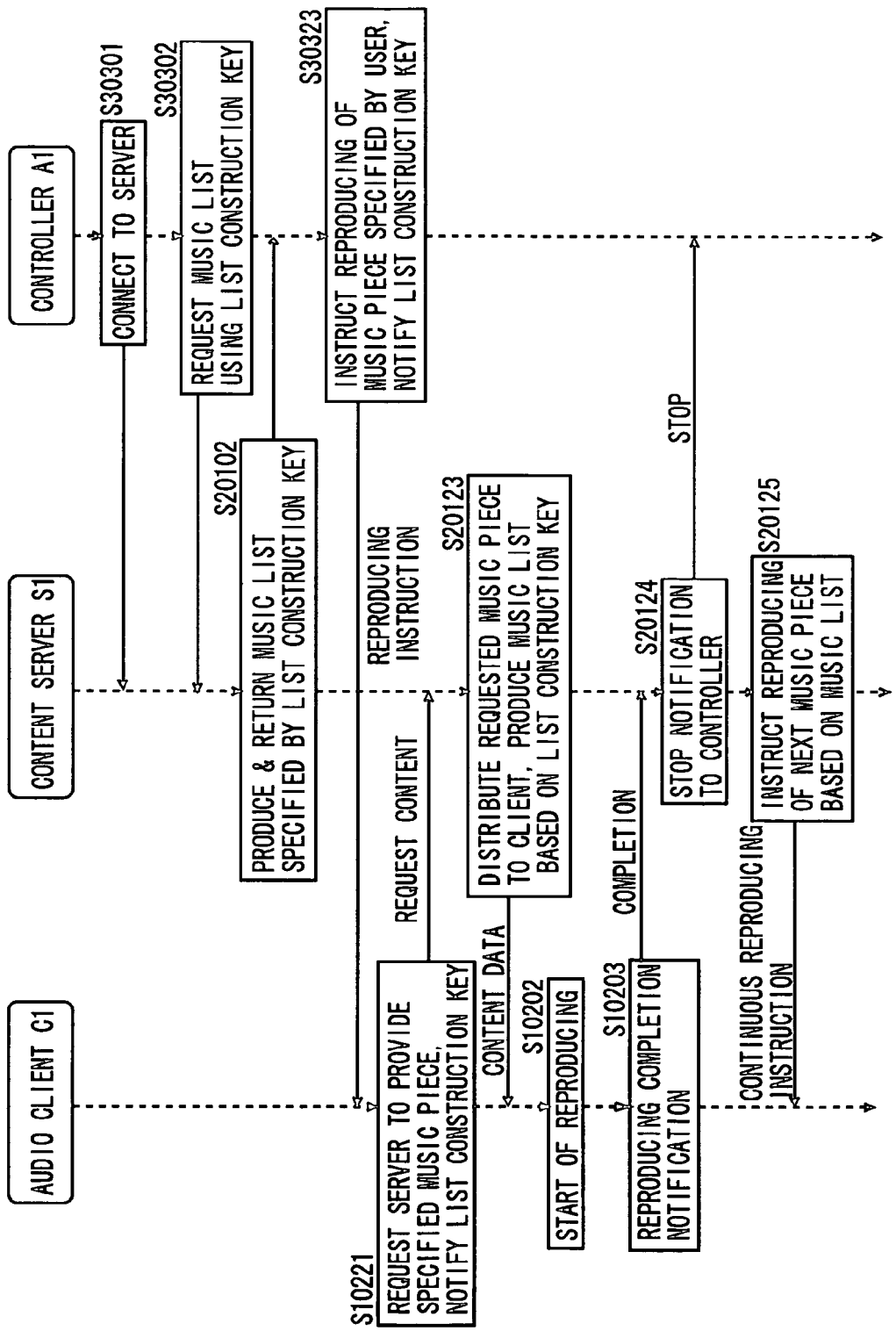
FIG. 79 is a flowchart for use in illustration of the operation of the continuous reproducing processing in FIG. 78.

The process will be detailed in conjunction with the flowchart in FIG. 79. According to the embodiment, computer programs to carry out the steps shown in FIG. 79 are installed in the content server S1, the audio client C1, and the controller A1. Steps S30323, S10221, and S20123 to S21125 in FIG. 79 are different from the embodiment shown in FIG. 73, and therefore these steps will be particularly detailed in the following description.

The controller A1 instructs the audio client C1 to reproduce a music piece similarly to the above described embodiment, but unlike the above embodiment, a list construction key used for obtaining a music list in step S30302 is transmitted to the audio client C1 (S30323).

The audio client C1 requests the content server S1 to provide the music content of the music piece specified similarly to the first embodiment and transfers the list construction key transmitted from the controller A1 to the content server S1 (S10221).

The content server S1 distributes the music content of the specified music piece to the audio client C1 similarly to the embodiment described above but produces a music list based on the list construction key transferred from the audio client C1 (S20123), which is different from the above described embodiment. The list construction key and the music list are stored in association with the client index of the audio client C1 as client information. In this way, the content server S1 is informed of the music list being reproduced by the audio client C1 in response to an instruction from the controller A1.

After the end of reproducing the music piece, the content server S1 receives a completion status from the audio client C1 and transmits a stop status to the controller A1 as opposed to the above described embodiment (S20124). The content server S1 instructs the audio client C1 to reproduce the next music piece based on the music list produced in step S20123 (S20125).

As in the foregoing, according to the embodiment, the content server S1 itself instructs continuous reproducing, and therefore continuous reproducing processing can normally be carried out without competition between continuous reproducing instructions from controllers.

Figure 80:
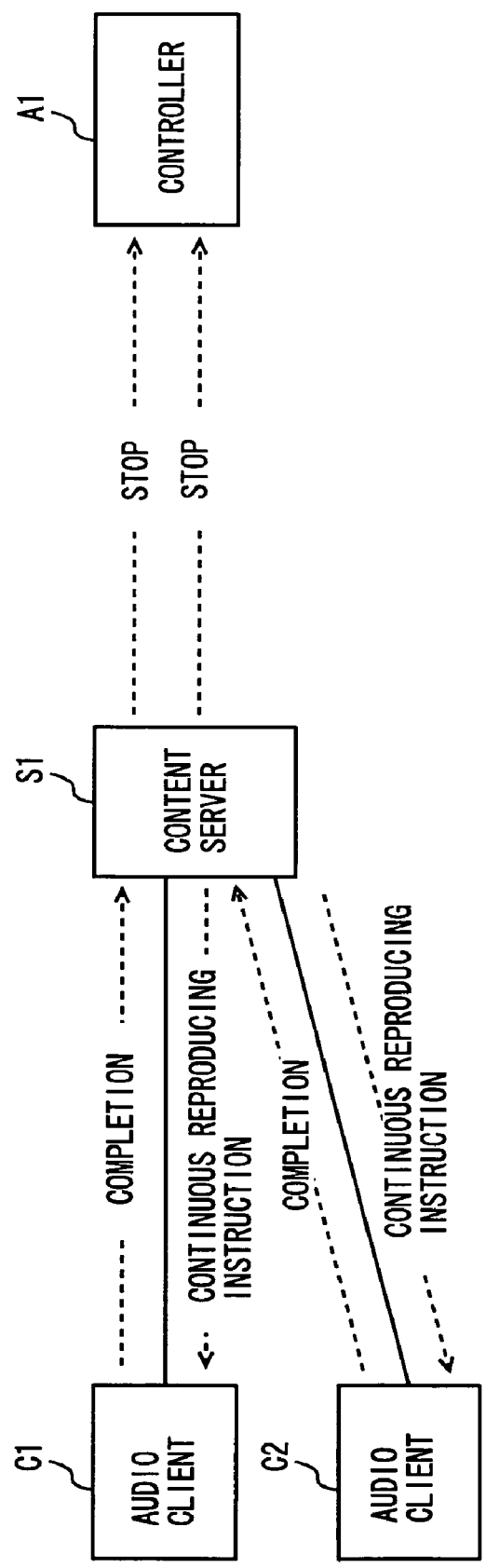
FIG. 80 is a functional block diagram of the continuous reproducing processing when there are a plurality of audio clients in the continuous reproducing processing in FIG. 78.

In the above example, there is only one client, but there may be two or more clients. In the example shown in FIG. 80, the audio clients C1 and C2 are connected to the content server S1. Similarly to step S20123 described above, the content server S1 stores the list construction key and the music list presently being reproduced by the audio client C1 to C2. When a completion status is transmitted to the content server S1 from the audio client C1, the content server S1 instructs the audio client C1 to carry out continuous reproducing based on the stored music list of the audio client C1 and transmits a stop status to the controller A1. When a completion status is transmitted to the content server S1 from the audio client C2, the content server S1 instructs the audio client C2 to carry out continuous reproducing based on the music list of the audio client C2 and transmits a stop status to the controller A1. In this way, the content server S1 instructs continuous reproducing separately to the audio clients C1 and C2 and therefore there is no possibility of competition between continuous reproducing instructions.

Similarly to the audio clients, two or more content servers may be provided. In the example shown in FIG. 81, the audio clients C1 and C2 are connected to the content server S1, and the audio client C3 is connected to the content server S2. In this case, one content server is connected to each client, and the audio client transmits a completion status only to the content server that the client is connected to. Similarly to the above, in response the completion status received from the audio client C1, the content server S1 instructs the audio client C1 to carry out continuous reproducing. In response to a completion status from the audio client C2, the content server S1 instructs the audio client C2 to carry out continuous reproducing. Further in this case, in response to the completion status received from the audio client C3, the content server S2 instructs the audio client C3 to carry out continuous reproducing. In this case, only one content server instructs each audio client to carry out continuous reproducing on the network, and therefore there is no possibility of competition between continuous reproducing instructions.

In the example shown in FIG. 81, when the controller A1 instructs the audio client C2 to reproduce a music piece stored in the content server S2 through the content server S1, the audio client C2 disconnects from the content server S1, and then connects to the content server S2 as shown in FIG. 82. At the time, the content server S2 produces a music list based on a list construction key transmitted from the audio client C2 and stores the list construction key and the music list as the client information of the audio client C2. When the audio client C2 finishes reproducing the music piece distributed from the content server S2, the audio client C2 transmits a completion status to the content server S2. The content server S2 responds to the completion status to instruct the audio client C2 to carry out continuous reproducing and transmits a stop status to the controller A1. Again, only one content server instructs continuous reproducing to each audio client on the network, and therefore there is no possibility of competition between continuous reproducing instructions.

Figure 83:
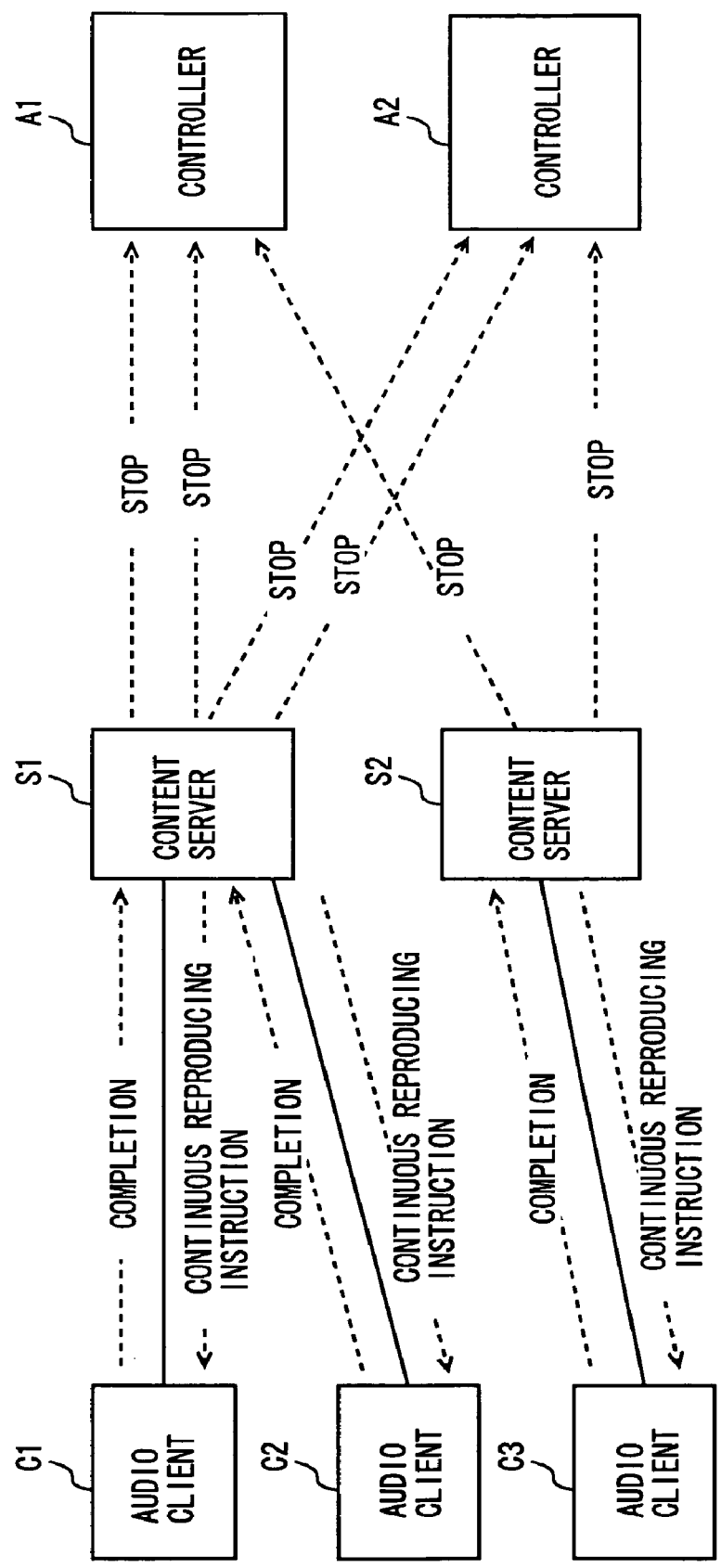
FIG. 83 is a functional block diagram of the continuous reproducing processing when there are a plurality of controllers in the continuous reproducing processing in FIG. 81.

Similarly to the audio clients and the content servers, two or more controllers may be provided. In the example shown in FIG. 83, there are the controllers A1 and A2. The content server S1 transmits a stop status not only to the controller A1 but also to the controller A2 in response to a completion status from the audio client C1 or C2. The content server S2 also transmits a stop status not only to the controller A1 but also to the controller A2 in response to a completion status received from the audio client C3. In this way, the controllers A1 and A2 are not capable of instructing continuous reproducing, can simply monitor the states of the audio clients C1 to C3, and therefore do not affect continuous reproducing processing.

1. 2. 3. 3. 9. Continuous Reproducing Control by Audio Client Itself

Figure 84:
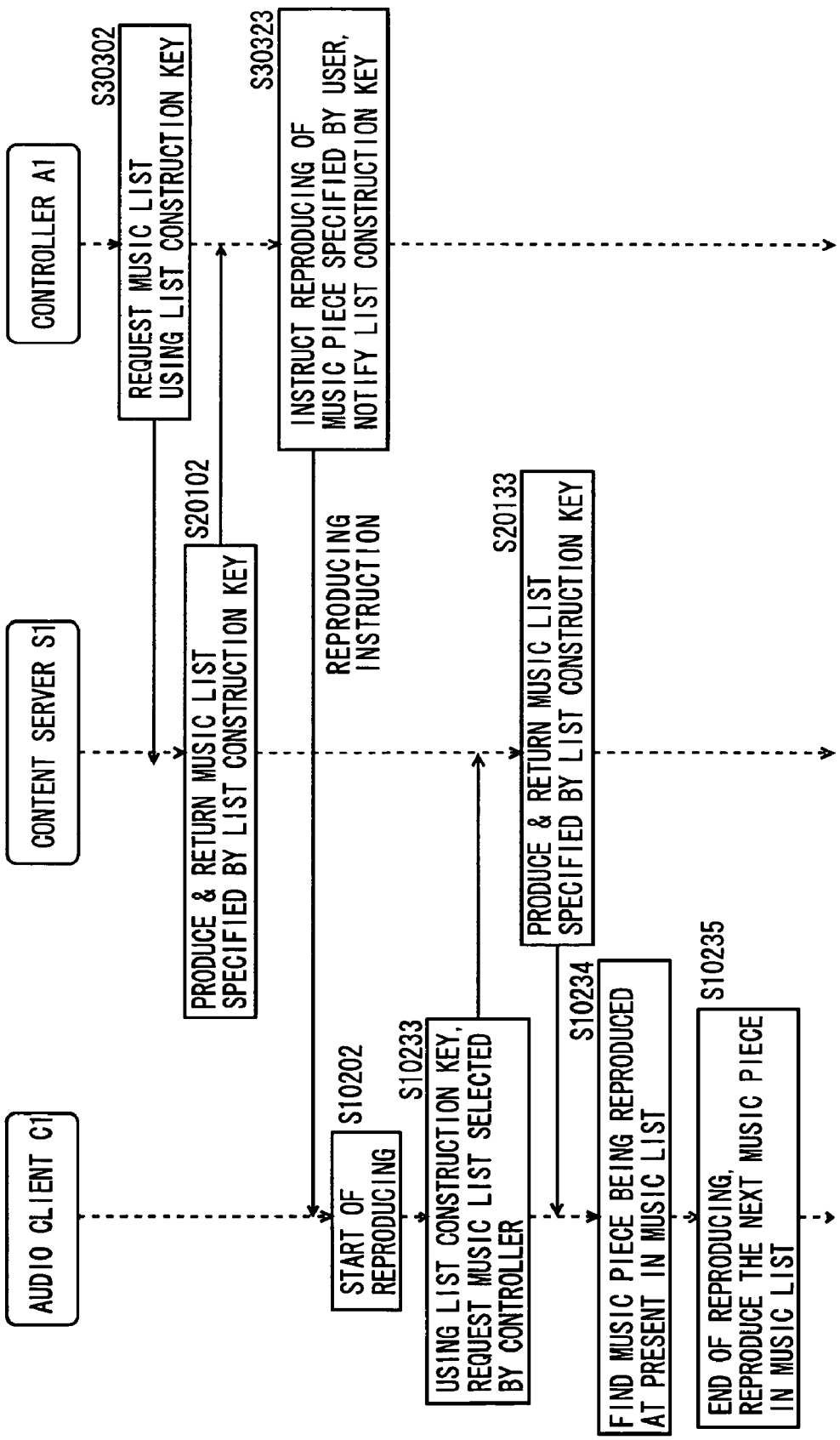
FIG. 84 is a flowchart for use in illustration of the operation of continuous reproducing processing by an audio client on its own.

According to the embodiment, computer programs to carry out the steps shown in FIG. 84 are installed in the content servers S1 to Si, the audio clients C1 to Cj, and the controllers A1 to Ak. Steps S10233 to S10235 in FIG. 84 are different from the embodiment shown in FIG. 79, and therefore these steps are particularly detailed here.

Similarly to the embodiment shown in FIG. 79, the controller A1 instructs the audio client C1 to reproduce a specified music piece and transmits a list construction key to the audio client C1 (S30323). The audio client C1 requests the content server S1 to provide the specified music piece and starts to reproduce the music piece distributed from the content server S1 in response to the request (S10202). At the time, the audio client C1 stores the list construction key transmitted from the controller A1.

The audio client C1 transmits the stored list construction key to the content server S1 and requests the content server S1 to provide the music list the same as that used in selecting the music piece by the controller A1 (S10233). The content server S1 produces a music list based on the received list construction key and transmits the list to the audio client C1 (S20133). The audio client C1 stores the received music list and specifies the music piece presently being reproduced in the music list (S10234).

The audio client C1 finishes reproducing the music piece to the end and reproduces the next music piece based on the stored music list (S10235).

Note that when the music pieces included in the music list are stored in a plurality of content servers, the audio client C1 carries out server switching processing similarly to the above.

As in the foregoing, according to the embodiment, the audio client C1 itself has a list construction key and obtains a music list using the key, and therefore the audio client C1 itself can carry out the continuous reproducing processing. Therefore, the audio client C1 does not receive a continuous reproducing instruction from the controller A1 or the content server S1, and there is no possibility of competition between continuous reproducing instructions.

According to the embodiment, the audio client C1 obtains the music list using the list construction key while the music piece is reproduced, it may be obtained after reproducing the music piece. Although the audio client C1 stores the obtained music list, the audio client may obtain a music list using a list construction key every time continuous reproducing is carried out rather than storing the list.

Figure 85:
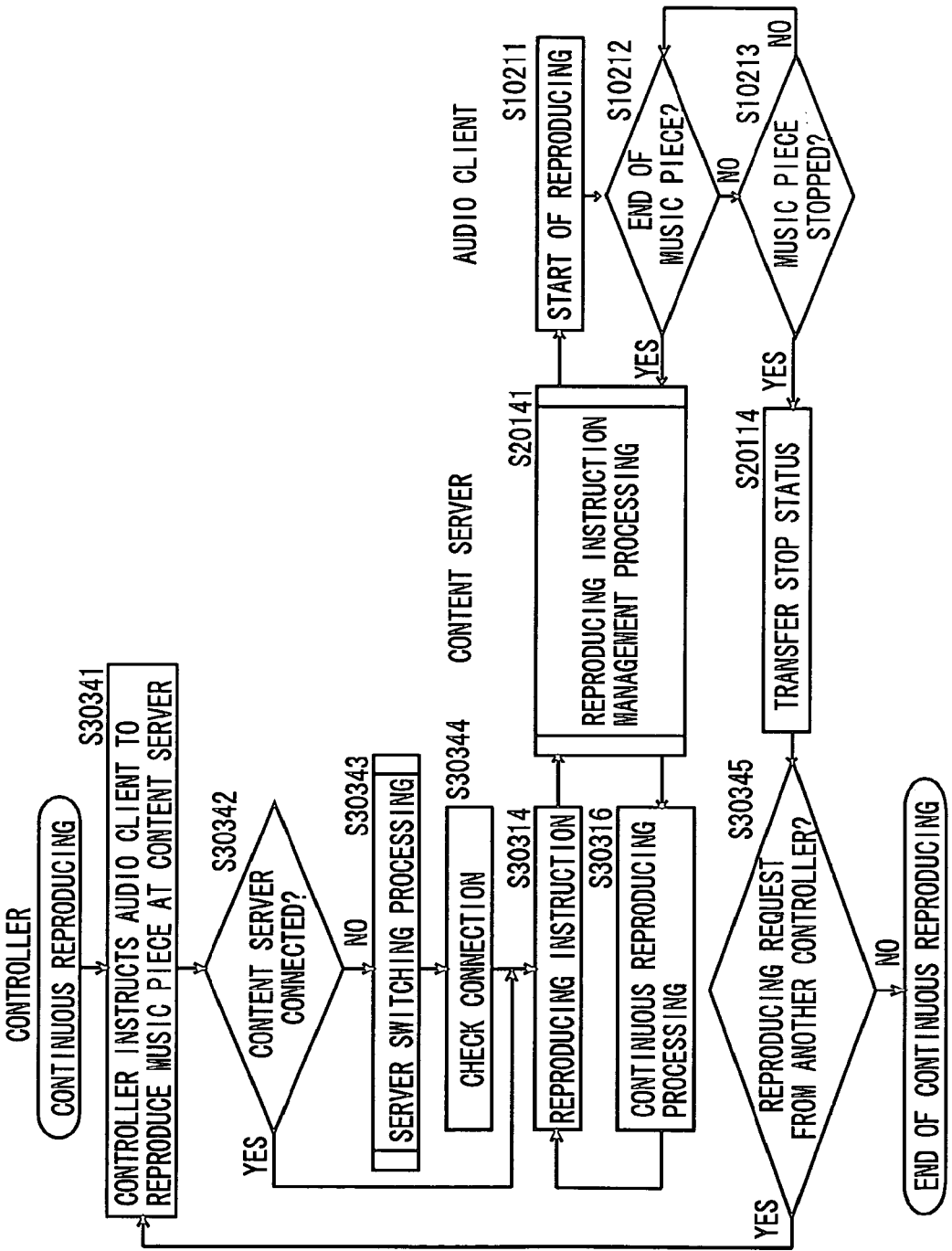
FIG. 85 is a flowchart for use in illustration of the operation of continuous reproducing processing using a reproducing instruction management table.

1. 2. 3. 3. 10. Continuous Reproducing Control Using Reproducing Instruction Management Table According to the embodiment, computer programs to carry out the steps shown in FIG. 85 are installed in the content servers S1 to Si, the audio clients C1 to Cj, and the controllers A1 to Ak. Steps S30341 to S30345, and S20141 in FIG. 85 are different from the embodiment shown in FIG. 76, and therefore these steps are particularly detailed here.

The content server S1 according to the embodiment stores a reproducing instruction management table including client indexes and controller indexes in association with each other. An example of the table is shown in the following Table 3. The reproducing instruction management table shown in Table 3 stores the controller index of the controller A1 that has last instructed the audio client C1 to carry out reproducing. The table also stores the controller index of the controller A2 that has last instructed the audio client C2 to carry out reproducing.

TABLE 3

| reproducing instruction management table | |
|---|---|
| client | controller |
| C1 | A1 |
| C2 | A2 |
| C3 | — |
| ... | ... |
| Cj | — |

Now, referring to the flowchart in FIG. 85, the operation of the embodiment will be described.

A certain controller instructs a certain audio client to reproduce a music piece stored in a certain content server (S30341).

Figure 86:
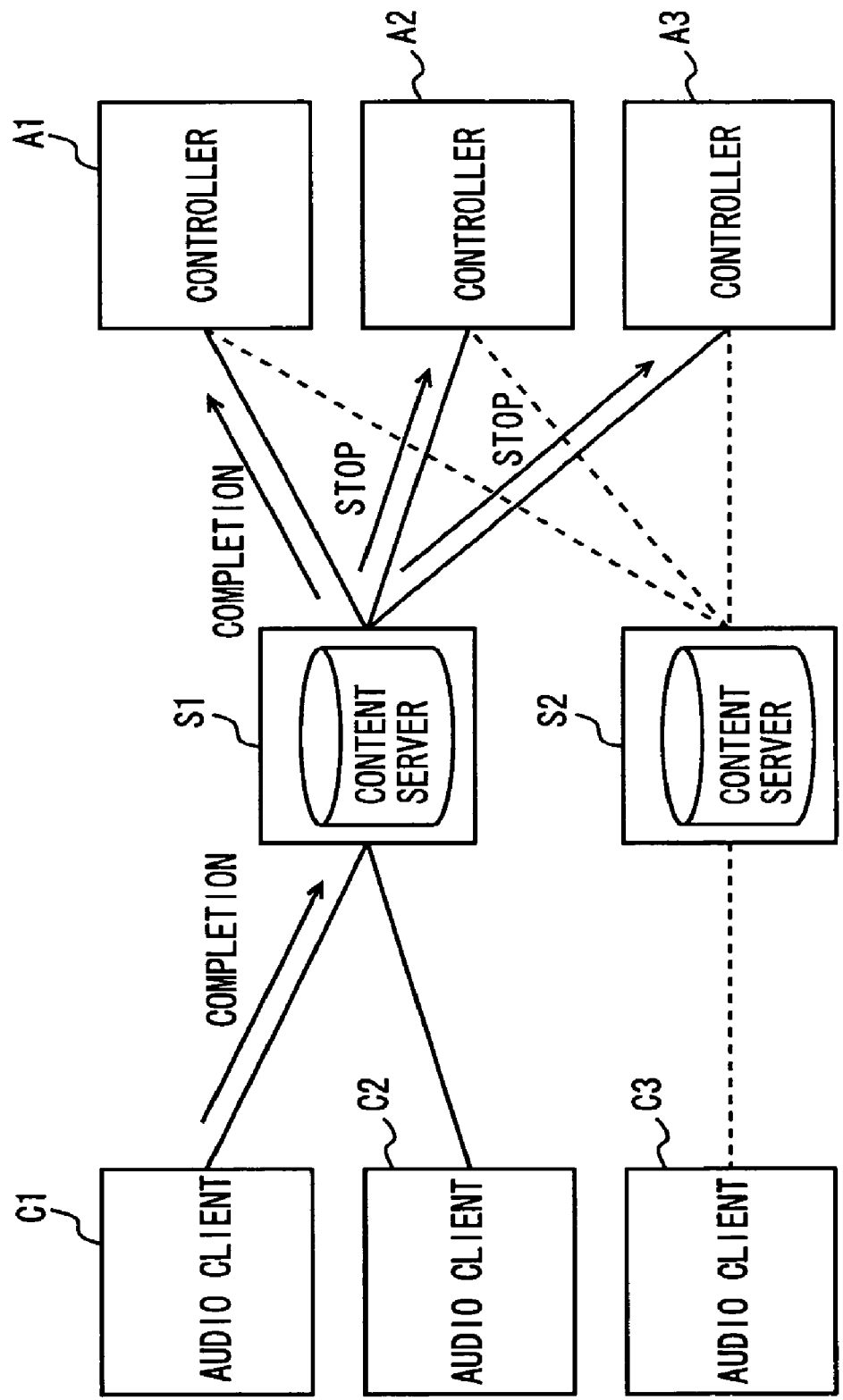
FIG. 86 is a functional block diagram of details of the continuous reproducing processing in FIG. 85.

As shown in FIG. 86, the controller A1 instructs the audio client C1 to reproduce a music piece stored in the content server S1 through the content server S1. In this example, the audio clients C1 and C2 and controllers A1 to A3 are connected to the content server S1.

The controller A1 determines whether or not the audio client C1 is connected to the content server S1 (S30342). In this example, the audio client C1 is connected to the content server S1, and the process proceeds to step S30314.

The controller A1 instructs the audio client C1 to reproduce a music piece specified in a music list through the content server S1 (S30314). The content server S1 carries out predetermined reproducing instruction management processing in response to the reproducing instruction (S20141).

Figure 87:
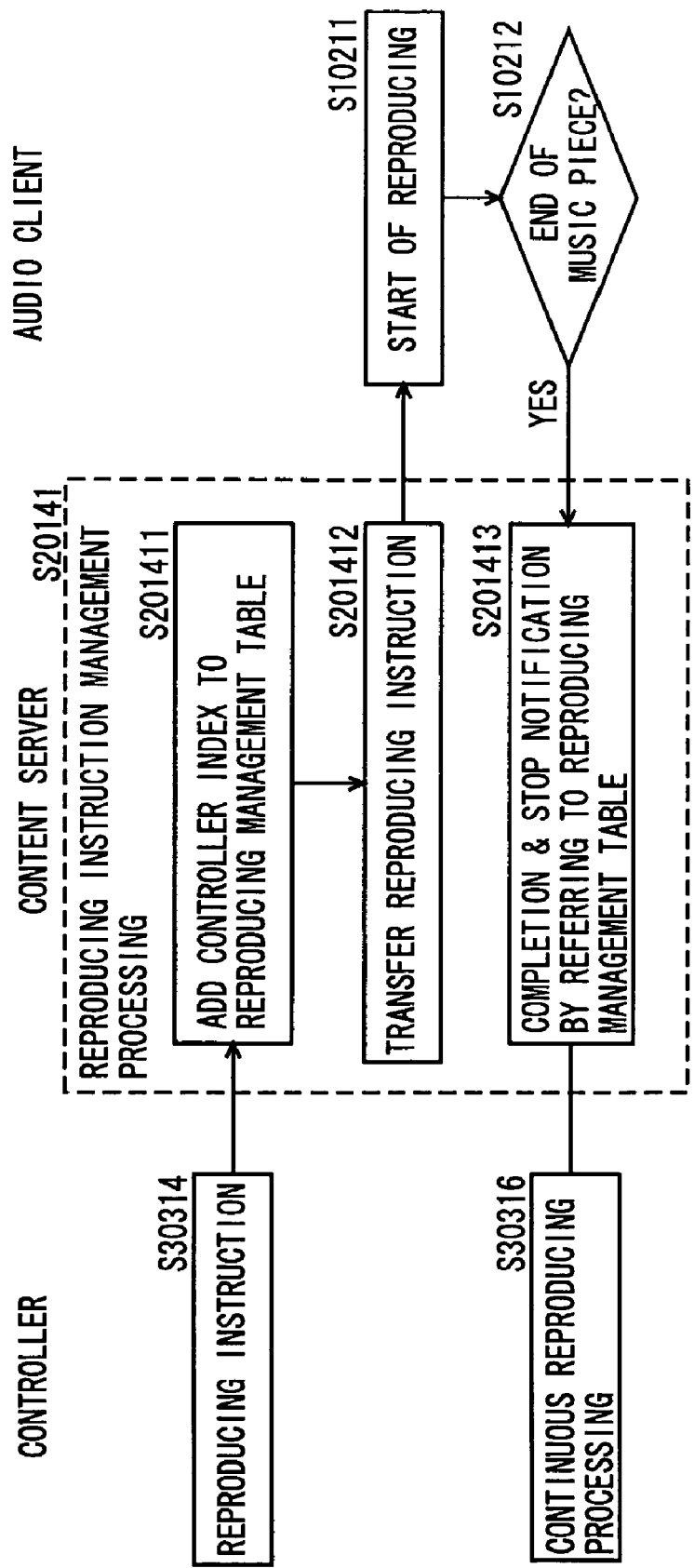
FIG. 87 is a flowchart for use in illustration of details of the reproducing instruction management processing in FIG. 85.

More specifically, referring to FIG. 87, the content server S1 stores the controller index of the controller A1 in association with the client index of the audio client C1 in the reproducing instruction management table (S201441). In this way, the content server S1 stores the controller A1 as the controller that has last instructed the audio client C1 to carry out reproducing. The content server S1 transfers the reproducing instruction from the controller A1 to the audio client C1 (S201412).

The audio client C1 starts to reproduce a music piece in response to the reproducing instruction from the controller A1 (S10211) and transmits a completion status to the content server S1 once the reproducing is complete (S10212).

The content server S1 specifies the controller A1 that has last instructed the audio client C1 to carry out reproducing by referring to the reproducing instruction management table in response to the completion status from the audio client C1 and transmits the completion status to the controller A1 and a stop status to the other controllers A2 and A3 (S201413). In response to the received completion status, the controller A1 carries out continuous reproducing processing to the audio client C1 (S30316). Meanwhile, in response to the received stop status, the controllers A2 and A3 do not take any positive action and simply monitor the state of the audio client C1.

When the audio client C1 reproduces a music piece in response to the instruction from the controller A1, and any other controller such as the controller A2 instructs the audio client C1 to reproduce another music piece, the audio client C1 stops reproducing the present music piece and starts to reproduce the new music piece in response to the instruction from the controller A2. At the time, the content server S1 updates the reproducing instruction management table and replaces the controller index of the controller A1 by the controller index of the controller A2 as shown in Table 4.

TABLE 4

| reproducing instruction management table | |
|---|---|
| client | controller |
| C1 | A1→A2 |
| C2 | A2 |
| C3 | — |
| ... | ... |
| Cj | — |

Figure 88:
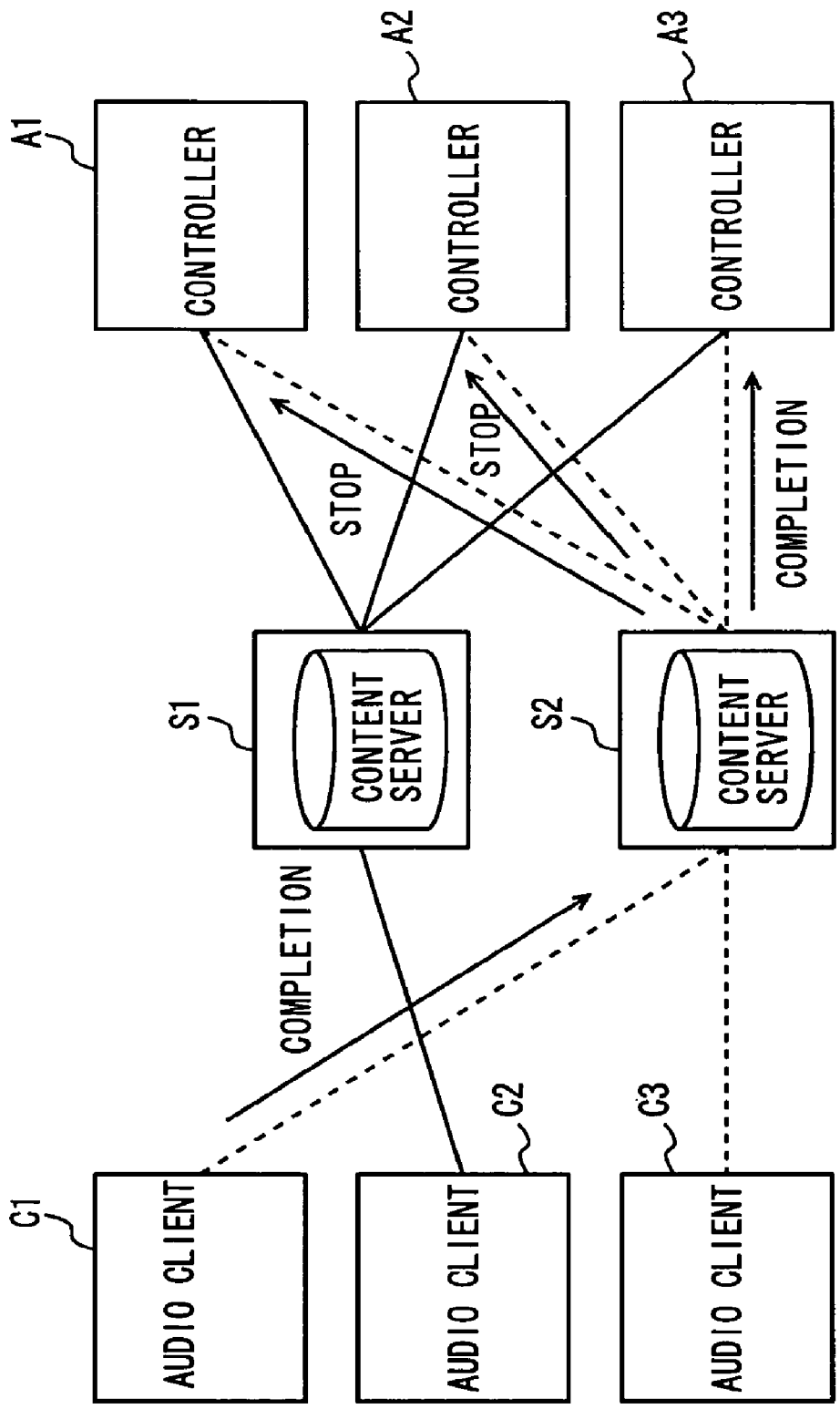
FIG. 88 is a functional block diagram of continuous reproducing processing when the content server is switched in the continuous reproducing processing in FIG. 85.

Now, as shown in FIG. 88, how the controller A3 instructs the audio client C1 to reproduce a music piece stored in the different content server S2 through the content server S1 will be described.

The controller A3 determines whether or not the audio client C1 is connected to the content server S2 (S30342). In this example, since the audio client C1 is not connected to the content server S2, the controller A3 carries out predetermined server switching processing (S30343).

Figure 89:
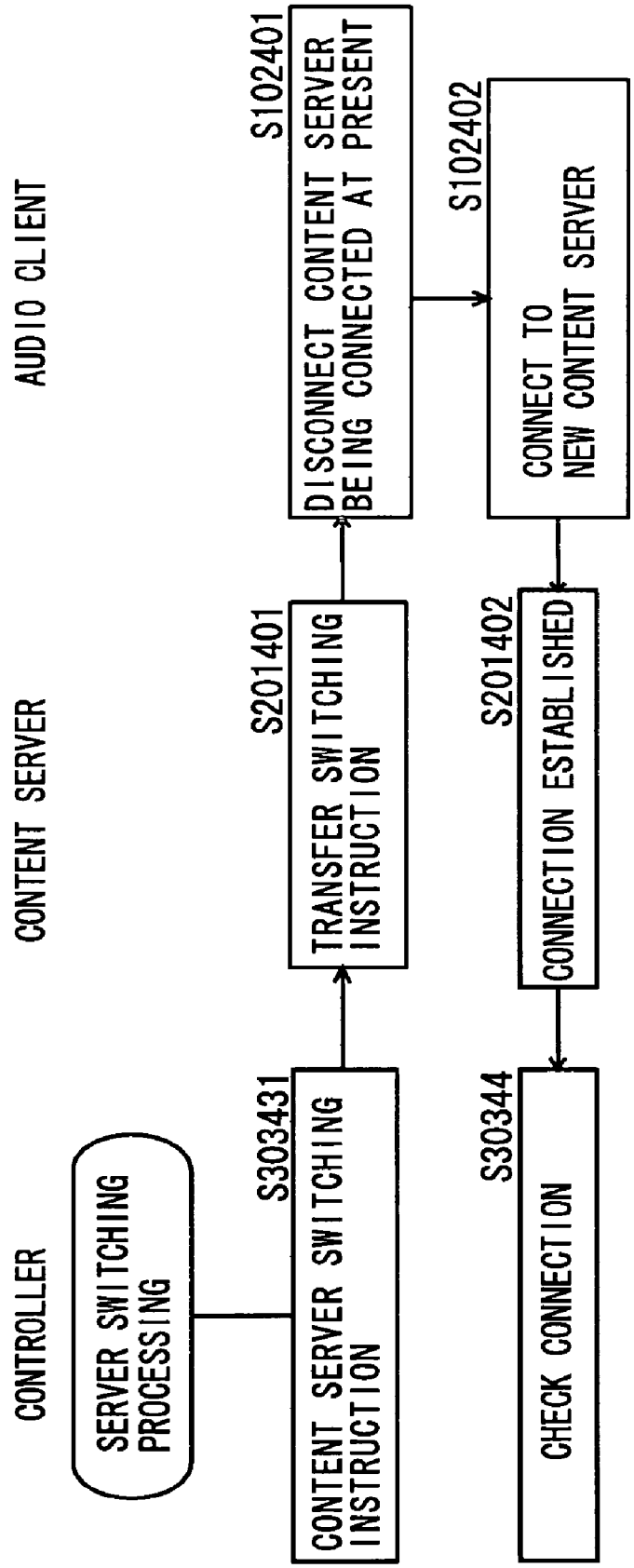
FIG. 89 is a flowchart for use in illustration of details of the server switching processing in FIG. 85.

More specifically, referring to FIG. 89, the controller A3 instructs the audio client C1 to switch from the content server S1 to the content server S2 through the content server S1 (S303431). The content server S1 transmits the switching instruction to the audio client C1 (S201401). The audio client C1 disconnects the content server S1 presently being connected (S102401) and requests connection to the new content server S2 in response to the switching instruction (S102402). The content server S2 establishes connection with the audio client C1 in response to the request (S201402). The controller A3 checks the connection with the content server S2 (S30344).

Then, the controller A3 instructs the audio client C1 to reproduce a music piece through the content server S2 (S30314). The content server S2 responds to the reproducing instruction to store the controller index of the controller A3 in association with the client index of the audio client C1 in the reproducing instruction management table as in Table 5 (S201441).

TABLE 5 reproducing instruction management table

| client | controller |
|---|---|
| C1 | A3 |
| C2 | — |
| C3 | — |
| ... | ... |
| Cj | — |

The content server S2 transfers the reproducing instruction from the controller A3 to the audio client C1 (S201412).

The audio client C1 starts to reproduce the music piece in response to the reproducing instruction from the controller A3 (S10211), and transmits a completion status to the content server S2 after reproducing the music piece (S10212). The content server S2 specifies the controller A3 that has last instructed the audio client C1 to reproduce by referring to the reproducing instruction management table in response to the completion status received from the audio client C1. Then, the content server S2 transmits a completion status to the controller A3 and a stop status to the other controllers A1 and A2 (S1413). The controller A3 carries out continuous reproducing processing to the audio client C1 in response to the received completion status (S30316). Meanwhile, the controllers A1 and A2 do not take any positive action in response to the stop status and simply monitor the state of the audio client C1.

As in the foregoing, according to the embodiment, the content server manages the controller that has last instructed the audio client to carry out reproducing and transfers a completion status from the audio client only to the controller, and therefore only the controller instructs the audio client to carry out continuous reproducing. Consequently, there is no possibility of competition between continuous reproducing instructions, and the continuous reproducing processing can normally be carried out.

1. 2. 4. AV Receiver Control

As shown in FIG. 90, AVR clients AC1 and AC2 are connected to the LAN 12. The AV receiver AVR1 is connected to the AVR client AC1 by EIA-232. The AV receiver AVR2 is connected to the AVR client AC1 through USB. The AV receiver AVR3 is connected to the AVR client AC2 through a manufacturer-specific serial interface.

The AVR clients AC1 and AC2 may each notify information related to the interface such as the EIA-232 and USB to the content server Si when the connection with the content server is established.

For the USB, the AVR client AC1 can obtain machine information such as the vendor ID or product ID of the AV receiver AVR2 and notify the information to the content server Si. For the EIA-232, the AVR client AC1 usually cannot obtain the machine information of the AV receiver AVR1, and therefore the vendor ID or product ID of the AV receiver AVR1 are registered in the AVR client AC1 in advance, so that the AVR client can notify the information to the content server Si.

When there are a number of AV receivers that can be connected, the communication protocol with the AVR client is predetermined, so that the AVR client may obtain the machine information of the AV receiver. For example, the AVR client may transmit a packet for inquiring about machine information at prescribed intervals (such as one second) in prescribed communication conditions (including the bit rate, bit length, and parity), and the AV receiver may return a packet including the machine information in response. In this way, the AVR client can specify the connected AV receiver. In this case as well as the case with the USB, the AVR client may obtain the machine information of the AV receiver after the connection with the content server is established, and therefore, a change in the machine information is notified to the content server Si when the machine information of the AV receiver is obtained.

Consequently, the content server Si may obtain the machine information of all the AV receivers AVR1 to AVR3 connected to or to be connected to the AVR clients AC1 and AC2. The machine information is also notified to the controller Ak from the content server Si, and therefore the controller Ak can obtain the machine information.

As shown in FIG. 91, the AV receiver AVR has various controlled elements such as a volume control, an input selector switch, and a DSP (digital signal processor) for sound field control. The controller Ak specifies such a controlled element and issues a control command. Therefore, the controller has the machine information about the kinds of controlled elements the AV receiver AVR has.

Note that since the content server Si has the machine information, the controller Ak may request the content server Si to provide the machine information using the vendor ID and product ID of the AV receiver AVR as a key.

The control command is output from the controller Ak and transmitted to the AV receiver AVR through the content server Si and the AVR client AC. Conversely, the status is output from the AV receiver AVR and transmitted to the controller Ak through the AVR client AC and the content server Si.

The AVR client AC determines that the control command is for the AV receiver AVR and then outputs the control command to the AV receiver AVR. If the command is used to control the value of the volume, the control command issued by the controller Ak is transmitted to the AV receiver ACR through the content server Si and the AVR client AC, so that the volume is controlled.

Referring to FIG. 92, the controller Ak transmits the control command to the content server Si (S35), the content server Si transmits the command to a specified AVR client AC (S28), and then the AVR client transmits it to the AV receiver AVR (S101). The AVR client AC transmits the status received from the AV receiver AVR to the content server Si (S102), the content server Si transmits this to the controller Ak (S29), and the controller Ak updates the status of the AV receiver AVR in response (S36).

As shown in FIG. 93, the content server Si, the AVR clients AC1 to AC3, and the AV receivers AVR11, AVR12, AVR21, AVR31, and AVR32 transmit a control command in a tree-like path having the content server Si as the root.

Figure 94:
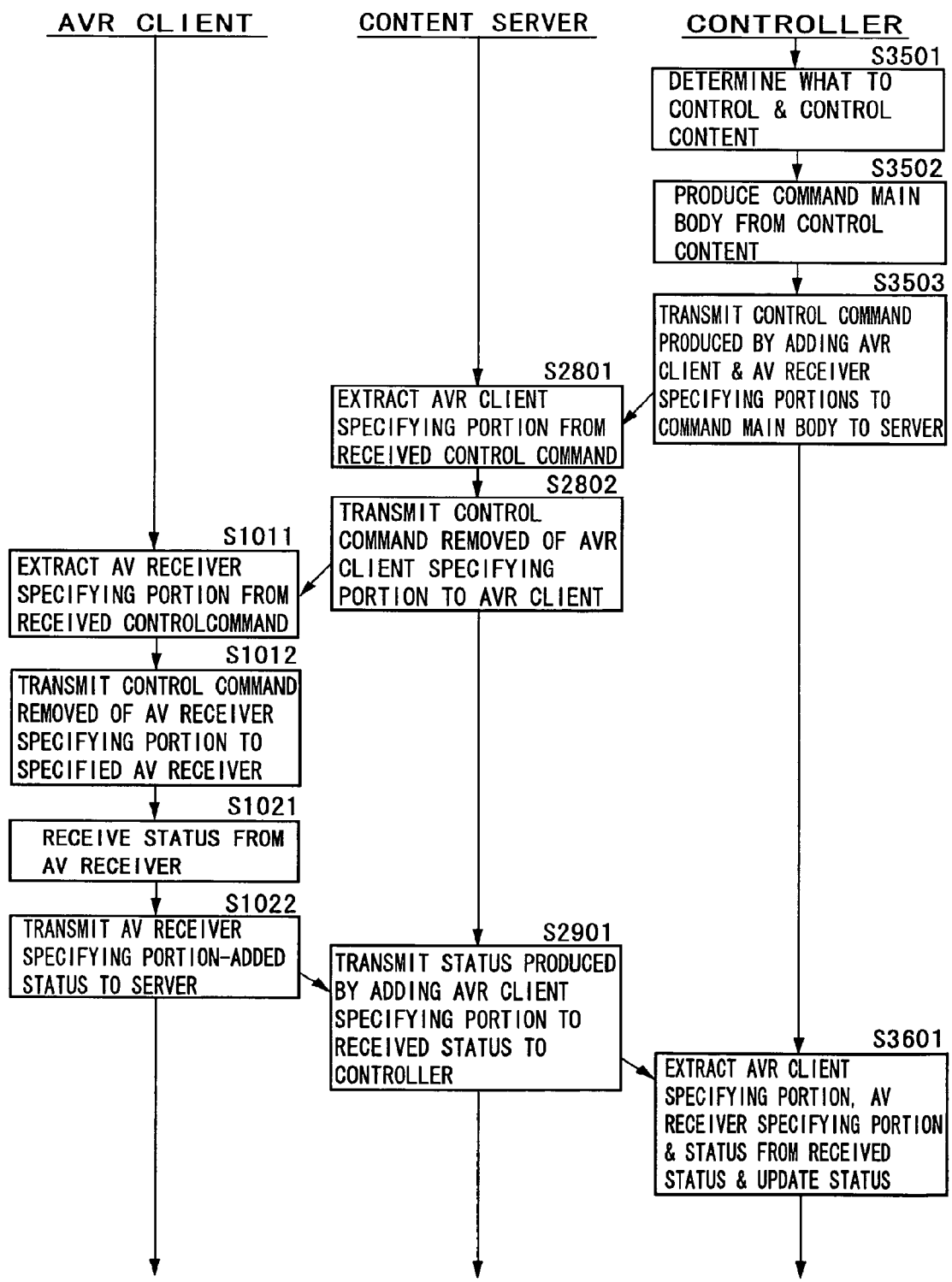
FIG. 94 is a flowchart for use in illustration of the operation of transmitting a command and a status in FIG. 93.

Referring to FIG. 94, the controller Ak determines an AV receiver AVR to be controlled and the control content (S3501) and produces the main body of a command based on the control content (S3502). As shown in FIG. 95A, the controller Ak then transmits the control command including the command main body and the attached destination information to the content server Si (S3503). The destination information in this example includes an AV receiver specifying portion that specifies the AV receiver AVR to be controlled and an AVR client specifying portion that specifies the AVR client AC connected to the AV receiver AVR.

The content server Si receives the control command and extracts the AVR client specifying portion from the received command as shown in FIG. 95B (S2801). The content server Si determines the specified AVR client AC based on the AVR client specifying portion. The content server Si then transmits the control command removed of the AVR client specifying portion to the specified AVR client AC (S2802).

The AVR client AC receives the control command and extracts the AV receiver specifying portion from the received command as shown in FIG. 95C (S1011). The AVR client AC determines the specified AV receiver based on the AV receiver specifying portion. The AVR client AC then transmits the control command made up only of the command main body to the specified AV receiver (S2802).

In this way, the control command removed of unnecessary portions is sequentially transferred, so that the network traffic can be alleviated. Note however that the control command may be transferred as it is without being removed of the specifying portions.

In each of the stages, the character string of the command main body does not have to be entirely the same as long as it has the same meaning. More specifically, the control command eventually transmitted to the AV receiver AVR from the AVR client AC needs only be comprehended by the AV receiver AVR.

In this way, the AV receiver AVR controls the controlled element based on the received control command. Consequently, in response to a change in the status of the controlled element, the AV receiver AVR transmits the status to the AVR client AC. The status is made only of the status main body as shown in FIG. 96A.

The AV client AC receives the status of the AV receiver AVR and stores it (S1021), adds the source information to the received status and transmits the resultant status to the content server Si as shown in FIG. 96B (S1022). The source information in this example includes the AV receiver specifying portion that specifies the AV receiver AVR that has transmitted the status.

The content server Si receives the status from the AVR client AC, adds an AVR client specifying portion to the received status as shown in FIG. 96C, and then transmits the resultant status to the controller Ak (S2901).

The controller Ak receives the status from the content server Si, extracts the AVR client specifying portion and the AV receiver specifying portion from the status and updates the status of the AV receiver AVR (S3601).

Note that there are not only the statuses of the controlled elements but also the statuses of elements that cannot be controlled by the controller Ak (such as the level information of a sound signal). These statuses are also transmitted to the controller Ak through the AVR client AC and the content server Si. The status is transmitted not only when the controlled element of the AV receiver AVR is controlled based on the control command, but also when the status changes. More specifically, when the connection between the AVR client AC and the AV receiver AVR is confirmed, the AVR client AC obtains the status of the AV receiver AVR and transmits the status to the content server Si.

In this way, the controller Ak that eventually receives the status can be informed of the status of each of the AV receivers AVR. The controller thus checks the control and displays the status.

Note statuses for the purpose of display that could frequently change may be transmitted less frequently by the AV receiver AVR or the AVR client AC. The frequently changing statuses can hardly be recognized if they are displayed as they change, and the high transmitting frequency of these statuses can cause unwanted traffic increase, which also increases the load on the content server.

A controlled element in a complicated structure may have a plurality of controlled portions. For example as shown in FIG. 91, the DSP for controlling the sound field necessitates many kinds of coefficient data to be set, and the settings are made by a microcontroller that controls the DSP. The settings are changed by the key operation by the user as the status state is displayed by the AV receiver main body or a display connected thereto in a stand-alone system. The operation is carried out by the firmware of the micro controller. In order to achieve complicated settings and make the operation easier, the program capacity must be increased or a high performance display is necessary. This could affect the product price or development cost.

In this system, a number of setting patterns of coefficient data are provided to the content server Si, so that one of the patterns may be selected from a hierarchy menu displayed at the controller Ak and the coefficient data may be set through the AVR client AC accordingly.

Since a plurality of AV receivers AVR may be under the control of the controller Ak, time setting for the AV receivers AVR or the like can be carried out at a time. In addition, by monitoring the statuses of these AV receivers AVR, cooperative operation such as relay recording can be carried out.

Now, the case when the volume of an AV receiver AVR connected to an AVR client AC is raised will be described.

Referring to FIG. 97, the controller Ak checks the connection with the client (S3011) and determines whether the client is an AVR client AC if the connection is established (S3014). If the client is an AVR client AC, a control command for raising the volume is transmitted to the content server Si (S35). The content server Si transmits this command to the AVR client AC (S28), and the AVR client AC transmits the command to the AV receiver AVR (S101). The AVR client AC receives the status indicating that the volume has been raised and transmits the status to the content server Si (S102). The content server Si transmits the command to the controller Ak (S29), and the controller Ak updates the status of the AV receiver AVR in response and resumes monitoring operation as shown in FIG. 34 (S36).

Figure 98:
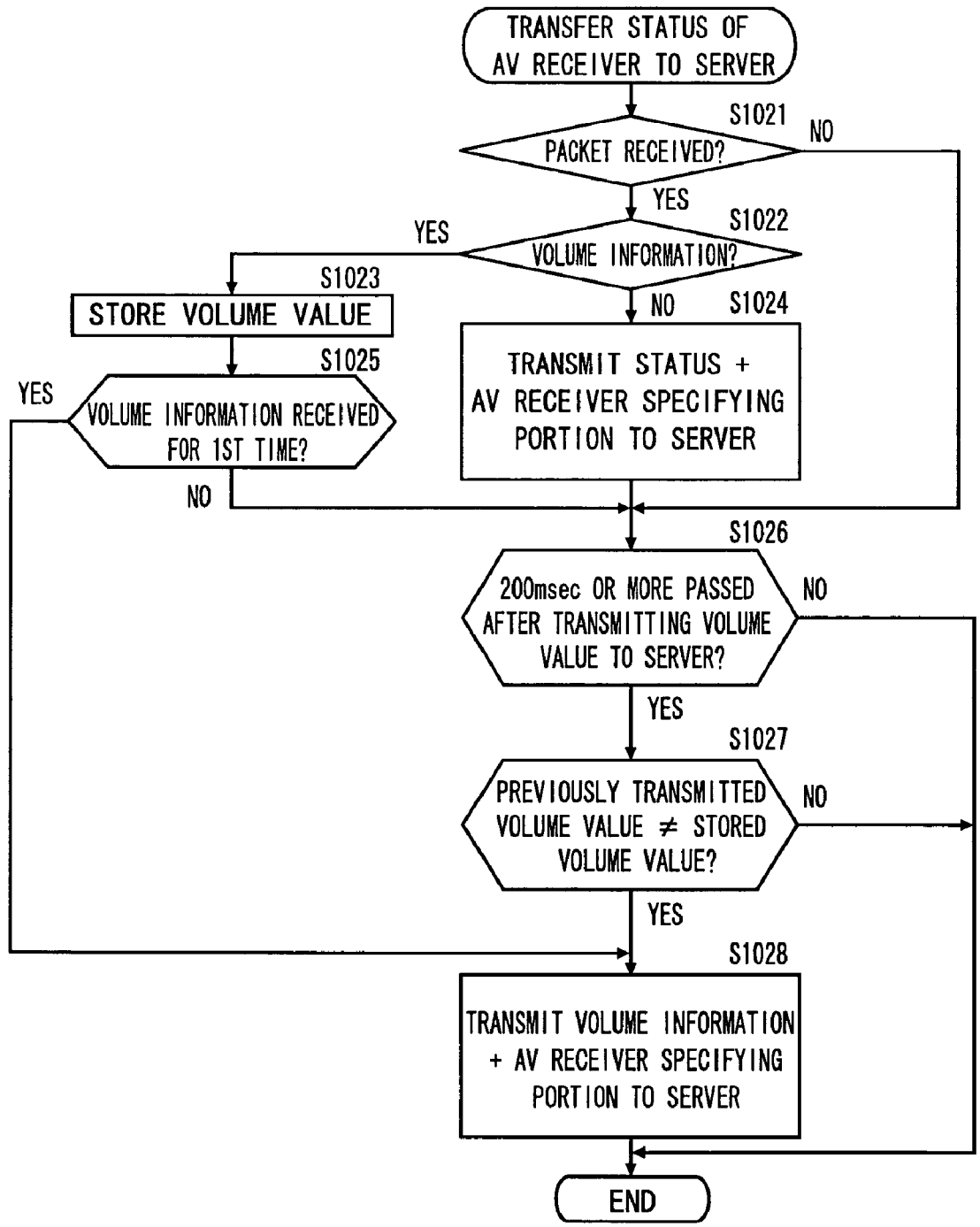
FIG. 98 is a flowchart for use in illustration of the operation of the AVR client when the status of the AV receiver is transferred to the server in the network type audio system in FIGS. 90 to 96C.

Now, the operation of the AVR client AC to transfer the status of the AV receiver AVR to the content server will be described in conjunction with FIG. 98.

The AVR client AC receives packet data from the AV receiver AVR (S1021) and determines whether the data is volume information (S1022). If the data from the AV receiver AVR is by EIA-232, the packet receiving is performed by serial receiving interruption, and the data is placed in a queue. The queue is read out at prescribed intervals and subsequent processing is carried out.

Then, if the received data is volume information, the AVR client AC stores the volume value (S1023). It is determined whether or not the data is the volume information (S1022) and the volume information is stored (S1023) before the data is placed in the queue. Meanwhile, if the received data is not volume information, the AVR client AC adds an AV receiver specifying portion that indicates that the status is from the AV receiver AVR to the packet data and transmits the resultant data to the content server Si (S1024).

After the volume value is stored, it is determined whether or not the volume information is received for the first time (S1025). If it is received for the first time, the AVR client AC proceeds to step S1028, but otherwise the AVR client AC determines whether 200 milliseconds or more has passed after the volume value is transmitted to the content server (S1026). If 200 milliseconds or more has passed, the AVR client AC compares the volume value previously transmitted and the stored volume (S1027). If they are different, the AVR client AC adds an AV receiver specifying portion indicating that the status is from the AV receiver AVR to the volume information and transmits the resultant status to the content server Si (S1028).

The status of the volume value comes in at shorter intervals than the other statuses and therefore could increase the load upon the content server Si and the controller Ak or unwanted traffic on the network. The volume information is simply used for display at the controller Ak and therefore needs only to be transmitted at intervals enough for display. Therefore, when the volume information is received, only the value thereof is stored, and the information is transmitted to the content server Si at appropriate intervals (200 milliseconds in this example) only when there is a change in the value.

Now, the operation of the AVR client AC to transfer a command from the content server Si to the AV receiver AVR will be described in conjunction with FIG. 99.

The AVR client AC receives a control packet for the AV receiver AVR (S1031) and extracts the control command for the AV receiver AVR from the packet (S1032). The AVR client AC determines whether or not the control command is a command to inquire about the volume value (S1033). If the command is a volume value inquiry command, the AVR client AC produces volume information based on the stored volume value (or a suitable initial value if there is no received value) (S1034), adds an AV receiver specifying portion indicating a status from the AV receiver AVR to the volume information and transmits the result to the content server Si (S1035).

Meanwhile, if the command is not a volume value inquiry command, the control command for the AV receiver AVR is transmitted to the AV receiver AVR (S1036). If the interface between the AVR client AC and the AV receiver AVR is by EIA-232, the transmission from the AVR client AC to the AC receiver AVR is carried out by interruption on a byte-basis. The control command from the content server Si is once stored in a queue. The queue is read out by interruption at prescribed intervals or buffer empty interruption in serial transmission and transmitted on a byte-basis.

According to the embodiment, the volume information is transmitted to the content server Si only when there is a change except for the first time. Therefore, if the AV receiver AVR responds to the volume value inquiry command from the content server Si to return the volume value and there is no change in the volume value, the AVR client AC does not return the volume value to the content server Si. To cope with this, the AVR client AC responds to the volume value inquiry command from the content server Si not through the AV receiver AVR. In the embodiment, when the power supply for the AV receiver AVR is turned on, the initial volume value is always transmitted to the AVR client AC as a status. However, the AVR client AC could not receive the initial value in some cases depending upon the timing of turning on the power supply.

Figure 100:
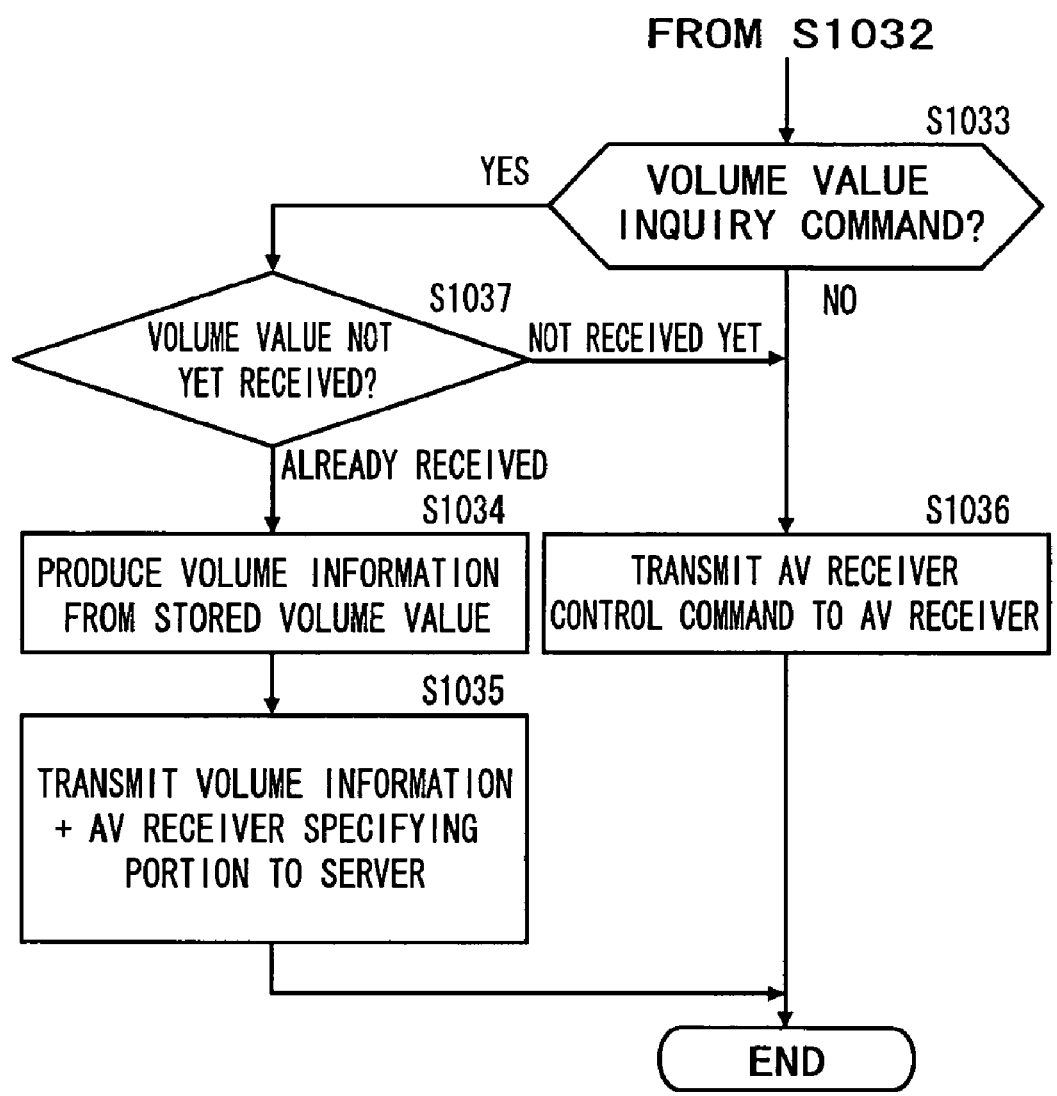
FIG. 100 is a flowchart for use in illustration of an improvement on the operation in FIG. 99.

Therefore, as shown in FIG. 100, the AVR client AC preferably responds only for the first time through the AV receiver AVR. More specifically, if the control command from the content server Si is a volume value inquiry command, the AVR client AC determines whether the volume value has not been received yet (S1034). If the value is not received, the process proceeds to step S1036, and if the value has already been received, the process proceeds to step S1034.

Note that if there are a plurality of kinds of AV receivers and the controller Ak controls these AV receivers, the controller Ak may issue a dedicated control command depending on the kinds of the AV receivers. Alternatively, the controller may issue a general-purpose control command regardless of the kind of the AV receivers, and the content server may change the general-purpose command to the dedicated command.

1. 2. 5. Firmware Updating

The content server as will be described can update firmware installed in a client. Here, a client requests the content server to update it, the content server inquires the client and then updates it, or the content server forcibly updates it.

Now, how the client requests the content server to update will be described. Referring to FIG. 101, the client requests the content server to provide firmware information (S103), the content server responds to the request to return firmware information to the client (S201), and the client receives the information (S103). The client then specifies the firmware (S104), and the content server responds to this to prepare for transferring the firmware (S202). The client then requests the content server to provide the firmware (S105), the content server responds to the request to transfer the firmware to the client (S203), and the client receives the firmware (S105). The client then updates the firmware (S106) and transmits an end status when the updating is over (S107), and the content server receives the status (S204).

Figure 102:
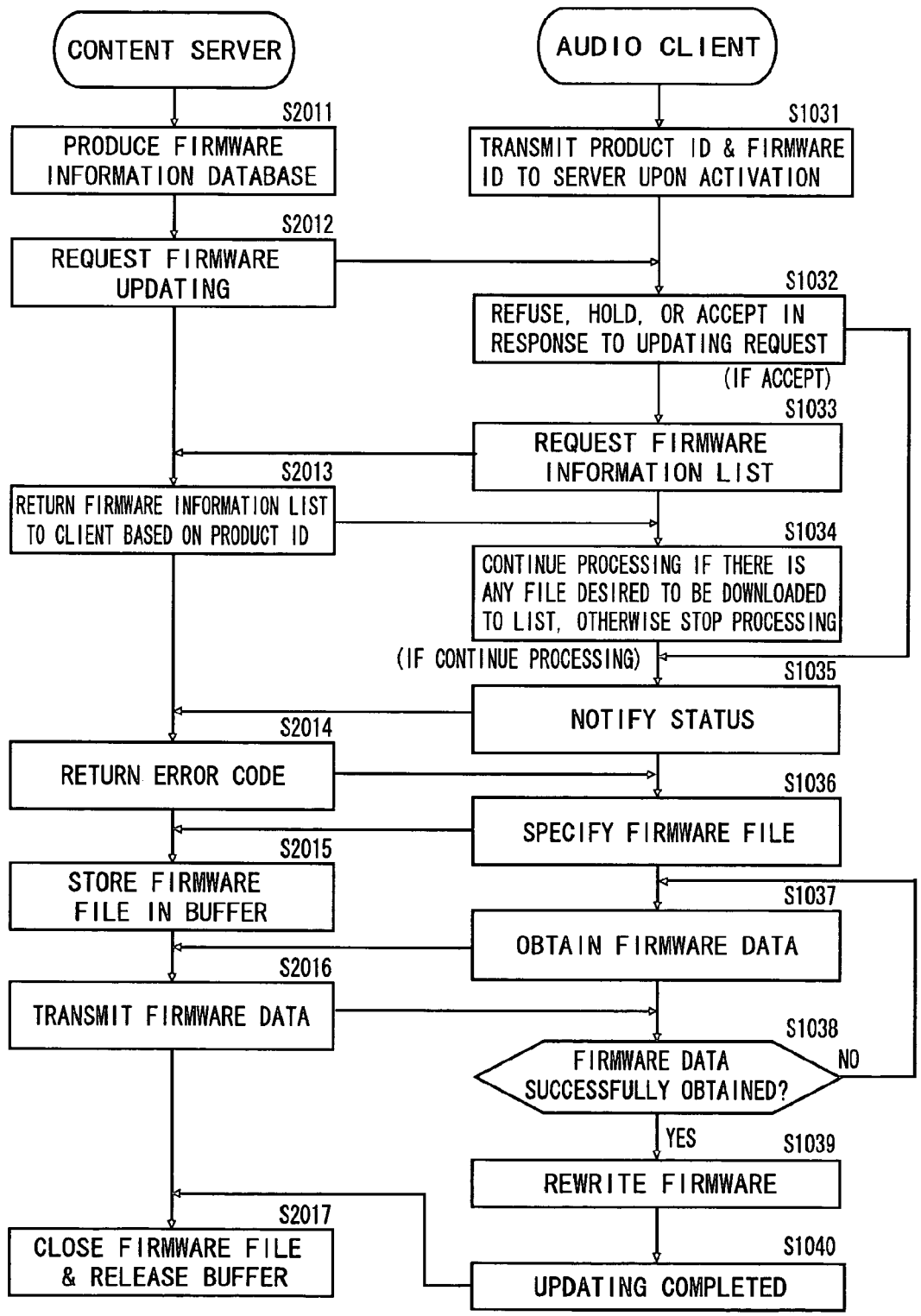
FIG. 102 is a flowchart for use in illustration of details of the firmware updating operation in FIG. 101.

How the firmware will be updated will be detailed in conjunction with FIG. 102. When the updating is started by the content server, the process starts from step S2012. When the updating is started by the client, the process starts from step S1033.

The content server reads the file of firmware information and produces a firmware information database shown in FIG. 15 (S2011). For example, the content server reads a necessary file for updating on a client-basis and produces an update information file. Therefore, the version of the firmware can be determined based on the information file. The client transmits the product ID and the firmware ID to the content server when it is activated (S1031).

When the updating is started by the content server, such as when the content server determines the firmware is old based on the product ID and firmware ID of the client, or when the content server obtains new firmware from a site on the Internet, the content server issues a firmware updating request command to request the client to update the firmware and provides information related to the new firmware recommended for updating if necessary (S2012). If the user does not wish to update the recommended firmware, the client refuses the updating request from the content server, and the process immediately ends (S1032). When the user defers the determination as to whether or not to update the recommended firmware, the process immediately ends (S1032). In the latter case, however, the client instructs the content server to request updating again after a prescribed time period. If the user accepts the recommended firmware updating, the client continues the processing (S1032). In this case, if the content server presents specific firmware to the client, the client proceeds to step S1035, and immediately starts updating the firmware. If the content server does not present any specific firmware and simply requests updating, the client proceeds to step S1033 and obtains a firmware list.

Note that the firmware updating request command may be issued by the controller as a server request. In this case, the controller obtains a firmware list related to the client controlled and monitored by the controller from the content server similarly to steps S1033 and S1034 and selects firmware desired by the user. Information on the firmware selected by the controller is presented to the client as firmware information recommended for updating.

If the updating request is accepted or the client starts updating, the client requests the content server to provide the firmware list (S1033). The firmware list includes firmware pieces applicable to specific clients. The content server does not always have such a firmware list but produces the list every time a client requests for such a list. The firmware list is produced basically in the same way as the way of producing the music list described above. Note however that when a firmware list is produced, the content server uses the firmware information database as shown in FIG. 15. The database stores firmware information for several firmware pieces. Now the method of producing the firmware list will be detailed.

Referring to FIG. 103, the content server initializes the index representing the number of firmware information stored in the firmware information database to zero (S20131).

The content server then determines whether the product ID of the firmware information indicated by the index matches the product ID of the client (S20132). If they match, the content server adds the firmware information to the firmware list (S20133) and then increases the index (S20134). Meanwhile, if they do not match, the content server skips step S20133 and immediately increases the index (S20134).

The content server then determines whether the firmware information number represented by the index is smaller than the number n of all the firmware information pieces (S20135). If the number is smaller than n, the process returns to step S20132, while if the number is not less than n, the process of producing the firmware list ends.

By the above processing, the content server picks up firmware information having a matching product ID in the firmware information database and produces a firmware list. In this way, the firmware lists are not formed into a database in advance, but a list is produced every time a client requests for one, and therefore the memory region for constantly storing firmware lists is not necessary.

The content server then returns the produced firmware list to the source client (S2013). The firmware list is divided for transmission from the content server to the client similarly to the music list described above.

More specifically, referring to FIG. 104, the client transmits a firmware list request command including the product ID of the client, an obtaining start index representing the first firmware information to be obtained, and an obtaining number that represents the number of firmware information pieces to be obtained to the content server (S1033). The content server responds to the firmware list request command to extract firmware information whose product ID is the same as the product ID of the client and returns firmware information pieces as many as the obtaining number in the firmware information represented by the obtaining start index to the client (S2031). At the time, the content server transmits an effective number representing the number of the firmware pieces to be transmitted and the remaining number representing the number of firmware pieces left out of the firmware list returned by the content server to the client. The client receives a part of the firmware list and stores it in the memory (S10331). The above described processing is repeated until all the firmware lists are transmitted from the content server to the client.

Then, the client continues the processing if there is firmware the user desires to download in the returned firmware list (such as an up-to-date version of firmware), and if there is none, the processing is stopped (S1034).

The content server transmits the firmware information of all the versions, either new or old, and therefore the client can change the firmware to older version firmware because of malfunction and the like.

In the updating, the client notifies the status that indicates the transition to the updating section to the content server (S1035). The content server returns an error code indicating the presence/absence of an error in response to the status (S2014). The client specifies the file of the firmware to be downloaded (S1036). More specifically, the client specifies a full path name stored in the obtained firmware information list. The content server reads a specified file and stores the file in the buffer (S2015).

The client then specifies the obtaining start address and data size (byte number) and obtains the data of the firmware (S1037). The content server reads out data for the specified byte number from the specified obtaining start address and transmits the data to the client (S2016).

The client determines whether or not the data of the firmware up to the last piece has been obtained (S1038), and if the data has not thoroughly been obtained, the client returns to step S1037 and repeats the process of obtaining data. After the client finishes obtaining the data, the client rewrites the firmware (S1039) and finishes updating (S1040). The content server closes the opened file of the firmware and releases the buffer (S2017).

When the client has finished rewriting the firmware, an unknown status is transmitted to the content server. The client interrupts the connection with the content server to reset (or activates the updated firmware) and notifies the client information to the content server. When the client fails to obtain the firmware data, a failure status may be transmitted. The failure status may be used for re-transmitting the firmware data.

Note that when the updating request is issued from the content server, the processing may be as follows. More specifically, in FIG. 102, the content server never fails to present firmware information to the client at the time of updating request (S2012). When the firmware recommended by the content server is to be updated, the process proceeds to step S1035, while when the user selects desired firmware from the firmware list rather than updating the firmware recommended by the content server, the process proceeds to S1033.

As in the foregoing, the data of the firmware is transmitted to the audio client through the LAN from the content server, so that the firmware of the client can be updated for a short period, and the firmware of a plurality of clients can be updated at a time. Since the product ID is used, firmware suitable for the client can automatically be selected for updating. Since the firmware ID is used, the firmware of the up-to-date version can automatically be selected for updating.

2. Other Embodiments

2. 1. Audio Client Stored in Outlet BOX

Figure 105:
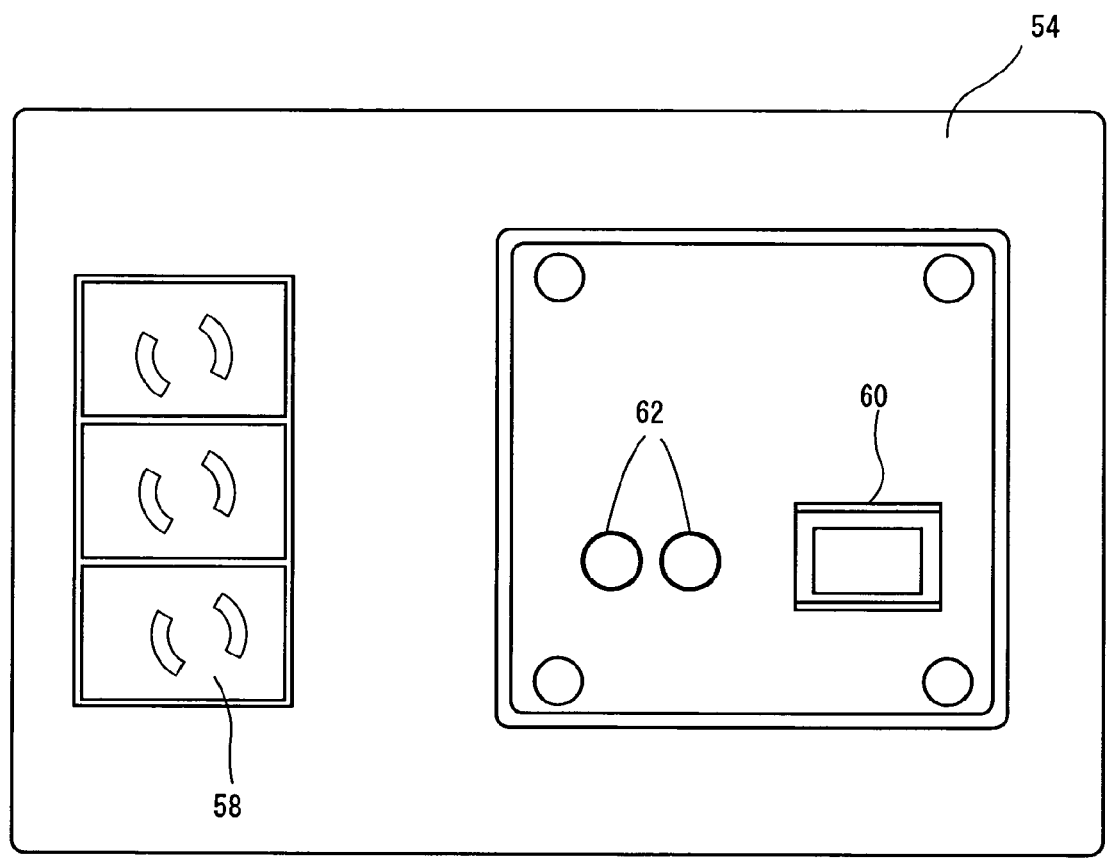
FIG. 105 is a front view of the outer structure of an audio client according to another embodiment of the invention.
Figure 106:
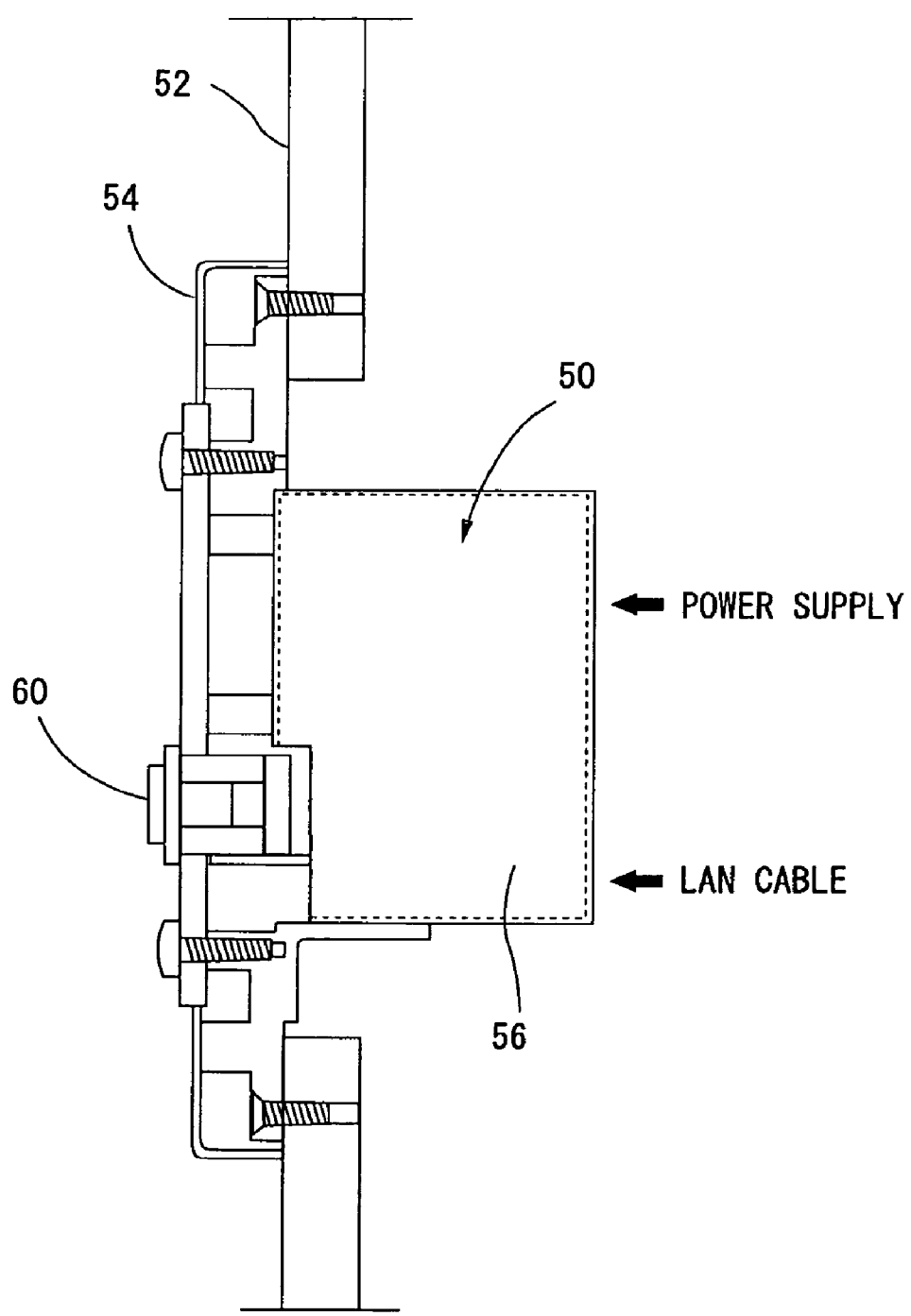
FIG. 106 is a side view of the audio client in FIG. 105.

An audio client may be stored in an outlet box 50 as shown in FIGS. 105 and 106. The outlet box 50 generally includes a front panel 54 attached to a wall 52, and a box member 56 attached to the back surface of the front panel 54. According to the embodiment, a circuit for the audio client as shown in FIG. 3 is provided in the box member 56. The LAN cable is connected to the circuit for the audio client. The front panel 54 is provided with a power supply receptacle 58, a power supply switch 60, a modular jack (not shown), and a TV antenna terminal (not shown) as well as an audio output terminal 62 for outputting an audio signal from the audio client. The audio client terminal 62 is connected to the right and left speaker devices.

The audio client typically includes a display for displaying a music list and switches to select a desired music piece in the displayed music list. The display or switches are necessary for monitoring and controlling an audio client, and the use of a controller connected to the same LAN 12 as the audio client permits the audio client to be removed of the display or switches. In place of the controller, a portable remote controller connected by radio to the LAN 12 the same as the audio client may be used.

In this way, the audio client is simplified and may be stored in the outlet box 50 for home use. The simplified audio client stored in the outlet box can only extract music or video from a network and reproduce it and cannot display or control.

As the Internet use comes to increase, particularly the infrastructure for the broadband (high speed and large capacity) technique comes to be more developed, there will be connection requests from a number of PCs per household to the Internet. The most typical way of connecting a number of PCs at home is to build a LAN in the house, and more households will undoubtedly build their own in-home LANs before long. The use of the LAN allows music or video to be distributed to various places in the house with only a single cable. The single cable can transmit music/video signals as well as control signals, and therefore special knowledge about audio/video is not necessary in providing the system. In addition, the system is much advantageous in terms of the cost, and the system can spread not only for business use but also for home use.

More houses to be newly built or reformed for general households are provided with in-home LANs in consideration of easier Internet connection, and it is a common practice to provide a LAN connector in an outlet box 50. Therefore, when such a LAN is provided, a plurality of audio clients can easily be provided as well. More specifically, an audio client can be built simply by connecting a speaker (including powered one). A video client can be built simply by connecting a video monitor such as a TV. Therefore, the audio clients that would match the house interior in appearance can be set. In terms of product development, eye-catching, luxurious designs for the products are not necessary, and the products can be designed by a simple designing method that puts more emphasis on functions. This can reduce the development cost. The simple structure alleviates recycling process, which is also beneficial.

In-home LAN distribution does not need a content medium such as a CD and a tape unlike conventional audio/vide equipment. More specifically, once a content is stored in a content server, the media does not have to be managed. In the server-client arrangement through the in-home network, an audio client does not need any mechanical devices such as a mechanism for inserting a media or a rotation driving device. Therefore, the size of the device can be reduced, and the product may have high reliability and prolonged useful life.

2. 2. Obtaining Music Data on Internet

According to the above described embodiment, the audio client searches for a content server by broadcasting when it is turned on. However, when the power supply for all the content servers on the LAN 12 are off, no content server responds, and therefore the audio client must endlessly continue to search for a content server. In order to avoid it, the audio client may be subjected to processing such as time-out error, but if the time-out error is caused, the audio client cannot operate at all for example for reproducing music.

In order to solve these disadvantages, when the audio client repeats broadcasting a prescribed number of times and still cannot find a content server, the audio client may access and connect with a WWW (World Wide Web) server on the Internet.

Figure 107:
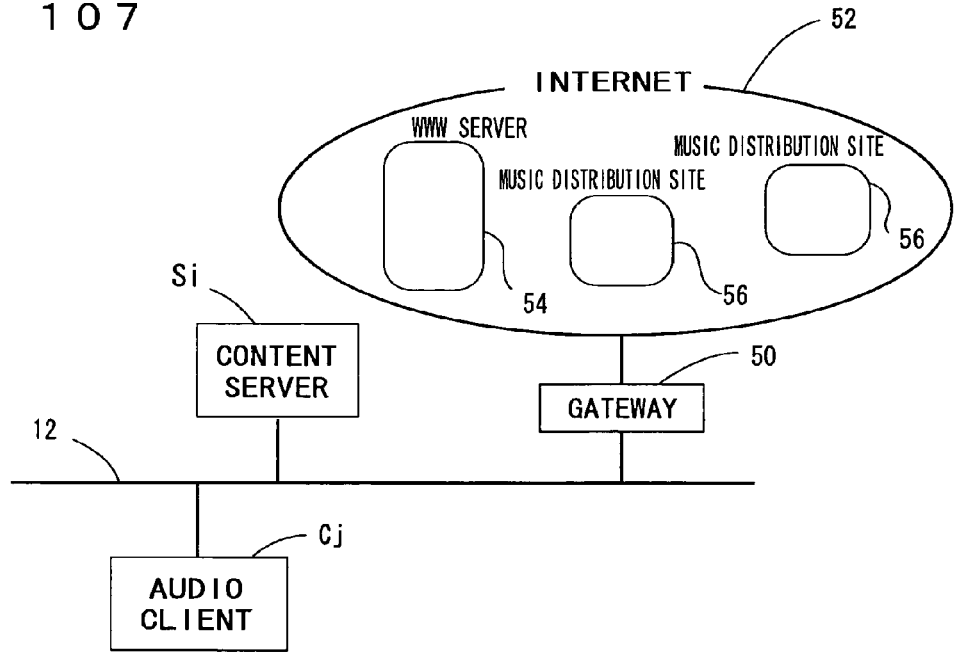
FIG. 107 is a functional block diagram of the general structure of a network type audio system and the Internet according to another embodiment of the invention.

In this case, as shown in FIG. 107, the LAN 12 is connected to the Internet 52 through a gateway 50. The WWW server 54 on the Internet 52 has registered lists of music pieces provided at a music distribution site 56. The lists include music piece information such as titles and artists' names and URLs (Uniform Resource Locator) where music data is provided.

Figure 108:
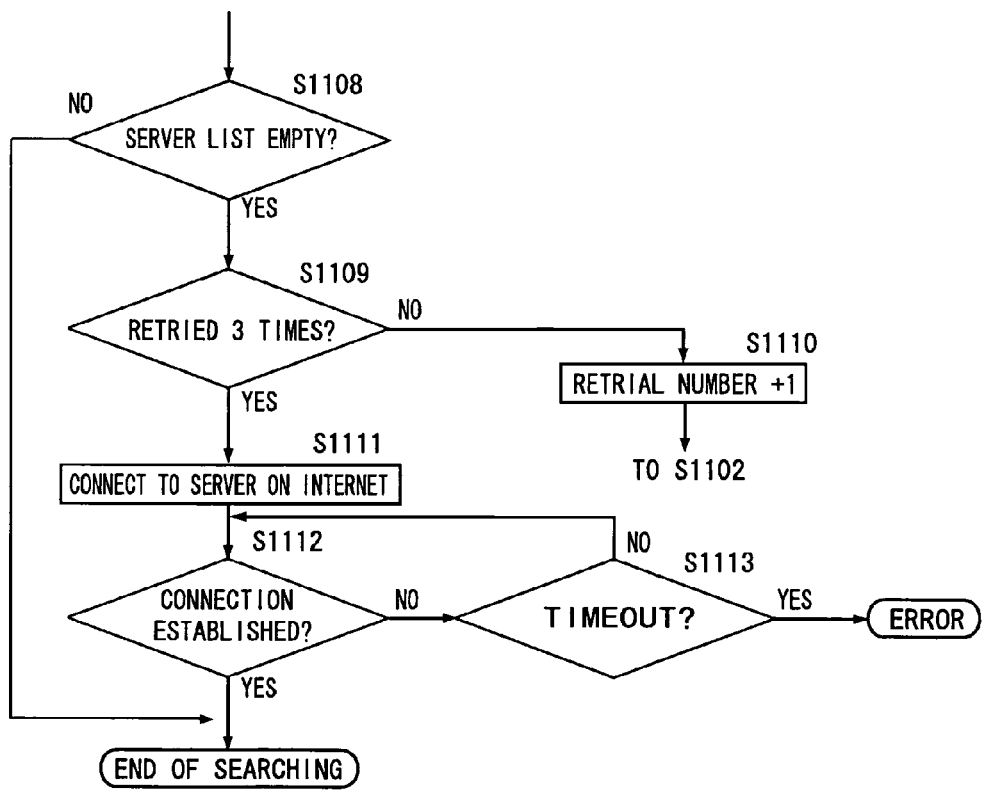
FIG. 108 is a flowchart for use in illustration of server search operation in the network type audio system in FIG. 107.

As shown in FIG. 108, when the server list is empty, the audio client determines whether or not the number of retrial attempts in broadcasting has reached a prescribed number such as three before returning to step S1102 and trying to broadcast again (S1109). If the number of retrial attempts has not reached three, the audio client increases the number of retrial attempts (S1110) and then returns to step S1102 to broadcast again. Meanwhile, if the number of retrial attempts has reached three, the audio client connects by HTTP to the WWW server 54 on the Internet 52 (S1111). If the audio client successfully connects, the searching process ends (S1112), but if the audio client does not successfully connect before time-out, an error is caused (S1113).

When the audio client accesses the WWW server 52, it receives music information or a URL from the server. The audio client analyzes the received information or URL and receives music data from the music distribution site 56 at the URL.

As in the foregoing, when there in no content server on the LAN 12 or a content server present on the LAN does not operate, the audio client automatically accesses the site 56 on the Internet 52 to obtain music data. The client therefore does not have to endlessly search for a content server on the LAN 12.

In the above example, when the number of retrial attempts reaches a prescribed number, the audio client connects to the WWW server 54 on the Internet 52. Alternatively, the audio client may access the WWW server 54 on the Internet 52 if the client broadcasts a magic word and there is no response from any of the content servers on the LAN 12 after a prescribed time period.

2. 3. Reproducing with Function of Changing Obtained Data Length

In the above embodiment, when the audio client Cj requests the content server Si to transfer music data, it always requests for a predetermined amount of the music data. Therefore, there is no problem while the number of audio clients Cj to request the content server Si to transfer music data is small, but as the number increases, the load imposed on the content server Si increases, which prolongs the time between the request by the audio client Cj to the content server Si for music piece data transfer and actual transfer of the music piece data. Therefore, in order to average the load on the content server Si, the amount of the music piece data requested by the audio client Cj by a single request can be changed as required.

Now, an example of how to change the amount of music piece data requested by the audio client Cj at a time depending on the time between the request by the audio client Cj to the content server Si for music piece data transfer and actual transfer of the music piece data will be described.

Figure 109:
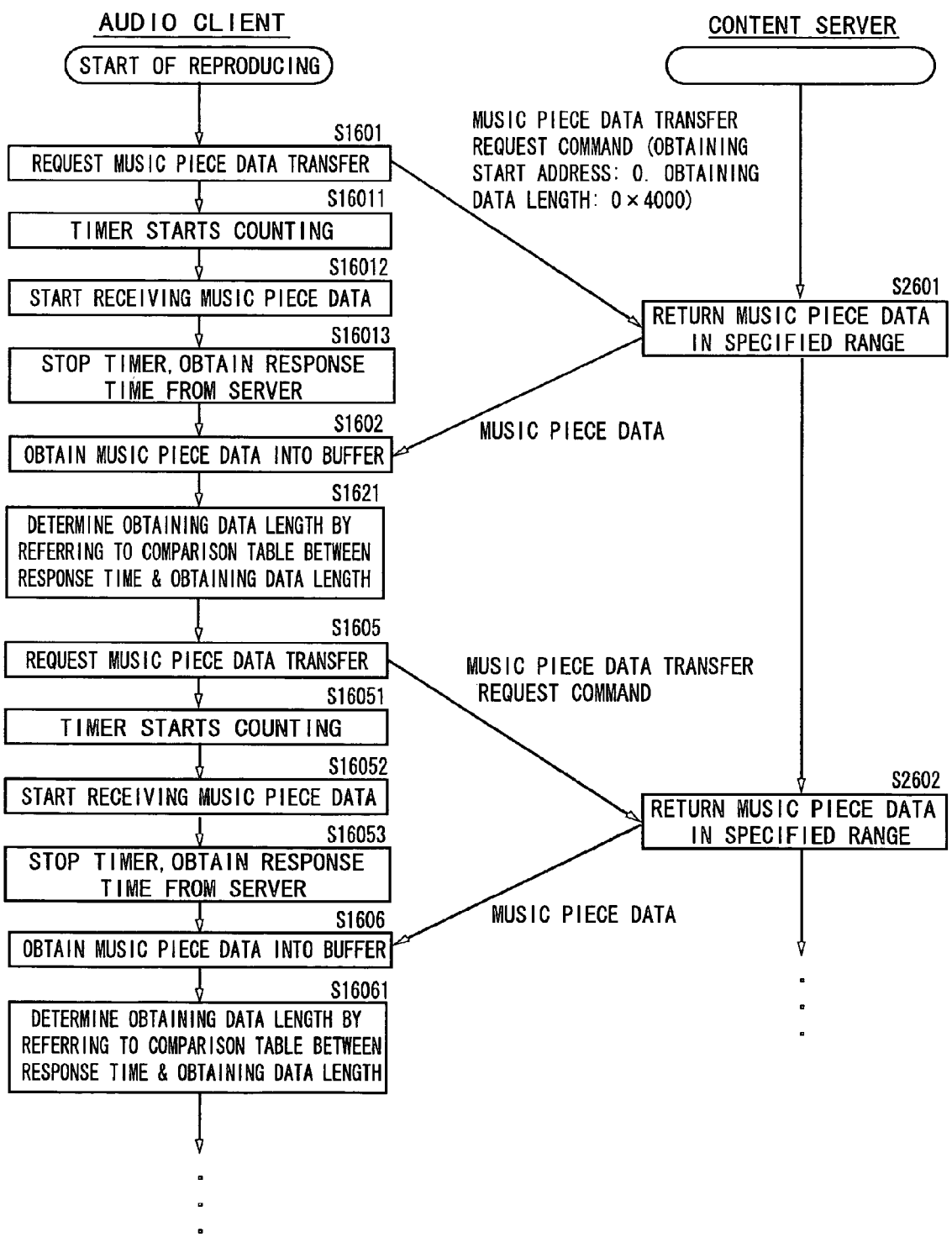
FIG. 109 is a flowchart for use in illustration of the operation of transferring music piece data according to another embodiment of the invention.

Referring to FIG. 109, the audio client Cj transmits a music piece data transfer command that requests the content server Si to transfer music piece data (S1601) and operates a timer at the same time, so that the response time until the music data is transferred from the content server Si starts to be counted (S16011). Note that when the audio client Cj issues the music piece data transfer command for the first time, an appropriate amount of music data to be requested by a single request is unknown, and therefore the obtaining data length is predetermined.

Then, when the audio client Cj starts to receive the music piece data (S16012), it stops the timer and obtains the response time for the music piece data by the content server Si (S16013).

Figures 110, 111:
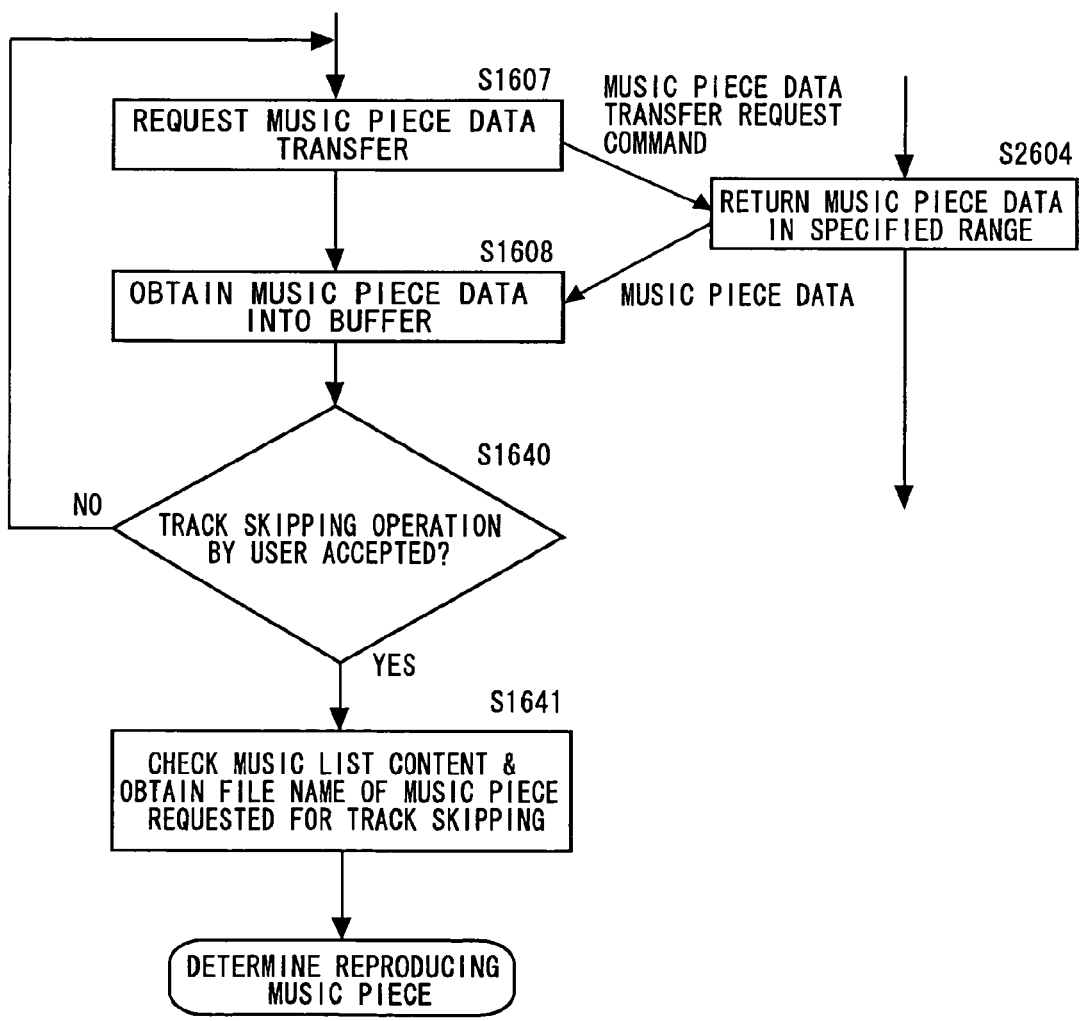
FIG. 110 is a comparison table that is referred to in steps S16021 and S16061 in FIG. 109.
FIG. 111 is a flowchart for use in illustration of the skip reproducing operation of an audio client according to another embodiment of the invention.

The audio client Cj refers to a comparison table shown in FIG. 110 and determines the obtaining data length corresponding to the obtained response time (S16021). The comparison table has prescribed response time periods and prescribed obtaining data lengths in association with each other. Since the longer the response time is, the greater the load on the content server Si is, the obtaining data length is shorter for longer response time. If for example the audio client Cj obtains a response time period of 20 msec, the obtaining data length is determined as 8 Kbytes.

The audio client Cj again requests the content server Si to transfer music data, while the obtaining data length determined as described above is transmitted (S1605). Then, the operation the same as the above is repeated (S16051 to S16061).

According to the embodiment, the obtaining data length of music piece data that the audio client Cj requests the content server Si to provide is shorter as the response time is longer. Therefore, if the number of audio clients Cj that request the content server Si to transfer music piece data increases, the amount of music piece data to be transferred to each audio client Cj by a single request is reduced. Consequently, the load on the content server Si per audio client Cj is averaged, and the content server Si can smoothly transfer music piece data to the plurality of audio clients Cj.

In the above example, the obtaining data length is determined depending upon the response time from the content server. Alternatively, the obtaining data length may be determined depending on the data format of the music piece to be obtained. More specifically, in FIG. 35, before a music piece data transfer request (S1601), the audio format of the music piece is obtained based on search data shown in FIG. 32. Then, based on the audio format of the music piece, the obtaining data length is set. In general, MP3 format data is compressed and has a small size, while WAV format data has a large size. Therefore, if the music data to be obtained is in the MP3 format, 4 Kbyte data for example may be obtained by a single request, and for the WAVE format data, 16 Kbyte data may be obtained by a single request.

2. 4. Skip Reproducing

In the above embodiment, the audio client Cj requests the content server Si to transfer music piece data in the order in the music list. However, the user might sometimes wish to listen a music piece being presently reproduced all over from the start. The user might want to skip the presently reproduced piece and listen to another piece in other cases. Therefore, the audio client Cj may be able to request music piece data transfer in response to such a request from the user.

Figure 112:
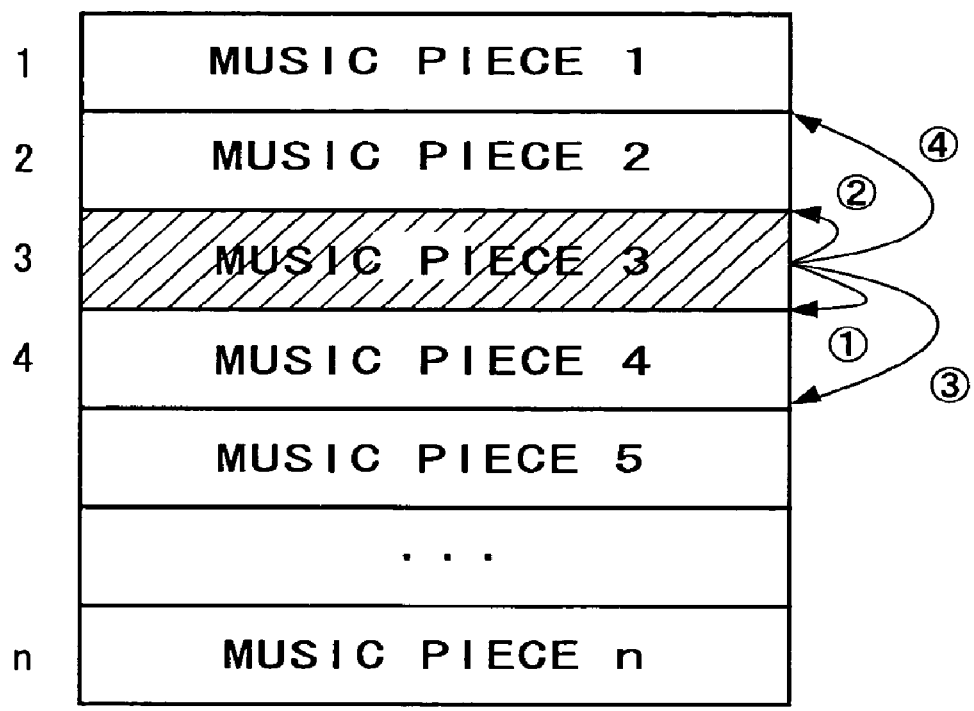
FIG. 112 is a table showing a music list stored in the memory of the audio client in the skip reproducing operation in FIG. 111.

Referring to FIG. 111, while the audio client Cj reproduces a music piece 3 in a music list shown in FIG. 112, the audio client requests the content server Si to transfer music data in a specified range of the music data of the music piece 3 (S1607), and the content server Si responds to the request to return the music data in the specified range to the audio client Cj (S2604). The audio client Cj receives the data and stores it in the memory 32 (S1608). The operation is repeated and the music piece 3 is reproduced accordingly.

When the user tries to end reproducing the music piece 3 and listens to a music piece 4 while the music piece 3 is reproduced (case (1) in FIG. 112), the user requests the audio client Cj to skip from the presently reproduced music to the music piece 4. The audio client Cj checks the content of the music list stored in the memory 32 in response to the skip request from the user and obtains the file name of the music piece 4 (S1641). If there is no such skip request from the user, the process returns to step S1607 and transfer of the data of the music piece 3 is requested.

The operation of the audio client Cj and the content server Si thereafter is the same as the operation described in conjunction with FIG. 35 and therefore will not be described.

By the above described operation, the audio client Cj can carry out skip reproducing to the music piece 4 while the music piece 3 is reproduced.

Note that while the audio client Cj reproduces the music piece 3, the audio client Cj can carry out skip reproducing by the same operation, if the user tries to listen to the music piece 3 all over again from the start (case (2) in FIG. 112), if the user tries to listen to a music piece 5 (case (3) in FIG. 112), or if the user tries to listen to a music piece 2 (case (4) in FIG. 112).

As in the foregoing, according to the embodiment, the use of the music list stored in the memory allows the audio client Cj to carry out skip reproducing from a music piece presently being reproduced to another music piece.

2. 5. Repeating Reproducing

Figure 113:
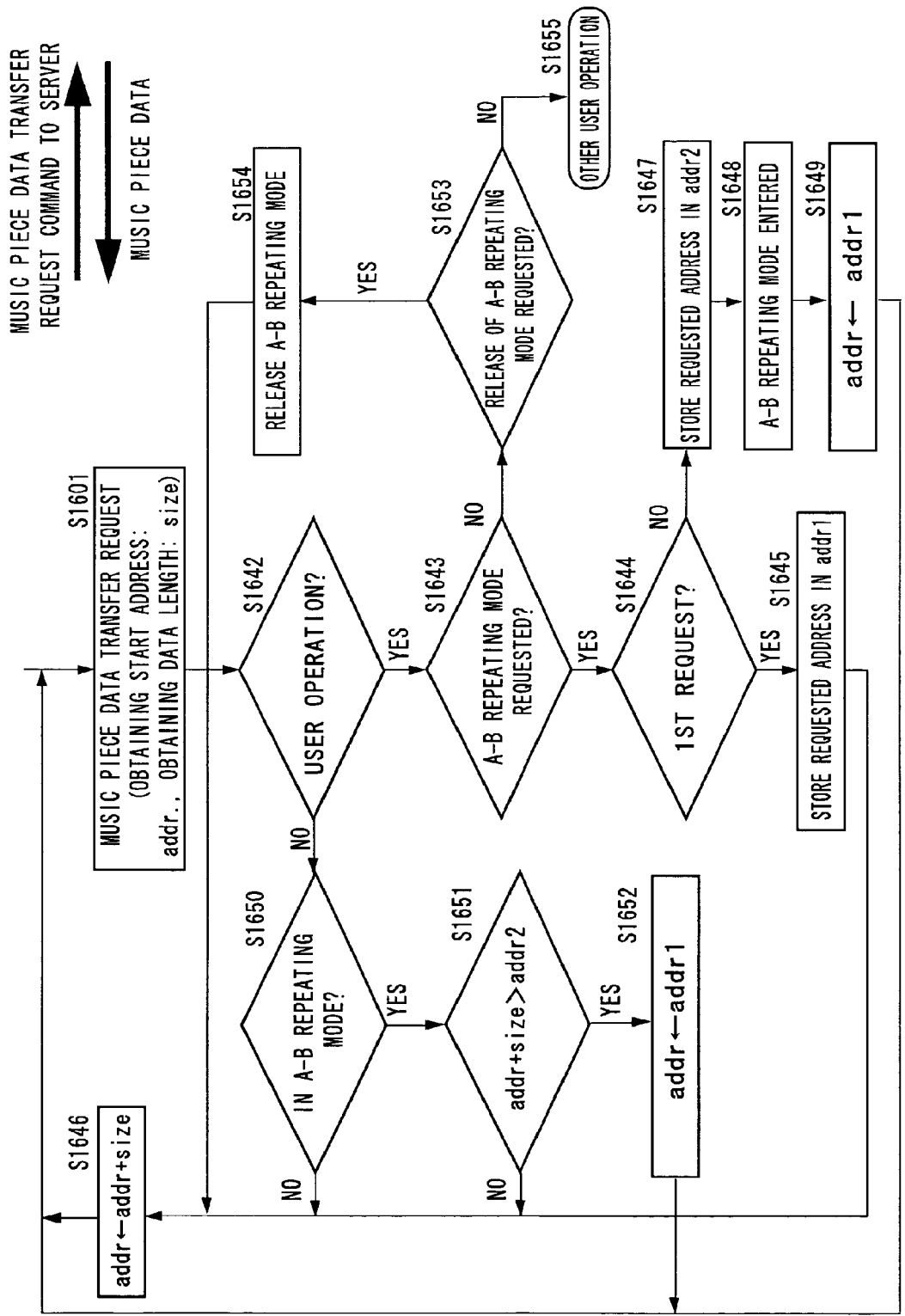
FIG. 113 is a flowchart for use in illustration of repetitive reproducing operation by an audio client according to another embodiment of the invention.

Data can repeatedly be reproduced between first and second addresses specified by the user, in other words, A-B repeating reproducing can be performed. The user carries out the first A-B repeating operation and specifies the first address indicating the start of repeating. More specifically, referring to FIG. 113, when the audio client requests music piece data to be transferred (and obtained) (S1601), and there is the user's operation (S1642), which is an A-B repeating request (S1643) by the first request (S1644), the audio client stores the address specified by the user as the first address (addr1). The obtaining data length (size) is added to the previous obtaining start address (addr) to produce an obtaining start address (addr) (S1646), and the process returns to step S1601.

Then, the user carries out the second A-B repeating operation, specifies the second address that indicates the end of repeating, and starts repeating operation. More specifically, in step S1644, since the A-B repeating request is for the second time (not for the first time), the address specified by the user is stored as the second address (addr2) (S1647).

The audio client enters an A-B repeating mode (S1648). More specifically, the obtaining start address is changed to the first address (S1649), and the audio client requests music piece data to be transferred (and obtained) (S1601). Here, the audio client determines that the A-B region is in a repeating state (S1650) and then determines whether the obtaining start address (=the previous start address+the obtaining data length) is greater than the second address (S1651). If the obtaining start address is still not more than the second address, the music piece data transfer request is continued (S1646 and S1601). If the obtaining start address is greater than the second address in step S1651, the obtaining start address is again changed to the first address (S1652), and a music piece data transfer request is carried out (S1601). In this way, the repeating reproducing can be performed between the first and second addresses. The user can release the repeating state by repeating releasing operation (S1643, S1653, and S1654).

2. 6. Midway Reproducing

Figure 114:
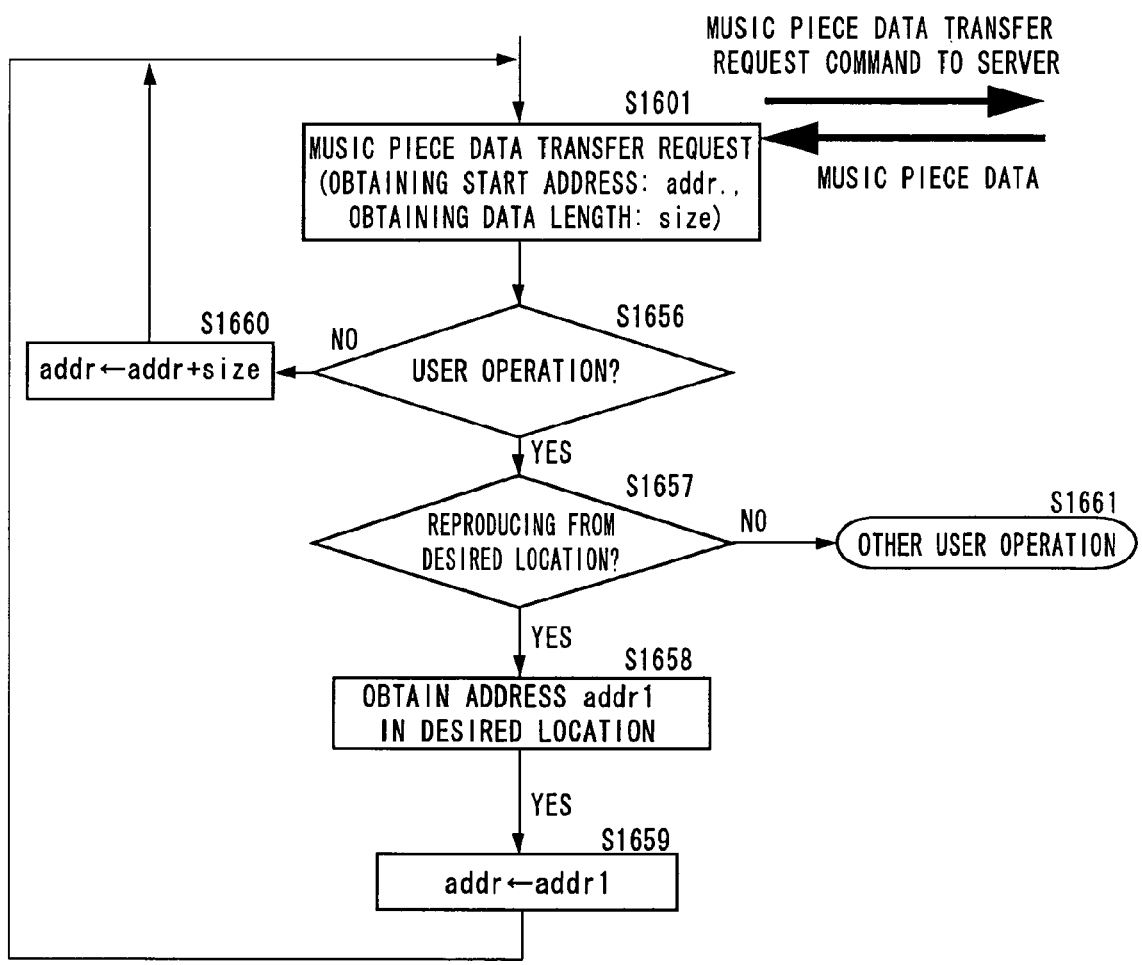
FIG. 114 is a flowchart for use in illustration of midway reproducing operation by an audio client according to another embodiment of the invention.

The user can specify an obtaining start address (for example by inputting start time) in order to reproduce a music piece from the specified address. More specifically, referring to FIG. 114, when the audio client requests music piece data to be transferred (and obtained) (S1601), and there is the user's operation (S1656), which specifies an address (S1657), the audio client obtains the address specified by the user (S1658). The address is produced from the total reproducing time of the music piece and the start time input by the user. The obtaining start address is changed to the address specified by the user (S1659), and the transfer of the music piece data is requested (and the music piece data is obtained) (S1601). In this way, the music piece can be reproduced from the address specified by the user. In addition, the user can specify an address not only when the audio client is in a reproducing state but also for example in a stop state or a pause state.

2. 7. Client with Automatic Connection Recovery Function

As described above, in the network type audio system, the audio client is connected to the content server, and the content server reproduces music distributed from the content server. When abnormality in the content server during the distribution causes the audio client to be disconnected from the content server, the audio client cannot reproduce the music until the audio client is once again connected to the content server. As for a typical audio client having an input device, the input device is operated to allow the audio client to carry out connection processing with the content server as shown in FIG. 5. The above described audio client stored in the outlet box without an input device is however left unconnected once it is disconnected from the content server. Therefore, the audio client desirably includes an automatic connection recovery function as follows.

Figure 115:
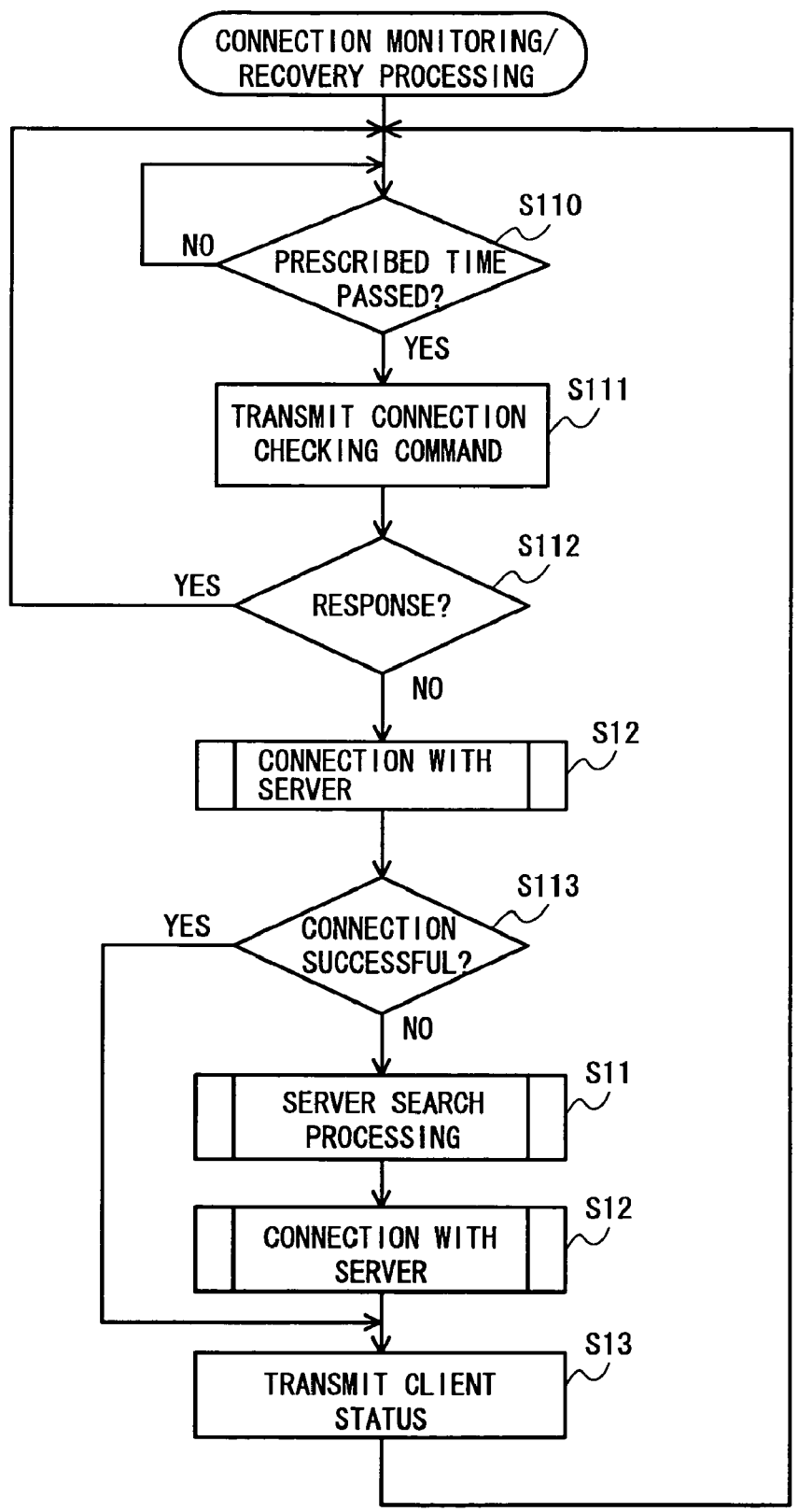
FIG. 115 is a flowchart for use in illustration of monitoring processing and connection recovery processing by an audio client according to another embodiment of the invention.

Referring to FIG. 115, the audio client Cj determines whether or not a prescribed time period has passed after its connection with the content server Si (S110). After the prescribed time period, the audio client Cj determines whether or not the connection with the content server Si is maintained (S111, S112). More specifically, the audio client Cj transmits a connection confirmation command to the content server Si (S111). If there is a response from the content server Si to the audio client Cj for the connection confirmation command (S112), it is determined that the connection is maintained. Meanwhile, if there is no response or a transmission error is caused (S112), it is determined that the connection is cut off. As the response, for example the content server Si may return the command the same as the transmitted command confirmation command.

If there is a response in step S112, the audio client Cj again returns to step S110 and determines whether or not the connection is maintained after a prescribed time period (S110 to S112). In this way, the audio client Cj checks the connection state with the content server Si at prescribed intervals. If the connection is cut off, the audio client Cj retries to connect to the same content server Si (S12).

After the re-connecting attempt, if the audio client successfully connects with the content server Si (S113), the audio client Cj transmits the client status immediately before the disconnection to the content server Si (S13). The client status includes for example a reproducing state such as "reproducing," "stop," and "pause," volume information, and a list construction key. Therefore, the audio client Cj can recover the original connection state with the content server Si. Consequently, the user can use the audio client Cj without being aware that the audio client Cj has re-connected with the content server Si.

Meanwhile, after the re-connecting attempt, if the audio client cannot connect with the content server Si (S113), the audio client Cj gives up reconnecting with the same content server Si and carries out connection processing with another content server Si (S11 to S13). More specifically, the audio client Cj searches for a content server Si that can be connected by broadcasting (S11) and connects with the content server Si found by the searching (S12). After the connection, the audio client Cj transmits the client status immediately before the disconnection to the content server Si (S13).

The audio client Cj achieves the above described automatic connection recovery function by an installed connection recovery program in FIG. 115.

By the above operation, the connection state is checked by the audio client Cj at prescribed intervals, and if the connection is cut off, the audio client Cj reestablishes connection. Therefore, if any abnormality in the content server Si causes disconnection, the audio client Cj is not left in the state disconnected from the content server Si. If any abnormality in the content server Si prevents re-connection with the content server Si, the audio client connects with another content server Si. Consequently, the user can always use the controller Ak to control the audio client Cj.

The audio client Cj transmits the client status immediately before the disconnection to the content server Si connected at the moment, and therefore the audio client Cj can connect with another content server Si and still regain the state immediately before the disconnection. Therefore, the user can use the audio client Cj without being aware of the disconnection between the audio client Cj and the content server Si.

According to the embodiment, the audio client Cj has an automatic connection recovery function, but the controller Ak may have the automatic connection recovery function. A passive client having only a music reproducing function preferably has the automatic connection recovery function rather than an active client having both the music reproducing function and the control function. This is because a passive audio client Cj without a control function does not transmit a command to the content server Si on its own, and therefore once it is disconnected from the content server Si, it is left as it is. The connection with the content server Si cannot be reestablished unless the user reactivates the audio client Cj.

The steps according to all the embodiments described above form operation programs that enable a computer to carry out the operation. Therefore, when the operation programs are installed in the content servers Si, audio clients, controllers, and AVR clients, a network type audio system can be provided. The operation programs may directly be distributed through a telecommunication line such as the Internet or may be stored in a computer readable storage medium such as a CD-ROM and a DVD-ROM for distribution.

The embodiments of the invention have been shown and described simply by way of illustrating the present invention. Therefore, the invention is not limited to the embodiments described above and various changes and modifications may be made therein without departing from the scope of the invention.

What is claimed is:

1. A network Audio Video (AV) system comprising:
a controller, a client connectable to the controller via a network, and an AV equipment connectable to the client, wherein
the controller includes: a first transmitting unit transmitting a command for controlling a controlled element of the AV equipment to the client;
the client includes: a first receiving unit receiving the command from the controller, and a second transmitting unit transmitting the command to the AV equipment; and
the AV equipment includes: the controlled element, a second receiving unit receiving the command from the client, and a controlling unit controlling the controlled element according to the received command;
wherein the AV equipment further includes: a first status transmitting unit transmitting a status of the controlled element to the client,
the client further includes: a first status receiving unit receiving the status from the AV equipment, and a second status transmitting unit transmitting the status to the controller, and
the controller further includes a second status receiving unit receiving the status from the client, and a display unit displaying the received status;

wherein the client further includes a determining unit determining whether a predetermined time has passed from when the status was transmitted to the controller at the previous time in the case that the status is received from the AV equipment, the second status transmitting unit transmits the status to the controller if it is determined that the predetermined time has passed, and the second status transmitting unit does not transmit the status to the controller if it is determined that the predetermined time has not passed.

2. The network AV system according to claim 1, wherein the client further includes: a machine information transmitting unit transmitting a machine information of the AV equipment to the controller, and the controller further includes: a machine information receiving unit receiving the machine information from the client.

3. The controller used in the network AV system according to claim 1, comprising:

a first transmitting unit transmitting a command for controlling a controlled element of the AV equipment to the client.

4. The controller according to claim 3, further comprising: a second status receiving unit receiving the status from the client, and a display unit displaying the received status.

5. A controller program stored on a non-transitory computer-readable medium causing a computer in the controller used in the network AV system according to claim 1, to perform the step of:

transmitting a command for controlling a controlled element of the AV equipment to the client.

6. The controller program according to claim 5, further causing the computer in the controller used in the network AV system according to claim 1 to perform the step of:

receiving the status from the client, and displaying the received status.

7. The client used in the network AV system according to claim 1, comprising:

a first receiving unit receiving the command from the controller, and a second transmitting unit transmitting the command to the AV equipment.

8. The client according to claim 7, further comprising: a first status receiving unit receiving the status from the AV equipment, and a second status transmitting unit transmitting the status to the controller.

9. The client according to claim 8, further comprising:

determining unit determining whether a predetermined time has passed from when the status was transmitted to the controller at the previous time in the case that the status is received from the AV equipment, the second status transmitting unit transmits the status to the controller if it is determined that the predetermined time has passed, and the second status transmitting unit does not transmit the status to the controller if it is determined that the predetermined time has not passed.

10. A client program stored on a non-transitory computer-readable medium causing a computer in the client used in the network AV system according to claim 1, to perform the step of:

receiving the command from the controller, and transmitting the command to the AV equipment.

11. The client program according to claim 10, further causing the computer in the client used in the network AV system according to claim 1 to perform the step of:

receiving the status from the AV equipment, and transmitting the status to the controller.

12. The client program according to claim 11, further causing the computer in the client to perform the step of:

determining whether a predetermined time has passed from when the status was transmitted to the controller at the previous time in the case that the status is received from the AV equipment, transmitting the status to the controller if it is determined that the predetermined time has passed, and not transmitting the status to the controller if it is determined that the predetermined time has not passed.

13. The AV equipment used in the network AV system according to claim 1, comprising:

a controlled element, a second receiving unit receiving the command from the client, and a controlling unit controlling the controlled element according to the received command.

14. The AV equipment according to claim 13, further comprising: a first status transmitting unit transmitting a status of the controlled element to the client.

* * * * *